US011016628B2

(12) United States Patent
Agnetta et al.

(10) Patent No.: US 11,016,628 B2
(45) Date of Patent: May 25, 2021

(54) MOBILE DEVICE APPLICATIONS

(71) Applicant: Amazon Technologies, Inc., Reno, NV (US)

(72) Inventors: Bryan Todd Agnetta, Seattle, WA (US); Venkata Nagesh Babu Balivada, San Jose, CA (US); Blair Harold Beebe, Menlo Park, CA (US); Joseph Robert Buchta, Seattle, WA (US); Vibhunandan Gavini, Toronto (CA); Catherine Ann Hendricks, Seattle, WA (US); Brian Peter Kralyevich, Kenmore, WA (US); Santhosh Kumar Paraliyil Krishnankutty, Dublin, CA (US); Richard Leigh Mains, Seattle, WA (US); Garret Martin Miller Graaf, San Jose, CA (US); Jae Pum Park, Bellevue, WA (US); Sean Anthony Rooney, Seattle, WA (US); Marc Anthony Salazar, Seattle, WA (US); Nino Yuniardi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 732 days.

(21) Appl. No.: 14/274,673

(22) Filed: May 9, 2014

(65) Prior Publication Data

US 2014/0333670 A1 Nov. 13, 2014

Related U.S. Application Data

(60) Provisional application No. 61/821,669, filed on May 9, 2013, provisional application No. 61/821,673, filed (Continued)

(51) Int. Cl.
*G06F 3/14* (2006.01)
*G06F 3/0481* (2013.01)
(Continued)

(52) U.S. Cl.
CPC .......... *G06F 3/0481* (2013.01); *G06F 1/1694* (2013.01); *G06F 3/0346* (2013.01);
(Continued)

(58) Field of Classification Search
CPC .................................... G06F 3/14; G06F 3/17
(Continued)

(56) References Cited

U.S. PATENT DOCUMENTS 5,574,836 A 11/1996 Broemmelsiek
9,710,123 B1 7/2017 Gray
(Continued)

FOREIGN PATENT DOCUMENTS

JP H11143606 5/1999
JP 2003186792 7/2003
(Continued)

OTHER PUBLICATIONS

PCT Search Report and Written Opinion dated Dec. 8, 2014 for PCT Application No. PCT/US14/37597, 12 pages.
(Continued)

*Primary Examiner* — Ruay Ho
(74) *Attorney, Agent, or Firm* — Lee & Hayes, P.C.

(57) ABSTRACT

Electronic devices, interfaces for electronic devices, and techniques for interacting with such interfaces and electronic devices are described. For instance, this disclosure describes an example electronic device that includes sensors, such as multiple front-facing cameras to detect orientation and/or location of the electronic device relative to an object and one or more inertial sensors. Users of the device may perform gestures on the device by moving the device in-air and/or by (Continued)

moving their head, face, or eyes relative to the device. In response to these gestures, the device may perform operations.

27 Claims, 88 Drawing Sheets

Related U.S. Application Data on May 9, 2013, provisional application No. 61/821,664, filed on May 9, 2013, provisional application No. 61/821,660, filed on May 9, 2013, provisional application No. 61/821,658, filed on May 9, 2013.

(51) Int. Cl.

| | |
|---|---|
| ***G06F 1/16*** | (2006.01) |
| ***G06F 3/0346*** | (2013.01) |
| ***G06F 3/0482*** | (2013.01) |
| ***G06F 3/0483*** | (2013.01) |
| ***G06F 3/16*** | (2006.01) |
| ***G06Q 30/06*** | (2012.01) |
| ***G06F 3/0485*** | (2013.01) |
| ***G06F 3/0488*** | (2013.01) |

(52) U.S. Cl.

CPC .......... *G06F 3/0482* (2013.01); *G06F 3/0483* (2013.01); *G06F 3/0485* (2013.01); *G06F 3/0488* (2013.01); *G06F 3/04817* (2013.01); *G06F 3/16* (2013.01); *G06Q 30/0631* (2013.01); *G06F 2200/1637* (2013.01)

(58) Field of Classification Search

USPC ......... 715/776, 863, 864; 356/421; 345/156, 345/174; 709/201; 705/26.61

See application file for complete search history.

(56) References Cited

U.S. PATENT DOCUMENTS

2005/0066209 A1 3/2005 Kee et al.
2006/0174211 A1 8/2006 Hoellerer et al.
2007/0064123 A1 3/2007 Aizawa et al.
2007/0146321 A1 6/2007 Sohn et al.
2007/0186173 A1 8/2007 Both et al.
2008/0094369 A1 4/2008 Ganatra et al.
2008/0320419 A1 12/2008 Matas et al.
2009/0228841 A1* 9/2009 Hildreth ................ G06F 3/0304 715/863
2009/0313584 A1 12/2009 Kerr et al.
2010/0125816 A1 5/2010 Bezos
2010/0211872 A1 8/2010 Rolston et al.
2011/0061010 A1 3/2011 Wasko
2011/0249073 A1 10/2011 Cranfill et al.
2012/0057064 A1 3/2012 Gardiner et al.
2012/0179965 A1 7/2012 Taylor
2012/0233565 A1* 9/2012 Grant .................. G06F 3/04817 715/776
2012/0249471 A1* 10/2012 Yi ......................... G06F 3/0416 345/174
2012/0311438 A1 12/2012 Cranfill et al.
2012/0311486 A1 12/2012 Reyna et al.
2013/0047126 A1 2/2013 Sareen et al.
2013/0057866 A1* 3/2013 Hillebrand ........... A45D 44/005 356/421
2013/0091439 A1 4/2013 Sirpal et al.
2013/0135203 A1 5/2013 Croughwell, III
2013/0154952 A1 6/2013 Hinckley et al.
2013/0332856 A1 12/2013 Sanders et al.
2014/0150042 A1 5/2014 Pacor et al.
2014/0207615 A1* 7/2014 Li ...................... G06Q 30/0623 705/26.61
2014/0215336 A1 7/2014 Gardenfors et al.
2014/0277843 A1 9/2014 Langlois et al.
2014/0282205 A1* 9/2014 Teplitsky .............. G06F 3/0483 715/776
2014/0283142 A1 9/2014 Shepherd et al.
2014/0320387 A1* 10/2014 Eriksson ................. G06F 3/017 345/156
2014/0324938 A1* 10/2014 Gardenfors ............. H04L 67/10 709/201
2014/0333530 A1 11/2014 Agnetta et al.
2014/0337321 A1 11/2014 Coyote et al.
2014/0337791 A1 11/2014 Agnetta et al.
2015/0033123 A1 1/2015 Arrasvuori et al.
2016/0061617 A1 3/2016 Duggan et al.

FOREIGN PATENT DOCUMENTS

| | | |
|---|---|---|
| JP | 2004356774 | 12/2004 |
| JP | 2006128789 | 5/2006 |
| JP | 2008117142 | 11/2006 |
| JP | 2009532806 | 9/2009 |
| JP | 2010171817 | 8/2010 |
| JP | 2012509544 | 4/2012 |
| JP | 2012123836 | 6/2012 |
| WO | WO2012108668 | 8/2012 |
| WO | WO2013055518 | 4/2013 |

OTHER PUBLICATIONS

Office action for U.S. Appl. No. 14/274,662, dated May 25, 2016, Agnetta et al., "Mobile Device Gestures," 13 pages.
Office action for U.S. Appl. No. 14/274,648, dated May 6, 2016, Agnetta et al.,"Mobile Device Interfaces," 16 pages.
Office action for U.S. Appl. No. 14/274,662, dated Mar. 7, 2017, Agnetta et al., "Mobile Device Gestures", 14 pages.
Office Action for U.S. Appl. No. 14/497,161, dated May 24, 2017, Balivada, et al., "Mobile Device Interfaces", 12 pages.
Office action for U.S. Appl. No. 14/500,746, dated Jun. 2, 2017, Park et al., "Mobile Device Interfaces", 25 pages.
Extended European Search Report dated Nov. 9, 2016 for European patent application No. 14795369.9, 9 pages.
Translated Japanese Office Action dated Dec. 20, 2016 for Japanese patent application No. 2016-513135, a counterpart foreign application of U.S. Appl. No. 14/274,648, 10 pages.
Office action for U.S. Appl. No. 14/274,648, dated Oct. 19, 2016, Agnetta et al.,"Mobile Device Interfaces", 17 pages.
Office Action for U.S. Appl. No. 14/497,161, dated Feb. 1, 2017, Balivada, et al., "Mobile Device Interfaces", 13 pages.
Office action for U.S. Appl. No. 14/500,746, dated Sep. 20, 2016, Park et al., "Mobile Device Interfaces", 14 pages.
Rothet al., "Bezel Swipe: Conflict-Free Scrolling and Multiple Selection on Mobile Touch Screen Devices", CHI2009, Apr. 2009, 4 pages.
Office Action for U.S. Appl. No. 14/500,726, dated Oct. 18, 2017, Donsbach, "Mobile Device Interfaces", 17 pages.
Office Action for U.S. Appl. No. 14/500,769, dated Oct. 5, 2017, Beebe, "Mobile Device Interfaces", 10 pages.
Office action for U.S. Appl. No. 14/274,662, dated Jul. 10, 2017, Agnetta et al., "Mobile Device Gestures", 19 pages.
Office Action for U.S. Appl. No. 14/497,125, dated Aug. 11, 2017, Formichelli, "Mobile Device Interfaces", 16 pages.
Office Action for U.S. Appl. No. 14/500,802, dated Sep. 5, 2017, Donsbach, "Mobile Device Interfaces", 11 pages.
European Office Action dated Jan. 18, 2018 for European Patent Application No. 14795369.9, a counterpart foreign application of U.S. Appl. No. 14/274,648, 7 pages.
Office Action for U.S. Appl. No. 14/497,161, dated Jan. 19, 2018, Balivada, et al., "Mobile Device Interfaces", 13 pages.
Office action for U.S. Appl. No. 14/274,662, dated Jan. 25, 2018, Agnetta et al., "Mobile Device Gestures", 22 pages.
Office Action for U.S. Appl. No. 14/497,125, dated Dec. 20, 2017, Formichelli, "Mobile Device Interfaces", 17 pages.
Office Action for U.S. Appl. No. 14/500,802, dated Feb. 14, 2018, Donsbach, "Mobile Device Interfaces", 14 pages.
Chinese Office Action dated Feb. 13, 2018 for Chinese patent

(56) References Cited

OTHER PUBLICATIONS application No. 201480038493.6, a counterpart foreign application of U.S. Appl. No. 14/274,648, 4 pages.
Office Action for U.S. Appl. No. 14/500,726, dated Feb. 28, 2018, Donsbach, "Mobile Device Interfaces," 19 pages.
Office Action for U.S. Appl. No. 14/500,769, dated Mar. 1, 2018, Beebe, "Mobile Device Interfaces," 12 pages.
Office Action for U.S. Appl. No. 14/500,746, dated Mar. 8, 2018, Park, "Mobile Device Interfaces," 33 pages.
Office Action for U.S. Appl. No. 14/497,161, dated May 22, 2018, Balivada, "Mobile Device Interfaces", 15 pages.
Office Action for U.S. Appl. No. 14/500,726, dated Jul. 3, 2018, Donsbach, "Mobile Device Interfaces", 17 pages.

* cited by examiner

FIG. 10
1002(3)
MUSIC ALBUM
PUMPED UP KICKS
BY TORCHES
1002(1)
MONDAY 21
JANUARY 2013
6:45
2
5
1002(2)
AFTERNOON REVIEW
AT PORT 99, IN 15 MINUTES
MOM
LEFT VOICEMAIL AT 10:04
WHAT'S FOR LUNCH?
JONI SADLER
MARCUS
WAS GOOD TO SEE YOU GUYS.
MARCUS
DO DOGS STILL RUN FREE AT AMZN?
1000

Figure 79:
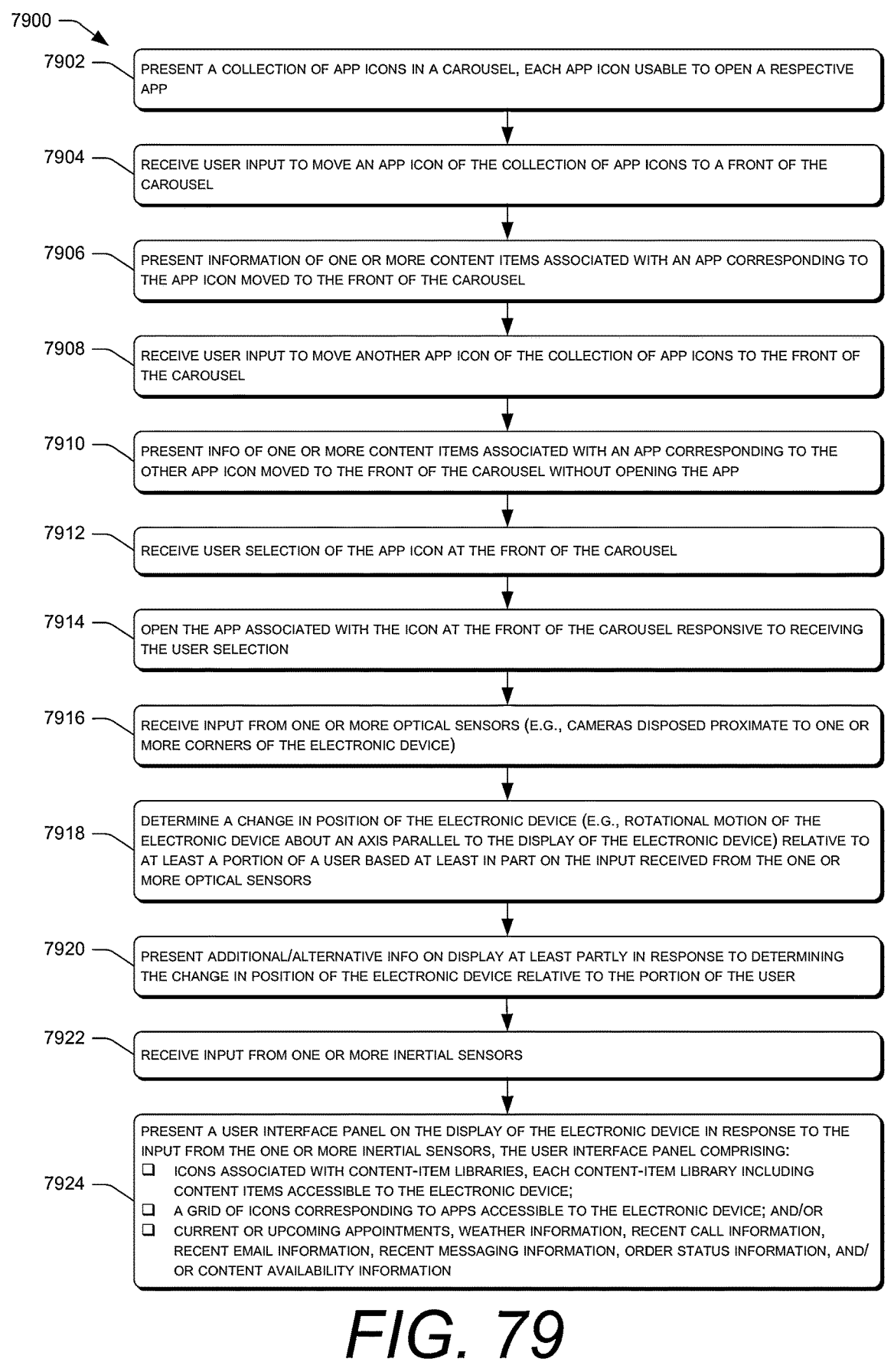

7900

7902 PRESENT A COLLECTION OF APP ICONS IN A CAROUSEL, EACH APP ICON USABLE TO OPEN A RESPECTIVE APP

7904 RECEIVE USER INPUT TO MOVE AN APP ICON OF THE COLLECTION OF APP ICONS TO A FRONT OF THE CAROUSEL

7906 PRESENT INFORMATION OF ONE OR MORE CONTENT ITEMS ASSOCIATED WITH AN APP CORRESPONDING TO THE APP ICON MOVED TO THE FRONT OF THE CAROUSEL

7908 RECEIVE USER INPUT TO MOVE ANOTHER APP ICON OF THE COLLECTION OF APP ICONS TO THE FRONT OF THE CAROUSEL

7910 PRESENT INFO OF ONE OR MORE CONTENT ITEMS ASSOCIATED WITH AN APP CORRESPONDING TO THE OTHER APP ICON MOVED TO THE FRONT OF THE CAROUSEL WITHOUT OPENING THE APP

7912 RECEIVE USER SELECTION OF THE APP ICON AT THE FRONT OF THE CAROUSEL

7914 OPEN THE APP ASSOCIATED WITH THE ICON AT THE FRONT OF THE CAROUSEL RESPONSIVE TO RECEIVING THE USER SELECTION

7916 RECEIVE INPUT FROM ONE OR MORE OPTICAL SENSORS (E.G., CAMERAS DISPOSED PROXIMATE TO ONE OR MORE CORNERS OF THE ELECTRONIC DEVICE)

7918 DETERMINE A CHANGE IN POSITION OF THE ELECTRONIC DEVICE (E.G., ROTATIONAL MOTION OF THE ELECTRONIC DEVICE ABOUT AN AXIS PARALLEL TO THE DISPLAY OF THE ELECTRONIC DEVICE) RELATIVE TO AT LEAST A PORTION OF A USER BASED AT LEAST IN PART ON THE INPUT RECEIVED FROM THE ONE OR MORE OPTICAL SENSORS

7920 PRESENT ADDITIONAL/ALTERNATIVE INFO ON DISPLAY AT LEAST PARTLY IN RESPONSE TO DETERMINING THE CHANGE IN POSITION OF THE ELECTRONIC DEVICE RELATIVE TO THE PORTION OF THE USER

7922 RECEIVE INPUT FROM ONE OR MORE INERTIAL SENSORS

7924 PRESENT A USER INTERFACE PANEL ON THE DISPLAY OF THE ELECTRONIC DEVICE IN RESPONSE TO THE INPUT FROM THE ONE OR MORE INERTIAL SENSORS, THE USER INTERFACE PANEL COMPRISING:

- ❑ ICONS ASSOCIATED WITH CONTENT-ITEM LIBRARIES, EACH CONTENT-ITEM LIBRARY INCLUDING CONTENT ITEMS ACCESSIBLE TO THE ELECTRONIC DEVICE;
- ❑ A GRID OF ICONS CORRESPONDING TO APPS ACCESSIBLE TO THE ELECTRONIC DEVICE; AND/OR
- ❑ CURRENT OR UPCOMING APPOINTMENTS, WEATHER INFORMATION, RECENT CALL INFORMATION, RECENT EMAIL INFORMATION, RECENT MESSAGING INFORMATION, ORDER STATUS INFORMATION, AND/OR CONTENT AVAILABILITY INFORMATION

Figure 80:
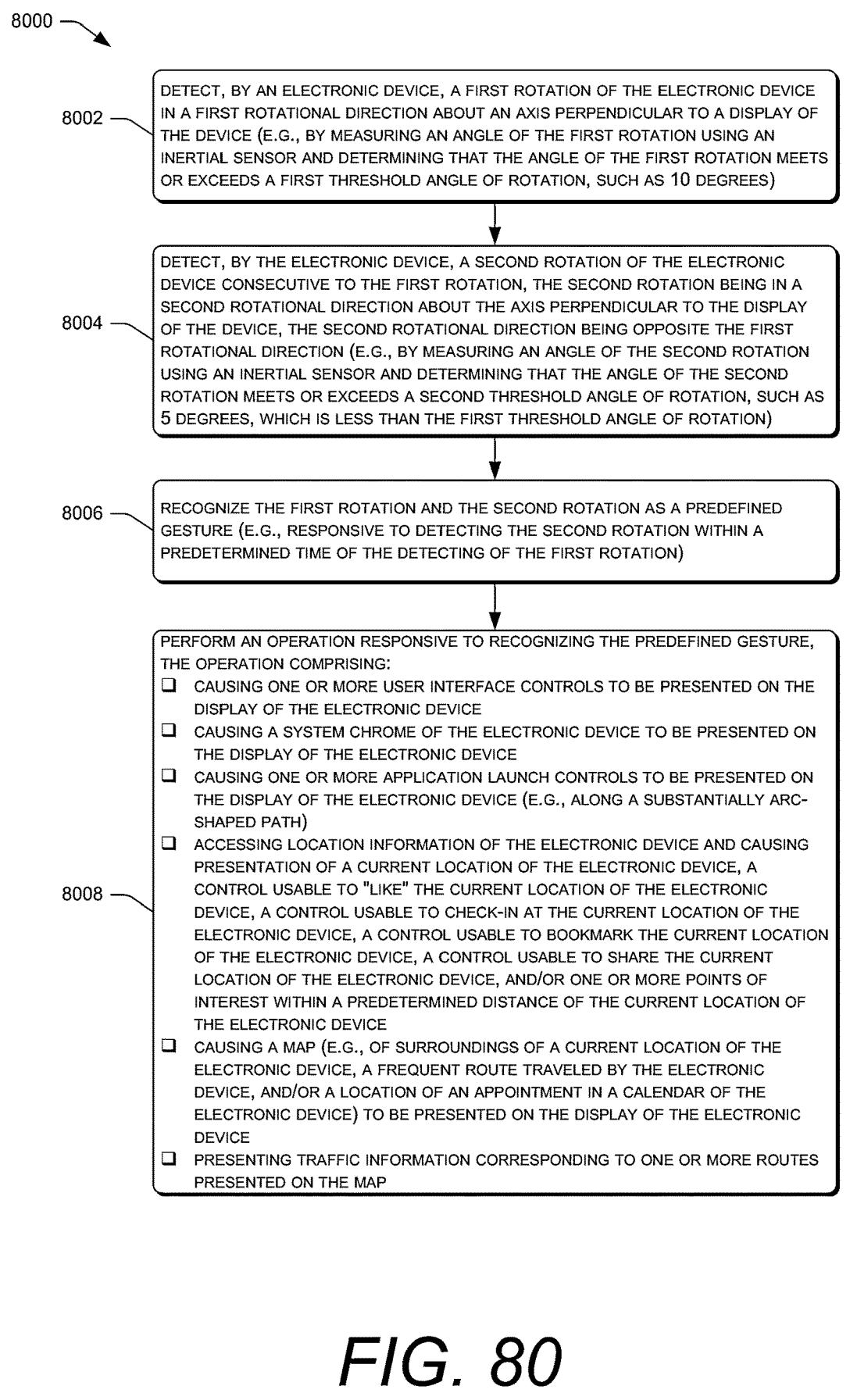

8002 DETECT, BY AN ELECTRONIC DEVICE, A FIRST ROTATION OF THE ELECTRONIC DEVICE IN A FIRST ROTATIONAL DIRECTION ABOUT AN AXIS PERPENDICULAR TO A DISPLAY OF THE DEVICE (E.G., BY MEASURING AN ANGLE OF THE FIRST ROTATION USING AN INERTIAL SENSOR AND DETERMINING THAT THE ANGLE OF THE FIRST ROTATION MEETS OR EXCEEDS A FIRST THRESHOLD ANGLE OF ROTATION, SUCH AS 10 DEGREES)

8004 DETECT, BY THE ELECTRONIC DEVICE, A SECOND ROTATION OF THE ELECTRONIC DEVICE CONSECUTIVE TO THE FIRST ROTATION, THE SECOND ROTATION BEING IN A SECOND ROTATIONAL DIRECTION ABOUT THE AXIS PERPENDICULAR TO THE DISPLAY OF THE DEVICE, THE SECOND ROTATIONAL DIRECTION BEING OPPOSITE THE FIRST ROTATIONAL DIRECTION (E.G., BY MEASURING AN ANGLE OF THE SECOND ROTATION USING AN INERTIAL SENSOR AND DETERMINING THAT THE ANGLE OF THE SECOND ROTATION MEETS OR EXCEEDS A SECOND THRESHOLD ANGLE OF ROTATION, SUCH AS 5 DEGREES, WHICH IS LESS THAN THE FIRST THRESHOLD ANGLE OF ROTATION)

8006 RECOGNIZE THE FIRST ROTATION AND THE SECOND ROTATION AS A PREDEFINED GESTURE (E.G., RESPONSIVE TO DETECTING THE SECOND ROTATION WITHIN A PREDETERMINED TIME OF THE DETECTING OF THE FIRST ROTATION)

8008 PERFORM AN OPERATION RESPONSIVE TO RECOGNIZING THE PREDEFINED GESTURE, THE OPERATION COMPRISING:

- ❑ CAUSING ONE OR MORE USER INTERFACE CONTROLS TO BE PRESENTED ON THE DISPLAY OF THE ELECTRONIC DEVICE
- ❑ CAUSING A SYSTEM CHROME OF THE ELECTRONIC DEVICE TO BE PRESENTED ON THE DISPLAY OF THE ELECTRONIC DEVICE
- ❑ CAUSING ONE OR MORE APPLICATION LAUNCH CONTROLS TO BE PRESENTED ON THE DISPLAY OF THE ELECTRONIC DEVICE (E.G., ALONG A SUBSTANTIALLY ARC-SHAPED PATH)
- ❑ ACCESSING LOCATION INFORMATION OF THE ELECTRONIC DEVICE AND CAUSING PRESENTATION OF A CURRENT LOCATION OF THE ELECTRONIC DEVICE, A CONTROL USABLE TO "LIKE" THE CURRENT LOCATION OF THE ELECTRONIC DEVICE, A CONTROL USABLE TO CHECK-IN AT THE CURRENT LOCATION OF THE ELECTRONIC DEVICE, A CONTROL USABLE TO BOOKMARK THE CURRENT LOCATION OF THE ELECTRONIC DEVICE, A CONTROL USABLE TO SHARE THE CURRENT LOCATION OF THE ELECTRONIC DEVICE, AND/OR ONE OR MORE POINTS OF INTEREST WITHIN A PREDETERMINED DISTANCE OF THE CURRENT LOCATION OF THE ELECTRONIC DEVICE
- ❑ CAUSING A MAP (E.G., OF SURROUNDINGS OF A CURRENT LOCATION OF THE ELECTRONIC DEVICE, A FREQUENT ROUTE TRAVELED BY THE ELECTRONIC DEVICE, AND/OR A LOCATION OF AN APPOINTMENT IN A CALENDAR OF THE ELECTRONIC DEVICE) TO BE PRESENTED ON THE DISPLAY OF THE ELECTRONIC DEVICE
- ❑ PRESENTING TRAFFIC INFORMATION CORRESPONDING TO ONE OR MORE ROUTES PRESENTED ON THE MAP

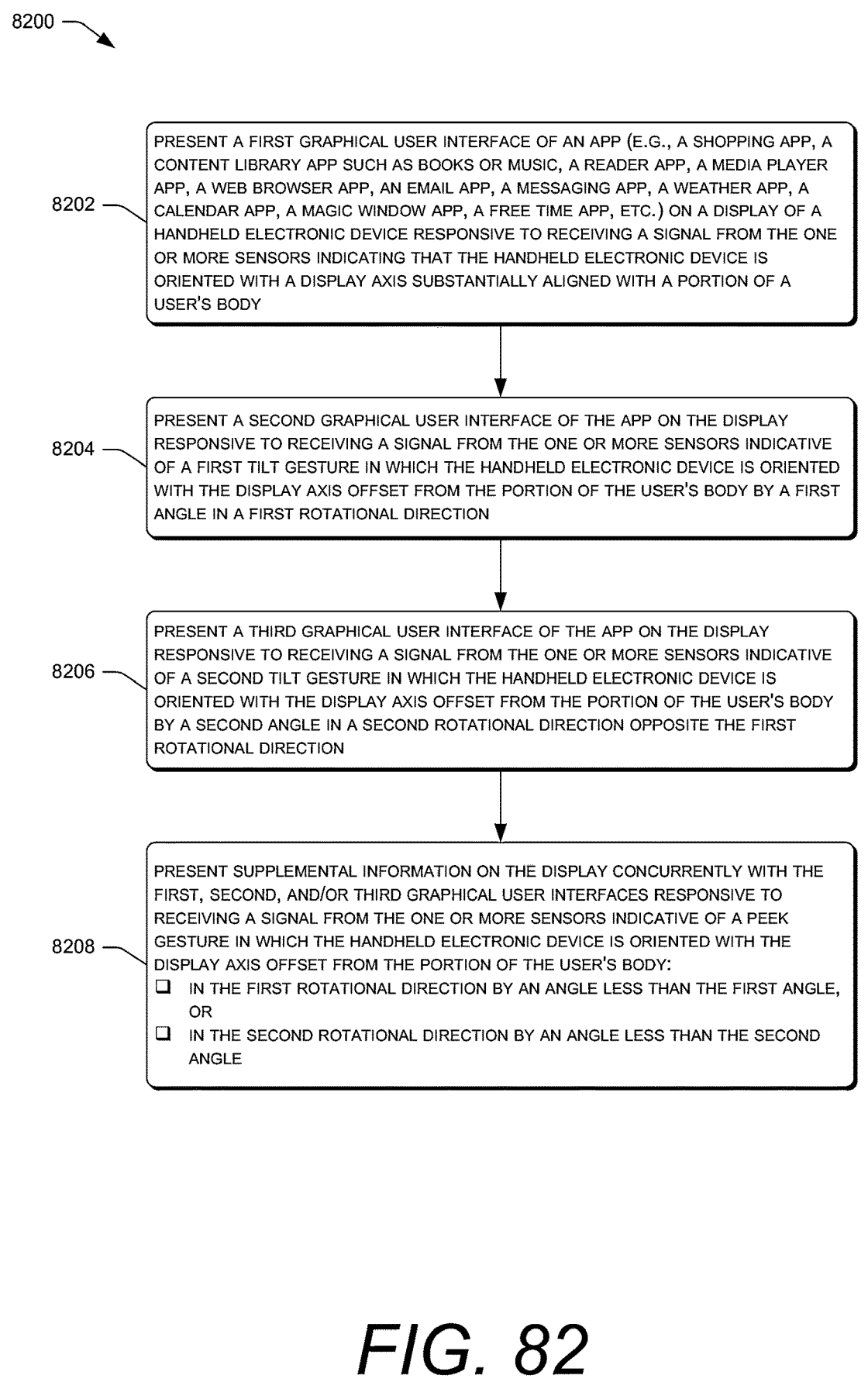

8202 PRESENT A FIRST GRAPHICAL USER INTERFACE OF AN APP (E.G., A SHOPPING APP, A CONTENT LIBRARY APP SUCH AS BOOKS OR MUSIC, A READER APP, A MEDIA PLAYER APP, A WEB BROWSER APP, AN EMAIL APP, A MESSAGING APP, A WEATHER APP, A CALENDAR APP, A MAGIC WINDOW APP, A FREE TIME APP, ETC.) ON A DISPLAY OF A HANDHELD ELECTRONIC DEVICE RESPONSIVE TO RECEIVING A SIGNAL FROM THE ONE OR MORE SENSORS INDICATING THAT THE HANDHELD ELECTRONIC DEVICE IS ORIENTED WITH A DISPLAY AXIS SUBSTANTIALLY ALIGNED WITH A PORTION OF A USER'S BODY

8204 PRESENT A SECOND GRAPHICAL USER INTERFACE OF THE APP ON THE DISPLAY RESPONSIVE TO RECEIVING A SIGNAL FROM THE ONE OR MORE SENSORS INDICATIVE OF A FIRST TILT GESTURE IN WHICH THE HANDHELD ELECTRONIC DEVICE IS ORIENTED WITH THE DISPLAY AXIS OFFSET FROM THE PORTION OF THE USER'S BODY BY A FIRST ANGLE IN A FIRST ROTATIONAL DIRECTION

8206 PRESENT A THIRD GRAPHICAL USER INTERFACE OF THE APP ON THE DISPLAY RESPONSIVE TO RECEIVING A SIGNAL FROM THE ONE OR MORE SENSORS INDICATIVE OF A SECOND TILT GESTURE IN WHICH THE HANDHELD ELECTRONIC DEVICE IS ORIENTED WITH THE DISPLAY AXIS OFFSET FROM THE PORTION OF THE USER'S BODY BY A SECOND ANGLE IN A SECOND ROTATIONAL DIRECTION OPPOSITE THE FIRST ROTATIONAL DIRECTION

8208 PRESENT SUPPLEMENTAL INFORMATION ON THE DISPLAY CONCURRENTLY WITH THE FIRST, SECOND, AND/OR THIRD GRAPHICAL USER INTERFACES RESPONSIVE TO RECEIVING A SIGNAL FROM THE ONE OR MORE SENSORS INDICATIVE OF A PEEK GESTURE IN WHICH THE HANDHELD ELECTRONIC DEVICE IS ORIENTED WITH THE DISPLAY AXIS OFFSET FROM THE PORTION OF THE USER'S BODY:

- ❑ IN THE FIRST ROTATIONAL DIRECTION BY AN ANGLE LESS THAN THE FIRST ANGLE, OR
- ❑ IN THE SECOND ROTATIONAL DIRECTION BY AN ANGLE LESS THAN THE SECOND ANGLE

*FIG. 82*

MOBILE DEVICE APPLICATIONS

RELATED APPLICATIONS

This application claims the benefit of priority to provisional U.S. Patent Application Ser. No. 61/821,658, filed on May 9, 2013 and entitled "Mobile Device User interface", provisional U.S. Patent Application Ser. No. 61/821,660, filed on May 9, 2013 and entitled "Mobile Device User interface—Framework", provisional U.S. Patent Application Ser. No. 61/821,669, filed on May 9, 2013 and entitled "Mobile Device User interface—Controls", provisional U.S. Patent Application Ser. No. 61/821,673, filed on May 9, 2013 and entitled "Mobile Device User interface—Apps", and provisional U.S. Patent Application Ser. No. 61/821,664, filed on May 9, 2013 and entitled "Mobile Device User interface—Idioms", each of which his incorporated by reference in its entirety herein.

BACKGROUND

A large and growing population of users employs various electronic devices to perform functions, such as placing telephone calls (voice and/or video), sending and receiving email, text messaging, accessing the internet, playing games, consuming digital content (e.g., music, movies, images, electronic books, etc.), and so on. Among these electronic devices are electronic book (eBook) reader devices, mobile telephones, desktop computers, portable media players, tablet computers, netbooks, and the like.

Many of these electronic devices include touch screens to allow users to interact with the electronic devices using touch inputs. While touch input is an effective way of interfacing with electronic devices in some instances, in many instances touch inputs are problematic. For example, it may be difficult to use touch inputs when using a device one handed. As another example, when interacting with a device using touch input, a user's finger or stylus typically obscures at least a portion of the screen.

Additionally, many existing electronic device interfaces are cumbersome and/or unintuitive to use. For instance, electronic devices commonly display a plurality of available application icons on a screen of the electronic device. When a large number of applications are installed on the device, this sort of interface can become cluttered with icons. Moreover, it may be difficult to remember which icon corresponds to each application operation, particularly when application icons change over time as applications are updated and revised. Additionally, user interface controls used to perform various functions are often esoteric and unintuitive to users, and these also may change over time.

Thus, there remains a need for new interfaces for electronic devices and techniques for interacting with such interfaces and electronic devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 illustrates an example mobile electronic device that may implement the gestures and user interfaces described herein. The device may include multiple different sensors, including multiple front-facing cameras, an accelerometer, a gyroscope, and the like.

FIG. 19 illustrates an example UI that the device may display. This UI includes certain information that may be currently pertinent to the user, such as a current weather near the user, status of any orders of the user, and the like.

FIGS. 22A-22F Illustrate different three-dimensional (3D) badges that the device may display atop or adjacent to icons associated with certain items. These badges may be dynamic and able to change based on parameters, such as how much of the respective item a user has consumed, or the like.

FIG. 79 illustrates a flowchart of an example process of presenting a GUI including a collection of application icons in a carousel which are usable to open respective applications. The GUI also includes information of one or more content items associated with an application that is in interface focus (e.g., in the front of the carousel).

FIG. 80 illustrates a flowchart of an example process of detecting and recognizing a gesture (e.g., a swivel gesture) and performing an operation such as those shown in FIG. 23A-FIG. 26 responsive to the gesture.

FIG. 82 illustrates a flowchart of an example process of presenting GUIs responsive to a relative orientation of a handheld electronic device relative to at least a portion of a body of a user.

DETAILED DESCRIPTION

Figure 1:
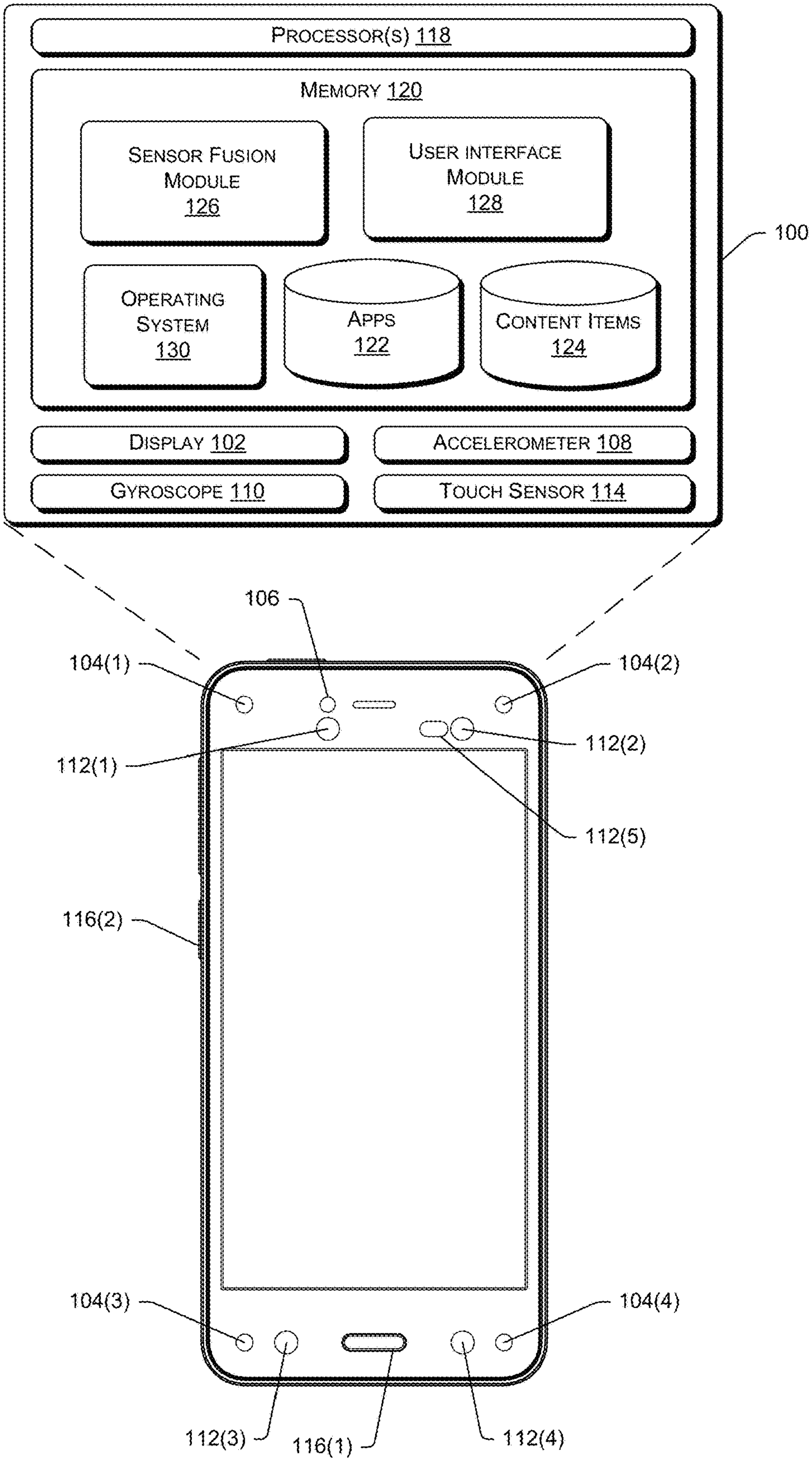

This disclosure describes, in part, new electronic devices, interfaces for electronic devices, and techniques for interacting with such interfaces and electronic devices. For instance, this disclosure describes example electronic devices that include multiple front-facing cameras to detect orientation and/or location of the electronic device relative to an object (e.g., head, hand, or other body part of a user, a stylus, a support surface, or other object). In some examples, at least some of the multiple front facing cameras may be located at or near corners of the electronic device. Using the front facing cameras alone or in combination with one or more other sensors, in some examples, the electronic device allows for simple one-handed or hands-free interaction with the device. For instance, the device may include one or more inertial sensors (e.g., gyroscopes or accelerometers), or the like, information from which may be integrated with information from the front-facing cameras for sensing gestures performed by a user.

In some examples, users may interact with the device without touching a display of the device, thereby keeping the display free of obstruction during use. By way of example and not limitation, users may interact with the device by rotating the device about one or more axes relative to the user's head or other object.

In additional or alternative examples, this disclosure describes example physical and graphical user interfaces (UIs) that may be used to interact with an electronic device. For instance, in some examples, the disclosure describes presenting a first interface responsive to detecting a first condition (e.g., a first orientation of the electronic device relative to the user), and presenting a second interface responsive to a second condition (e.g., a second orientation of the electronic device relative to the user). In one illustrative example, the first interface may comprise a relatively simple or clean interface (e.g., icons or images with limited text or free of text) and the second interface may comprise a more detailed or informative interface (e.g., icons or images with textual names and/or other information). In other examples, the first interface may include first content and the second interface may include additional or alternative content.

In addition, the techniques described herein allow a user to view different "panels" of content through different in-air gestures of the device. These gestures may take any form and may be detected through optical sensors (e.g., front-facing cameras), inertial sensors (e.g., accelerometers, gyroscopes, etc.), or the like, as discussed in detail below.

Content displayed on the device, meanwhile, may reside in three or more panels, including a center (default) panel, a left panel, and a right panel. In some instances, the "home screen" of the device may reside within a center panel, such that a leftward-directed gesture causes the device to display additional content in a left panel and a rightward-directed gesture causes the device to display still more additional content in a right panel.

In some instances, the content in the center panel of the home screen may comprise, in part, an interactive collection, list, or "carousel" of icons corresponding to different applications and/or content items (collectively, "items") that are accessible to the device. For instance, the content may comprise a list that is scrollable horizontally on the display via touch gestures on the display, physical buttons on the device, or the like. However the list is actuated, an icon corresponding to a particular item may have user-interface focus at any one time. The content in the center panel may include (e.g., beneath the carousel) content items associated with the particular item whose icon currently has user-interface focus (e.g., is in a front of the carousel). For instance, if an icon corresponding to an email application currently has user-interface focus, then one or more most-recently received emails may be displayed in a list beneath the carousel. Alternatively, in some examples, instead of displaying the most-recently received emails, a summary or excerpts of the most-recently received emails may be provided.

In addition, a user may navigate to the left panel or right panel from the center panel of the home screen via one or more gestures. In one example, a user may navigate to the left panel by performing a "tilt gesture" to the left or may navigate to the right panel by performing a tilt gesture to the right. In addition, the user may navigate from the left panel to the center panel via a tilt gesture to the right, and from the right panel to the center panel with a tilt gesture to the left.

A tilt gesture may be determined, in some instances, based on orientation information captured by a gyroscope. As described below, a tilt gesture may comprise, in part, a rotation about a vertical "y axis" that runs down a middle of the device. More specifically, a tilt gesture to the left may comprise a clockwise rotation (when the device is viewed from a top of the device) and then back to or toward the original orientation. As such, when a user is looking at a display of the device, a tilt gesture to the left may be determined when a user rotates a left side of the screen away from him or her by some threshold amount (with the right side of the screen coming closer) and then back towards the initial orientation, with these motions being performed consecutively or contiguously. That is, in some examples, the tilt gesture is detected only if these motions occur within a certain amount of time of each other. A tilt gesture to the right may be defined oppositely.

When the user performs a tilt gesture to navigate from the interactive list in the center panel to the left panel, the left panel may display a list of content-item libraries available to the device. For instance, the left panel may include icons corresponding to different libraries that are available to the user (e.g., on the device, in a remote or "cloud" storage, or the like), such as an electronic book library, a photo gallery, an application library, or the like. When the user performs a tilt gesture to navigate from the interactive list in the center panel to the right panel, meanwhile, the right panel may display a grid or other layout of applications available to the device.

In addition, applications executable on the devices described herein may utilize the left-center-right panel layout (potentially in addition to additional left and right panels to create five-panel layouts or the like). Generally, the center panel may comprise "primary content" associated with an application, such as text of a book when in a book-reading application. The left panel of an application, meanwhile, may generally comprise a settings menu, with some settings being generic to the device and some settings being specific to the application. The right panel, meanwhile, may generally include content that is supplementary or additional to the primary content of the center panel, such as other items that are similar to a content item currently displayed on the center panel, items that may be of interest to a user of the device, items available for acquisition, or the like.

In addition to performing tilt gestures to navigate between panels, in some instances the device may be configured to detect a "peek gesture," as determined by information captured by the front-facing cameras. When a user performs a peek gesture, the device may, generally, display additional or supplemental information regarding whatever content is currently being displayed on the device. For instance, if the device currently displays a list of icons corresponding to respective books available for purchase, then a peek gesture to the right (or left) may cause the device to determine and display corresponding prices or ratings for the books atop or adjacent to the icons. As such, the user is able to quickly learn more about the items on the display by performing a quick peek gesture.

As mentioned above, the peek gesture may be determined from information captured by the front-facing cameras. More specifically, the device may identify, from the cameras, when the head or face of the user moves relative to the device (or vice versa) and, in response, may designate the gesture as a peek gesture. Therefore, a user may effectuate a peek gesture by either moving or turning his or her head to the left and/or by slightly moving the device in the rotation described above with reference to the user.

In addition, the devices described herein may be configured to detect a "swivel gesture" or a gesture made about a "z-axis," which is perpendicular to the y-axis about which the tilt is detected (the plane of the device). In some instances, a swivel gesture made from the home screen or from within any application presents a predefined set of icons, such as an icon to navigate to the home screen, navigate backwards to a previous location/application, or the like. Again, the device may detect the swivel gesture in response to orientation information captured by the gyroscope, potentially along with other information captured by other sensors (e.g., front-facing cameras, accelerometer, etc.).

In additional or alternative examples, this disclosure describes graphical UIs that are or give the impression of being at least partially three dimensional (3D) and which change or update when viewed from different orientations or locations relative to the electronic device. For instance, icons representative of applications or content items (e.g., electronic books, documents, videos, songs, etc.) may comprise three-dimensionally modeled objects such that viewing a display of the electronic device from different orientations causes the display to update which aspects of the icons the display presents (and, hence, which aspects are viewable to the user). As such, a user of the electronic device is able to move his or her head relative to the device (and/or vice versa) in order to view different "sides" of the 3D-modeled objects.

In these instances, user interfaces that are based at least in part on a user's position with respect to a device and/or motion/orientation of the device are provided. One or more user interface (UI) elements may be presented on a two-dimensional (2D) display screen, or other such display element. One or more processes can be used to determine a relative position, direction, and/or viewing angle of the user. For example, head or face tracking (or tracking of a facial feature, such as a user's eyebrows, eyes, nose, mouth, etc.) and/or related information (e.g., motion and/or orientation of the device) can be utilized to determine the relative position of the user, and information about the relative position can be used to render one or more of the UI elements to correspond to the user's relative position. Such a rendering can give the impression that the UI elements are associated with various three-dimensional (3D) depths. Three-dimensional depth information can be used to render 2D or 3D objects such that the objects appear to move with respect to each other as if those objects were fixed in space, giving the user an impression that the objects are arranged in three-dimensional space. Three-dimensional depth can be contrasted to conventional systems that simulate 2D depth, such as by stacking or cascading 2D UI elements on top of one another or using a tab interface to switch between UI elements. Such approaches may not be capable of conveying as much information as a user interface capable of simulating 3D depth and/or may not provide as immersive an experience as a UI that simulates 3D depth.

Various embodiments enable UI elements to be displayed so as to appear to a user as if the UI elements correspond to 3D depth when the user's position changes, the device is moved, and/or the device's orientation is changed. The UI elements can include images, text, and interactive components such as buttons, scrollbars, and/or date selectors, among others. When it is determined that a user has moved with respect to the device, one or more UI elements can each be redrawn to provide an impression that the UI element is associated with 3D depth. Simulation of 3D depth can be further enhanced by integrating one or more virtual light sources for simulating shadow effects to cause one or more UI elements at depths closer to the user to cast shadows on one or more UI elements (or other graphical elements or content) at depths further away from the user. Various aspects of the shadows can be determined based at least in part on properties of the virtual light source(s), such as the color, intensity, direction of the light source and/or whether the light source is a directional light, point light, or spotlight. Further, shadows can also depend on the dimensions of various UI elements, such as the x-, y-, and z-coordinates of at least one vertex of the UI element, such as the top left corner of the UI element; the width and height of a planar UI element; the width, height, and depth for a rectangular cuboid UI element; or multiple vertices of a complex 3D UI element. When UI elements are rendered based on changes to the user's viewing angle with respect to the device, the shadows of UI elements can be recast based on the properties of the virtual light source(s) and the rendering of the UI elements at the user's new viewing angle.

In some embodiments, the 3D depths of one or more UI elements can be dynamically changed based on user interaction or other input received by a device. For example, an email application, instant messenger, short message service (SMS) text messenger, notification system, visual voice mail application, or the like may allow a user to sort messages according to criteria such as date and time of receipt of a message, sender, subject matter, priority, size of message, whether there are enclosures, among other options. To simultaneously present messages sorted according to at least two dimensions, the messages may be presented in conventional list order according to a first dimension and by 3D depth order according to a second dimension. Thus, when a user elects to sort messages by a new second dimension, the 3D depths of messages can change. As another example, in a multi-tasking environment, users may cause the 3D depths of running applications to be altered based on changing focus between the applications. The user may operate a first application which may initially have focus and be presented at the depth closest to the user. The user may switch operation to a second application which may position the second application at the depth closest to the user and lower the first application below the depth closest to the user. In both of these examples, there may also be other UI elements being presented on the display screen and some of these other UI elements may be associated with depths that need to be updated. That is, when the 3D depth of a UI element changes, the UI element may cease to cast shadows on certain UI elements and/or cast new shadows on other UI elements. In still other embodiments, UI elements may be redrawn or rendered based on a change of the relative position of the user such that shadows cast by the redrawn UI elements must also be updated. In various embodiments, a UI framework can be enhanced to manage 3D depth of UI elements, including whether a UI element casts a shadow and/or whether shadows are cast on the UI element and the position, dimensions, color, intensity, blur amount, transparency level, among other parameters of the shadows.

In addition, or alternatively, a device can include one or more motion and/or orientation determination components, such as an accelerometer, gyroscope, magnetometer, inertial sensor, or a combination thereof, that can be used to determine the position and/or orientation of the device. In some embodiments, the device can be configured to monitor for a change in position and/or orientation of the device using the motion and/or orientation determination components. Upon detecting a change in position and/orientation of the device exceeding a specified threshold, the UI elements presented on the device can be redrawn or rendered to correspond to the new position and/or orientation of the device to simulate 3D depth. In other embodiments, input data captured by the motion and/or orientation determination components can be analyzed in combination with images captured by one or more cameras of the device to determine the user's position with respect to the device or related information, such as the user's viewing angle with respect to the device. Such an approach may be more efficient and/or accurate than using methods based on either image analysis or motion/orientation sensors alone.

These and numerous other aspects of the disclosure are described below with reference to the drawings. The electronic devices, interfaces for electronic devices, and techniques for interacting with such interfaces and electronic devices as described herein may be implemented in a variety of ways and by a variety of electronic devices. Furthermore, it is noted that while certain gestures are associated with certain operations, these are merely illustrative and any other gestures may be used for any other operation. Further, while example "left", "right" and "center" panels are described, it is to be appreciated that the content on these panels are merely illustrative and that the content shown in these panels may be rearranged in some implementations.

FIG. 1 illustrates an example handheld or mobile electronic device 100 that may implement the gestures and user interfaces described herein. As illustrated, the device 100 includes a display 102 for presenting applications and content items, along with other output devices such as one or more speakers, a haptics device, and the like. The device 100 may include multiple different sensors, including multiple front-facing, corner-located cameras 104(1), 104(2), 104(3), and 104(4), and 104(5) which, in some instances may reside on the front face of the device 100 and near the corners of the device 100 as defined by a housing of the device. While FIG. 1 illustrates four corner cameras 104(1)-(4), in other instances the device 100 may implement any other number of cameras, such as two corner cameras, one centered camera on top and two cameras on the bottom, two cameras on the bottom, or the like.

In addition to the cameras 104(1)-(4), the device 100 may include a single front-facing camera 106, which may be used for capturing images and/or video. The device 100 may also include an array of other sensors, such as one or more accelerometers 108, one or more gyroscopes 110, one or more infrared cameras 112(1), 112(2), 112(3), 112(4), and 112(5), a touch sensor 114, a rear-facing camera, and the like. In some instances, the touch sensor 114 is integrated with the display 102 to form a touch-sensitive display, while in other instances the touch sensor 114 is located apart from the display 102. As described in detail below, the collection of sensors may be used individually or in combination with one another for detecting in-air gestures made by a user holding the device 100.

FIG. 1 further illustrates that the device 100 may include physical buttons 116(1) and 116(2), potentially along with multiple other physical hardware buttons (e.g., a power button, volume controls, etc.). The physical button 116(1) may be selectable to cause the device to turn on the display 102, to transition from an application to a home screen of the device, and the like, as discussed in detail below. The physical button 116(2), meanwhile, may be selectable to capture images and/or audio for object recognition, as described in further detail below.

The device 100 may also include one or more processors 118 and memory 120. Individual ones of the processors 116 may be implemented as hardware processing units (e.g., a microprocessor chip) and/or software processing units (e.g., a virtual machine). The memory 120, meanwhile, may be implemented in hardware or firmware, and may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store information and which can be accessed by a processor. The memory 120 encompasses non-transitory computer-readable media. Non-transitory computer-readable media includes all types of computer-readable media other than transitory signals.

As illustrated, the memory 120 may store one or more applications 122 for execution on the device 100, one or more content items 124 for presentation on the display 102 or output on the speakers, a sensor-fusion module 126, a user-interface module 128, and an operating system 130. The sensor-fusion module 124 may function to receive information captured from the different sensors of the device, integrate this information, and use the integrated information to identify inputs provided by a user of the device. For instance, the sensor-fusion module 126 may integrate information provided by the gyroscope 110 and the corner cameras 104(1)-(4) to determine when a user of the device 100 performs a "peek gesture."

The user-interface module 128, meanwhile, may present user interfaces (UIs) on the display 102 according to inputs received from the user. For instance, the user-interface module 128 may present any of the screen described and illustrated below in response to the user performing gestures on the device, such as in-air gestures, touch gestures received via the touch sensor 114, or the like. The operating system module 130, meanwhile, functions to manage interactions between and requests from different components of the device 100.

Figure 2:
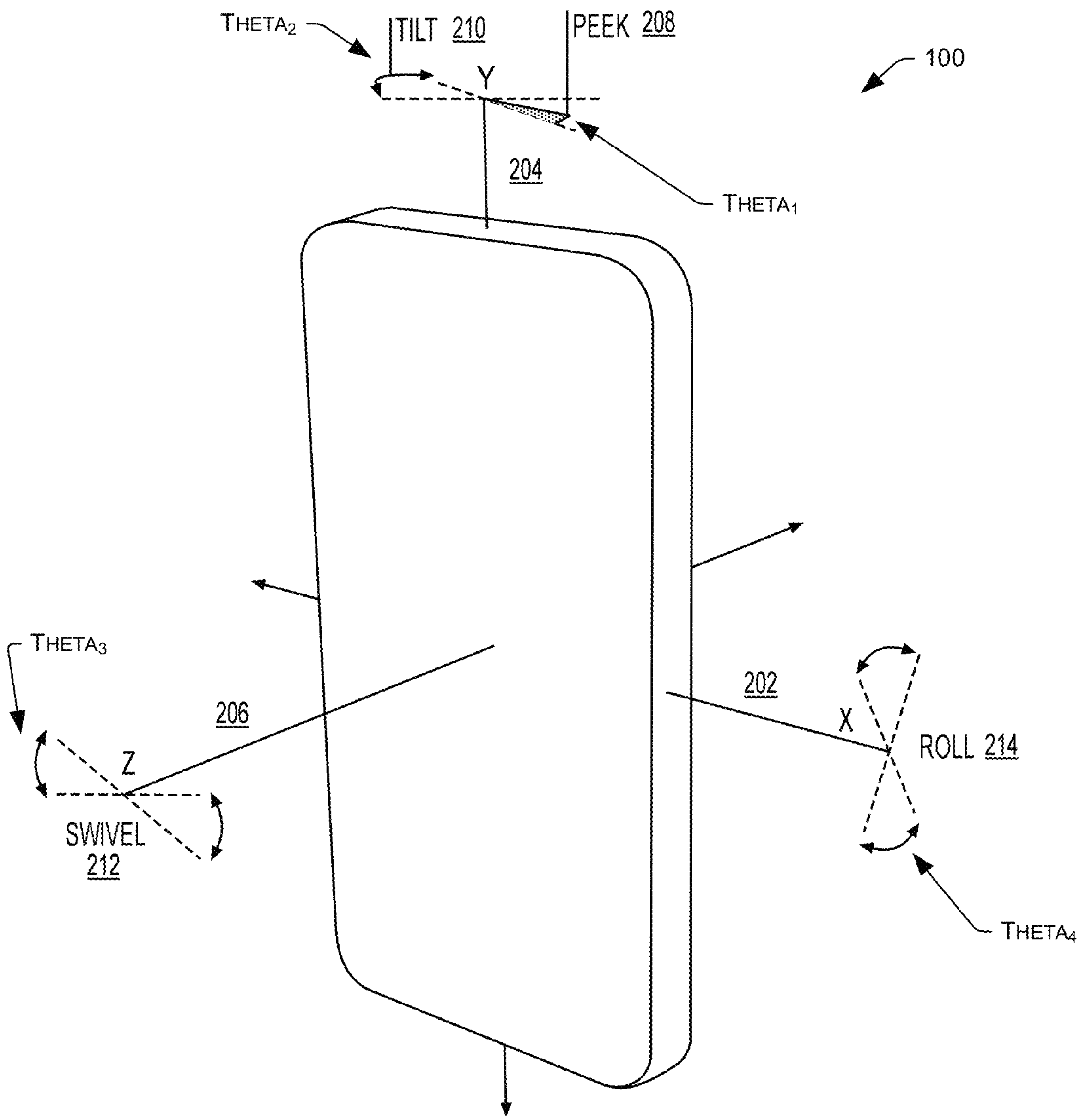
FIG. 2 illustrates example gestures that a user may perform using the device of FIG. 1, with these gestures including a peek gesture, a tilt gesture, a swivel gesture, and a roll gesture.

FIG. 2 illustrates example gestures that a user may perform using the device 100. As illustrated, FIG. 2 defines an x-axis 202, a y-axis 204, and a z-axis 206. The x-axis is within a plane defined by the major plane of the device 100 and runs along the length of the device 100 and in the middle of the device. The y-axis 204, meanwhile, is also in the plane but runs along the height of the device 100 and in the middle of the device. Finally, the z-axis 206 runs perpendicular to the major plane of the device (and perpendicular to the display of the device) and through a middle of the device 100.

As illustrated, a user may perform a peek gesture 208 and a tilt gesture 210 by rotating the device 100 about the y-axis 202. In some instances, a peek gesture 208 is determined by the user-interface module when the position of the user changes relative to the device, as determined from information captured by the corner cameras 104(1)-(4). Therefore, a user may perform a peek gesture 208 by rotating the device slightly about the y-axis (thereby changing the relative position of the user's face to the device from the perspective of the cameras 104(1)-(4)) and/or by moving the user's face to the right or left when looking at the display 102 of the device 100 (again, changing the user's position relative to the cameras 104(1)-(4)). In some instances, the peek gesture 208 is defined with reference solely from information from the cameras 104(1)-(4), while in other instances other information may be utilized (e.g., information from the gyroscope, etc.). Furthermore, in some instances a peek gesture 208 requires that a user's position relative to the device 100 change by at least a threshold angle, $\theta_1$.

Next, a user may perform a tilt gesture 210 by rotating the device 100 about the y-axis 202 by a threshold amount, $\theta_2$, and then rotating the device 100 back the opposite direction by a second threshold amount. In some instances, $\theta_2$ is greater than $\theta_1$, although in other instances the opposite is true or the angles are substantially equal. For instance, in one example $\theta_1$ may be between about 0.1° and about 5°, while $\theta_2$ may be between about 5° and about 30°.

In some implementations, the user-interface module 128 detects a tilt gesture based on data from the gyroscope indicating that the user has rotated the device 100 about the y-axis in a first direction and has started rotating the device 100 back in a second, opposite direction (i.e., back towards the initial position). In some instances, the user-interface module 128 detects the tilt gesture 210 based on the rotation forwards and backwards, as well as based on one of the cameras on the front of the device 100 recognizing the presence of a face or head of a user, thus better ensuring that the a user is in fact looking at the display 102 and, hence, is providing an intentional input to the device 100.

In some instances, the peek gesture 208 may be used to display additional details regarding icons presented on the display 102. The tilt gesture 210, meanwhile, may be used to navigate between center, left, and right panels. For instance, a tilt gesture to the right (i.e., rotating the device 104 about the y-axis in a clockwise direction followed by a counterclockwise direction when viewing the device from above) may cause the device to navigate from the center panel to the right panel, or from the left panel to the center panel. A tilt gesture to the left (i.e., rotating the device 104 about the y-axis in a counterclockwise direction followed by a clockwise direction when viewing the device from above), meanwhile, may cause the device to navigate from the center panel to the left panel, or from the right panel to the center panel.

In addition to the peek gesture 208 and the tilt gesture 210, a user of may rotate the device 100 about the z-axis to perform the swivel gesture 212. The swivel gesture may 212 comprise rotating the device more than a threshold angle ($\theta_3$), while in other instances the swivel gesture 212 may comprise rotating the device more than the threshold angle, $\theta_3$, and then beginning to rotate the device back towards its initial position (i.e., in the opposite direction about the z-axis 206), potentially by more than a threshold amount. Again, the user-interface module may determine that a swivel gesture 212 has occurred based on information from the gyroscope, from another orientation sensor, and/or from one or more other sensors. For example, the user-interface module may also ensure that a face or head of the user is present (based on information from one or more front-facing cameras) prior to determining that the swivel gesture 212 has occurred. As described above, the swivel gesture 212 may result in any sort of operation on the device 100, such as surfacing one or more icons.

Finally, FIG. 2 illustrates that a user of the device 100 may perform a roll gesture 214 by rotating the device 100 about the x-axis 202. The user-interface module 128 may identify the roll gesture similar to the identification of the tilt and swivel gestures. That is, the module 128 may identify that the user has rolled the device about the x-axis 202 by more than a threshold angle ($\theta_4$), or may identify that that the user has rolled the device past the threshold angle, $\theta_4$, and then has begun rolling it back the other direction. Again, the user-interface module 128 may make this determination using information provided by an orientation sensor, such as the gyroscope, and/or along with information from other sensors (e.g., information from one or more front-facing cameras, used to ensure that a face or head of the user is present). Alternatively, the roll gesture 214 may be detected entirely and exclusively using the optical sensors (e.g., front facing cameras). While the roll gesture 214 may be used by the device to perform an array of operations in response, in one example the roll gesture 214 causes the device to surface one or more icons, such as settings icons or the like.

In one example a user may be able to scroll content (e.g., text on documents, photos, etc.) via use of the roll gesture 214. For instance, a user may roll the device forward (i.e., so that a top half of the device is nearer to the user) in order to scroll downwards, and may roll the device backward (so that a top half of the device is further from the user) in order to scroll upwards (or vice versa). Furthermore, in some instances the speed of the scrolling may be based on the degree of the roll. That is, a user may be able to scroll faster by increasing a degree of the roll and vice versa. Additionally or alternatively, the device may detect a speed or acceleration at which the user performs the roll gesture, which may be used to determine the speed of the scrolling. For instance, a user may perform a very fast roll gesture to scroll quickly, and a very slow, more gentle roll gesture to scroll more slowly.

While a few example gestures have been described, it is to be appreciated that the user-interface module 128 may identify, in combination with the sensor-fusion module 126, an array of multiple other gestures based on information captured by sensors of the device 100. Furthermore, while a few example operations performed by the device 100 have been described, the device may perform any other similar or different operations in response to these gestures.

Figure 3:
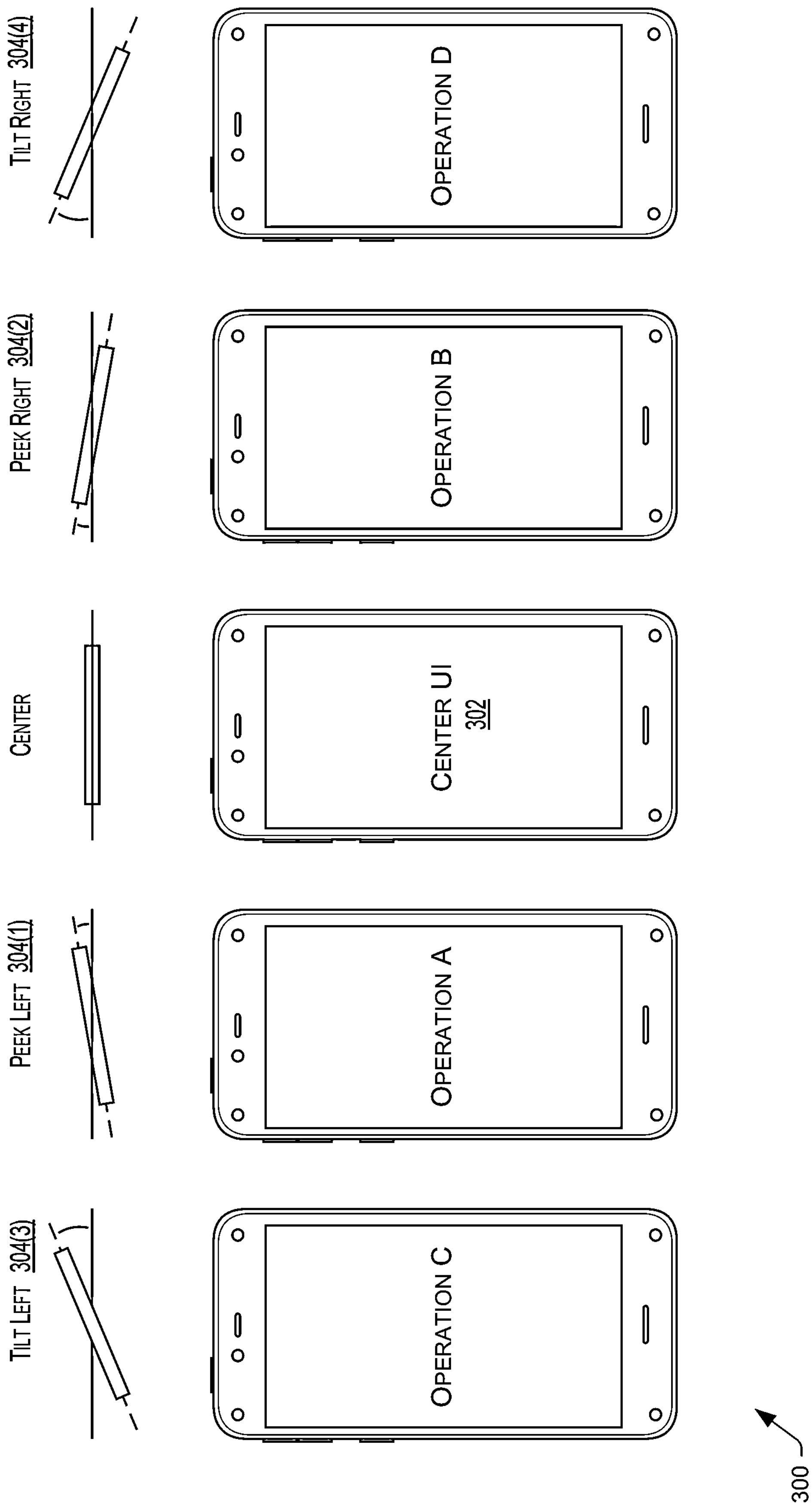
FIG. 3 illustrates an example where a user performs a peek gesture to the left, a peek gesture to the right, a tilt gesture to the left, and a tilt gesture to the right. As illustrated, each of these gestures causes the mobile electronic device to perform a different operation.

FIG. 3 illustrates an example scenario 300 where a user performs, on the mobile electronic device 100, a peek gesture to the left, a peek gesture to the right, a tilt gesture to the left, and a tilt gesture to the right. As illustrated, each of these gestures causes the mobile electronic device to perform a different operation.

To begin, the electronic device 100 presents a "center UI" 302 on the display 102. Thereafter, a user performs a peek gesture to the left 304(1) by either rotating the device 100 in a counterclockwise manner when viewed from the top of the device and/or by moving a head of the user in corresponding or opposing manner. That is, because the device 100 identifies the peek gesture using the four corner cameras 104(1)-(4) in some instances, the device identifies the gesture 304(1) by determining that the face or head of the user has changed relative to the position of the device and, thus, the user may either rotate the device and/or move his or her head to the left in this example. In either case, identifying the change in the position of the user relative to the device causes the device to perform an "operation A". This operation may include surfacing new or additional content, moving or altering objects or images displayed in the UI, surfacing a new UI, performing a function, or any other type of operation.

Conversely, FIG. 3 also illustrates a user performing a peek gesture to the right 304(2) while the device 100 presents the center UI 302. As shown, in response the device 100 performs a different operation, operation B.

In still another example, a user of the device 100 may perform a tilt gesture to the left 304(3) when the device 100 presents the center UI (before or after performance of operation A). As described above, the device 100 may recognize the tilt gesture 304(3) based on data collected by an inertial sensor, such as a gyroscope, accelerometer, or the like. For instance, the device 100 may determine that the tilt gesture has been performed in response to determining that the user has rotated the device in the counterclockwise direction (when viewed from above) passed a threshold angle and then has begun rotating the device 100 back in the clockwise direction. In response to determining that the tilt gesture has occurred, the device 100 may perform a predefined operation associated with that gesture (here, "Operation C").

Finally, FIG. 3 illustrates a user of the device 100 performing a tilt gesture to the right 304(4), which the device 100 may identify in a manner similar to how the device identified the tilt gesture 304(3). Here, however, the user rotates the device clockwise past a threshold angle and then back in a counterclockwise direction. As illustrated, the device 100 performs an operation D on the device 100.

Figure 4:
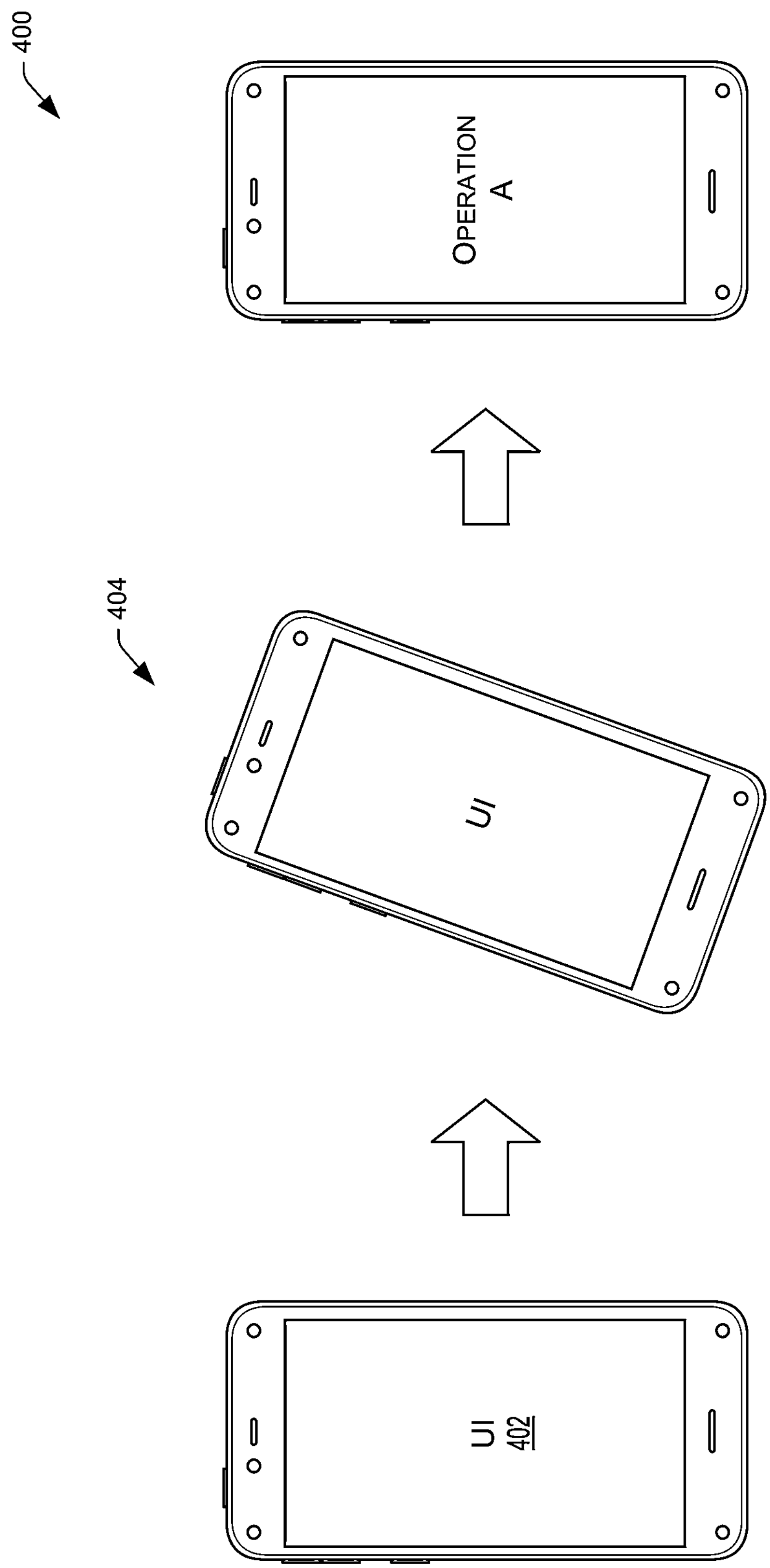
FIG. 4 illustrates an example where a user performs a swivel gesture and, in response, the device performs a predefined operation.

FIG. 4 illustrates an example scenario 400 where a user performs a swivel gesture on the device 100 and, in response, the device performs a predefined operation. As illustrated, the device 100 initially displays a UI 402. At 404, the user begins to perform a swivel gesture by rotating the device 100 in either direction about the z-axis that is perpendicular to the display 102 of the device. As noted above, an inertial sensor may sense this rotation. After 404, the user rotates the device 100 about the z-axis in the opposite direction (counterclockwise in this example) and, in response, the device 100 identifies the gesture as a swivel gesture. In response to identifying the swivel gesture, the device performs an operation A, which, as discussed above, may comprise any sort of operation, including displaying or otherwise outputting certain content. While this example displays a swivel gesture to the right (given the initial clockwise rotation), in other instances the user may perform a swivel gesture to the left, which may result in the same or a different operation.

In some instances, the swivel gesture may require that a user rotate the device by more than a first threshold amount (e.g., 10 degrees), and then back by more than a second threshold amount (e.g., 5 degrees). In other instances, the device may detect a swivel gesture in response to the user rotating the device by more than a threshold amount then back the other direction by any amount.

Figure 5:
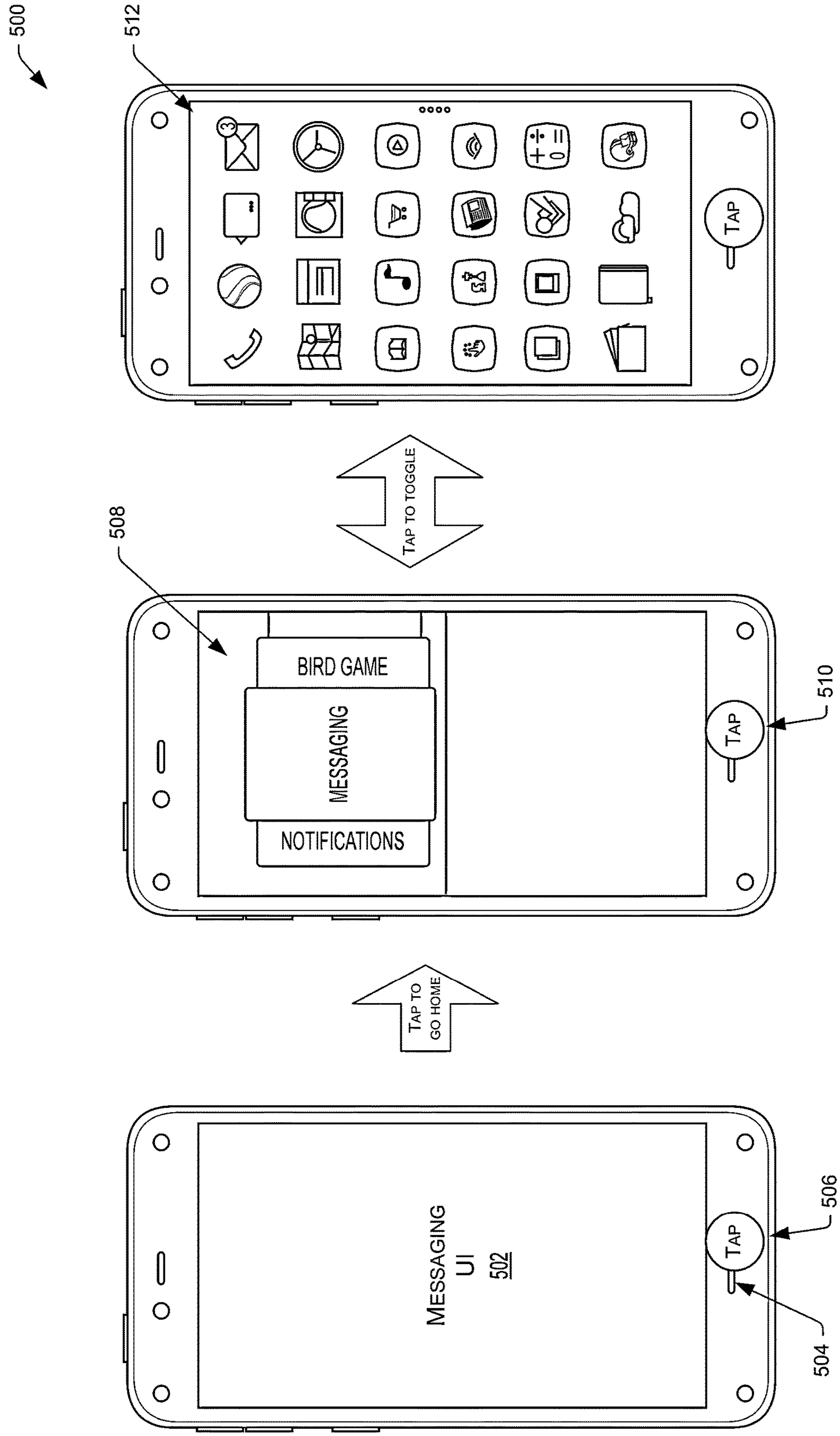
FIG. 5 illustrates an example of the user interface (UI) of the device changing in response to a user selecting a physical home button on the device. In this example, the device begins in an application, then navigates to a carousel of items in response to the user selecting the home button, and then toggles between the carousel and an application grid in response to the user selecting the home button.

FIG. 5 illustrates an example scenario 500 of the user interface (UI) of the device changing in response to a user selecting a physical home button on the device. In this example, the device 100 begins by displaying a UI 502 from an example application. While the device 100 presents the UI 502, the user selects (e.g., depresses) a physical button 504 on the device 100. This button 504 may comprise a "home button" that, when selected causes the device 100 to present a home screen associated with the device 100. In this example, at 506 the user taps or otherwise selects the button

504. In response, the device 100 navigates to the home screen 508, which comprises a carousel of icons corresponding to applications and/or content items (collectively, "items").

The list displayed on the home screen 508 may comprise an interactive list that is scrollable by the user of the device, such as by touch gestures on the display 102. For instance, the user may swipe horizontally to view different icons in the list, and a single icon in the middle of the list and in front of the other icons may have user-interface focus at any one time. In some instances, the list comprises a carousel that "loops", such that a user is able to continuously spin the carousel in a circle, while in other examples the list has two ends and may be scrolled leftwards and rightwards.

in response to the user again selecting, at 510, the home button 504, the device displays a UI comprising a grid of applications 512 available to the device (e.g., stored locally on the device, remotely in the cloud, or both). In some instances the grid 512 is scrollable horizontally or vertically to display as many pages as necessary to present an icon associated with each application available to the device 100. As illustrated, as the user selects the home button 504, the device 100 toggles between displaying the home screen (e.g., with the carousel) and the application grid 512. Application icons may appear in the home carousel 508, the application grid 512, or both.

Figure 6A:
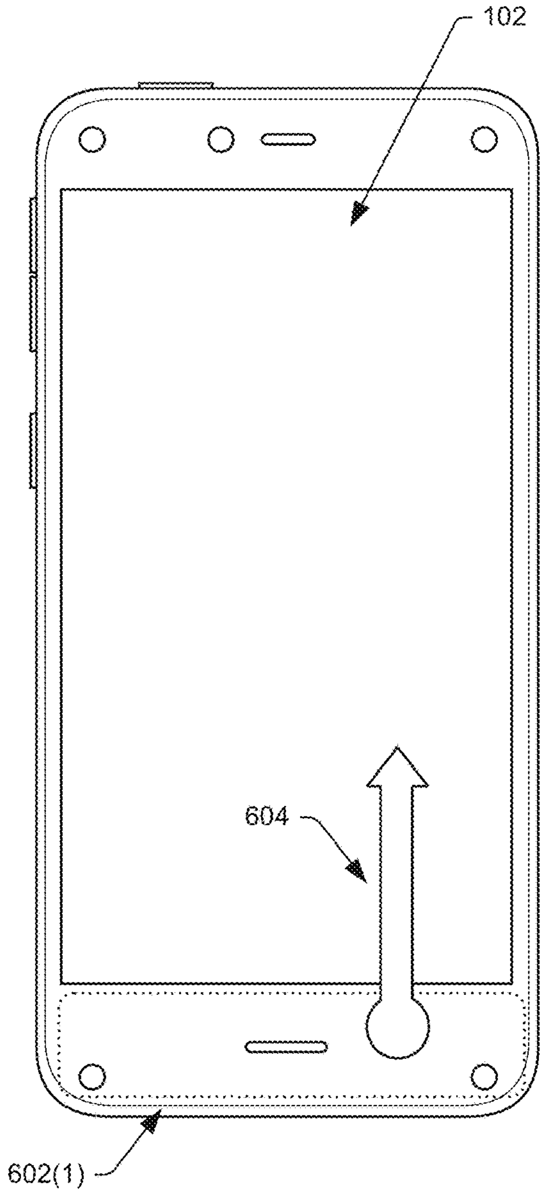
FIGS. 6A-6B illustrate example swipe gestures made from a bezel of the device and onto a display of the device.
Figure 6B:
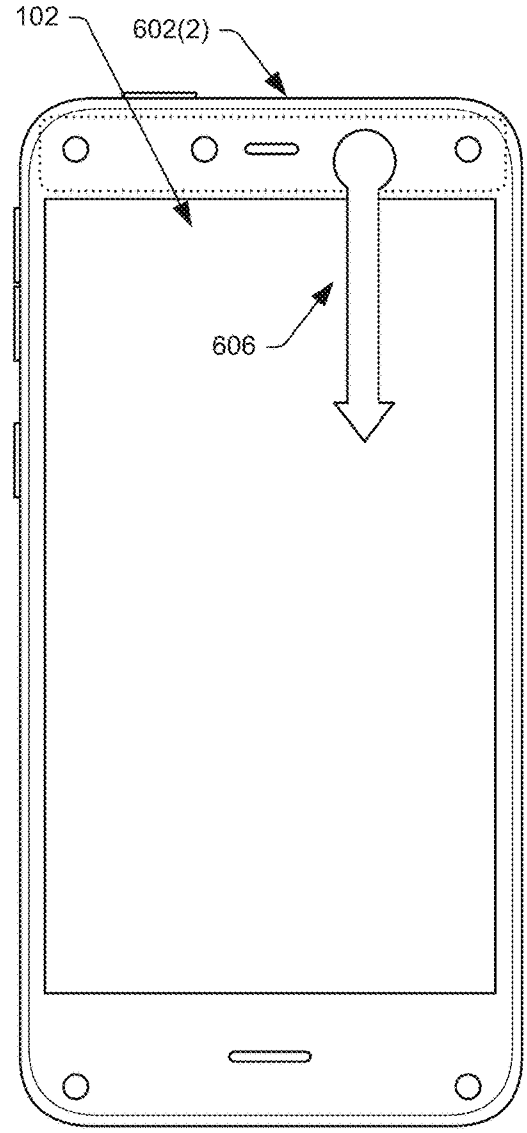

FIGS. 6A-B illustrate example swipe gestures made from a bezel of the device and onto a display of the device. FIG. 6A, for instance, displays an upwards swipe gesture 604 that begins at a bottom portion of a bezel 602(1) of the device 100 and ends on the display 102. FIG. 6B, meanwhile, illustrates a downwards swipe gesture 606 that begins at an upper portion of the bezel 602(2) and ends on the display 102.

These respective gestures may be associated with the same or different operations. For instance, the gesture 604 may cause the device 100 to navigate backwards to whatever task the device 100 was performing prior to the current task the device is performing at the time of the gesture 604. This may include navigating backwards in a browser application, switching from a first application to a second application that the user was previously consuming, or the like. Similarly, the gesture 604 may cause the device 100 to perform an sort of predefined operations.

FIGS. 7A-H illustrate an array of example swipe gestures that a user may perform on the mobile electronic device 100. These respective gestures may be associated with any type of predefined operations, which may be specific to whatever application a device is currently executing or which may be used consistently across all applications on the device.

Figure 7A:
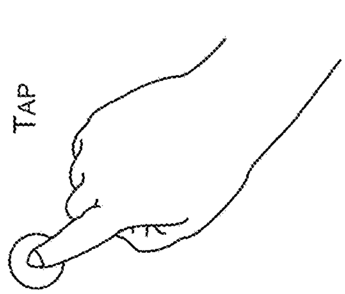
FIGS. 7A-7H illustrate an array of example touch and multi-touch gestures that a user may perform on the mobile electronic device.
Figure 7B:
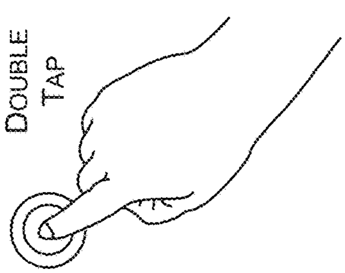

FIG. 7A illustrates a basic tap on a touch-sensitive display, such as the display 102. This may cause the device open a content item or otherwise perform a selection operation. FIG. 7B illustrates a double tap, which comprises a user striking the touch-sensitive display (or other touch sensor) with an implement (e.g., a finger, stylus, pen, etc.) two times within a threshold duration of one another and within a threshold distance of another. This may allow a user to zoom in on a content item (e.g., map, picture, etc.), to toggle a video aspect ratio of the display, to enter an immersive text view, or the like.

Figure 7C:
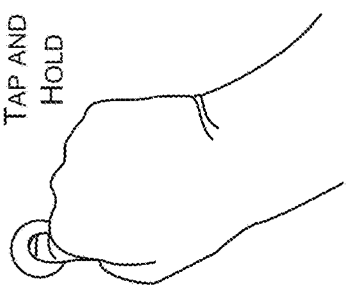

FIG. 7C, meanwhile, illustrates a tap-and-hold gesture. Here, the user taps the display and keeps his or her finger on the display for a threshold amount of time. After the touch-sensor recognizes the user's finger or other element on the display for the threshold amount of time, the device 100 may recognize the tap-and-hold gesture and may perform a corresponding operation. For instance, pressing-and-holding may cause the device to launch a voice-recognition application to allow a user of the device 100 to provide a voice command to the device. This gesture may also cause the device to present a camera button, may launch the camera directly, may cause the device 100 to present a context menu of icons, or the like.

Figure 7D:
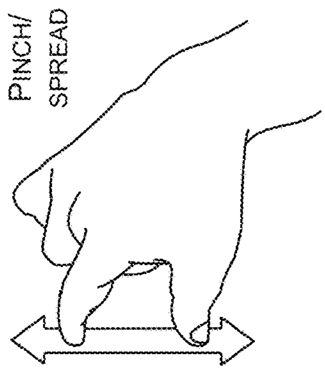

FIG. 7D illustrates a pinch-and-spread gesture, where a user places two fingers on the touch-sensitive display in close proximity to one another then spreads his or her fingers out. This may cause the device 100 to zoom in on certain items, such as maps, photos, a browser, etc.

Figure 7E:
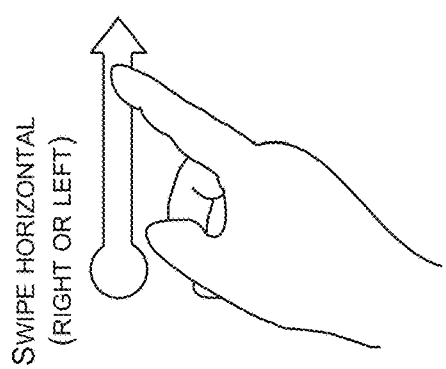
Figure 7F:
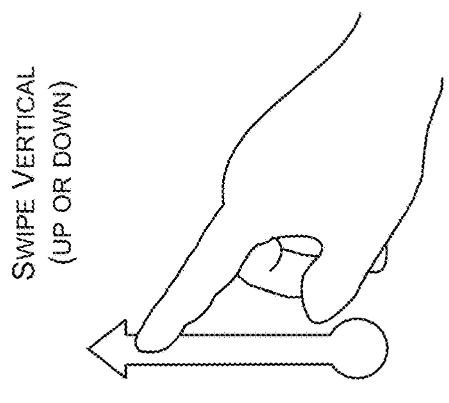

FIG. 7E, meanwhile, illustrates a horizontal swipe by a user, while FIG. 7F illustrates a vertical swipe. A horizontal swipe may allow a user to navigate an interactive list horizontally, to pan a map horizontally, to move from one song to another song in a music application to fast forward or rewind in a video application, or the like. The vertical swipe of FIG. 7F, meanwhile, may allow a user to scroll a list or the application grid vertically, pan a map vertically, unlock the device 100, answer a phone call, change a volume of the device, and the like.

Figure 7G:
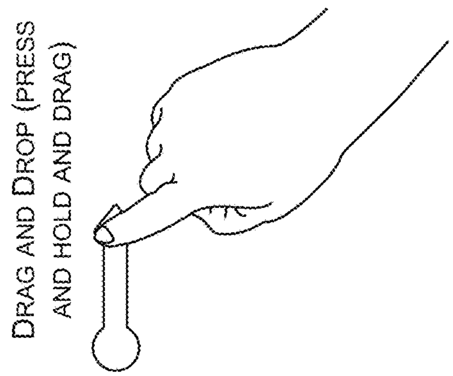

FIG. 7G illustrates a drag-and-drop gesture, which may cause the device 100 to give the appearance of the user grabbing and icon on the display 102 and moving the icon where the user's finger or other implement travels on the display. To do so, a user may tap-and-hold on the device and, after a threshold amount of time, may drag his or her finger or other implement across the display in the desired direction without lifting his or her finger or implement off of the display. When the user lifts the finger or implement off of the display, the device 100 may consider the gesture complete and may determine an operation to perform (e.g., where to display the icon) based on where the user removed his or her finger from the display 102.

Figure 7H:
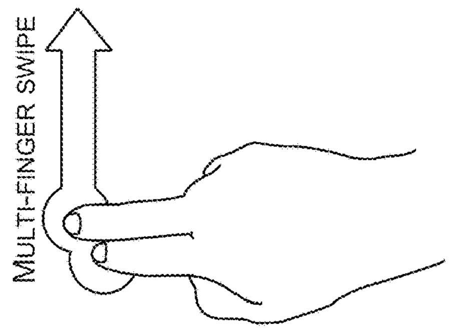

Finally, FIG. 7H illustrates a multi-finger swipe gesture, where a user places two fingers onto the touch-sensitive display or other touch sensor and slides his or her fingers across the display 102 or touch sensor. In some instances, this gesture acts similar to one or more of the in-air gestures (e.g., swivel, peek, tilt, roll) in order to provide a better experience to users that are unable to perform the in-air gestures comfortably. For instance, the multi-finger swipe gesture to the right may navigate an application (or the home screen) from a center panel to a right panel, while such a gesture to the left may cause display of a corresponding left panel. This gesture may also adjust a brightness of the display 102 or may be associated with any other predefined operation.

Figure 8:
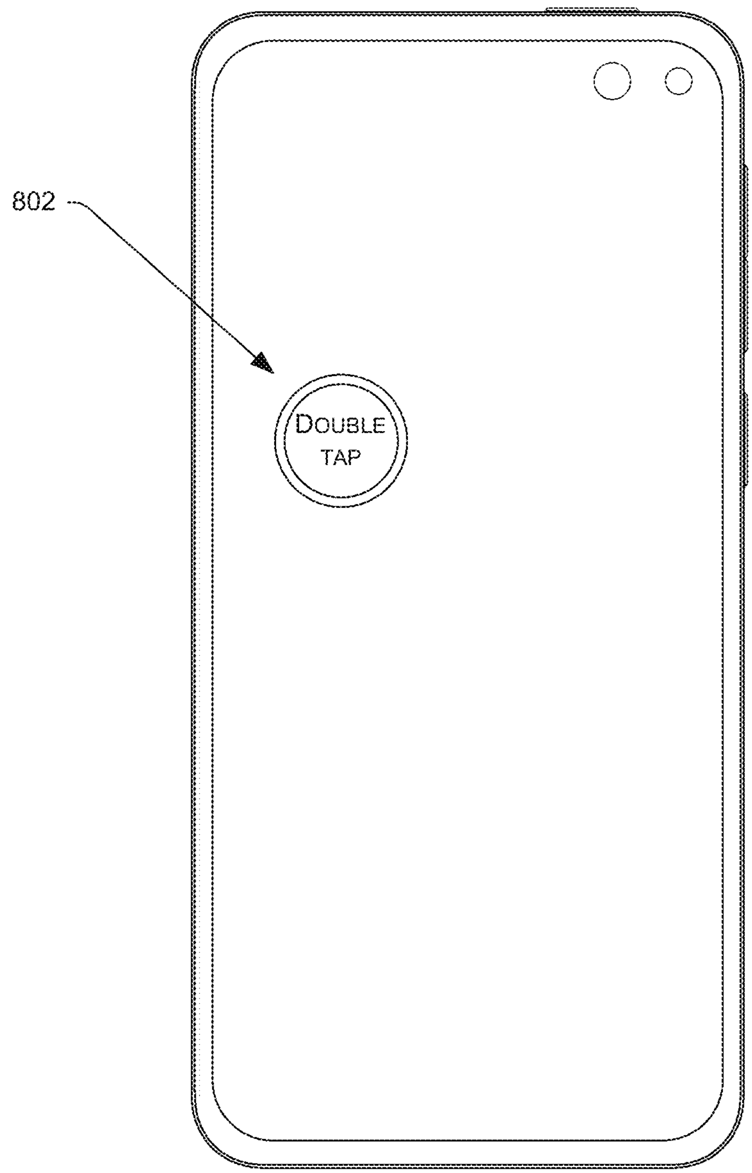
FIG. 8 illustrates an example double-tap gesture that a user may perform on a back of the mobile electronic device.

FIG. 8 illustrates an example double-tap gesture 802 that a user may perform on a back of the mobile electronic device 100. Here, a user may perform this gesture 802 by tapping the device (e.g., with a finger) on the back of the device, with the taps occurring within a threshold amount of time of each other and within a threshold distance of one another. In some instances, an inertial sensor, such as an accelerometer, a gyroscope, or both may detect both tap events and may determine: (1) whether they occurred within a threshold amount of time of one another, and (2) whether they occurred within a threshold distance of one another. If so, then the device 100 may determine that a double-tap gesture 802 occurred and may perform a corresponding operation. It is noted that while FIG. 8 illustrates a double-tap gesture, in other instances the device 100 utilizes gestures having any other predetermined number of taps. Furthermore, while an accelerometer or gyroscope may be used to identify the gesture 802, in other instances other sensors may be used to determine this gesture, such as a touch screen or touch sensor on the back of the device 100.

Figure 9:
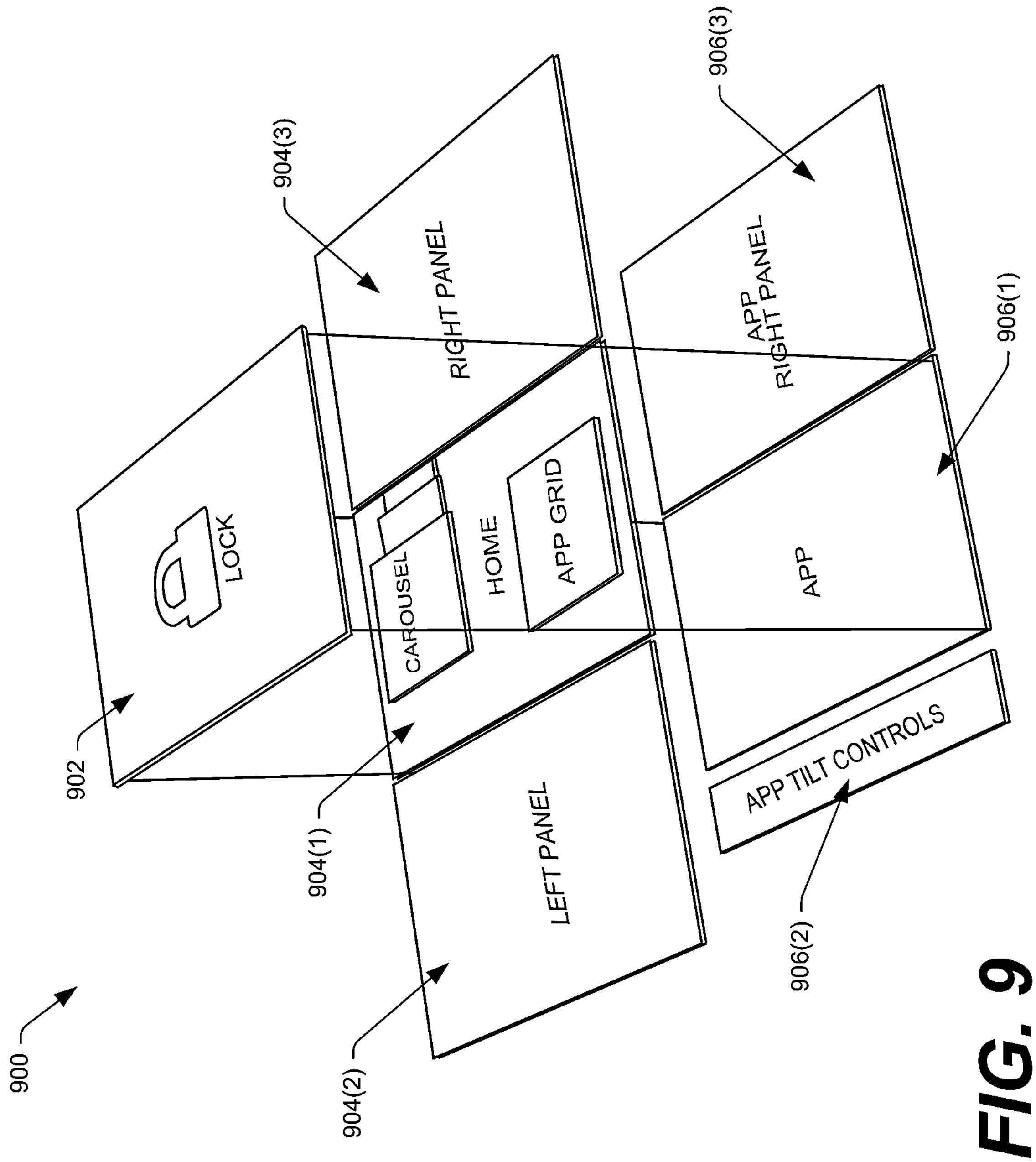
FIG. 9 illustrates an example sequence of UIs that the device may implement. The UI of the device may initially comprise a lock screen. Upon a user unlocking the device, the UI may comprise a "home screen", from which a user may navigate to right or left panels, or to an application, from which the user may also navigate to right or left panels.

FIG. 9 illustrates an example sequence of UIs 900 that the device 100 may implement. The UI of the device may initially comprise a lock screen 902. Upon a user unlocking the device (e.g., via a password, a swipe gesture, biometric authentication, etc.), the UI may comprise a "home screen" 904(1), which may include an interactive list as described above (e.g., the carousel), along with a grid of applications, which a user may navigate via vertical swipe gestures. As described above, the home screen 904(1) may comprise a center panel of a three (or more) panel layer of screens. From the home screen 904(1), the user may navigate to a left panel 904(2) or to a right panel 904(3). For instance, a user may perform a tilt gesture to the left to navigate to the left panel 904(2) or may perform a tilt gesture to the right to navigate to the right panel 904(3). Conversely, the user may perform a multi-finger swipe right or left or may perform another predefined gesture to navigate to these panels.

Additionally from the layer of screens 904, a user may navigate to a particular application comprising a center panel 906(1), a left panel 906(2), and a right panel 906(3). The center panel 906(1) may be the default screen for an application executable on the device and, as such, this panel may display the "primary content". For instance, in a book-reading application, the center panel 906(1) may comprise the content of the electronic book. In a document processing application, the center panel 906(1) may comprise the content of the document, and the like. Again, the user may navigate to the right and left panels via the respective tilt gestures in some instances.

In some examples, a left panel 906(2) of an application may comprise user-interface controls, which may include application-specific controls, device-generic controls (e.g., wireless settings, display brightness, etc.), or both. The right panel 906(3), meanwhile, may comprise content that is supplementary to or related to the primary content displayed on the center panel 906(1). While a few specific examples are discussed and illustrated below, it is to be appreciated that these are merely examples and many other possibilities exist.

Figure 10:
FIG. 10 illustrates an example lock screen and potential right and left panels that the device may display in response to predefined gestures (e.g., a tilt gesture to the right and a tilt gesture to the left, respectively).

FIG. 10 illustrates an example lock screen 1000 comprising a center panel 1002(1), a left panel 1002(2), and a right panel 1002(3). As illustrated, the center panel 1002(1) may include certain information, such as a current date, time of day, notifications, and the like. The notifications may include a number of new messages (e.g., emails, text messages etc.) that the user has received, a number of new voicemails, meeting reminders, and the like.

In addition, the user may learn additional information about what is displayed on the center panel 1002(1) by navigating to the left panel 1002(2). In some instances, the user may navigate to the left panel by performing a tilt gesture to the left. As illustrated, the left panel 1002(2) of the lock screen 1000 includes additional information regarding the notifications, such as expanded information regarding the received messages, received voicemails, and impending meetings. For the messages, this additional information may include an indication of a sender of each message, other recipient(s) of each message if any, a subject of each message, a part or all of the content of each message, and/or the like. The additional information for the voicemail may indicate who the voicemail is from, when the device 100 received the voicemail, a length of the voicemail, and/or the like. For the meeting reminder, the additional information may include a title of the meeting, a location of the meeting, when the meeting is scheduled to occur, and/or the like. In addition, because the object representing the current time of day (6:45) is a 3D-modeled object, performing the tilt gesture to the left causes this object to be oriented differently, as if the user were seeing a left side of the object.

Furthermore, the user may navigate to the right panel 1002(3) of the lock screen 1000 by performing a tilt gesture to the right. In this example, the right panel 1002(3) shows music that the device is currently playing, along with some controls for controlling the music. Again, some of the objects, including the time, the controls, and the album cover comprise 3D-modeled objects and, therefore, the orientation and shadowing of these items may change as the user changes his or her position relative to the device 1000. In other examples, right panels of the lock screen may display information of one or more currently open applications (e.g., games, weather, timers, alarms, etc.).

FIGS. 11A-E illustrate an example home screen of the device. Here, the home screen comprises an upper portion having a carousel 1100 that a user is able to navigate via swipe gestures on the display 102. As illustrated, content associated with an item having focus on the carousel may be display in a lower portion beneath the carousel. As an item having focus in the carousel is changed or updated, so too does the information in the lower portion.

Figure 11D:
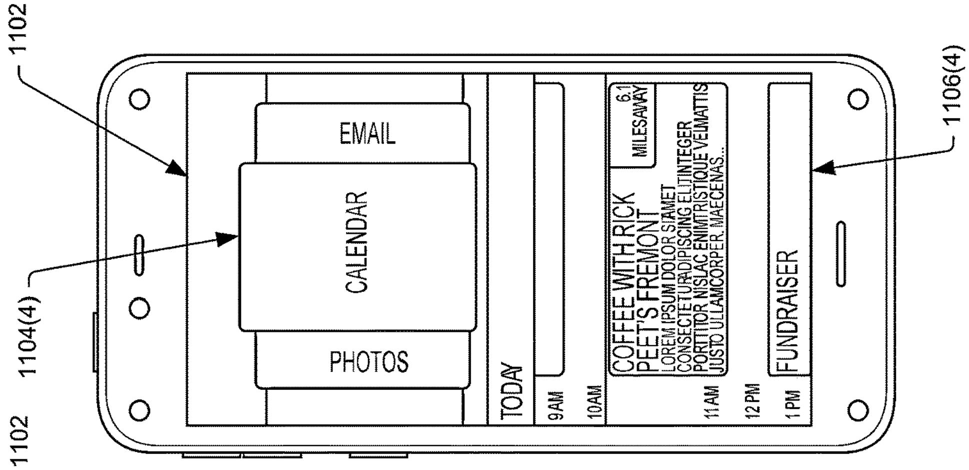
FIGS. 11A-11E illustrate an example home screen of the device. Here, the home screen comprises a carousel that a user is able to navigate via swipe gestures on the display. As illustrated, content associated with an item having focus on the carousel may be display beneath the carousel.
Figure 11C:
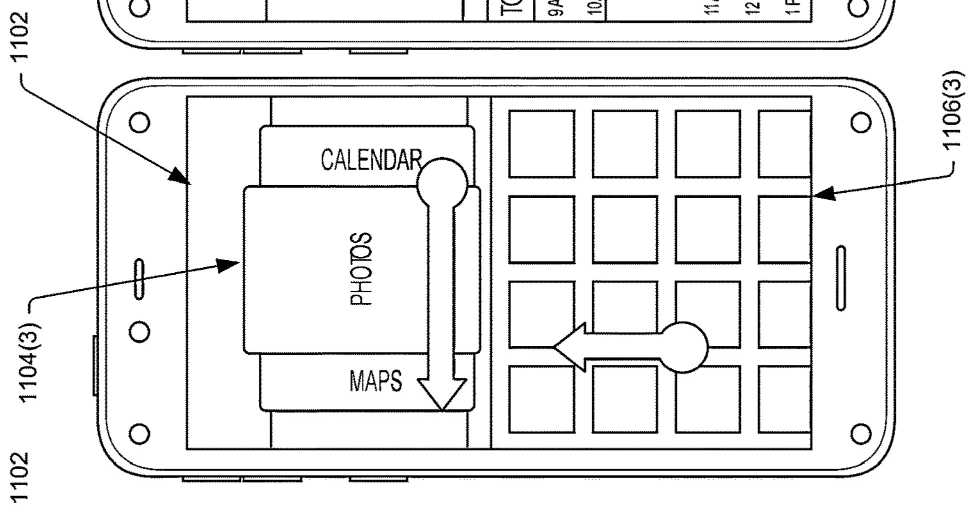
Figure 11B:
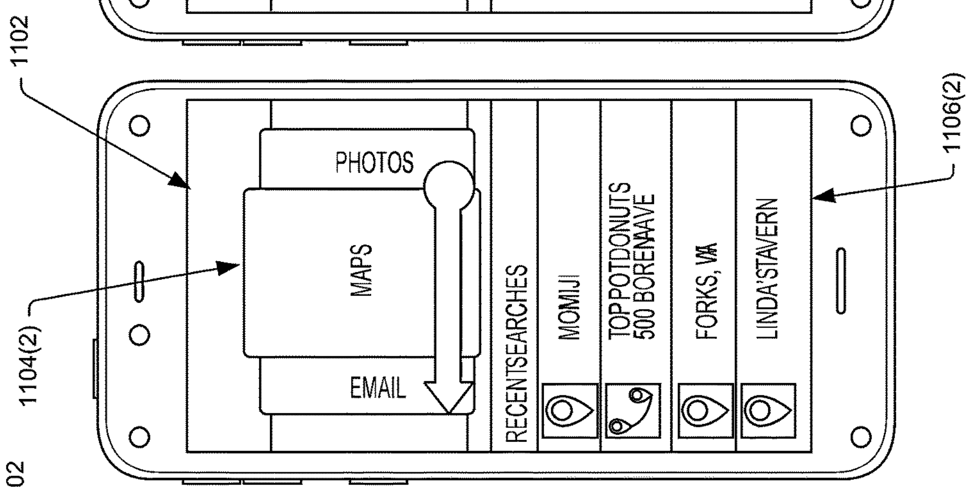
Figure 11A:
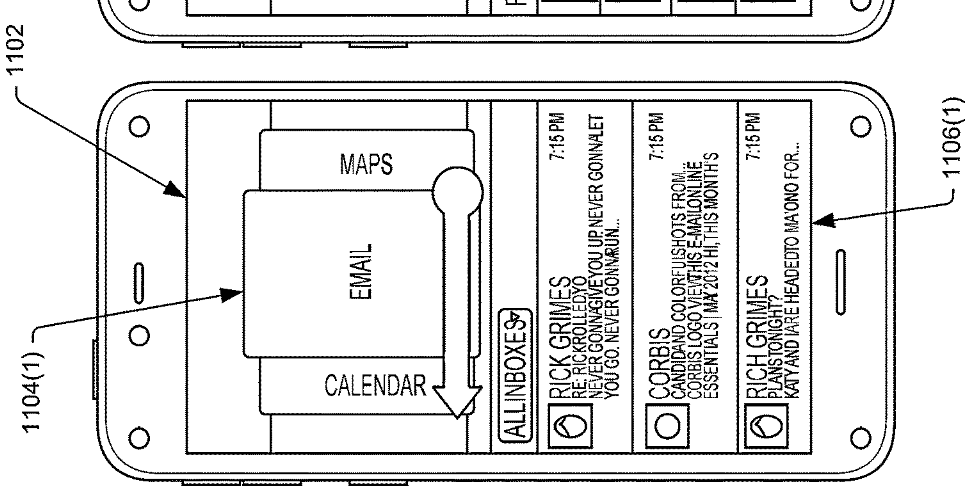

FIG. 11A illustrates the carousel 1102 when an icon 1104(1) corresponding to an email application has user-interface focus. That is, the icon 1104(1) is centered and in front of each other icon in the carousel 1102 and, therefore, has the user-interface focus. As illustrated, the lower portion of the display includes additional items 1106(1) associated with the email application. In this instance, these items comprise email messages, such as the most recently received emails.

FIG. 11A further illustrates that the user may scroll the carousel 1102 horizontally, and in this instance to the left. As such, FIG. 11B illustrates that an icon 1104(2) corresponding to mapping application currently has user-interface focus. As such, the lower portion of the display 102 presents additional items 1106(2) associated with the mapping application, such as recent geographical searches conducted on the application.

FIG. 11C illustrates that the user has again scrolled the carousel to the left, such that an icon 1104(3) corresponding to a photo-gallery application now has user-interface focus. As such, the lower portion presents additional items 1106(3) associated with the application having the user-interface focus. Here, the additional items 1106(3) may comprise recent pictures that the user has taken using a camera of the device. FIG. 11C further illustrates that the user is able to scroll the additional items 1106(3) in the lower portion via vertical swipe gestures.

FIG. 11D illustrates that the user has again scrolled the carousel to left, such that an icon 1104(4) corresponding to a calendaring application now has user-interface focus. As such, the lower portion now presents items 1106(4) associated with the calendaring application. Here, these items comprise upcoming meetings for the day. Again, this day-view shown in the lower portion of the display 102 may be navigable by the via vertical swipe gestures on the display 102.

Figure 11E:
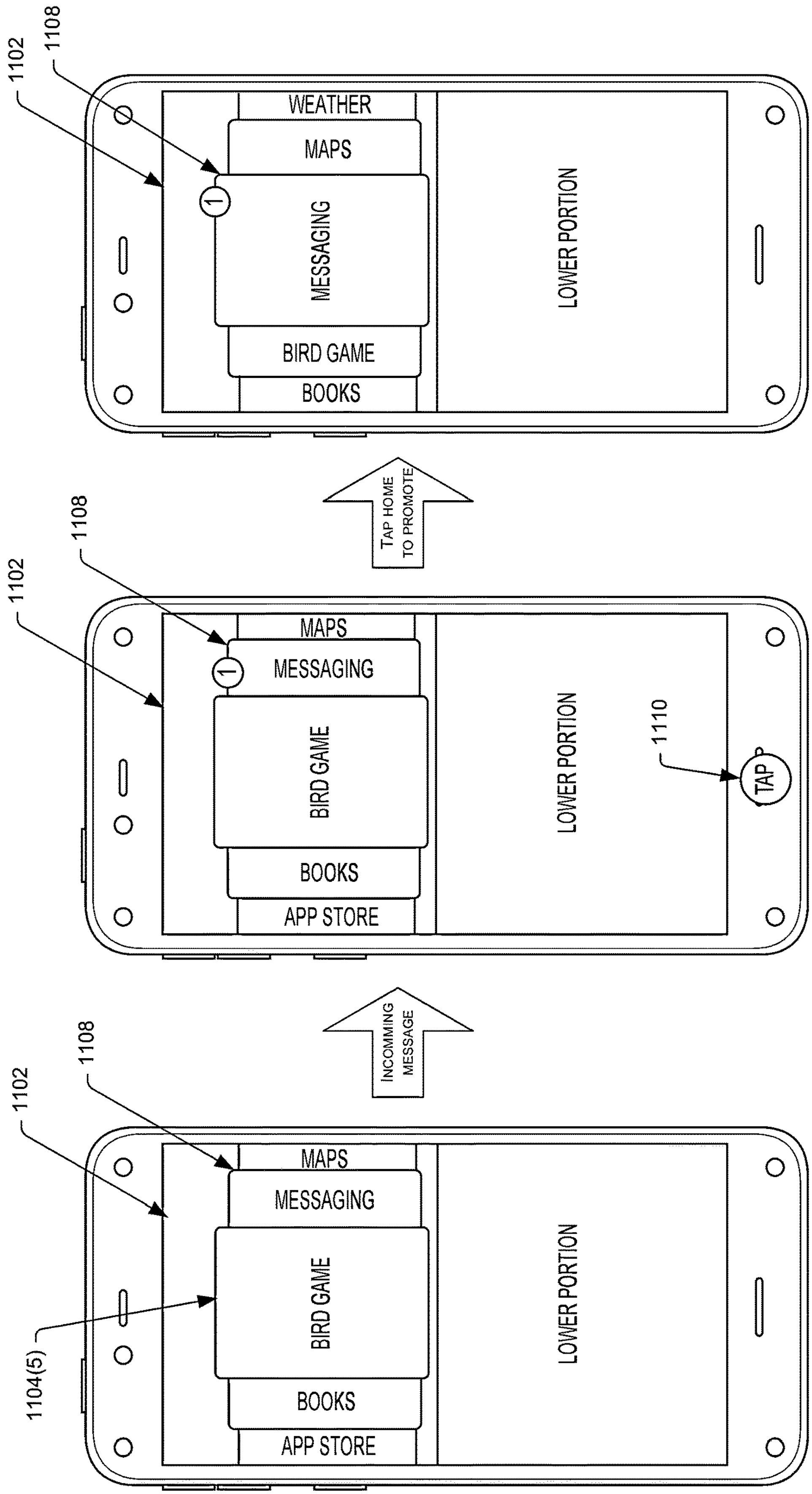

FIG. 11E illustrates how the carousel 1102 may promote, towards or to the front of the carousel 1102, those items having notifications for the user. In the first screen shot, an icon 1104(5) corresponding to a bird game currently has user-interface focus, while an icon 1108 corresponding to messaging application is next in line in the carousel. Note that in the first screen shot, the messaging application does not have any current notifications.

Next, the second screen shot illustrates that the messaging application now has a notification, potentially indicating the receipt of a new message. As such, the icon 1108 includes a "1", indicating one new message. As such, in response to a user input, or potentially automatically and without user input, the device may reorder the carousel 1102 to promote (i.e., move nearer or to the front of the carousel 1102) those icons associated with applications having current, unread notifications. For example, the second screen shot illustrates the user tapping, at 1110, the physical home button of the device 100. In response, and as shown in the third screen shot, the carousel 1102 has now been reordered such that the icon 1108 corresponding to the messaging application is now at the front of the carousel and has user-interface focus. As such, while illustrated as blank in each of the three screenshots, the lower portion of the display on the home screen may present items associated with the messaging application—such as the newly received message.

Figure 12:
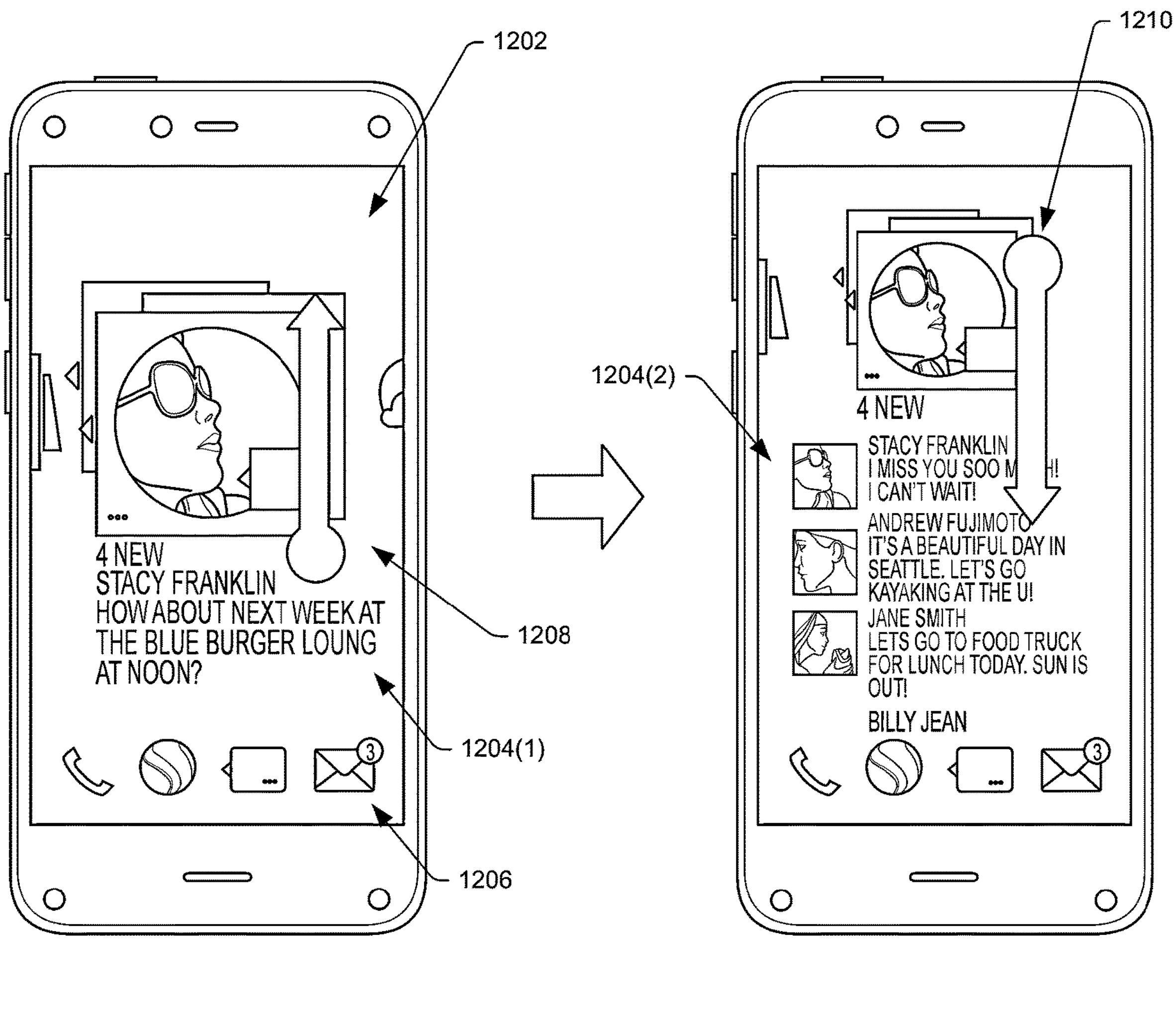
FIG. 12 illustrates an example where information related to an item having focus in the carousel is initially displayed underneath an icon of the item. In response to a user performing a gesture (e.g., a swipe gesture), additional information related to the item may be displayed on the device.

FIG. 12 illustrates an example where information related to an item having focus in the carousel is initially displayed underneath an icon of the item. In response to a user performing a gesture (e.g., a swipe gesture), additional information related to the item may be displayed on the device.

As illustrated, the display 102 initially displays a carousel of icons 1202, information 1204(1) related to an icon currently having user-interface focus, and a row of icons 1206. In this instance, the icon having user-interface focus corresponds to a messaging application, such as a text-messaging application. As such, the information 1204(1) includes an indication of a number of new messages and a portion of a newest message (including an identifier of the sender).

As illustrated, a user of the device 100 performs an upwards swipe gesture 1208 from the information 1204(1) towards the icon having the user-interface focus. In response, as shown in the second screen shot, additional information 1204(2) regarding the application associated with the icon having the user-interface focus is displayed. For instance, multiple new messages are now displayed, along with an identifier of each sender, rather than a single message. In addition, the icon in the carousel 1202, as well as the carousel 1202 itself, has been reduced in size on the display. Thereafter, the user may perform a downwards swipe gesture 1210 to return the UI shown in the first screen shot.

Figure 13A:
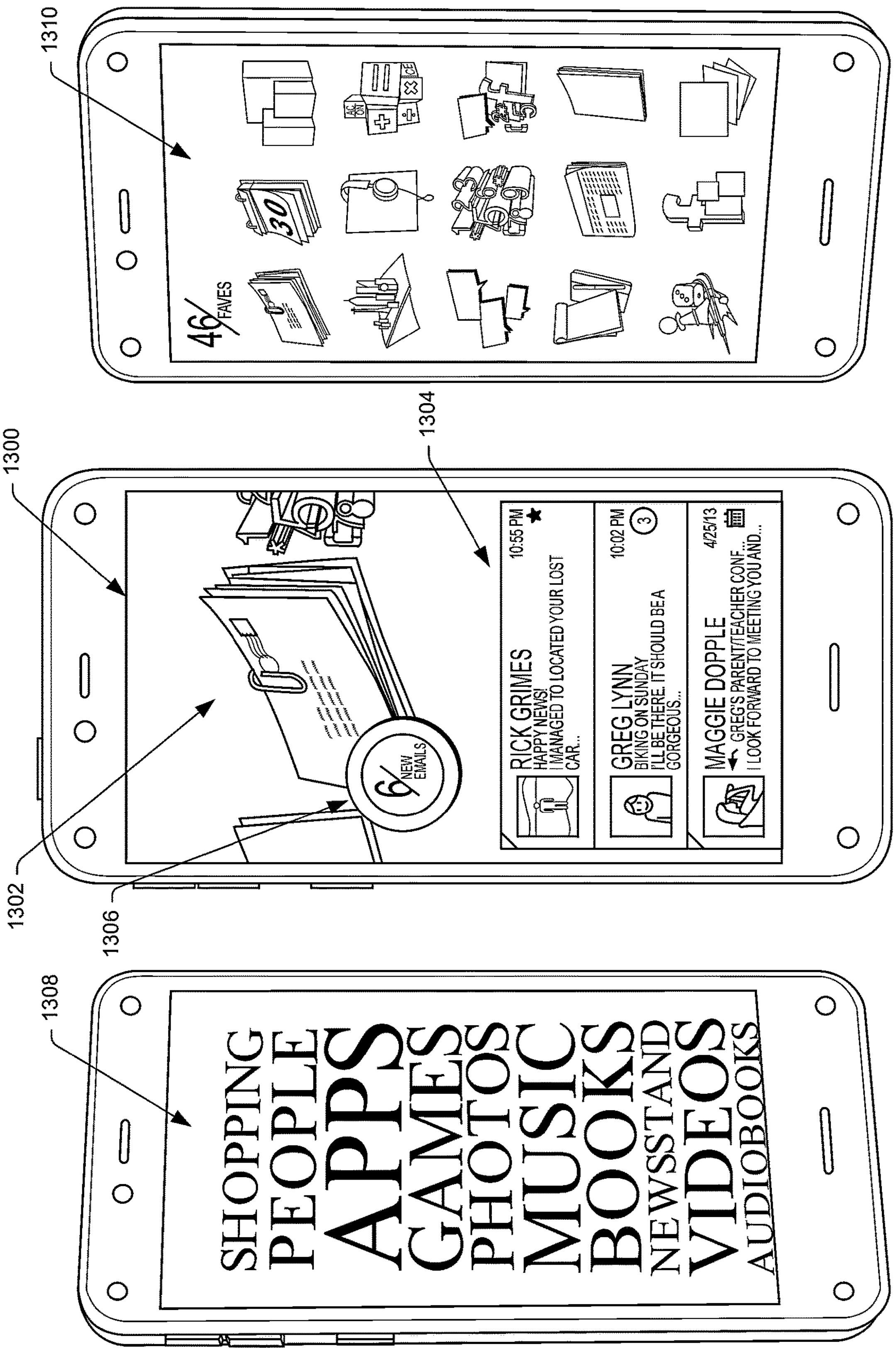
FIG. 13A illustrates an example home screen (the carousel) of the device, as well as example left and right panels. In some instances, the device displays the left panel in response to a left tilt gestures and the right panel in response to a right panel gesture.

FIG. 13A illustrates an example home screen 1300, which includes a carousel 1302 at a time when an icon associated with an email application has user-interface focus. As such, a lower portion of the home screen 1300 includes items 1304 associated with the email application. Here, for instance, the items comprise most recently received email messages, and the emails indicate a sender and also include a portion of the message. In addition, the icon having user-interface focus in the carousel includes a badge 1306, which may provide any sort of application-specific information. Here, for instance, the badge 1306 indicates that the email application currently has six new email messages.

FIG. 13A also illustrates a left panel 1308 that the device 100 may display in response to a user performing a tilt gesture to the left from the home screen 1300. Here, the left panel comprises a "library picker"—that is, selectable icons associated with each content-item library available to the electronic device 100. For instance, each illustrated word in the left panel 1308 may be associated with a content-item library, such that selection of a particular icon causes the device 100 to display icons corresponding to the content items of the respective library. The content-item libraries may include a shopping library showing items that the user has purchased or has added to a list (e.g., a wish list), a people library illustrating contacts and corresponding contact information, an application library illustrated applications available to the device (and/or available for purchase), a games library, a photo-gallery library, a music gallery, a book library for electronic books, a newsstand library for periodicals, a video library, and an audio-book library.

Furthermore, FIG. 13A illustrates a right panel 1310 that the user may navigate to from the home screen 1300 in response to performing a tilt gesture to the right. The right panel 1310 may comprise a grid of applications, in some instances. The applications may comprise each application available to the device, applications having been deemed favorites of the user, applications having been recently accessed, or the like.

Furthermore, each icon in the application grid may comprise a 3D-modeled object. As such, when a position of a head or face of a user changes relative to the display of the device, the display 102 may alter display of the 3D icons, as described above.

Figure 13B:
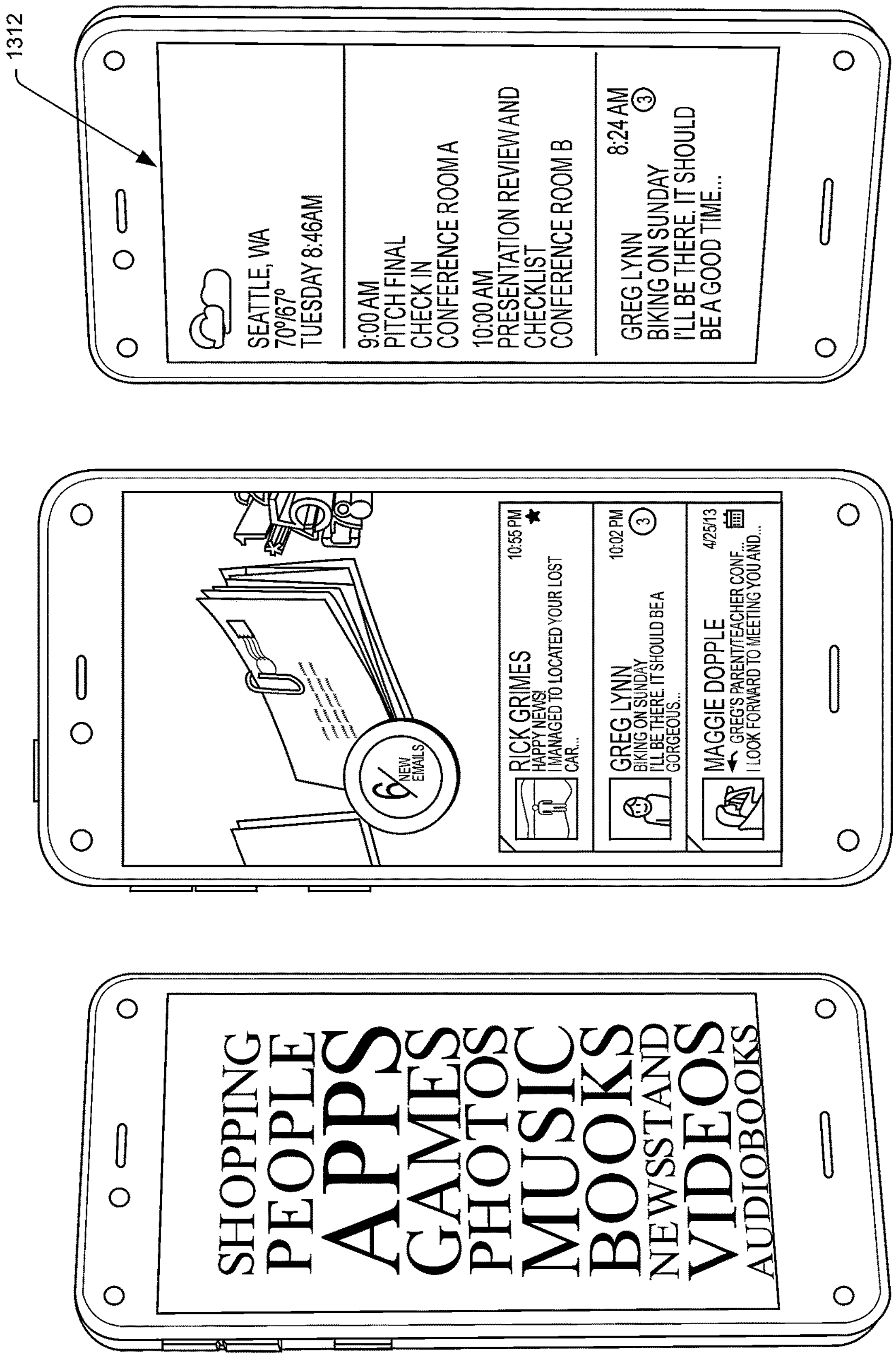
FIG. 13B illustrates the example of FIG. 13A with an alternative right panel.
Figure 19:
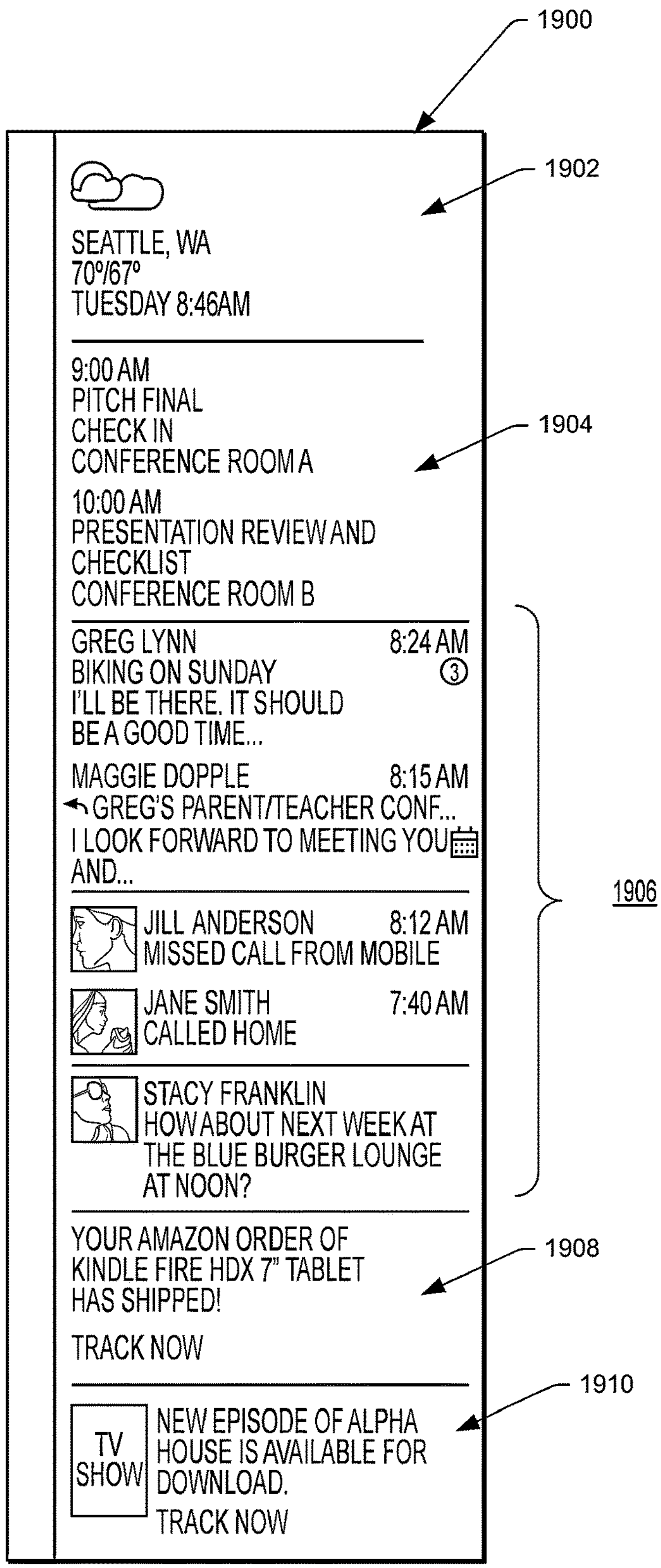

FIG. 13B illustrates an alternative right panel 1312 from the implementation of FIG. 13A. Here, the right panel 1312 may include current information that the device 100 determines is currently pertinent to the user. This may include current weather, current notifications, upcoming meetings, status of one or more orders, and the like. FIG. 19, described below, more fully implements potential elements of the example right panel 1312.

Figure 14:
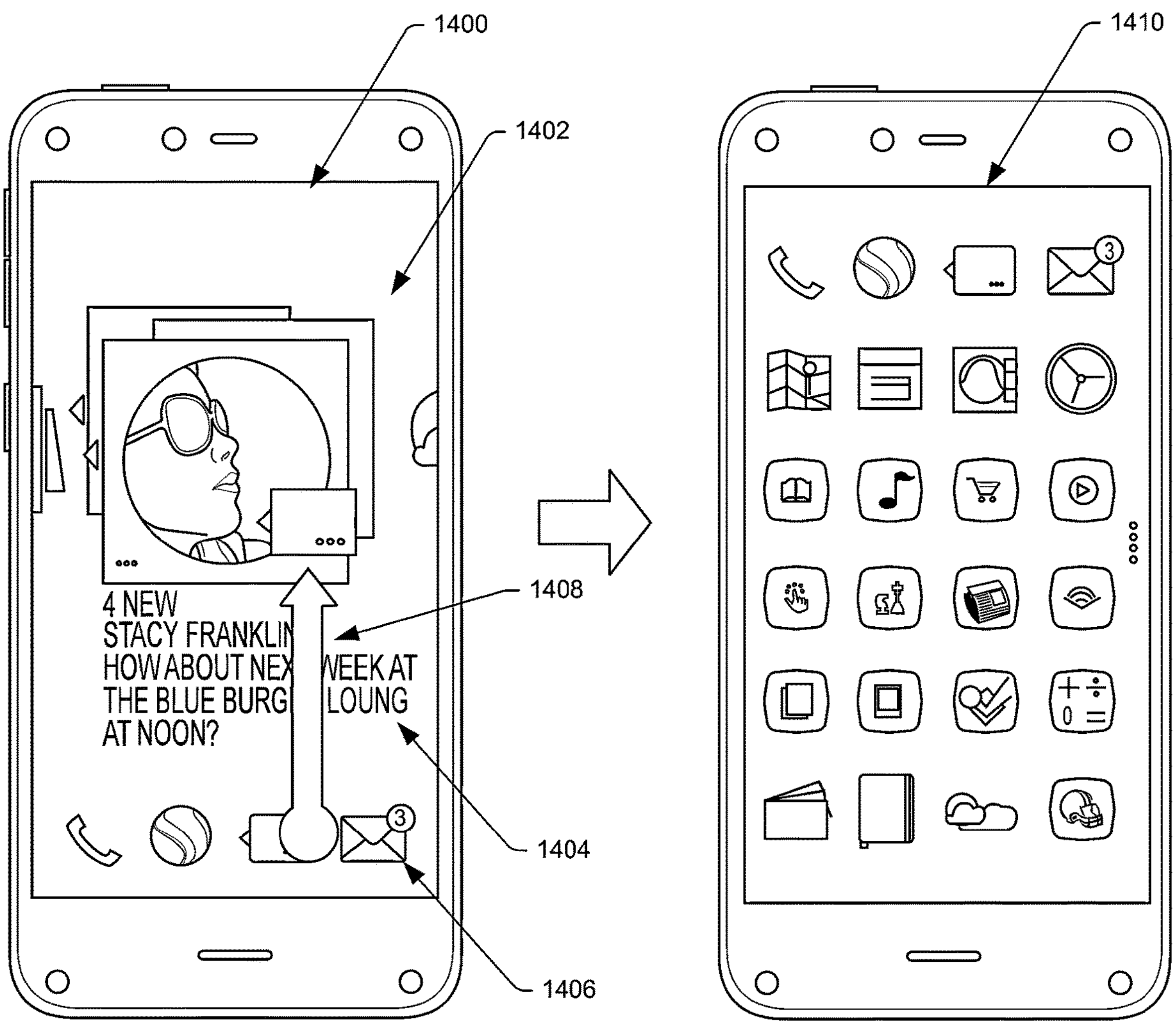
FIG. 14 shows an example swiping up gesture made by the user from a bottom of the display and, in response, the device displays a grid of applications available to the device.

FIG. 14 illustrates another example home screen comprising a carousel 1402 and items 1404 associated with an application corresponding to an icon currently having user-interface focus. In addition, the home screen 1400 includes a row of icons 1406, corresponding to a phone application, a browser application, a text messaging application, and an email application.

FIG. 14 illustrates the user performing an upwards swipe gesture 1408 beginning at the row of icons 1406. In response, the device 100 displays a grid of applications 1410, which may comprise all applications available to the device, applications that the user has deemed favorites, applications recently accessed, or the like.

Figure 15:
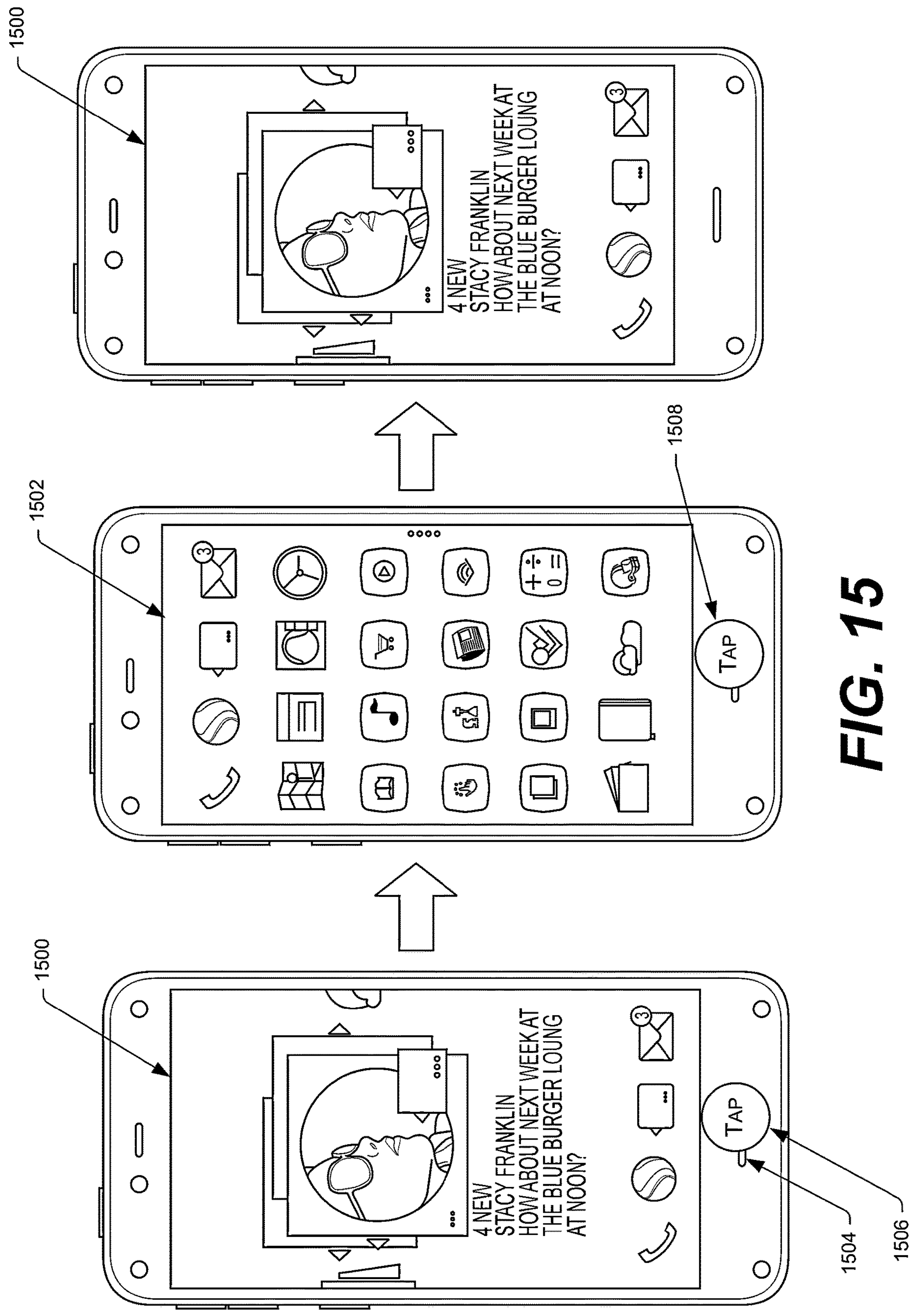
FIG. 15 illustrates an example where the device toggles between displaying a carousel and displaying an application grid in response to a user selecting a physical home button on the device.

FIG. 15 illustrates an example where the device toggles between displaying a home screen 1500 and displaying an application grid 1502 in response to a user selecting a physical home button 1504 on the device. As illustrated by the first screen shot, at 1506 the user taps the home button 1504. In response, the device 100 navigates from the home screen to the application grid 1502. Further, the user then selects, at 1508, the home button 1504 again, thus causing the device to navigate back to the home screen 1500. As such, the user is able to toggle between the home screen (that includes the carousel) and the application grid by selecting the physical home button on the housing of the device 100.

Figure 16:
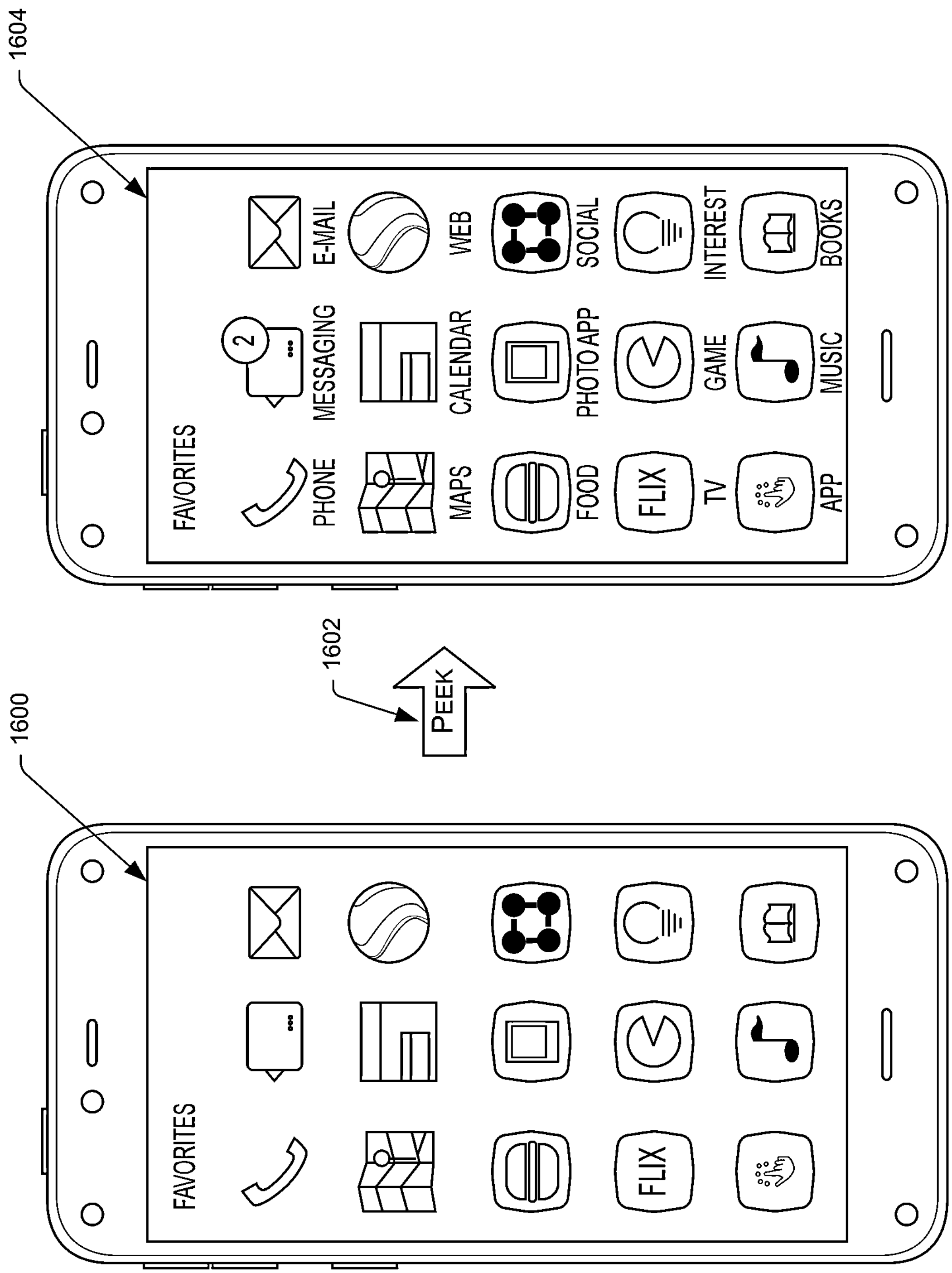
FIG. 16 illustrates an example operation that the device may perform in response to a peek gesture. Here, the UI of the device initially displays icons corresponding to favorite items of the user and, in response to the peek gesture, overlays additional details regarding the favorite items.

FIG. 16 illustrates an example operation that the device may perform in response to a peek gesture. Here, the UI of the device initially displays a screen 1600 comprising icons corresponding to favorite items of the user. in response to the user performing a peek gesture 1602, the device 100 displays a screen 1604, which includes additional details regarding the favorite items. That is, in response to the user performing the peek gesture 1602, the device 100 updates the display 100 to include additional details regarding applications and content items associated with items in the favorites screen 1600. These additional details may include a name of the application, a size of the application, any notifications associated with the application, when the application was last accessed, or any other type of information.

Figure 17:
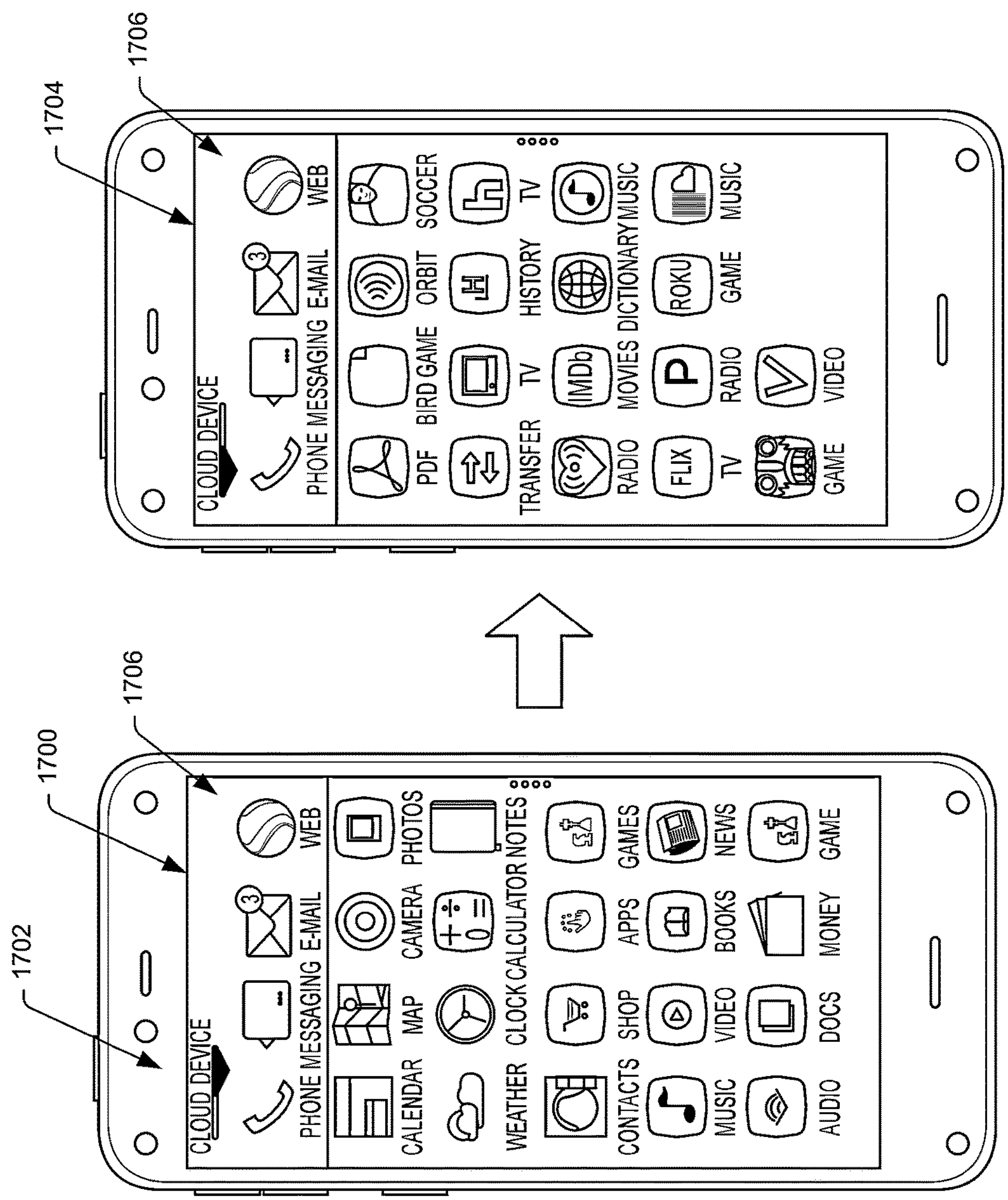
FIG. 17 illustrates an example where a user of the device is able to cause the UI of the device to transition from displaying icons corresponding to applications stored on the device to icons corresponding to applications available to the device but stored remotely from the device.

FIG. 17 illustrates an example in which a user of the device is able to cause the UI of the device to transition from displaying icons corresponding to applications stored on the device to icons corresponding available to the device but stored remotely from the device. To begin, FIG. 17 illustrates a screen 1700 that depicts icons associated with applications that are stored locally on the device 102, as well as an icon 1702 that allows the user to toggle between viewing icons associated with applications stored on the device, and applications remotely "on the cloud". As illustrated, after the user selects to view applications stored on the cloud, the device 100 may update the display to show a screen 1704 having icons associated with applications stored remotely from the device 100. In addition, in some instances both the screen 1700 and the screen 1704 may display a row or other grouping of icons 1706, such that these applications are accessible to the user regardless of whether the user has chosen to view applications stored on the cloud or applications stored locally. These icons may correspond to the row of icons 1406 shown in FIG. 14, with the applications including a phone application, a browser application, a text messaging application, and an email application.

Figure 18:
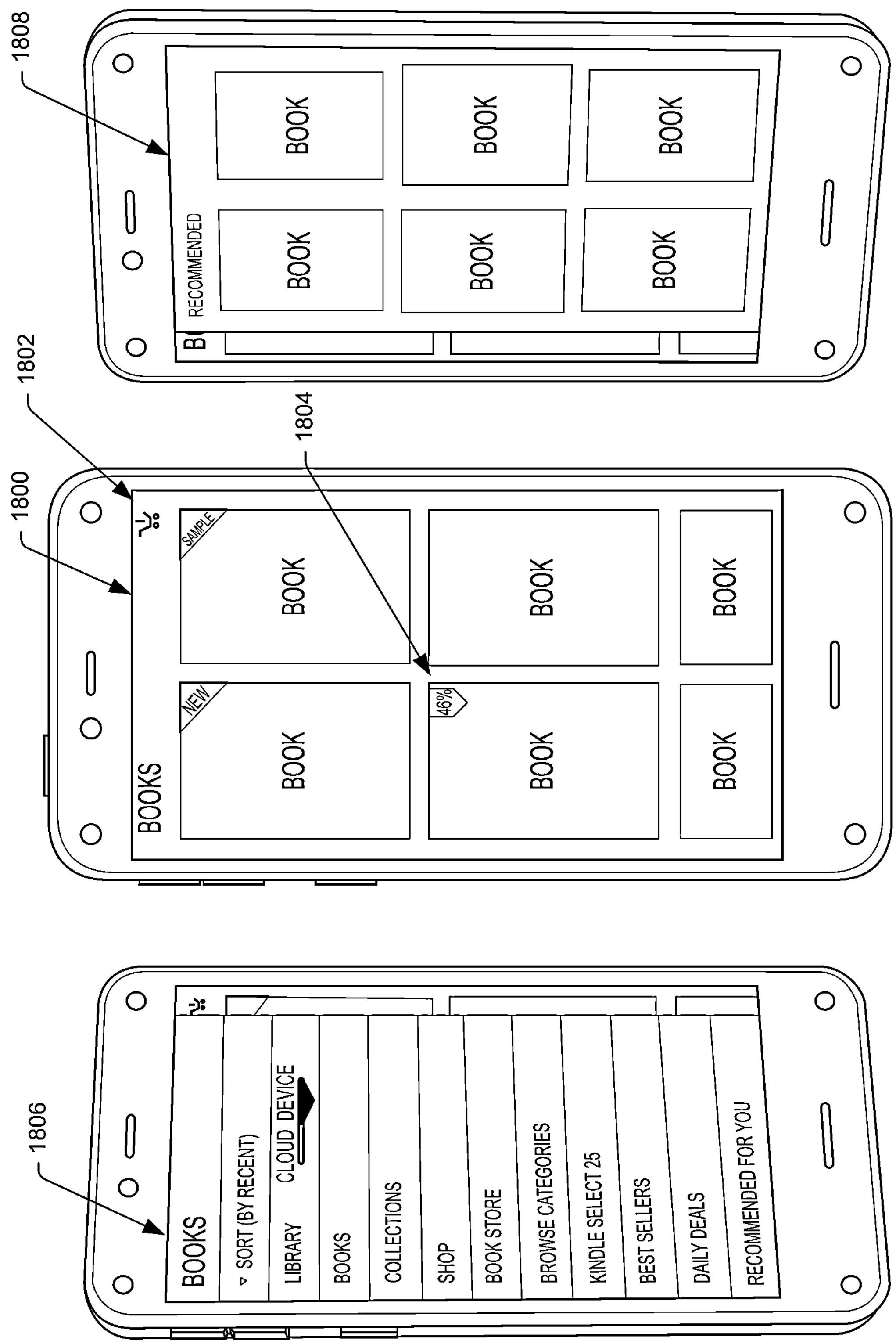
FIG. 18 illustrates example UIs that the device may display when a user launches a book application (or "reader application") on the device. As illustrated, the center panel may illustrate books available to the device and/or books available for acquisition. The left panel, meanwhile, includes settings associated with the book application and may be displayed in response to a user of the device performing a left tilt gesture, while the right panel displays icons corresponding to books recommended for the user and may be displayed in response to the user performing a right tilt gesture.

FIG. 18 illustrates example UIs that the device may display when a user launches a book application on the device. As illustrated, a center panel 1800 currently illustrates icons corresponding to books available to the device, either stored locally or remotely on the cloud. Responsive to a user selecting an icon associated with a particular book, the device 100 may display content of the respective book. In addition, the center panel 1800 includes an icon 1802 that, when selected, instructs the device 100 to display books available for acquisition (e.g., purchase, rent, lease, borrow, etc.). That is, selection of the icon 1802 may cause the device to navigate to a store where additional books may be acquired. Finally, the center panel 1800 currently illustrates one or more badges 1804 associated with respective book icons. The example icons illustrate that one book is new, one book is actually a sample of a book, and 46% of one book has been read by the user of the device. In some instances, the center panel 1800 displays these badges in response to a user performing a peek gesture.

FIG. 18 also illustrates a left panel 1806 that the device 100 may display in response to a user performing a tilt gesture to the left while the device displays the book application in the center panel 1800. As illustrated, the left panel 1806 includes settings associated with the book application. For instance, the left panel allows the user to sort books of the user according to whether they are stored on the cloud on the device.

The user may also cause the device 100 to present a right panel 1808 by performing a tilt gesture to the right while the device displays the center panel 1800 (or may perform two tilt gestures to the right while the device 100 displays the left panel 1806. In this example, the right panel 1808 includes icons corresponding to books that are recommended for the user. In instances, a service that offers these books for acquisition determines which books to include on the right panel 1808, based on books previously book or read by the user, the books currently on the device 100 or stored in the cloud in association with the device 100, or based on any other known information regarding the user of the device.

FIG. 19 illustrates an example UI 1900 that the device 100 may display. This UI includes certain information that may be currently pertinent to the user, such as a current weather 1902 near the user of the device 100 and upcoming meetings 1904 from a calendar of the user. In addition, the UI 1900 may include a section 1906 indicating messages that have been missed at the device. These messages may be grouped by application (e.g., text messages, emails, phone calls, etc.) and may be sorted by recency or age of the messages. In addition, the UI 1900 may indicate a status 1908 of any orders of the user (e.g., orders from an online merchant) and may also include an indication 1910 of content available to the user or the device (e.g., newly released content to which the user has a subscription to), and the like. While FIG. 19 illustrates several example pieces of information that may be of current interest to the user, it is to be appreciated that this UI 1900 may include any other type of information.

Figure 20:
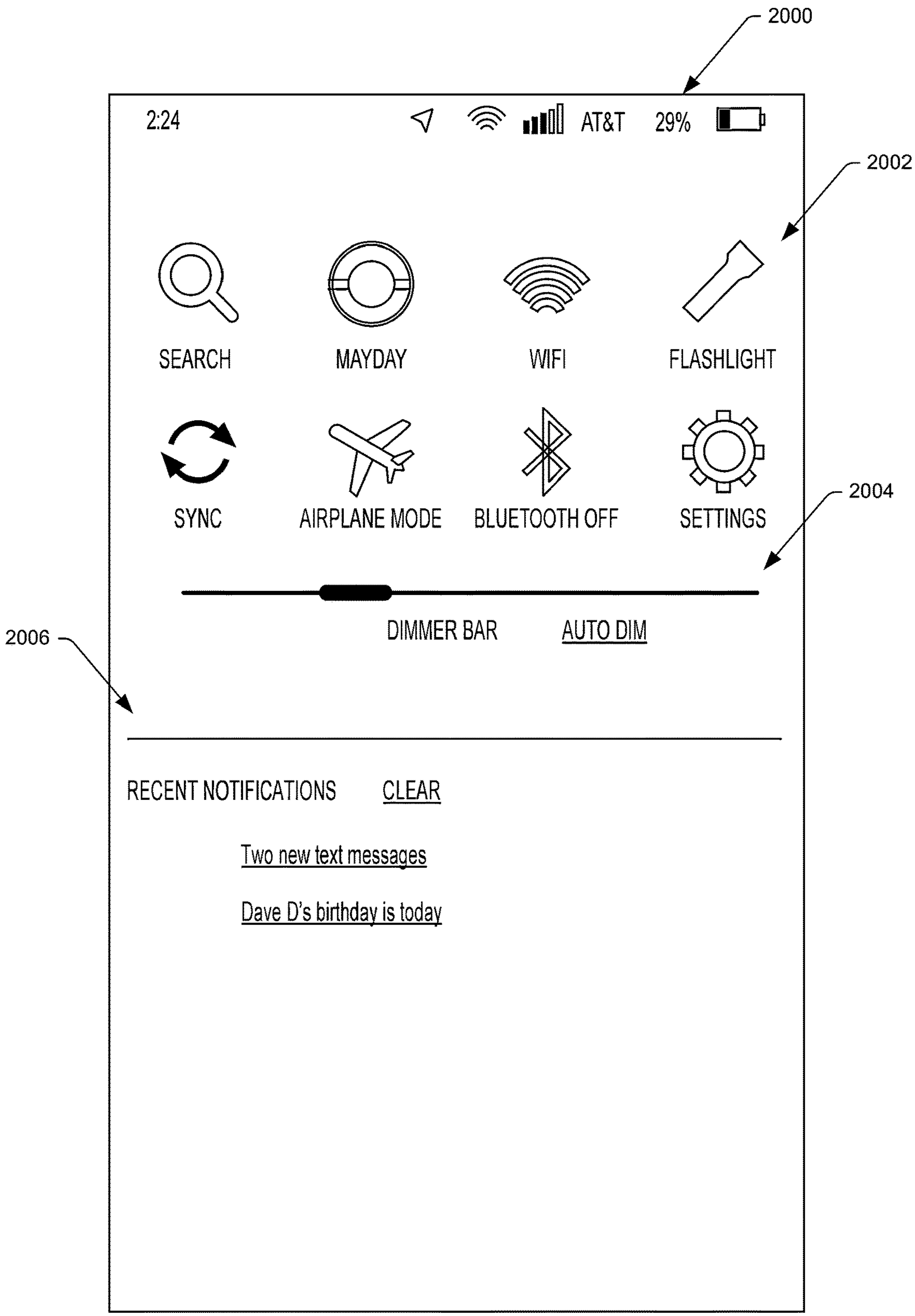
FIG. 20 illustrates an example settings UI that the device may display. As illustrated, this UI may include icons corresponding to screen shots captured on the device.

FIG. 20 illustrates an example settings UI 2000 that the device 100 may display. As illustrated, this UI 2000 may include a group of icons 2002 for managing certain settings on the device 100. For instance, the icons 2002 allow a user to search their content and applications stored remotely from the device (i.e., in the cloud), to contact a customer service representative for help operating the device 100 (the "mayday" icon), to change wireless settings associated with the device, to turn on a "flashlight" using a light of the device, to sync the device 100 storage with a portion of cloud storage, to switch the device into an airplane mode, to change a Bluetooth setting of the device, and to launch a general device-settings menu for the device 100. In addition, the UI 2000 includes a dimmer bar 2004 for adjusting brightness of the display, as well as an icon that, when selected, causes the device to automatically adjust the display brightness based on ambient lighting conditions.

Finally, the UI 2000 may include a portion 2006 that indicates a list of recent notifications for the device 100. These notifications may include missed calls, new emails, new text messages, calendar notifications, notifications of captured screen shots, and the like.

Figure 21:
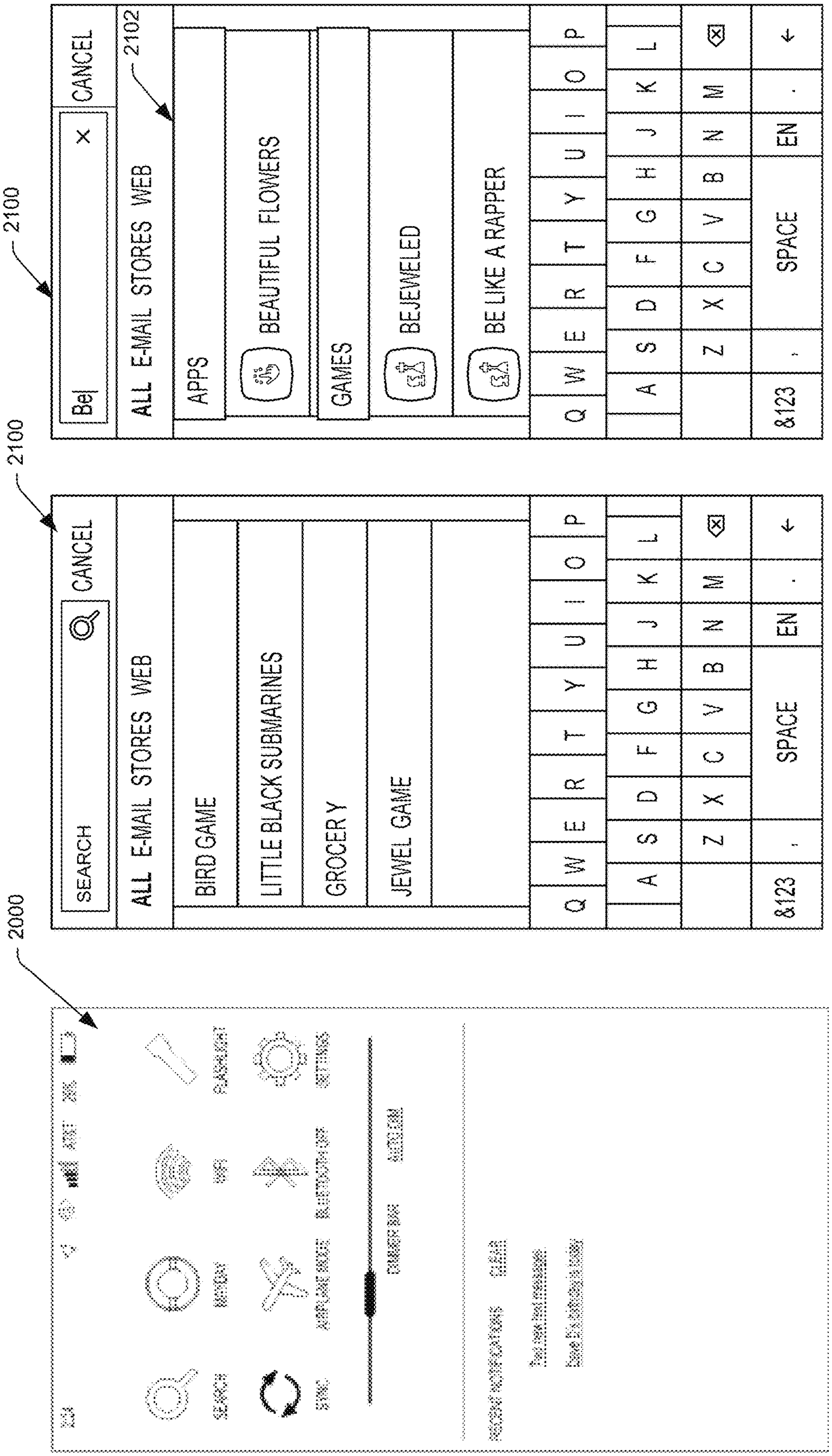
FIG. 21 illustrates an example scenario where a user requests to launch a search from a settings menu displayed on the device.

FIG. 21 illustrates an example scenario where a user requests to launch a search from the UI 2000 illustrated in FIG. 20. As illustrated, when the user of the device 100 selects (e.g., via a touch gesture on the display 102) the search icon, the device 100 displays the second UI 2100. The second UI 2100 may display recent searches conducted by the user. As the user begins to type, the UI 2100 may begin to provide search suggestions 2102. As illustrated, these search suggestions may be grouped by item type, such as applications, games, books, and the like. Here, the user has typed "Be" and, in response, the device 100 suggests some items that include these letters.

FIGS. 22A-F Illustrate different three-dimensional (3D) badges that the device may display atop or adjacent to icons associated with certain items. These badges are dynamic and can change based on parameters, such as how much of the respective item a user has consumed, or the like. Because these badges are 3D-modeled objects, a user may be able to view different sides of the objects may changing the position of the user relative to the display, as determined by information captured by the corner cameras. In some examples, viewing the badges from different angles may display different information. For instance, viewing a progress bar from the top may display a user's total progress through the item, whereas viewing the progress bar from below may display the user's progress during a most recent consumption session.

Figure 22A:
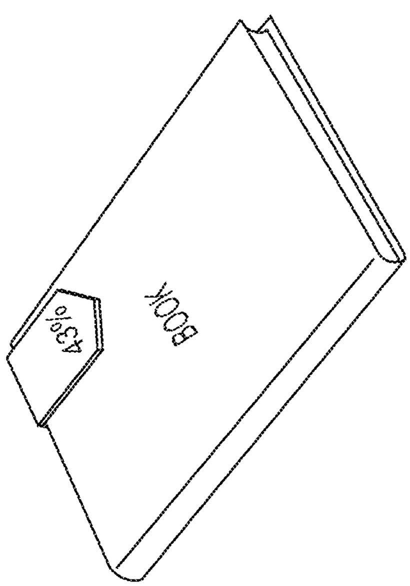
Figure 22B:
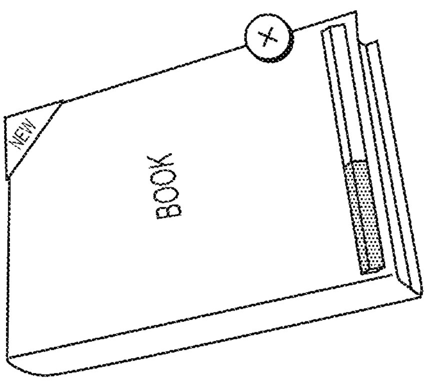

FIG. 22A, for instance, illustrates a badge that indicates that a user has finished 43% of the book. This badge, like each other illustrated badge, has been modeled specifically to fit the 3D-modeled icon representing the book. FIG. 22B, meanwhile, illustrates a book having multiple badges. First, the book includes a badge indicating that the book is "new"—that is, that the user has not yet opened the book on the device 100 (or another device associated with an account of the user of the device). In addition, the book includes a progress-bar badge indicating a current location of the user in the book, along with a control ("x") that, when selected," removes the progress-bar badge from the book. The progress bar, and the percentage of FIG. 22A, may dynamically update as the user reads through the book.

Figure 22C:
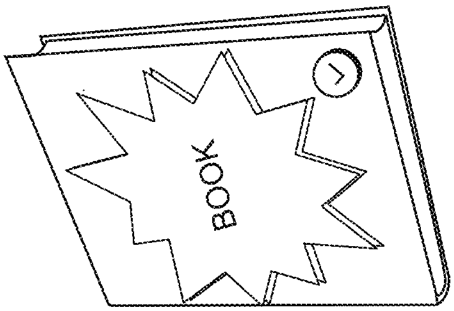
Figure 22D:
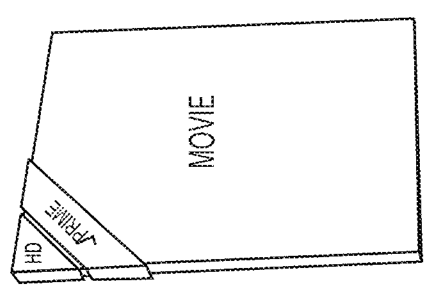
Figure 22E:
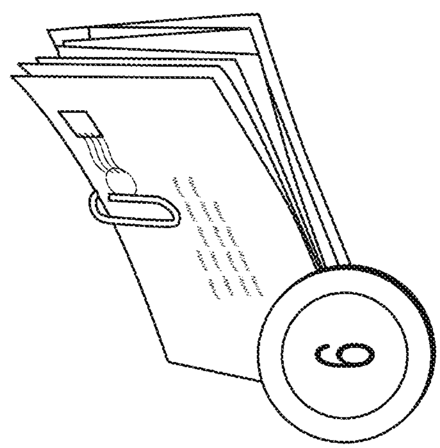
Figure 22F:
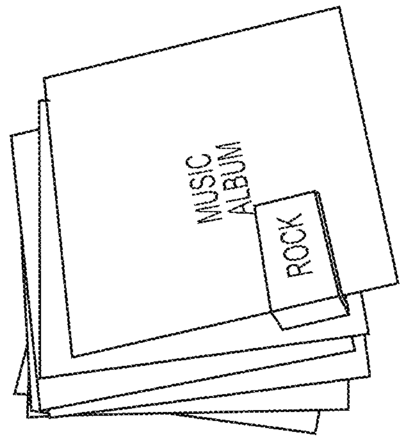

FIG. 22C, meanwhile, includes a badge indicating that the icon represents a book. FIG. 22D includes a badge indicating that the movie is in a high-definition format, as well as that certain members of a program (Amazon Prime®) are able to view the movie without additional charge. FIG. 22E includes a badge associated with an email-application icon indicating how many unread messages the user has in his or her email account. Again, this number may dynamically update based on receipt of incoming mail. Finally, FIG. 22E illustrates a badge on a music-album icon indicating a genre of music of the album (rock). While a few example badges have been described, it is to be appreciated that multiple other badges are possible.

Figure 23A:
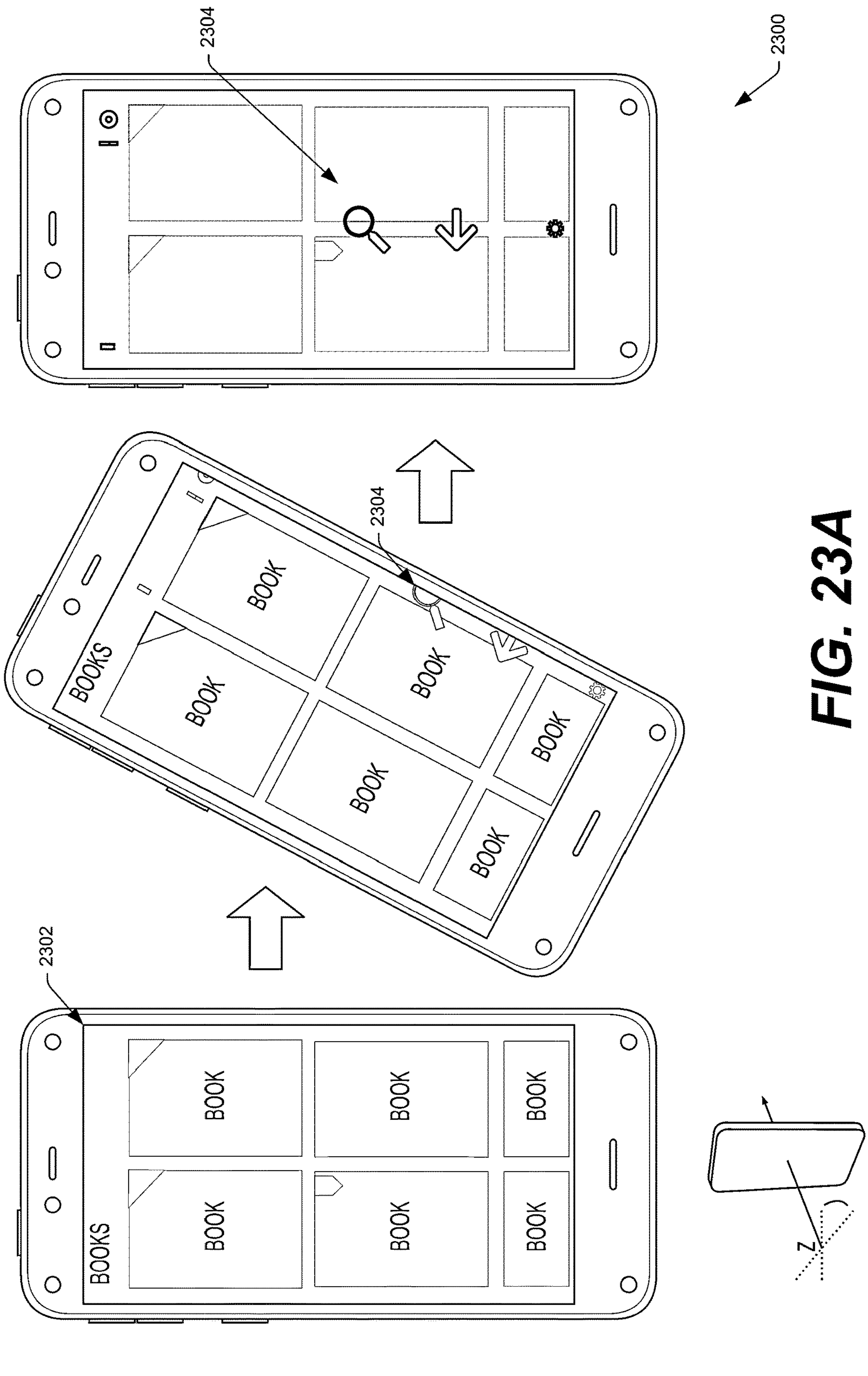
FIG. 23A illustrates an example where a user performs a swivel gesture while the device is displaying a UI corresponding to an application accessible to the device. In response to the swivel gesture, the device may display a settings menu for operation by a user of the device.

FIG. 23A illustrates an example scenario 2300 where a user performs a swivel gesture while the device is displaying a UI 2302 corresponding to an application accessible to the device. In response to the swivel gesture, the device may display a system chrome 2304 for operation by a user of the device. As shown, the system chrome 2304 may appear to slide in from a side of the display 102 and may finally stop at a location approximately in the middle of the width of the display. The system chrome 2304 may include an icon to search the device or the cloud, to navigate back to a previous location (within and across applications), and to launch a more detailed settings menu. In some instances, the user may be able to cause display of the system chrome at any point in time, regardless of the current application being executed on the device 100, by performing the swivel gesture. Furthermore, and as will be appreciated, while several example icons are described, the system chrome may display any other similar or different type of icon. In some instances, the system chrome remains for a predefined amount of time after performing the predefined gesture (e.g., three seconds) after which the display 102 may be updated to remove the system chrome.

Figure 23B:
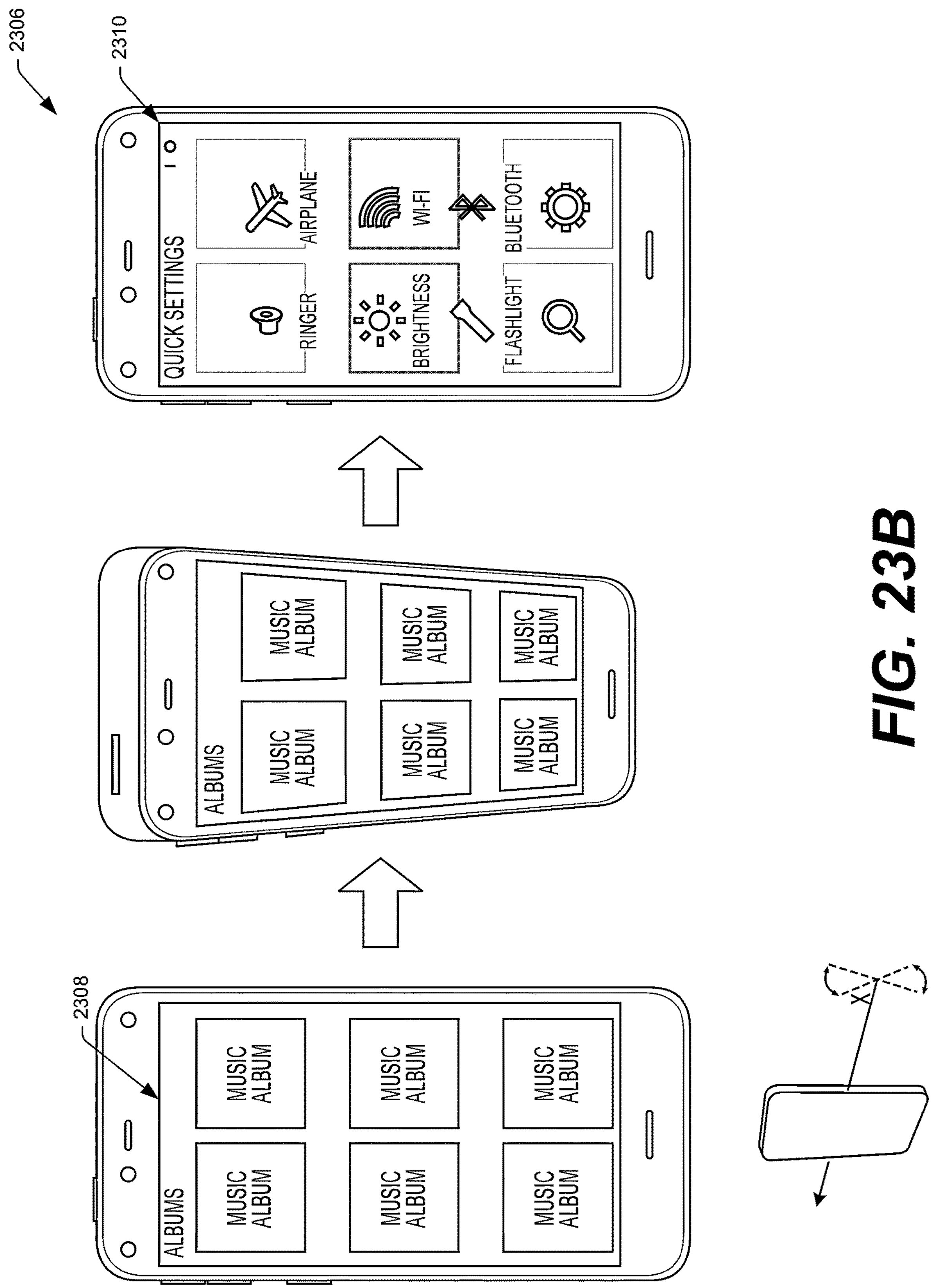
FIG. 23B illustrates an example where a user performs a roll gesture while the device is displaying a UI corresponding to an application accessible to the device. In response to the roll gesture, the device may display a "quick settings" menu for operation by a user of the device.

FIG. 23B illustrates an example scenario 2306 where a user performs a roll gesture while the device is displaying a UI 2308 corresponding to an application accessible to the device. In response to the roll gesture, the device 100 may display a "quick settings" menu 2310 for operation by a user of the device. In some instances, the quick-settings menu 2310 may comprise an alternative or an additional menu to the system chrome 2304. As illustrated, the quick-settings menu may allow a user to change a ring setting, place the device 100 into airplane mode, change a brightness of the device, change a wireless setting of the device, turn on a light as a flashlight, or connect the device to Bluetooth. Of course, while a few examples have been provided, it is to be appreciated that the menu 2310 may include any other different or similar icons.

Figure 24:
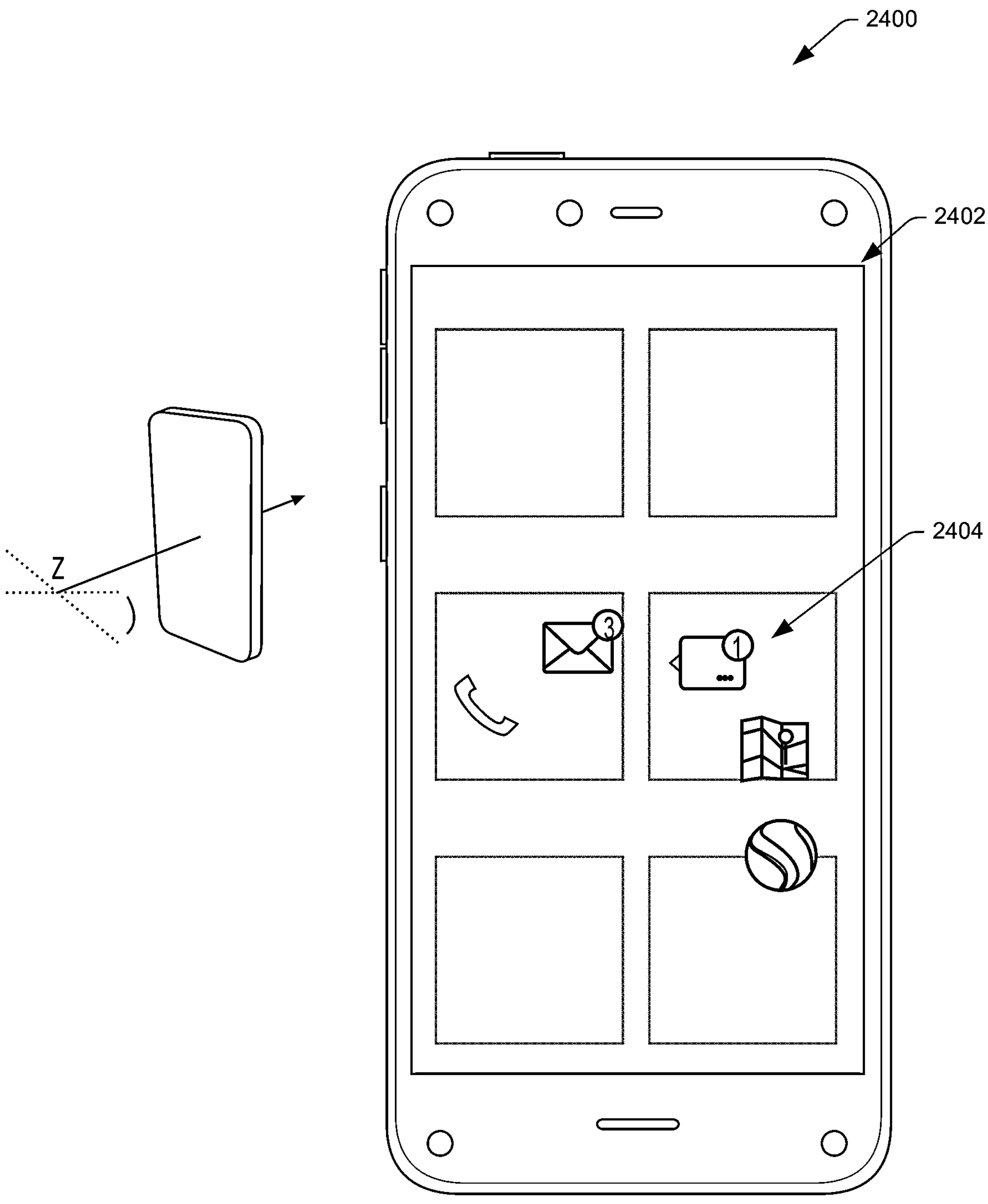
FIG. 24 illustrates an example where a user performs a swivel gesture while the device is displaying a UI corresponding to an application accessible to the device. In response to the swivel gesture, the device may display, in part, icons corresponding to application launch controls.

FIG. 24 illustrates another example scenario 2400 where a user performs a swivel gesture while the device is displaying a UI 2402 corresponding to an application accessible to the device. In response to the swivel gesture, the device 100 may display, in part, icons corresponding to certain application launch controls 2404 that, when selected, cause the device 100 to launch the corresponding applications. In some instances, the application launch controls 2404 may be presented along a substantially arc-shaped path, which may position the icons within easy reach of where a user's thumb or finger is likely to be while performing the swivel gesture. The arc may be centered around a lower corner of the display screen, or may be centered around a detected location of one or more fingers of the user (e.g., detected by a touch screen or touch sensor of the device), for example.

As illustrated, these applications may include a phone application, a text-messaging application, an email application, a map application, and a browser application. Of course, while a few examples have been provided, other implementations may include any other similar or different application launch controls. In some instances, the particular application launch controls may be chosen or set by the user.

Figure 25:
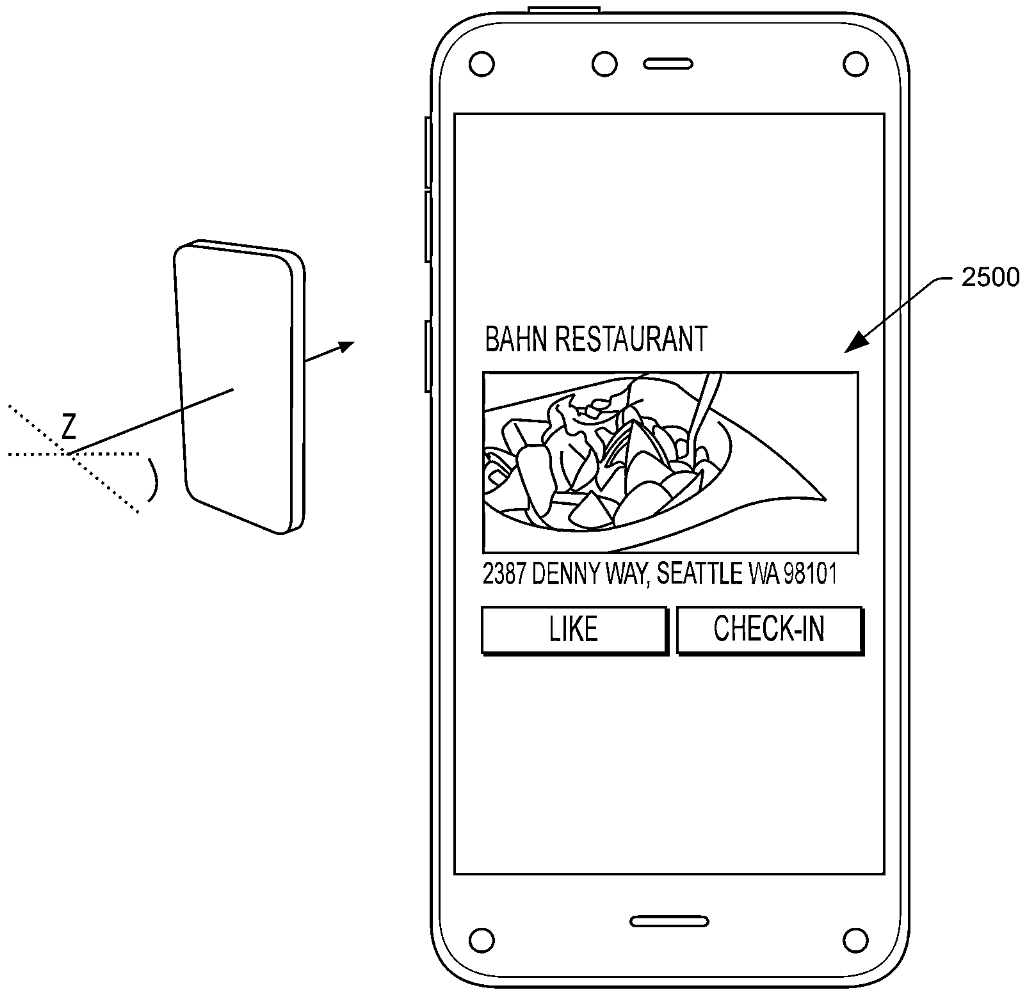
FIG. 25 illustrates another example operation that the device may perform in response to a user performing a swivel gesture. In this example, the operation is based in part on a location of the user. Specifically, the device displays information regarding a restaurant that the user is currently located at and further displays functionality to allow a user to "check in" at or "like" the restaurant on a social network.

FIG. 25 illustrates another example operation that the device may perform in response to a user performing a swivel gesture. In this example, the operation is based in part on a location of the user. Specifically, the device displays information 2500 regarding a restaurant that the user is currently located at and further displays functionality to allow a user to "check in" at or "like" the restaurant on a social network. In some instances, this information 2500 may be displayed when the device 100 is executing a particular application, while in other implementations the information 2500 may be presented across any and all applications. That is, the information 2500 may be presented based on the user's geo-location (as determined by one or more location components of the device 100) rather than based on a particular application that the user is executing on the device 100.

Figure 26:
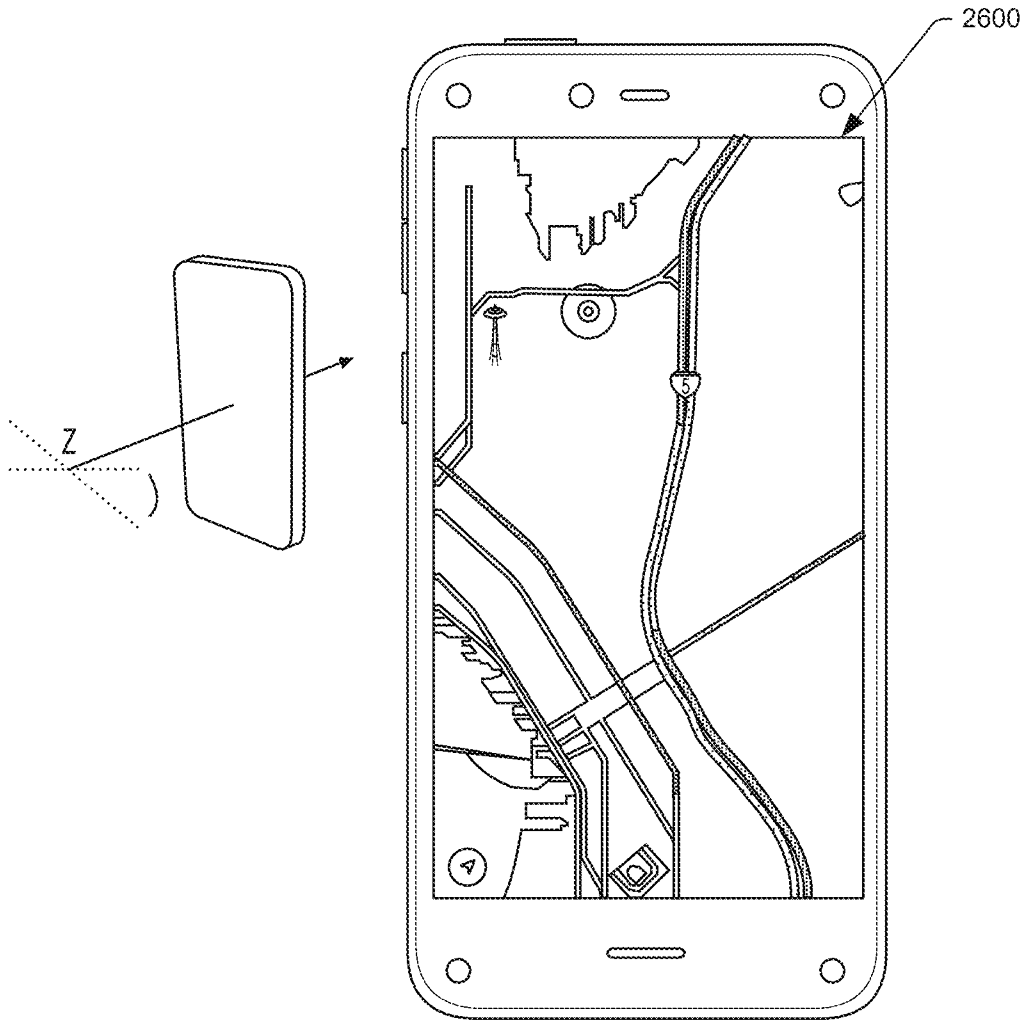
FIG. 26 illustrates another example geo-based operation that the device may perform in response to a user performing a swivel gesture. Here, the device displays a map along with traffic information.

FIG. 26 illustrates another example geo-based operation that the device may perform in response to a user performing a swivel gesture. Here, the device displays a map 2600. The map may be of the current location of the user, a destination of the user, or the like. Again, the map 2600 may be displayed in response to the swivel gesture when the device 100 is executing a particular application (e.g., a mapping application), while in other instances the map 2500 may be displayed without reference to an underlying application. In some instances, performing a swivel gesture or another gesture may cause the device 100 to present traffic information corresponding to one or more routes presented on the map. In still other instances, the map may comprise a map of a location frequently traveled to by a user of the device, may comprise a map of a location at which a user has an upcoming meeting or appointment (e.g., the next meeting on the user's calendar), or the like.

While FIG. 25 displays the map 2500, in other implementations other geo-based information may be displayed in response to a swivel gesture or another predefined gesture. For instance, the device 100 may present businesses (e.g., restaurants) or other points of interest that are within a particular proximity of the user. Or, performing a swivel gesture may cause the device to present a UI to allow the user to "share" his or her location with his or her social network. In another example, performing the swivel gesture may cause the device to "remember" the location of the user. That is, the device 100 may bookmark or pin the location on a map for later viewing by the user.

In still other examples, the device 100 may display notifications in response to the user performing a swivel gesture. These notifications may indicate new messages received, missed calls, updates needed, and the like. In still another example, the device 100 may display a panel of information that includes some or all of the information discussed above with reference to FIG. 19. Again, while a few example operations have been described, it is to be appreciated that multiple other operations may be performed in response to the user performing a swivel gesture or any other type of predefined gesture.

Figure 27:
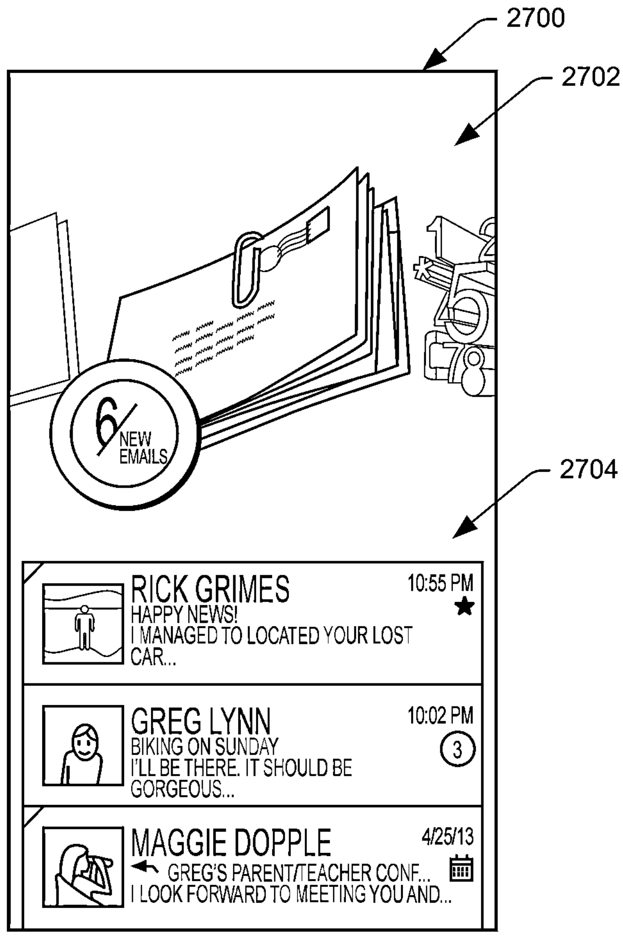
FIG. 27 illustrates an example UI of a carousel of icons that is navigable by a user of the device, with an icon corresponding to a mail application having interface focus (e.g., being located at the front of the carousel). As illustrated, when an icon has user-interface focus, information associated with an item corresponding to the icon is displayed beneath the carousel.

FIG. 27 illustrates an example UI 2700 of a home screen of the device 100. As illustrated, the UI 2700 includes a carousel of icons 2702 that is navigable by a user of the device. The UI 2700 also includes a lower portion 2704, which displays additional information. As illustrated, when an icon has user-interface focus, information associated with an item corresponding to the icon is displayed beneath the carousel. That is, whatever item has user-interface focus populates the lower portion 2704 with additional information. Here, the icon corresponding to an email application has user-interface focus in the carousel 2702 and, therefore, the lower portion 2704 includes the most recently received emails for the corresponding email account. As illustrated and as discussed above, the carousel may be navigable horizontally via touch gestures on the display 102, while the information in the lower portion may be navigable vertically via touch gestures on the display 102. In addition, the icons in the carousel 2702 comprise 3D-modeled objects, and may include 3D or 2D badges.

Figure 28:
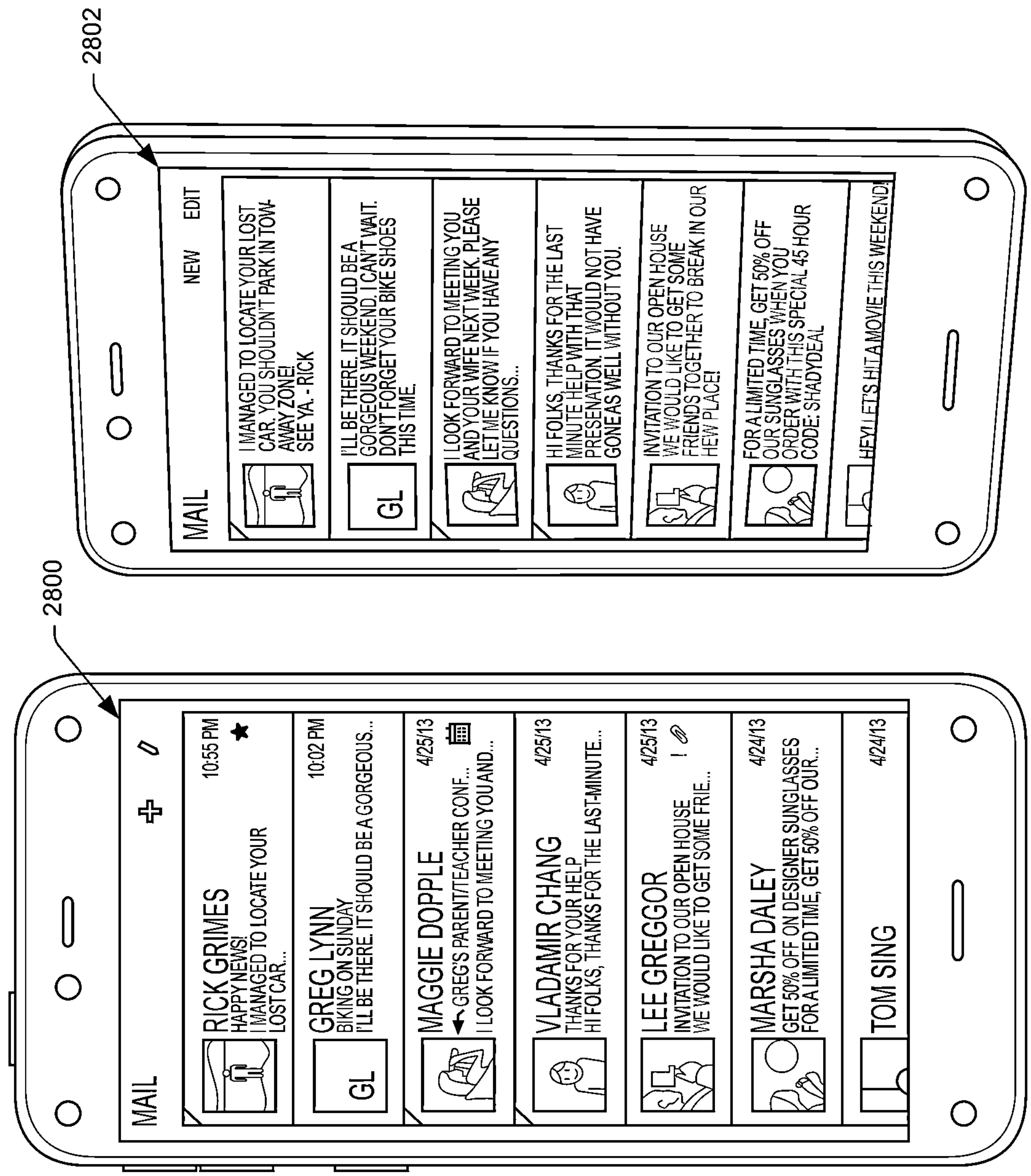
FIG. 28 illustrates an example UI within a mail application. In addition, this figure illustrates that the device may display additional or different information regarding messages in an inbox in response to a user performing a peek gesture on the device.

FIG. 28 illustrates an example UI 2800 within an email application. As illustrated, this UI 2800 comprises an inbox of a user, which lists emails received by the user. In addition, this figure illustrates that the device 100 may display another UI 2802, which includes additional or different information regarding messages in the inbox, in response to a user performing a peek gesture on the device 100. That is, when a user is viewing an inbox, the user may perform a peek gesture (e.g., to the right or left) to cause the device to display additional or different information. In this case, the additional information comprises more of each message. In addition, the UI 2802 has removed some information as compared to the information in the UI 2800. For instance, the UI 2800 includes an identifier of the send and a time of receipt, while the UI 2802 does not. As such, the peek gesture is effective to remove certain information to make room for more of the actual content of the email messages in the inbox.

Figure 29:
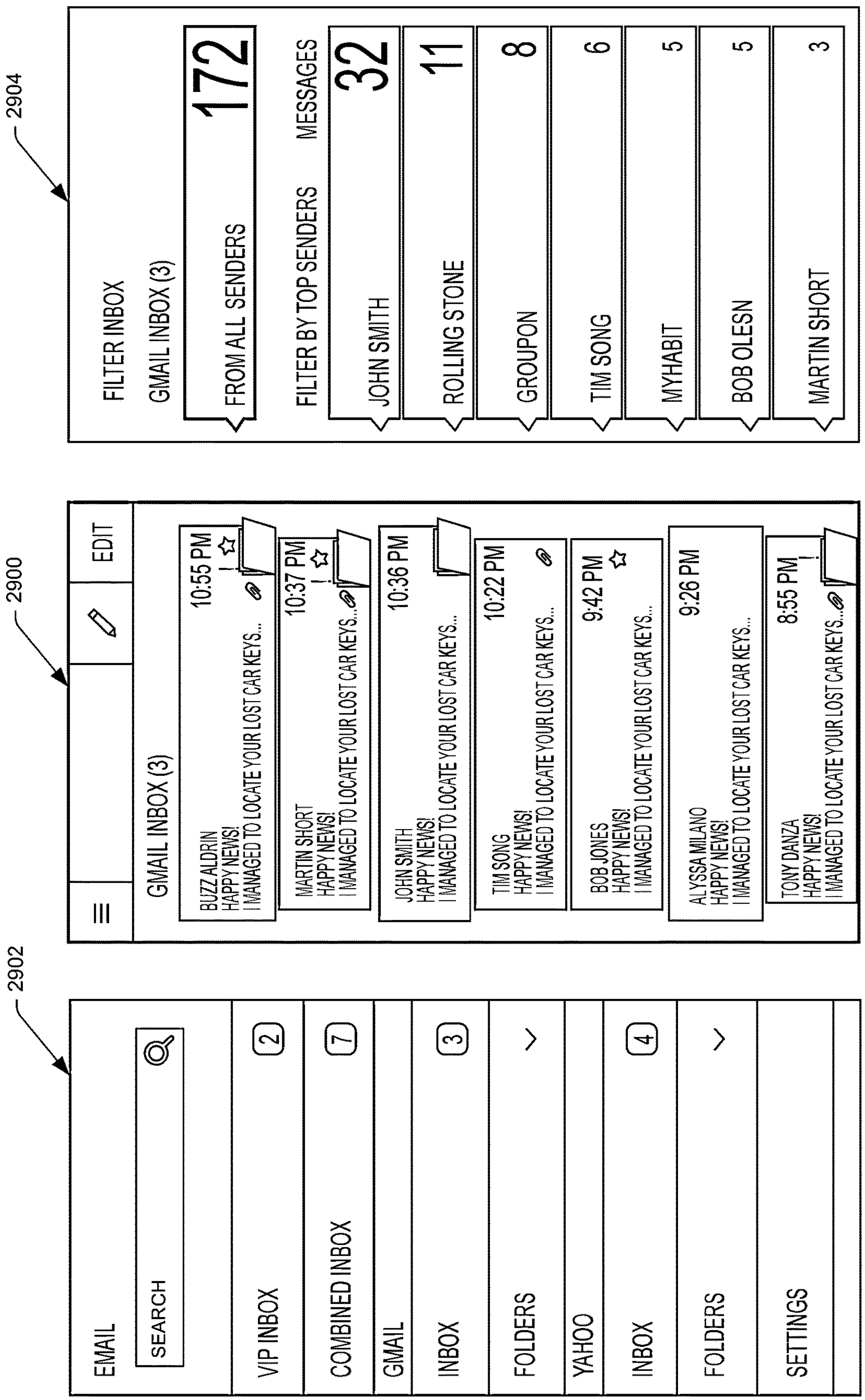
FIG. 29 illustrates an example inbox UI within a mail application and potential right and left panels that the device may display in response to predefined gestures (e.g., a tilt gesture to the right and a tilt gesture to the left, respectively).

FIG. 29 illustrates an example UI 2900 of an inbox of an email application, in addition to potential right and left panels that the device may display in response to predefined gestures (e.g., a tilt gesture to the right and a tilt gesture to the left, respectively). As illustrated, the UI 2900 lists multiple messages in the user's inbox. By performing a tilt gesture to the left, however, the device 100 may display a left panel 2902. The left panel 2902 may comprise a settings menu that allows a user to manage the email account of the user.

By performing a tilt gesture to the right from the center panel 2900, however, the user is able to view a right panel 2904. The right panel 2904 comprises a grouping of email messages by senders. That is, the right panel 2904 includes an indication of a total number of emails within the inbox. Underneath this indication, the right panel 2904 includes a list of the "top senders"—that is, senders that have sent the largest number of emails to the inbox. The right panel 2904 ranks these such that the sender who has sent the most emails is listed first and so forth. In addition, selection of a sender may cause the device 100 to display, according to recency, emails received from that particular sender.

Figure 30:
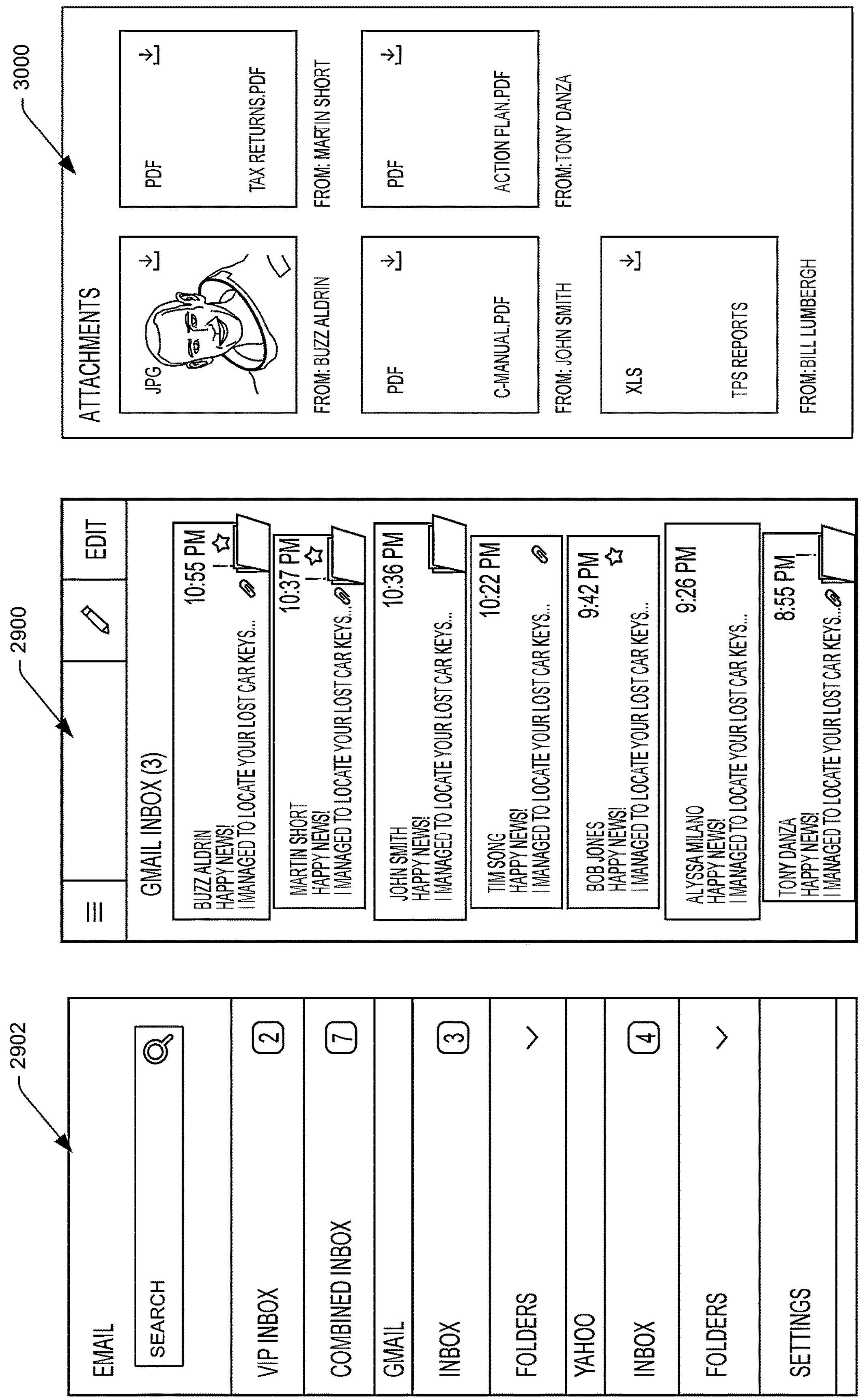
FIG. 30 illustrates another example right panel that the device may display in response to a user performing a tilt gesture to the right while viewing an inbox from the mail application.

FIG. 30 illustrates an example right panel 3000 that the device 100 may display in response to a user performing a tilt gesture to the right while viewing an inbox from the mail application. In this example, when the user performs a tilt gesture to the right, the device 100 displays icons corresponding to one or more attachments that are attached to emails in the inbox. These icons may be selectable such that selection of a corresponding icon causes the device 100 to save or output the attachment, or ask if the user would like to perform some action regarding the attachment. In some instances these attachments may be sorted based on recency of the corresponding emails (e.g., attachments from most recent emails displayed first and so forth), size of the attachments, or the like.

Figure 31:
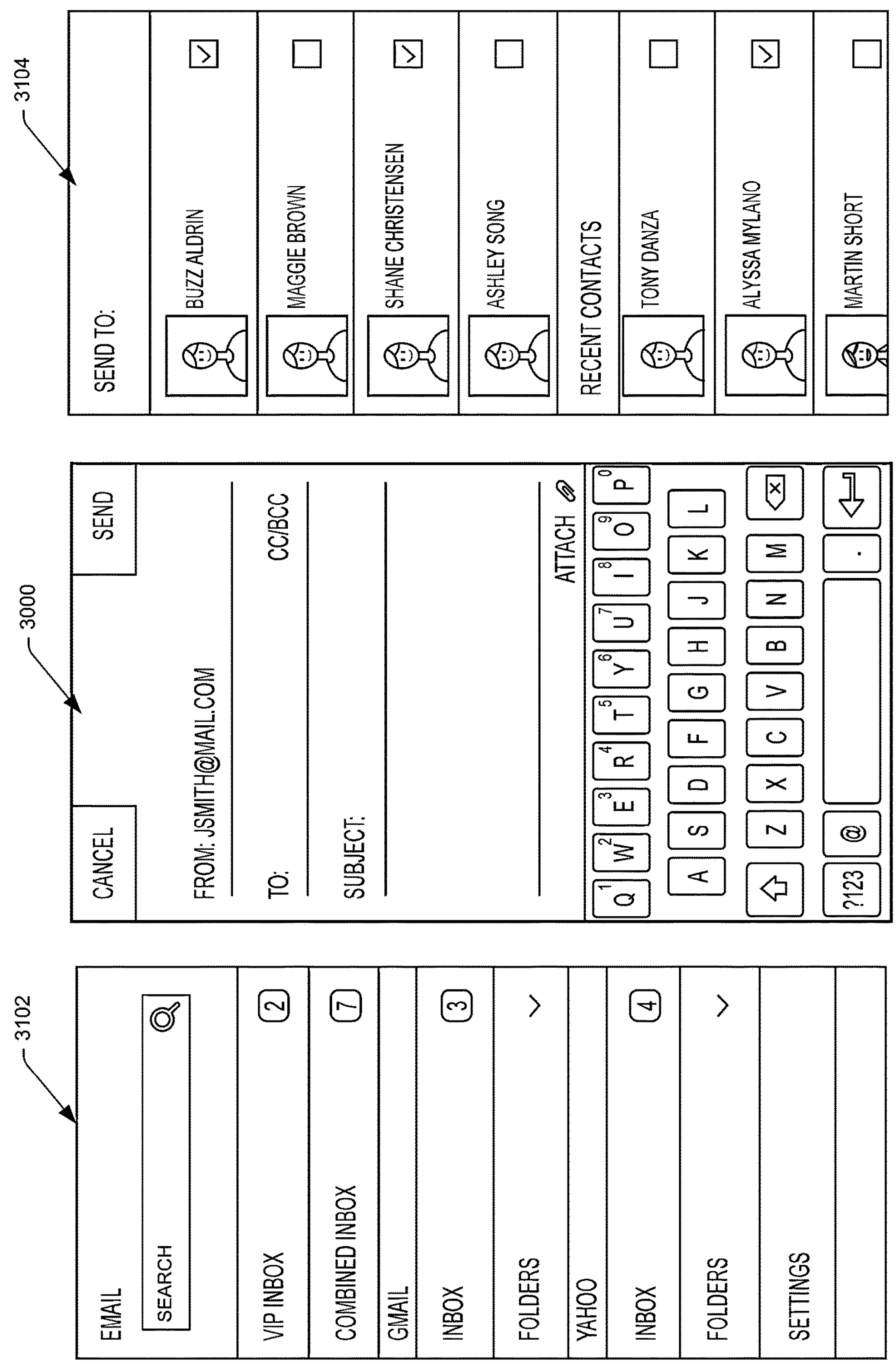
FIG. 31 illustrates an example UI showing a user composing a new mail message, as well as potential right and left panels that the device may display in response to predefined gestures (e.g., a tilt gesture to the right and a tilt gesture to the left, respectively).

FIG. 31 illustrates an example center panel 3100 showing a user composing a new mail message. In this example, when the user performs a tilt gesture to the left, the device 100 again displays a left panel 3102 that comprises a settings menu that allows a user to manage the email account of the user. When the user performs a tilt gesture to the right, however, the device 100 displays a list of contacts 3104 in this example. As illustrated, the user may select which contacts of the list he or she would like to send the email to. This right panel 3104 may accordingly be scrollable in the vertical direction in this example (e.g., via touch gestures on the display). In some instances, cursor of the user may be in the "to:" line in order for the tilt gesture to the right to display the list of contacts in the right panel 3104. Furthermore, the list of contacts may be populated based on a contacts application, a list of previous recipients of emails from the user of the device 100, or the like. Further, the list of contacts may be sorted alphabetically, based on a number of times that the user has sent emails to each particular contact, or the like.

Figure 32:
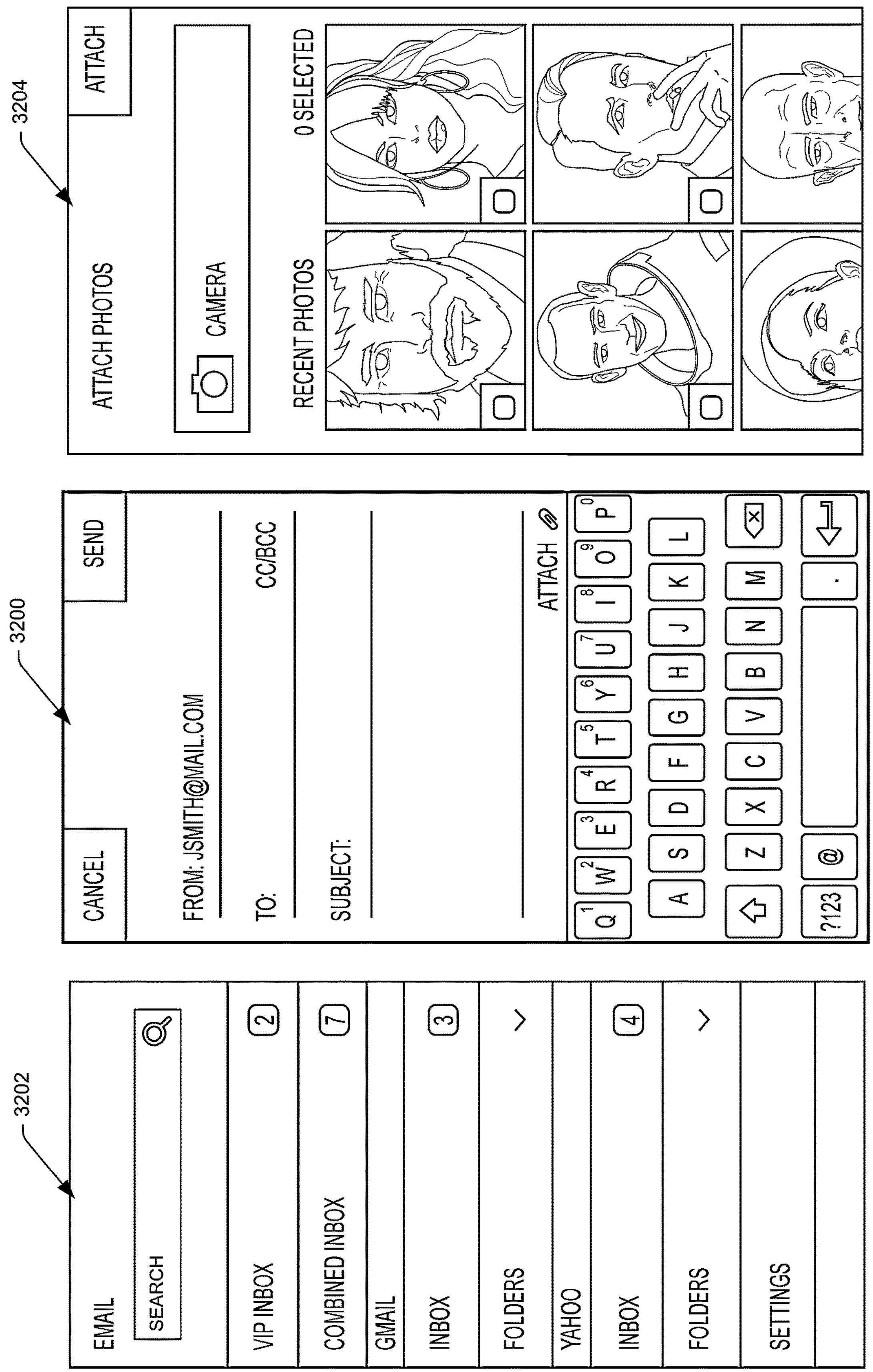
FIG. 32 illustrates another example right panel that the device may display in response to the user performing a tilt gesture to the right while composing a new message.

FIG. 32 illustrates another example where a user is composing an email in a center panel 3200. Again, the device 100 may display a settings menu in a left panel 3202. In response to the user performing a tilt gesture to the right, however, the device may display a right panel that includes files (in this case, photos) to attach to the email message. For instance, the device 100 may display photos from a photo gallery of the device 100 for selection by the user, potentially sorted according to recency with most recently taken photos appearing first. In response to the user of the device 100 selecting one or more photos from the right panel 3204, the device 100 may attach those photos to the email message being composed in the center panel 3200.

Figure 33:
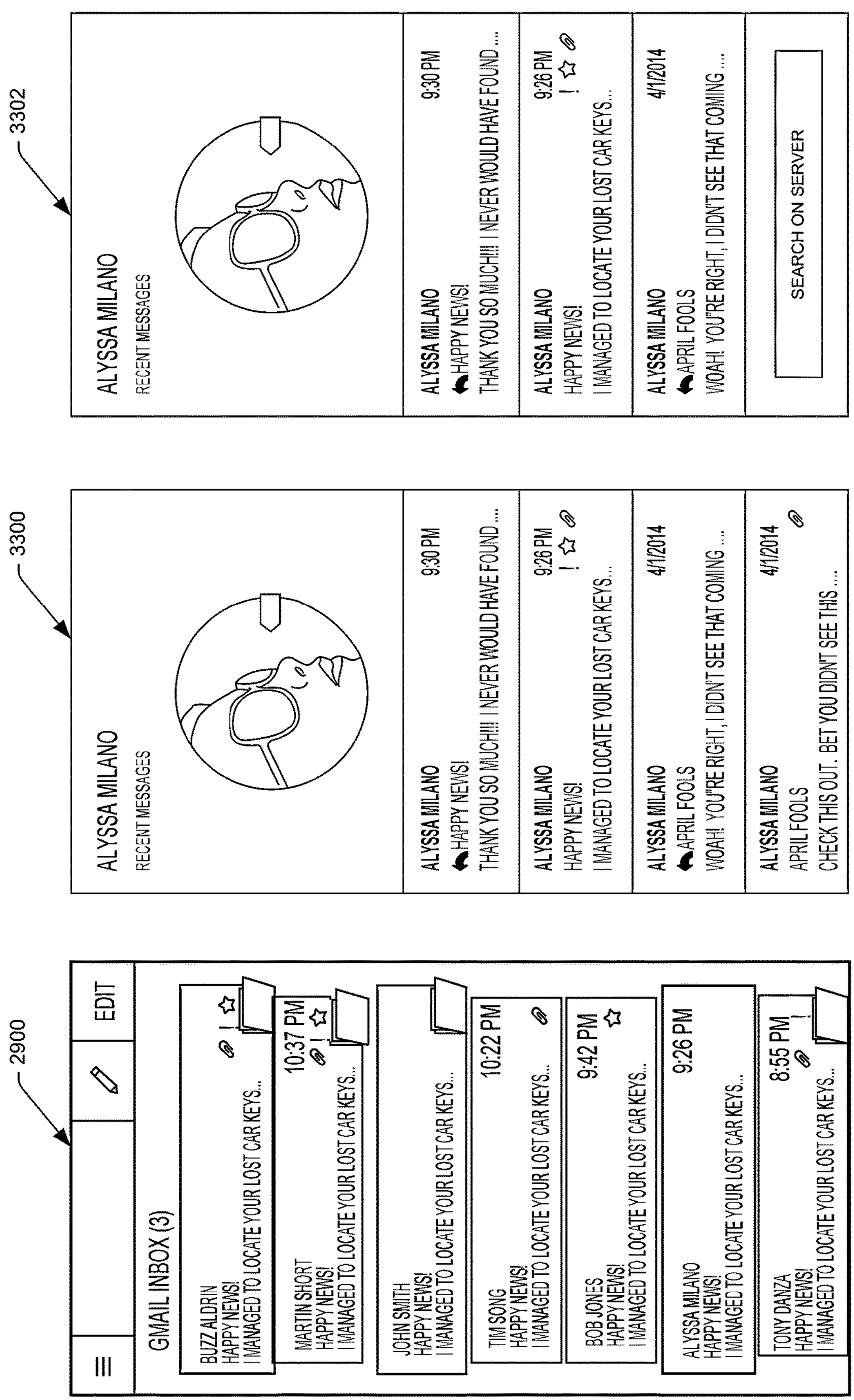
FIG. 33 illustrates an example right panel that the device may display from an open or selected email message received from or sent to a particular user. In response to the user performing a tilt gesture to the right, the device may display other messages to and/or from the user.

FIG. 33 illustrates two example right panels 3300 and 3302 that the device 100 may display in response to a user performing a tilt gesture to the right from an open email message received from or sent to a particular user, or from an email that has been highlighted in a list (as illustrated in the example inbox). As illustrated, each right panel 3300 and 3302 displays other emails sent and/or received from the particular contact that sent the subject email in the center panel (or to whom the user sent an email to, in the case of a sent message). In the right panel 3300, the device 100 displays those emails that are to or from the contact and that stored on the device. The right panel 3302, meanwhile, display those emails that are to or from the contact and that are either stored on the device 100 or stored on a server that is remote from the device 100 (i.e., stored in the cloud).

Figure 34:
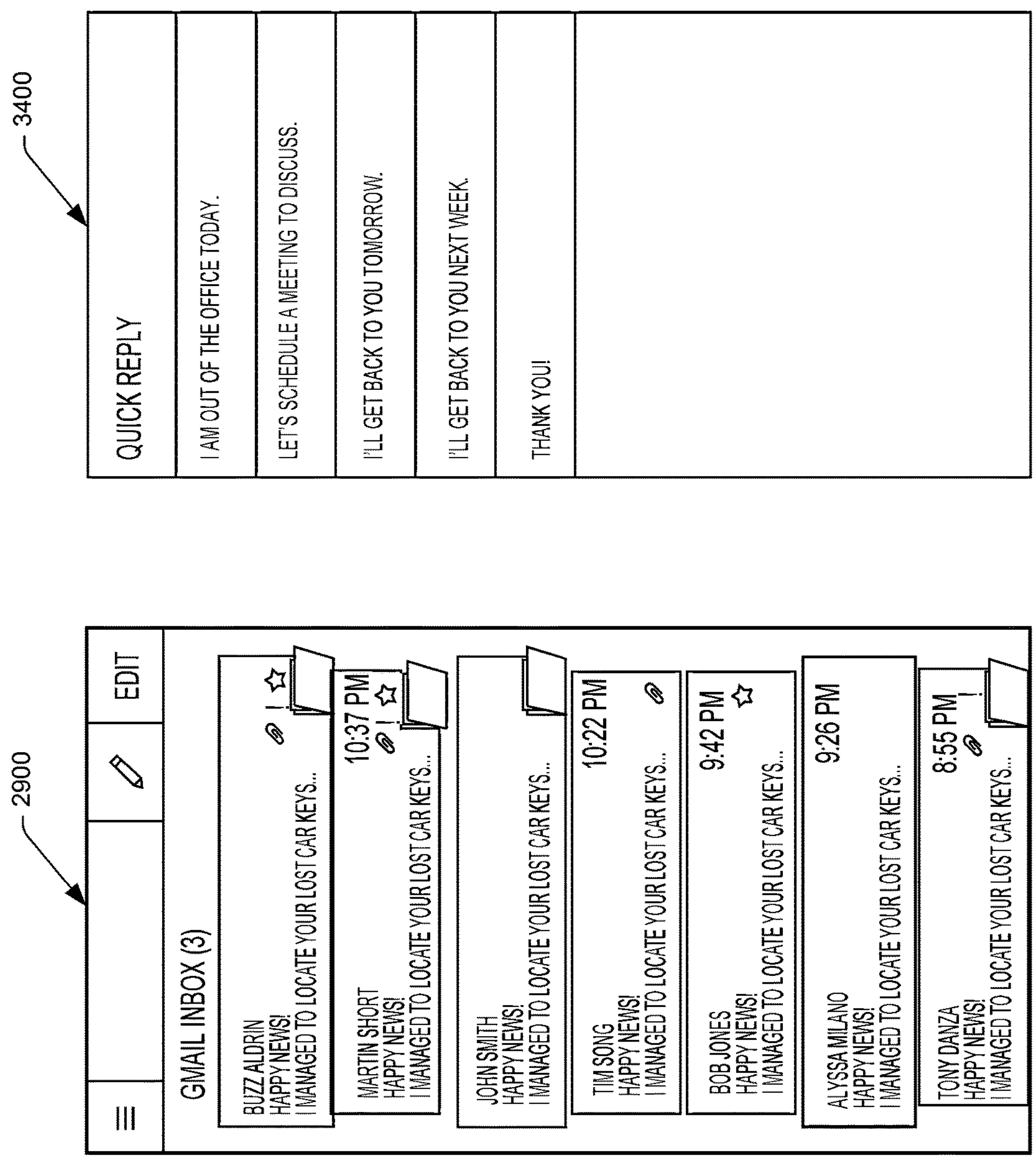
FIG. 34 illustrates another example right panel that the device may display from an open email message that the device has received. In response to the user performing a tilt gesture to the right, the device may display a UI that allows the user to reply to the sender or to one or more other parties.

FIG. 34 illustrates another example right panel 3400 that the device may display from an open email message that the device has received (or sent), or from an email highlighted in a list (as illustrated). In response to the user performing a tilt gesture to the right, the device 100 may display the right panel 3400, which allows the user to reply to the sender or to one or more other parties. As such, when a user views a received email on the display 102, the user need only perform a tilt gesture to the right to open a window to compose a reply email to the sender.

Figure 35:
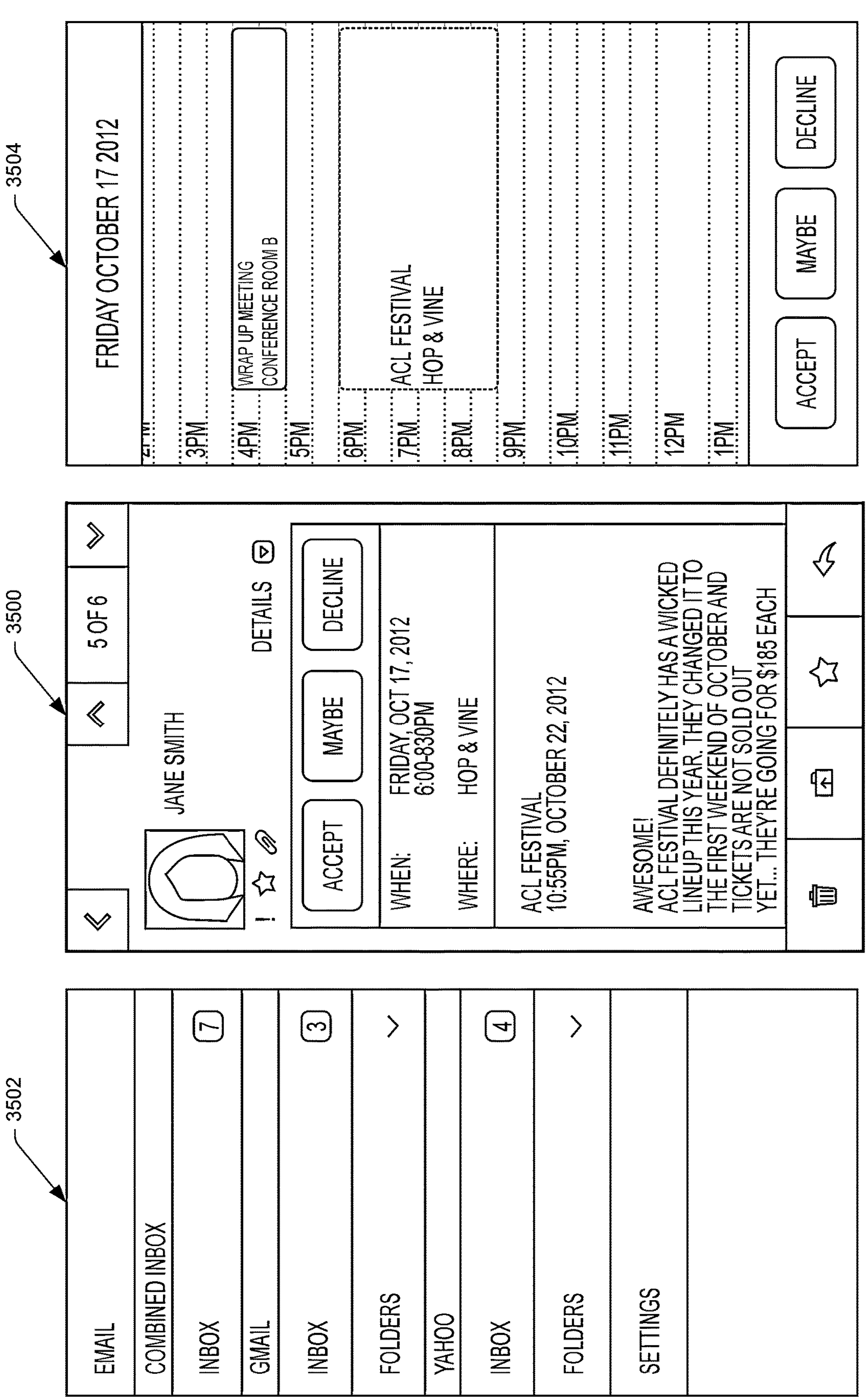
FIG. 35 illustrates an example UI showing a meeting invitation, as well as potential right and left panels that the device may display in response to predefined gestures (e.g., a tilt gesture to the right and a tilt gesture to the left, respectively).

FIG. 35 illustrates an example center panel 3500 showing a meeting invitation, as well as potential right and left panels that the device may display in response to predefined gestures (e.g., a tilt gesture to the right and a tilt gesture to the left, respectively). As illustrated, the center panel 3500 includes details of the propose meeting, including a location and time, as well as controls that allow a user to respond to the invitation. In response to the user performing a tilt gesture to the left, the device 100 may display the left panel 3502, which again comprises a settings menu that allows a user to manage his or her email account (and potentially calendar). In response to performing a tilt gesture to the right when in the center panel 3500, however, the device 100 may display the right panel 3504. As illustrated, the right panel 3504, in this example, shows the calendar of the user populated with current appointments of the user on the day at which the proposed meeting is to occur. In this example, the right panel 3504 also shows, within the calendar, the proposed meeting. As such, the user is able to easily see how the proposed meeting fits in with the rest of his or her schedule. In addition, the right panel 3504 includes controls for a user to reply to the invitation with a reply of accept, decline, or maybe.

Figure 36:
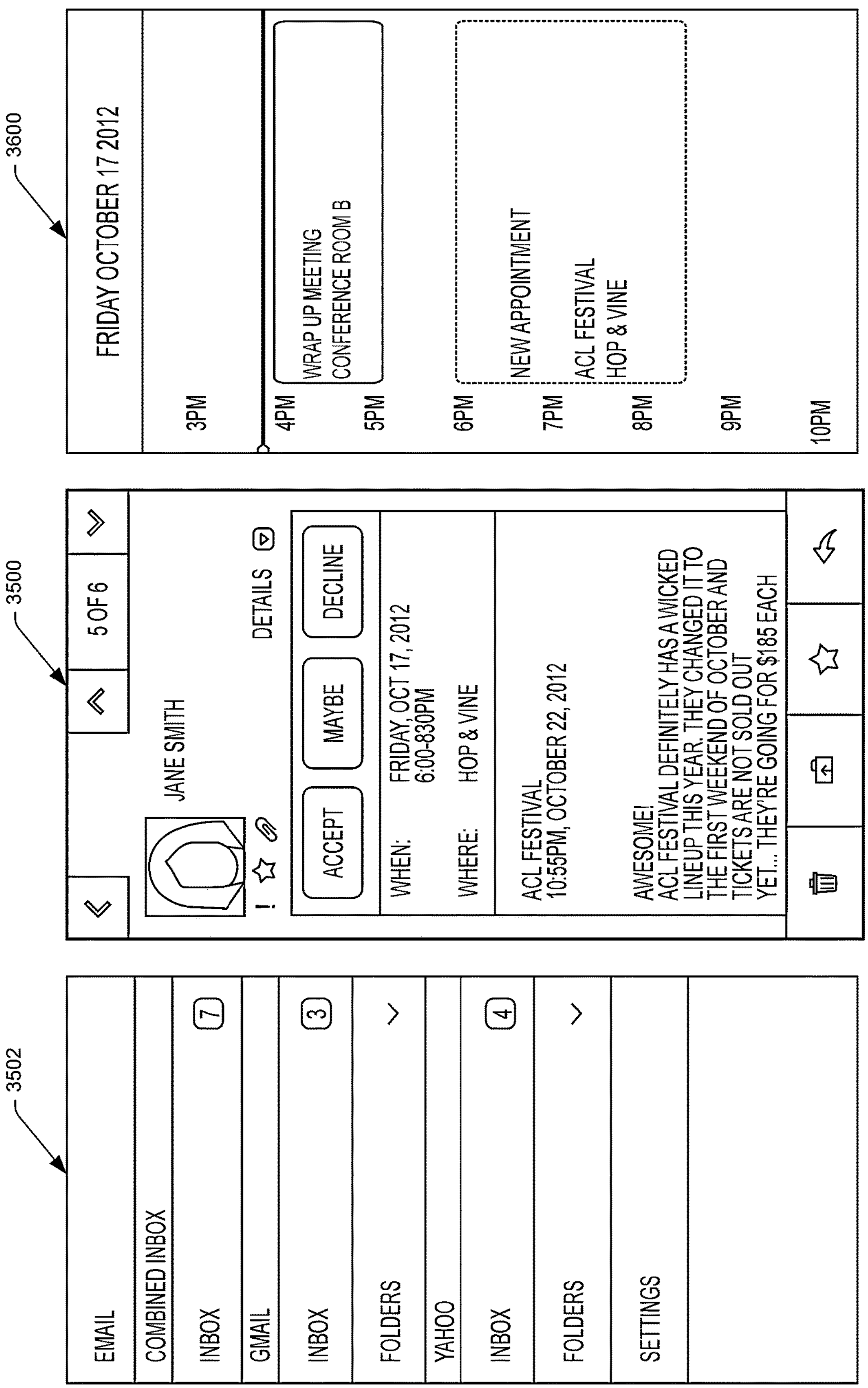
FIG. 36 illustrates another example right panel that the device may display in response to a user performing a tilt gesture to the right while the device displays a meeting invitation.

FIG. 36 illustrates another example right panel 3600 that the device may display in response to a user performing a tilt gesture to the right while the device displays a meeting invitation. This figure illustrates an alternative right panel 3600, which does not include the controls for replying to the invitation but instead lists the invitation on the calendar as a "new appointment".

Figure 37:
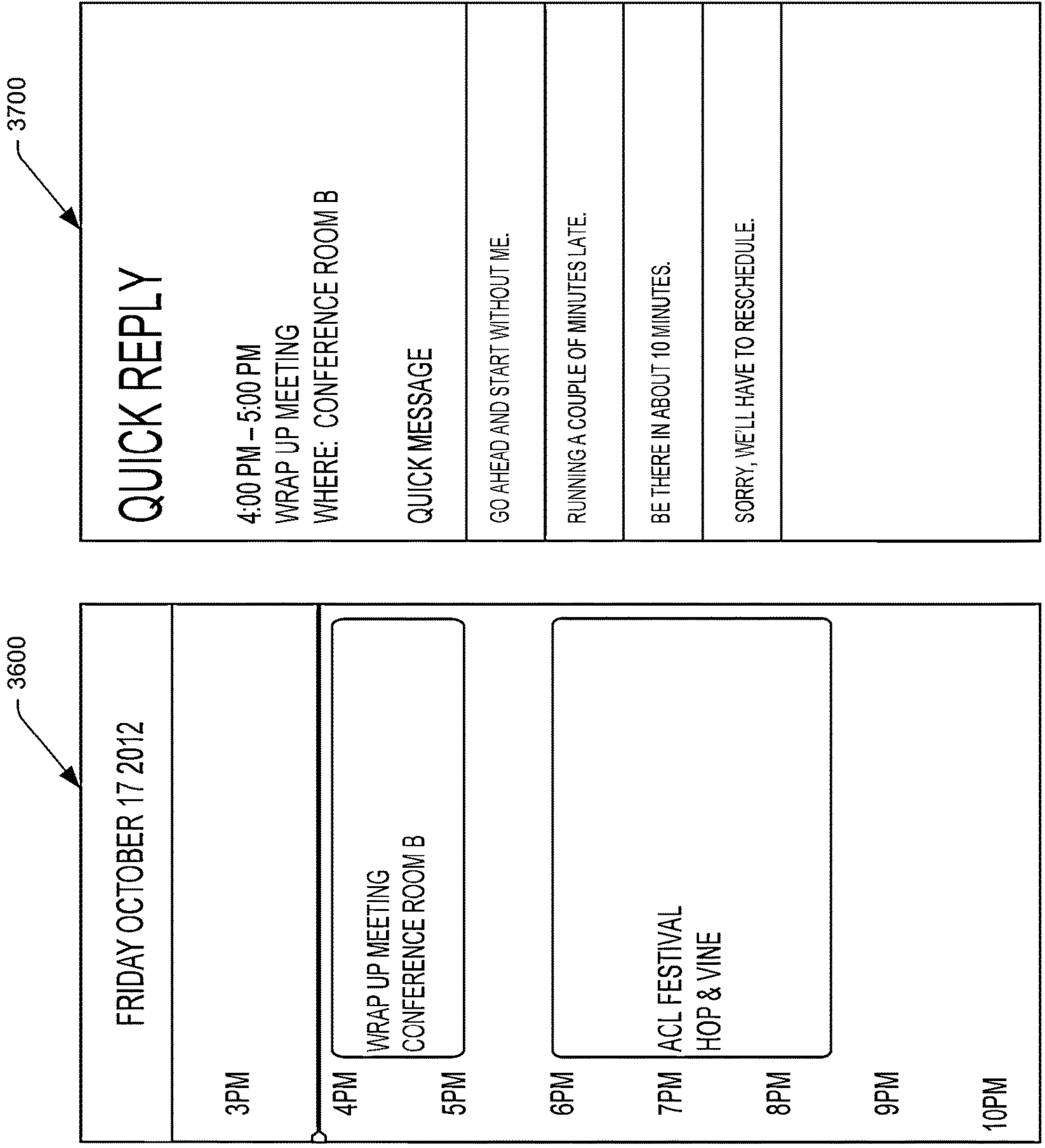
FIG. 37 illustrates an example right panel that the device may display in response to displaying a tilt gesture to the right while the device displays a calendar.

FIG. 37 illustrates an example right panel 3700 that the device may display in response to displaying a tilt gesture to the right while the device 100 displays a calendar. In this example, when the user performs this gesture while viewing a calendar, the device 100 displays information regarding the next meeting of the user. That is, the right panel 3700 displays details, such as the title, time, location, and other attendees, of the meeting that is the next meeting on the calendar of the user. Further, as illustrated, the right panel may include one or more controls that allow a user to compose a "quick message", either by selecting an icon and typing a message to some or all attendees or organizers of the meeting, or by simply selecting a pre-written message. For instance, the right panel 3702 includes several example messages that the device 100 may send to one or more people associated with the meeting in response to selection of the message, such as "Go ahead and start without me" and the like. Therefore, a user is able to not only view his or her impending meeting with a gesture of the device 100, but also able to quickly email other interested parties by selecting an icon on the right panel 3704.

Figure 38:
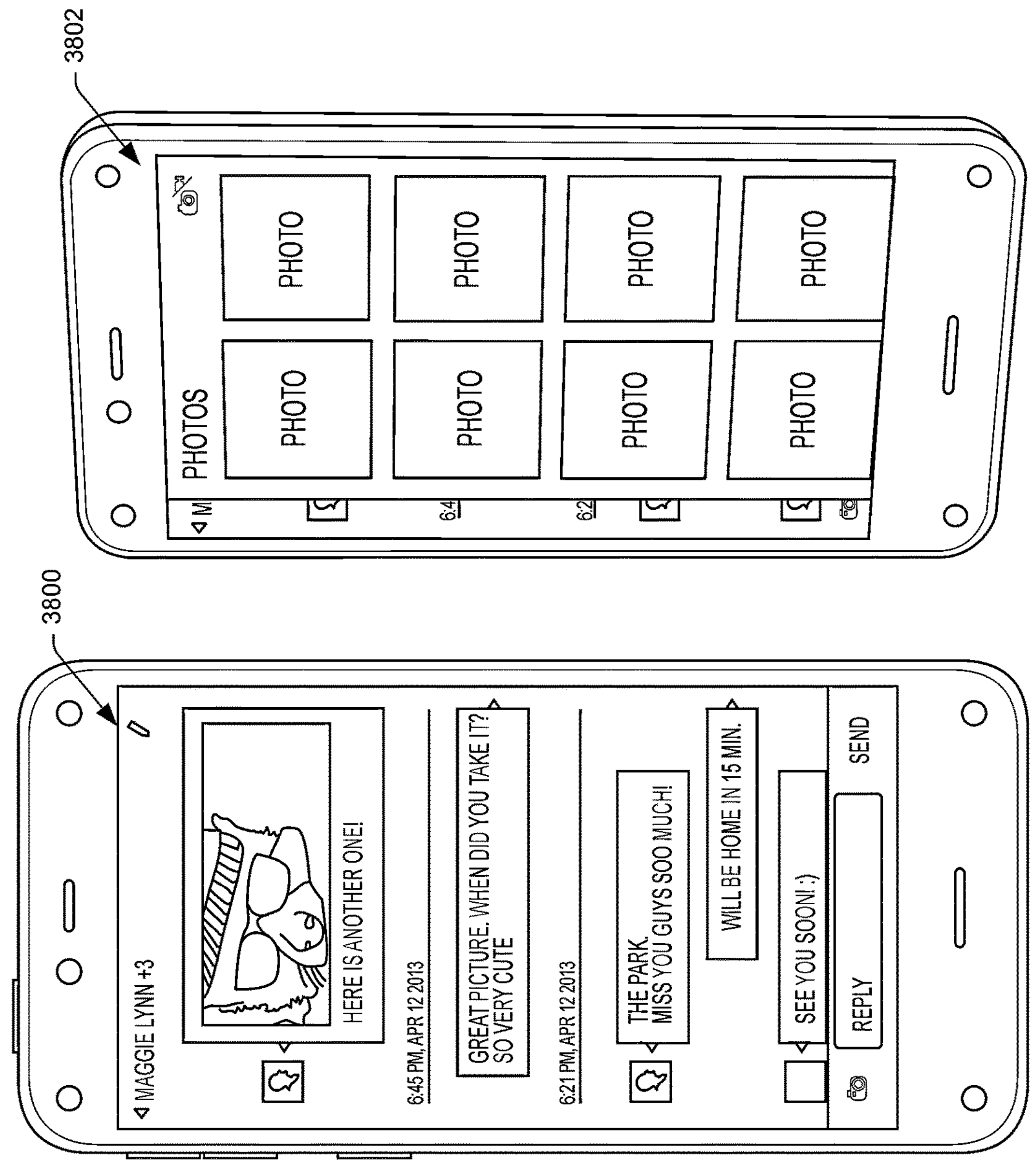
FIG. 38 illustrates an example UI showing a messaging session between two users, as well as an example right panel that the device may display in response to a user performing a predefined gesture on the device (e.g., a tilt gesture to the right).

FIG. 38 illustrates an example central panel 3800 showing a messaging session (e.g., text messaging) between a user of the device and another example user ("Maggie Lynn"). In this example, in response to performing a tilt gesture to the right, the device may display a right panel 3802, which comprises icons associated with photos that the user of the device 100 has either sent or received as part of the conversation in the text-messaging session with Maggie Lynn. That is, by performing the tilt gesture from within the conversation panel, the user of the device 100 is able to see each picture that the two users in the messaging session have shared with one another. These photos may be ordered by recency, size, or the like. Furthermore, selection of an icon corresponding to a photo may cause the device 100 to display the photo, store the photo locally, or present a menu querying the user as to what operation the user would like the device 100 to perform. In some instances, applications such as a text-messaging application, might not implement a left panel (or, conversely, may implement a left panel but no right panel).

Furthermore, while FIG. 38 illustrates an example of a messaging session between two users, in some instances a center panel may comprise a list of contacts to whom the user of the device has sent or received text messages from. In this instance, in response to a user performing a tilt gesture to the right, the device may display a list of photos sent or received from each of the contacts in the list.

Figure 39:
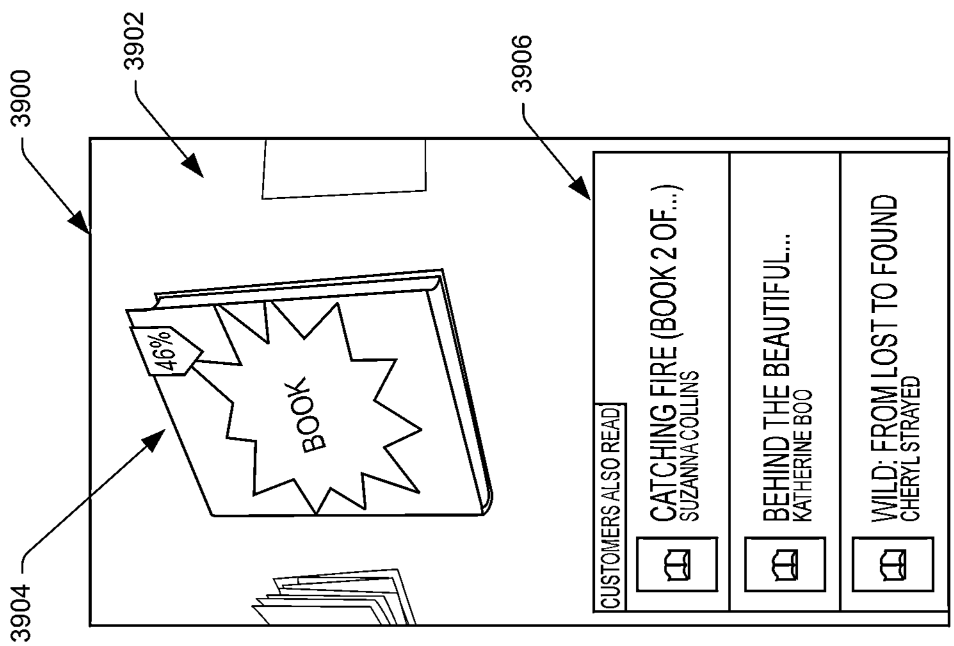
FIG. 39 illustrates an example UI of a carousel of icons that is navigable by a user of the device, with an icon corresponding to a book that the user has partially read currently having user-interface focus in the carousel. As illustrated, the information beneath the carousel comprises recommended books for the user, based on the book corresponding to the illustrated icon.

FIG. 39 illustrates an example UI 3900 of a home screen that includes a carousel of icons 3902 that is navigable by a user of the device 100. In this example, an icon 3904 corresponding to a book that the user has partially read currently has user-interface focus in the carousel 3902. In this example, the icon 3904 represents the book-reading application, and selection of icon 3904 may launch the corresponding application and well as the book corresponding to the icon 3904.

In addition, because the icon corresponding to the book application currently has user-interface focus, the information in a lower portion 3906 of the UI 3900, beneath the carousel, comprises recommended books for the user that have been identified from the book corresponding to the illustrated icon. That is, in this example, the lower portion of the UI 3900 recommends certain books to the user based on the book illustrated in the carousel and/or based on other books stored to the device or previously read by the user. In some instances, selection of a book from the lower portion 3906 may cause the device 100 to navigate to a store from which the user may acquire the corresponding book or another book. Furthermore, in some instances the user of the device 100 may navigate the items in the lower portion 3906 of the UI 3900 by vertical swipe gestures on the display 102.

Figure 40:
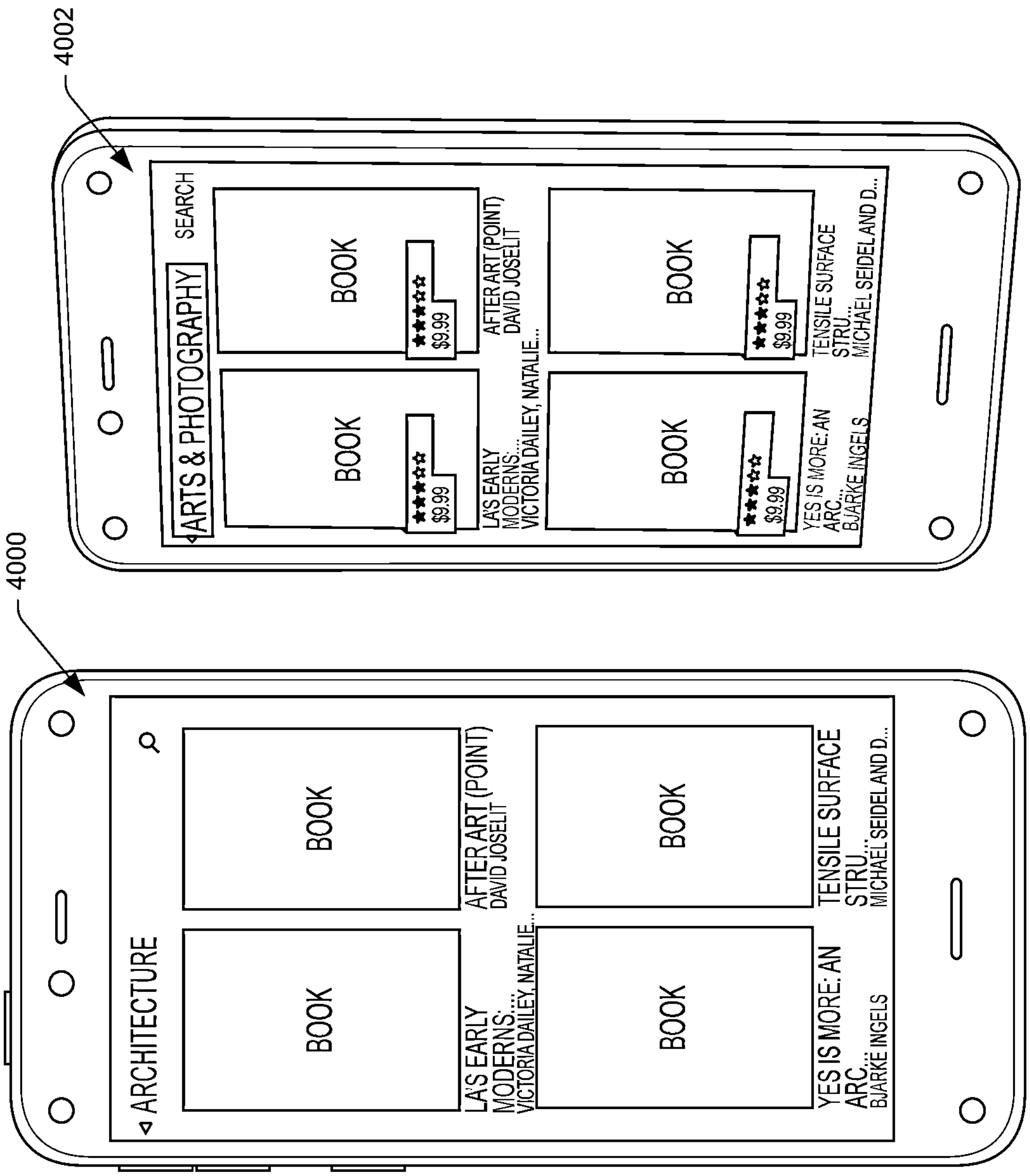
FIG. 40 illustrates an example UI displaying books accessible to the user or available for acquisition by the user, as well as an example right panel that the device may display in response to a user performing a predefined gesture on the device (e.g., a tilt gesture to the right).

FIG. 40 illustrates an example UI 4000 of a store and displays books available for acquisition by the user. As illustrated, the UI 4000 includes an icon for the book (e.g., a cover for the book), as well as a name of the book and an author. In this example, the user performs a peek gesture to cause the device 100 to display a right panel 4002, which includes additional details regarding the books. For instance, the right panel 4002 adds a rating for each book along with a price for each book in the store. While a few example details are shown, it is to be appreciated that multiple additional or alternative details may be displayed in response to the user performing the peek gesture.

Furthermore, in instances where the center panel displays books from the library of the user, different details may be displayed in response to the user performing the peek gesture. For instance, the right panel may display a user's progress through the book, expressed via a progress bar, a percentage, or the like.

Figure 41:
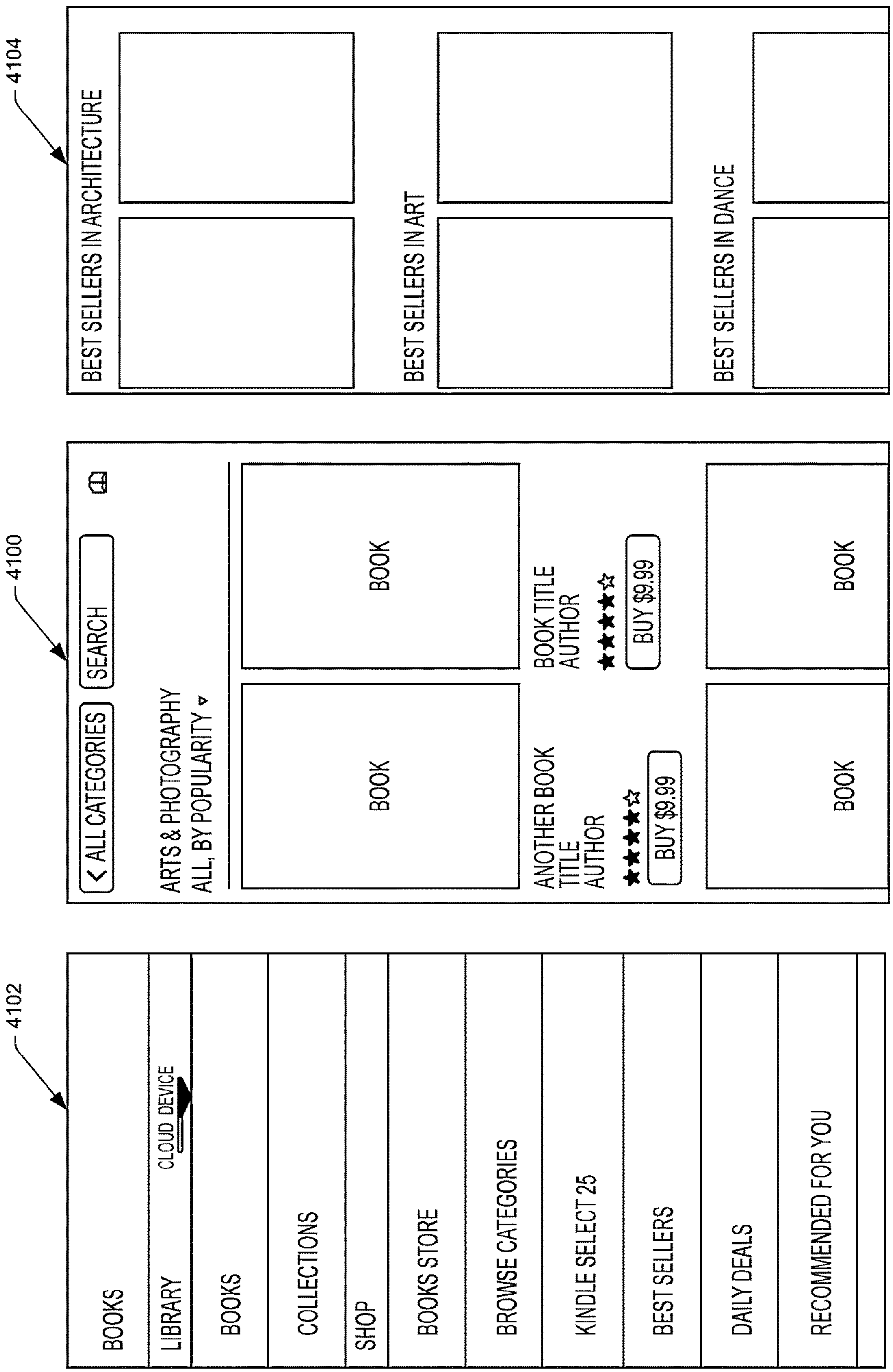
FIG. 41 illustrates an example UI showing books available to the device or available for acquisition by the user, as well as example right and left panels that the device may display in response to a user performing a predefined gesture on the device (e.g., a tilt gesture to the right and a tilt gesture to the left, respectively).

FIG. 41 illustrates an example UI 4100 showing books available to the device or available for acquisition by the user. That is, the UI 4100 may comprise an interface that a store may present in response to a user navigating to the store and browsing within an electronic catalog of the store. In addition, FIG. 41 illustrates that the user has performed a tilt gesture to the left and, in response, the device 100 displays a left panel 4102 comprising a navigation menu. As illustrated, the navigation menu 4102 includes links that allow the user to navigate within his or her own library, as well as within the store.

In addition, FIG. 41 illustrates that the user has performed a tilt gesture to the right and, in response, the device 100 has displayed an example right panel 4104. In this example, the right panel 4104 comprises additional books available for acquisition for consideration by the user. More specifically, the right panel 4104 illustrates "best sellers" within a category of the electronic catalog that the user is currently viewing in the center panel 4100, as well as related categories or sub-categories. As such, the user is able to view best-selling books in a category that he or she is browsing in response to performing the tilt gesture to the right. In some instances, the additional content shown in the right panel 4104 may instead comprise recommend items or the like.

Figure 42:
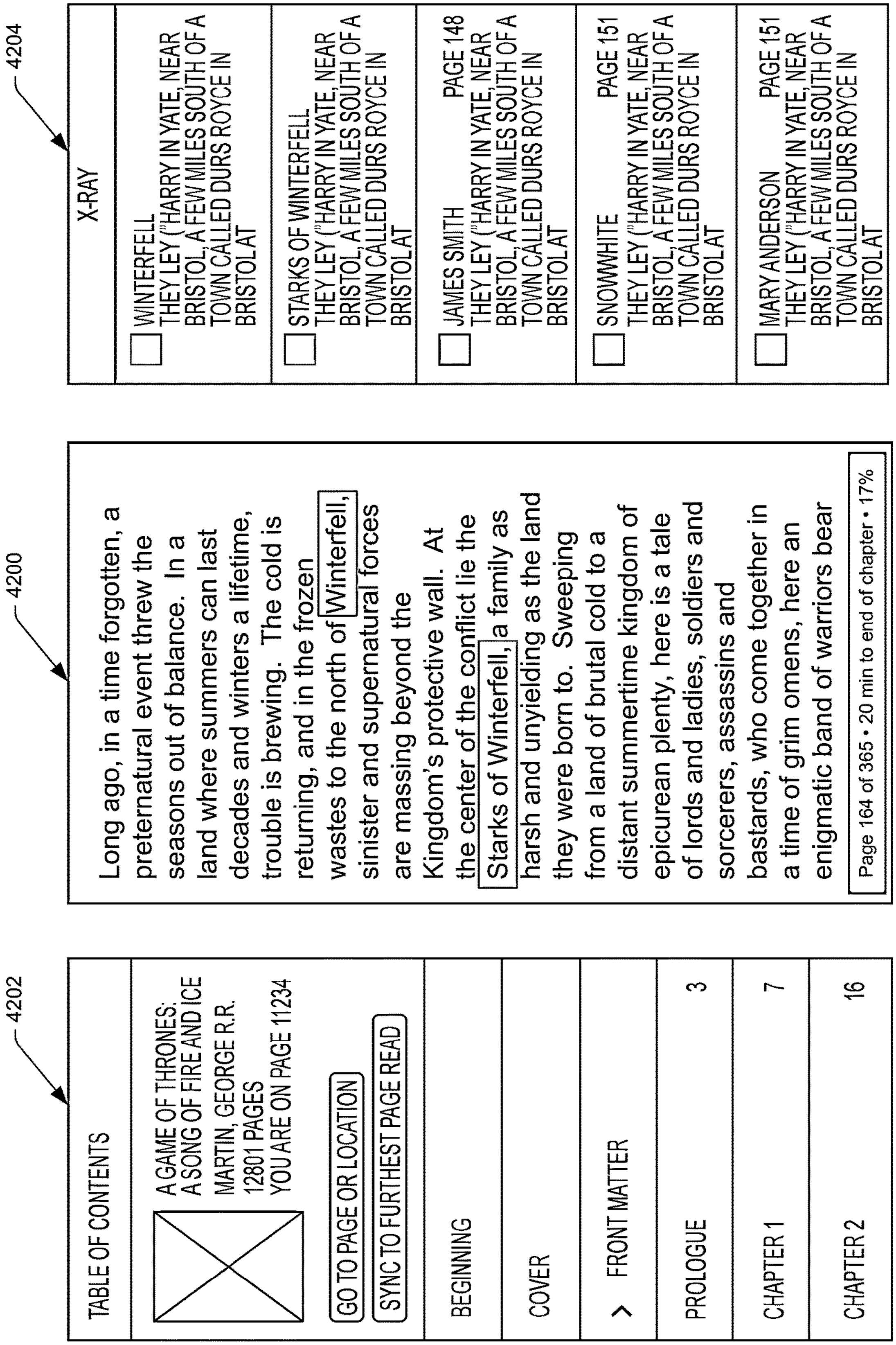
FIG. 42 illustrates an example UI showing content from within a book accessible to the device, as well as example right and left panels that the device may display in response to a user performing a predefined gesture on the device (e.g., a tilt gesture to the right and a tilt gesture to the left, respectively).

FIG. 42 illustrates an example UI 4200 showing content from within a book accessible to the device. That is, the UI 4200 may be displayed in response to a user requesting to read a book that is accessible to the device. In addition, FIG. 42 displays an example left panel 4202 that the device 100 may display in response to the user performing a tilt gesture to the left when the book content is displayed in the center panel. As illustrated, the left panel 4202 may include a navigation menu that allows the user to navigate through the book that he or she is currently reading. For example, the navigation menu may include a table of contents that includes links corresponding to locations within the book that the user is currently reading that, when selected, cause the device the navigate to the selected location. The left panel 4202 may include additional information regarding the book, such as a name of the book, an author of the book, a length of the book, a current location of the book, and the like. The left panel 4202 also includes a link that allows a user to request to navigate to any particular location within the book ("Go to Page or Location") as well as a link that allows the user to display the furthest page that the user has reached in the book, whether on the device 100 or another device associated with an account of the user ("Sync to Furthest Page Read").

FIG. 42 also illustrates an example right panel that the device 100 may display in response to the user performing a tilt gesture to the right while reading the book in the center-panel UI 4200. The right panel may include any sort of additional information regarding the books, such as an outline of the book, commentary associated with the book, author's notes, highlights made by other users at the particular location of the book, or the like. In this example, the right panel 4204 includes "X-Ray" data, which includes information regarding people, places, or things mentioned in the particular page that is rendered on the UI 4200. That is, the X-Ray data may comprise additional information regarding characters or other "people, places, or things" referenced in the book, with this additional information comprising an indication of where this "person, place, or thing" was first referenced in the book, additional places throughout the book where this person appears, and the like. In some instances, each person, place, or thing referenced in the right panel 4204 is selectable to view additional information than is shown in the right panel 4204. In other instances, the information in the right panel 4204 may be selectable to navigate to a particular portion of the book that references the respective person, place, or thing, such as a place where the book introduces the respective person, place, or thing. Finally, in some instances, a user may be able to view, within the center-panel UI 4200, which people, places, or things have X-Ray data associated with them by performing a peek gesture from the UI 4200. In response, the device may highlight each person, place, or thing for which the device has information for display within the right panel 4204. Therefore, a user may perform a peek gesture to determine whether a particular character or location in the book, for example, is associated with X-Ray information and, if so, the user may perform a tilt gesture to the right to view this X-ray information. Further, as shown in center panel 4200, the device 100 may highlight the nouns or other information on the page of the electronic book, in response to a peek gesture, for which this X-Ray data is available.

Figure 43:
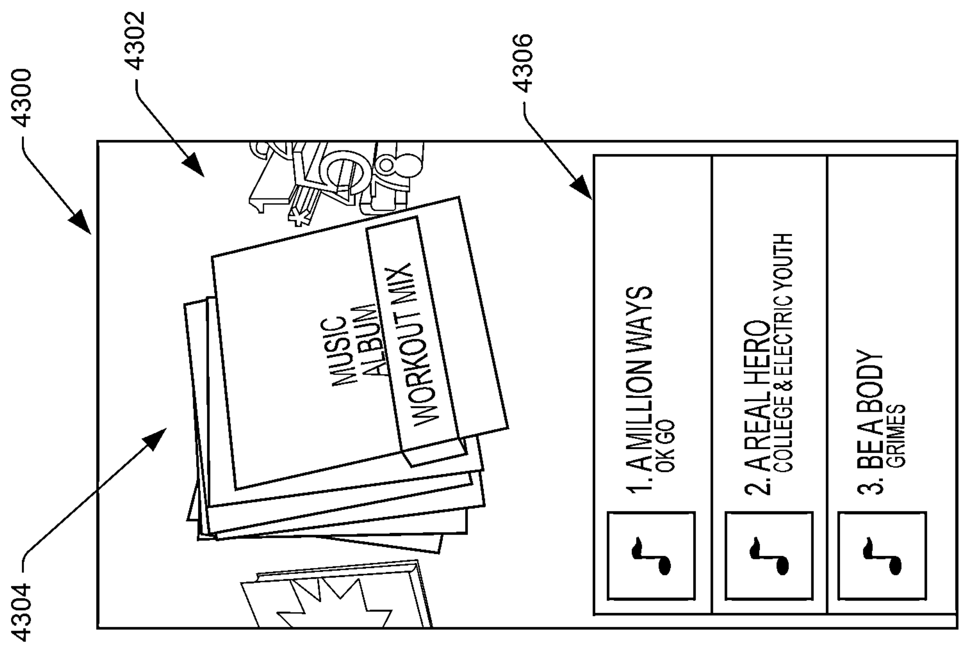
FIG. 43 illustrates an example UI of a carousel of icons that is navigable by a user of the device, with an icon corresponding to a music application currently having user-interface focus in the carousel. As illustrated, the information beneath the carousel may comprise songs of a playlist or album accessible to the music application.

FIG. 43 illustrates an example UI 4300 of a home screen that includes a carousel of icons 4302 that is navigable by a user of the device 100. In this example, an icon 4304 corresponding to a particular music album that the user owns has user-interface focus in the carousel 4302. In this example, the icon 4304 represents a music application, and selection of icon 4304 may launch the corresponding application and well as the music album corresponding to the icon 4304.

In addition, because the icon corresponding to the music application currently has user-interface focus, the information in a lower portion 4306 of the UI 4300, beneath the carousel, comprises individual tracks that are on the music album corresponding to the UI 4304. These tracks may be scrollable via swipe gestures in the lower portion 4306. Furthermore, in some instance the lower portion 4306 may display alternative information, such as recommended music for the user based on the music album corresponding to the icon 4304 (potentially based on other information about the user). In these instances, selection of a song or album icon from the lower portion 4306 may cause the device 100 to navigate to a store from which the user may acquire the corresponding music or other music.

Figure 44:
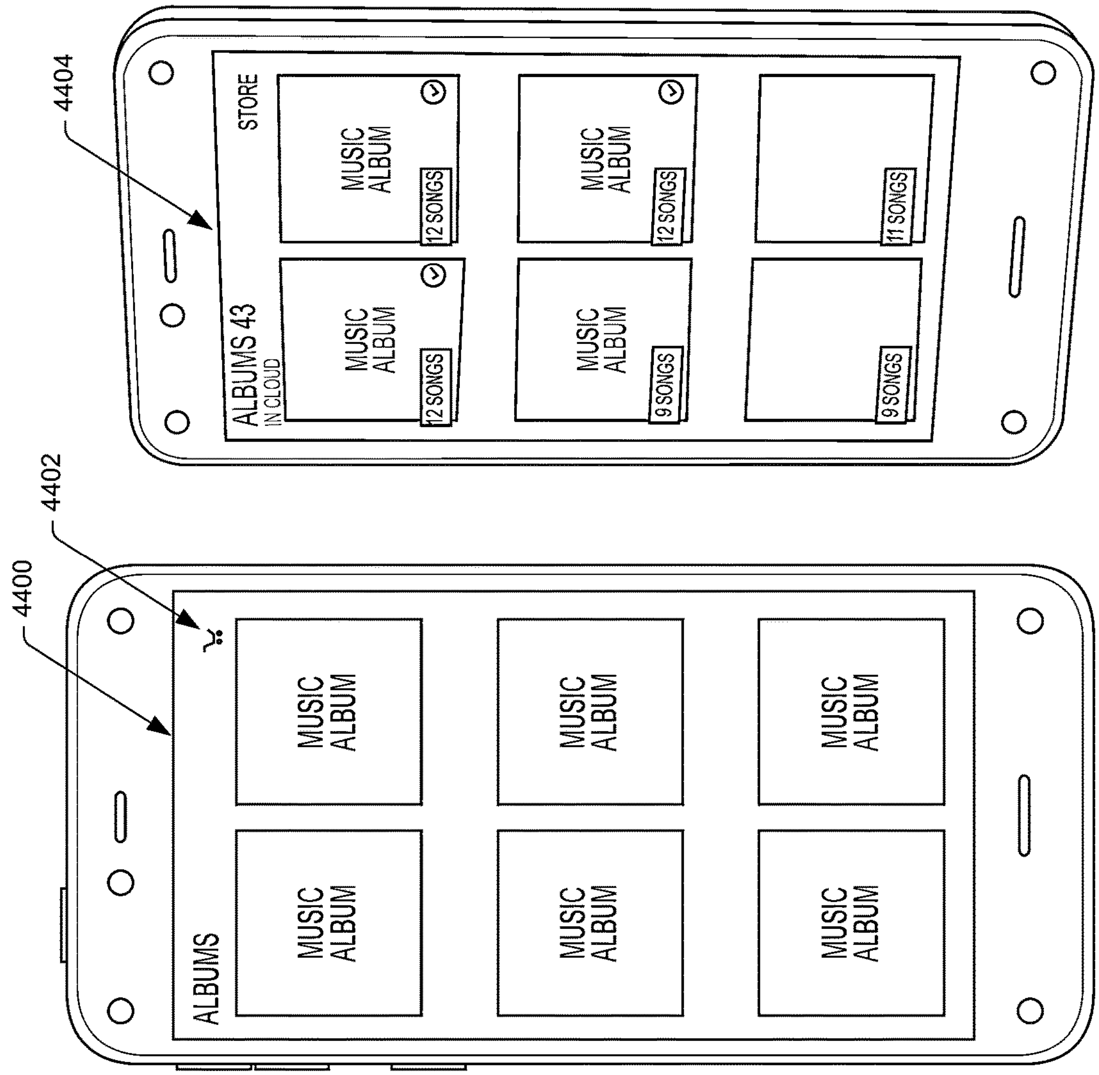
FIG. 44 illustrates an example UI showing music albums available to the device, as well as additional example information regarding the music albums in response to a user performing a predefined gesture (e.g., a peek gesture to the right).

FIG. 44 illustrates an example UI 4400 showing music albums available to the device. That is, this UI 4400 illustrates icons corresponding to music albums previously acquired by the user of the device. These albums may be stored locally on the device or remotely in the cloud. Selection of an icon from the UI 4400 may cause the device 100 to begin playing the corresponding music. In addition, the UI 4400 includes an icon 4402 (a shopping cart) that, when selected, navigates the device to a music storefront where the user may acquire additional music.

In addition, FIG. 44 illustrates an example right panel 4404 showing additional information regarding the music albums in response to a use performing a peek gesture to the right. This additional information may include a number of songs of each device, whether the device is stored locally on the device (indicated by the check mark), a year that the album was released, a length of the album, and the like.

Figure 45:
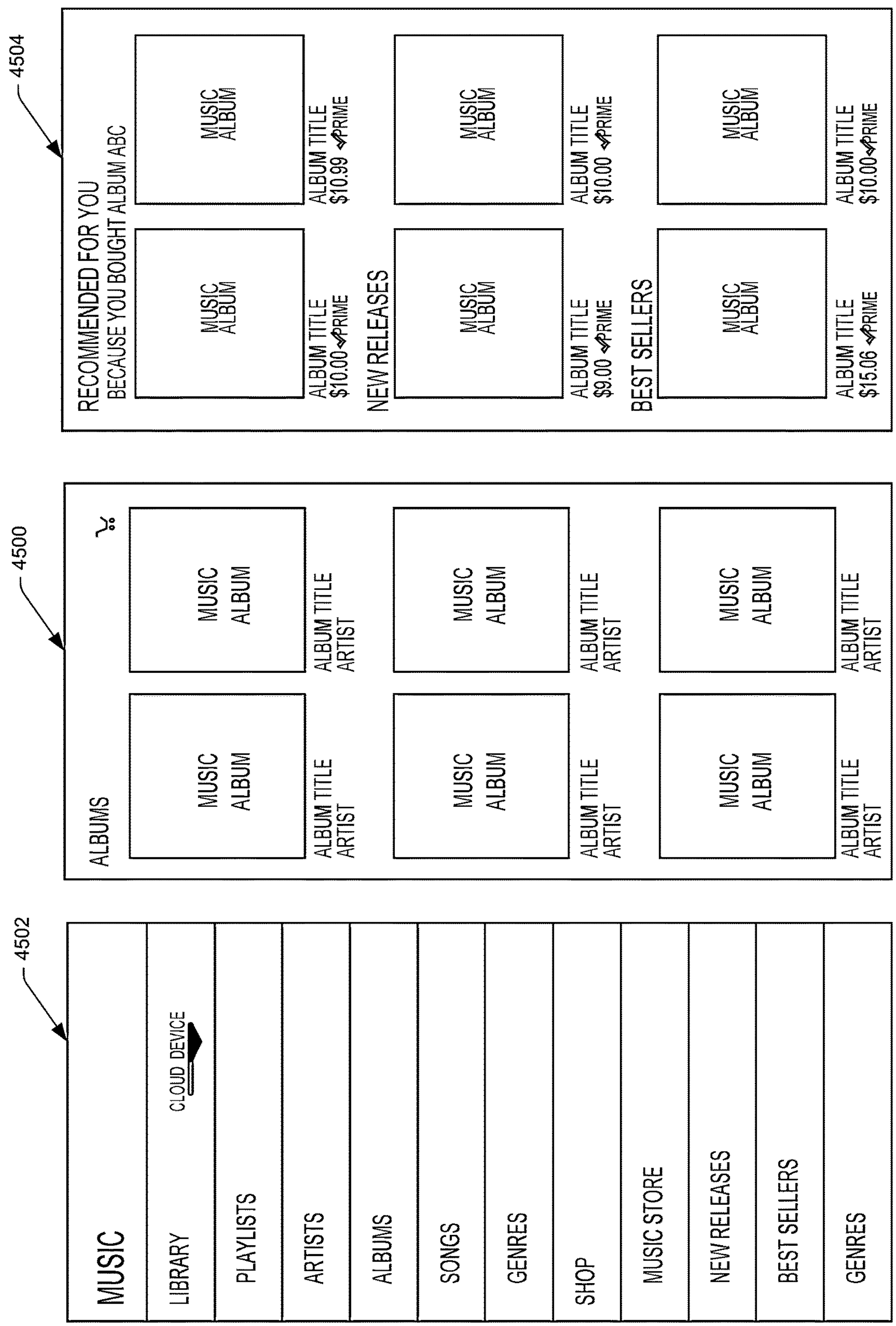
FIG. 45 illustrates an example UI showing music albums available to the device, as well as an example right panel showing recommended content in response to a user performing a predefined gesture (e.g., a tilt gesture to the right).

FIG. 45 illustrates an example UI 4500 showing music albums available to the device, such as albums that the user of the device has previously acquired. In addition, this figure illustrates an example left panel 4502 that the device 100 may display when the user performs a tilt gesture to the left from the center-panel UI 4500 corresponding to the music application. As illustrated, the left panel 4502 comprises a navigation menu that allows the user to navigate his or her own music, as well as navigate within a music store for acquiring additional music.

FIG. 45 also illustrates an example right panel 4504 that the device 100 may display in response to the user performing a tilt gesture to the right from the UI 4500. As illustrated, additional content may be displayed to the user based on the music of the user (e.g., the music indicated in the UI 4500). For example, the right panel 4504 may include music that is recommended for the user based on information about the user, music that has been newly released, and best sellers in music—generally, in a genre that the user often listens to, or based upon the music that is displayed in the center-panel UI 4500.

Figure 46:
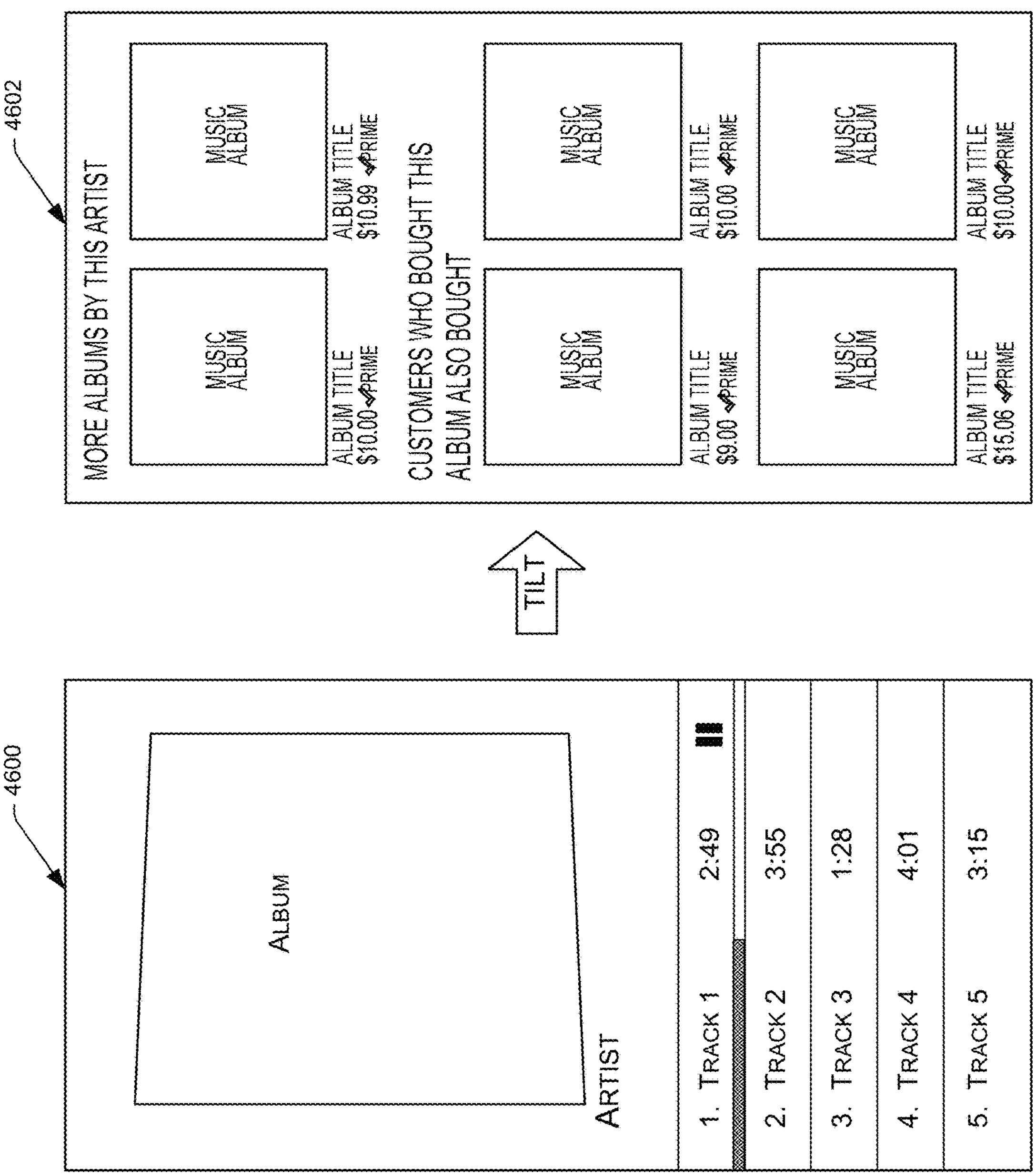
FIG. 46 illustrates an example UI showing a particular music album available to the device or currently being played, as well as an example right panel showing items that are recommended for the user based on the currently displayed album.

FIG. 46 illustrates an example UI 4600 showing a particular music album available to the device. As illustrated, the UI 4600 includes cover art for the music currently being played back by the device, as well as tracks on the album and a progress bar showing current progress through the track and a length of each track (which, in some instances, may be shown upon a peek gesture). In some instances, some or all of this information (e.g., track length, progress bar, etc.) may be displayed in response to the user performing a peek gesture on the device.

In addition, FIG. 46 illustrates an example right panel 4602 that the device may display in response to the use performing a tilt gesture to the right. As illustrated, the right panel 4602 may illustrate items that an array of different recommended music based on the album currently displayed in the UI 4600 and that is currently being played. For instance, this information may include other music by the artist, music that customers who have bought the currently playing album have also purchased or otherwise acquired, and the like. Therefore, the user is able to view additional music that may be of interest to the user by performing the tilt gesture to the right.

Figure 47:
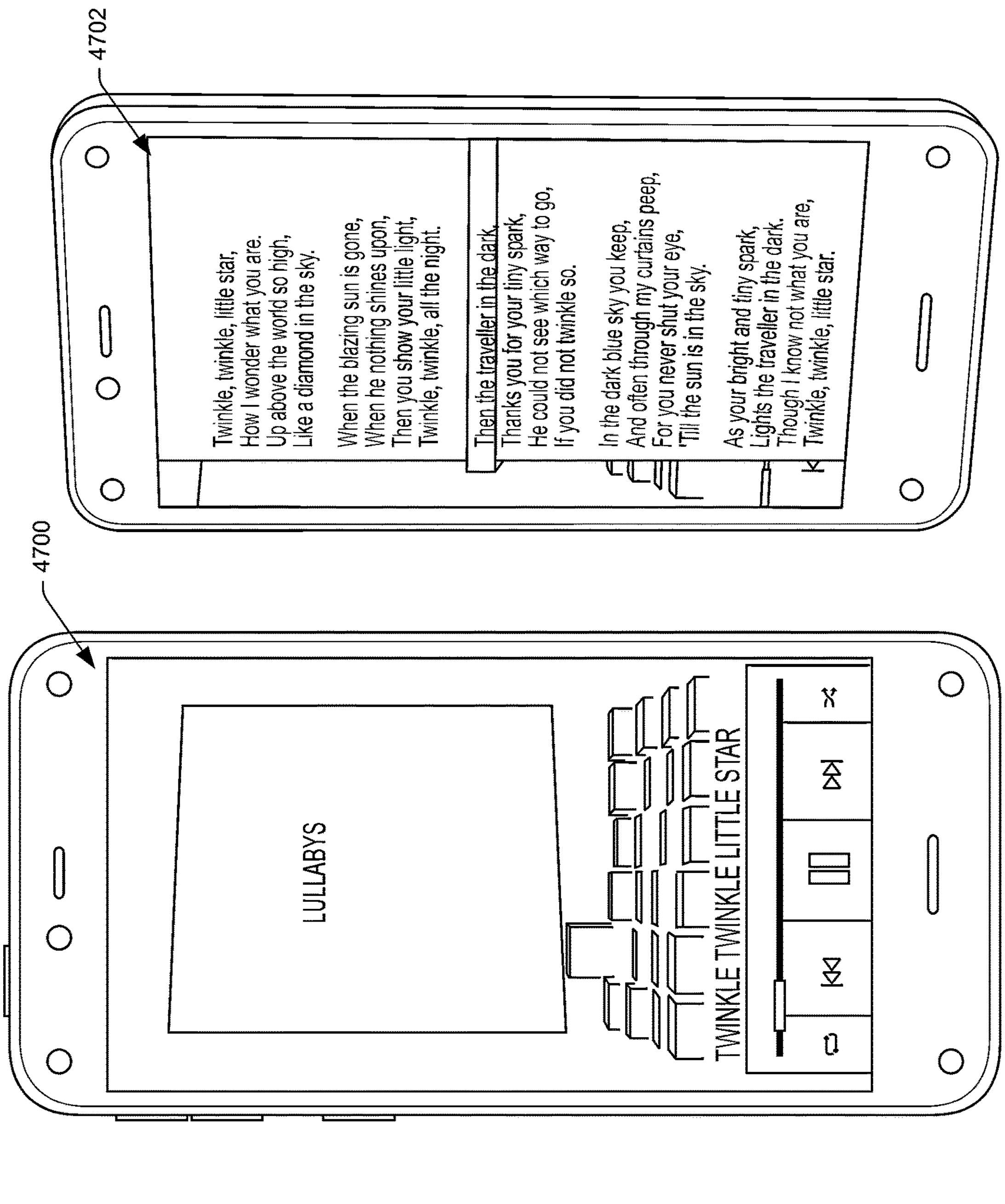
FIG. 47 illustrates an example UI showing a particular song playing on the device, as well as an example right panel showing lyrics or a transcript of the song, if available.

FIG. 47 illustrates an example UI 4700 showing a particular song that is currently playing on the device. In addition, the FIG. 47 illustrates an example right panel 4702 that the device 100 may display in response to the user performing a tilt gesture to the right. In this example, the right panel 4702 displays lyrics of the song, if available. The device 100 may store these lyrics locally or may obtain the lyrics in response to the user performing the tilt gesture. In addition, the right panel 4702 highlights or otherwise indicates, within the lyrics, a current portion of the song that the device is currently outputting.

Figure 48:
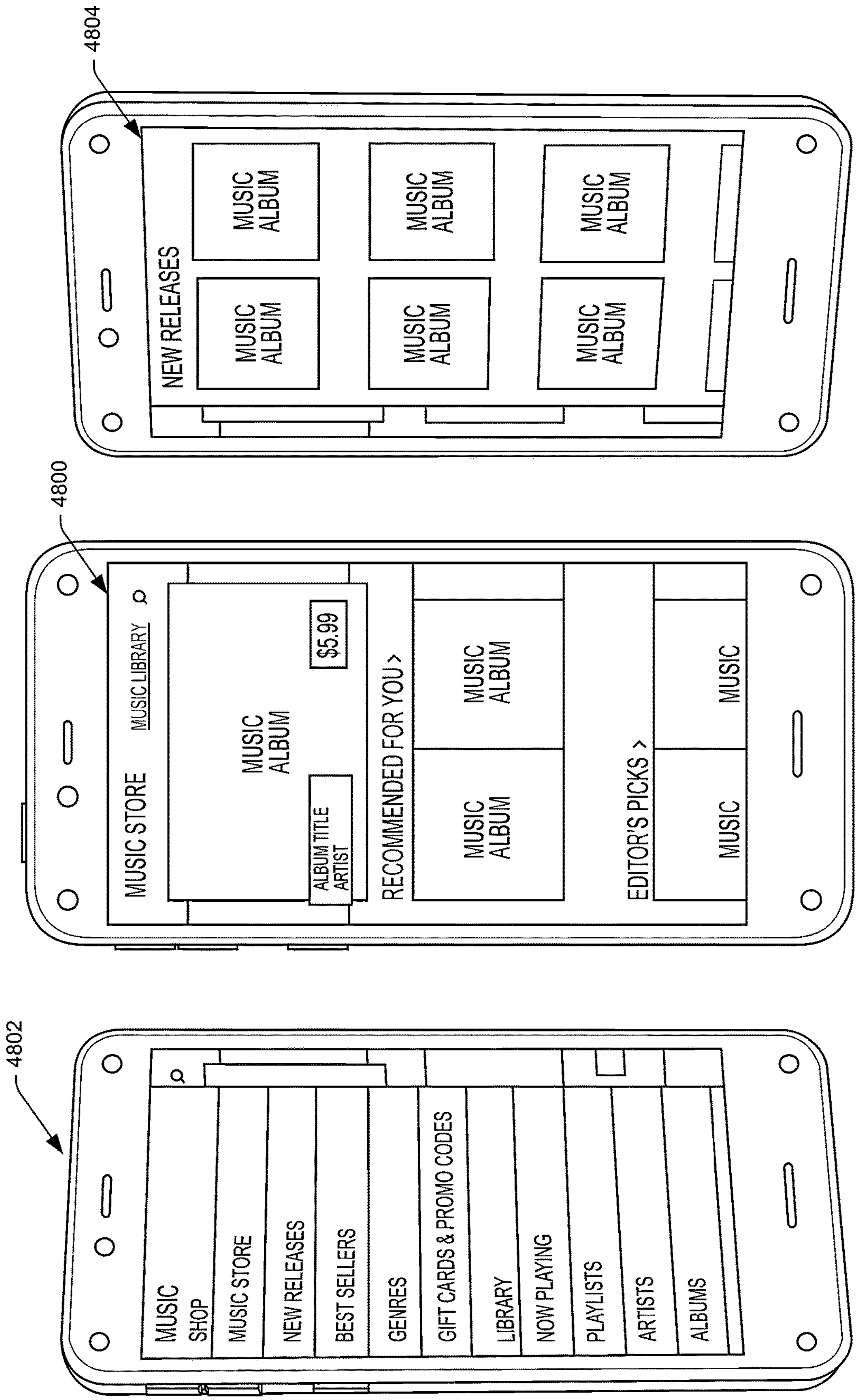
FIG. 48 illustrates an example UI showing music items available for acquisition, as well as example right and left panels that the device may display in response to a user performing a predefined gesture on the device (e.g., a tilt gesture to the right and a tilt gesture to the left, respectively).

FIG. 48 illustrates an example UI 4800 showing music items available for acquisition within a music storefront. As illustrated, the UI 4800 includes certain music recommended for the user, music recommended by an editor of the storefront, and the like. The UI 4800 also includes a link or icon ("music library") that, when selected, causes the device 100 to display music of the user.

In response to the user performing a tilt gesture to the left, the device 100 may display a left panel 4802 that includes a navigation menu 4802 for navigating the music store as well as music of the user. In addition, in response to the user performing a tilt gesture to the right from the center-panel UI 4800, the device 100 may display a right panel 4804. As illustrated, the right panel 4804 may display newly released music and/or other classes of music offered for acquisition by the user. As such, a user is able to view newly released music from a music storefront by performing the tilt gesture to the right.

Figure 49:
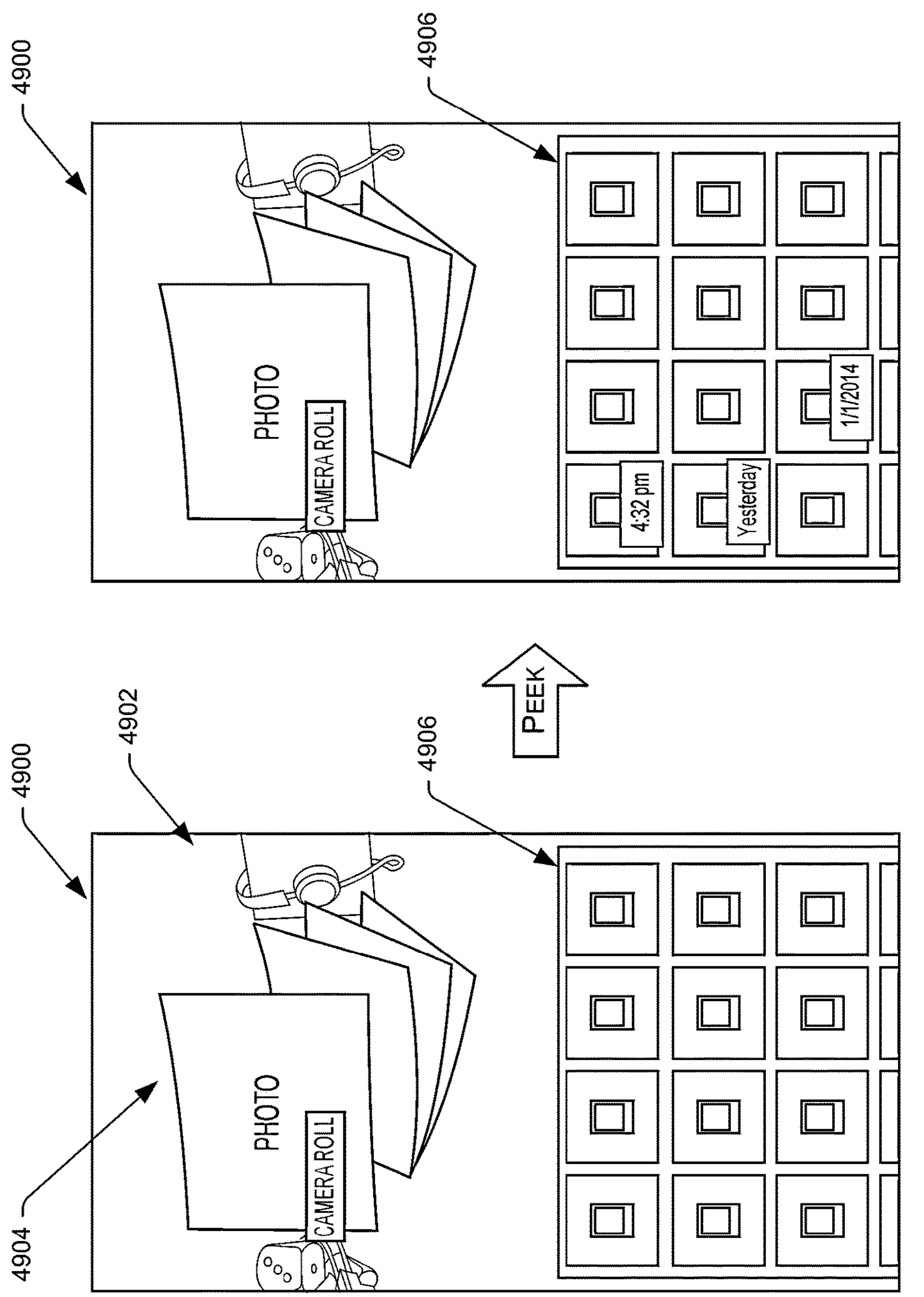
FIG. 49 illustrates an example UI of a carousel of icons that is navigable by a user of the device, with an icon corresponding to a gallery of photos currently having user-interface focus in the carousel. As illustrated, the information beneath the carousel may comprise photos from the gallery. Also shown are example details associated with the photos that may be displayed in response to a user of the device performing a peek gesture to the right.

FIG. 49 illustrates an example UI 4900 that includes a carousel of icons 4902 that is navigable by a user of the device, potentially via horizontal swipe gestures on the display. The UI 4900 illustrates that, in this example, an icon 4904 corresponding to a gallery of photos currently has user-interface focus in the carousel 4902. As illustrated, the information beneath the carousel, in a lower portion 4906, may comprise photos from the gallery. For instance, the lower portion 4906 may include photos captured by a camera of the device 100, with photos most recently captured appearing at the top. In addition, FIG. 49 illustrates the UI 4900 after the user performs a peek gesture. In response, the device 100 may display additional information regarding the photos from the gallery in the lower portion 4906 of the UI 4900. This additional information may comprise when the respective photo was captured, people or things tagged in the photos, or the like.

Figure 50:
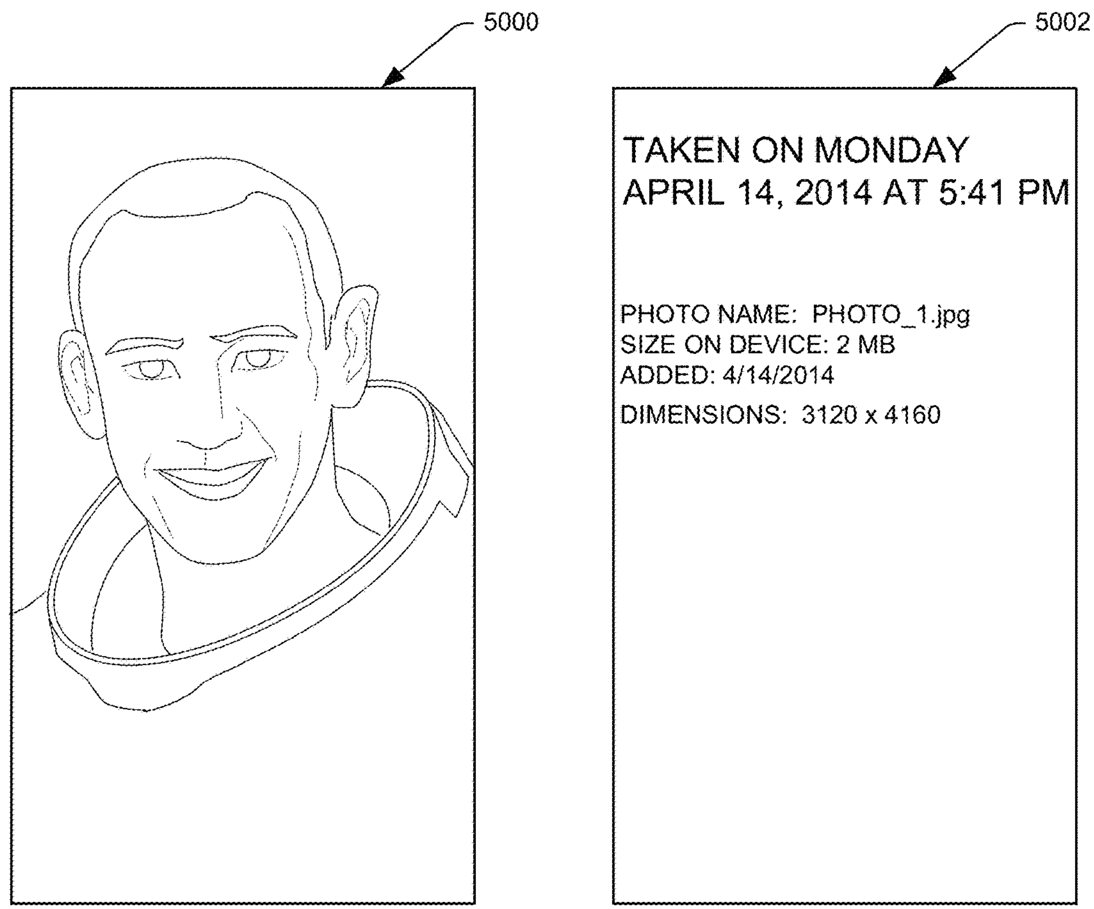
FIG. 50 illustrates an example UI showing a particular photo displayed on the device, as well as an example right panel showing information associated with the photo.

FIG. 50 illustrates an example UI 5000 showing a particular photo displayed on the device. For instance, in response to a user of the device 100 selecting a thumbnail icon associated with a particular photo, the device 100 may display the photo within the UI 5000. In addition, FIG. 50 illustrates an example right panel 5002 that the device 100 may display in response to the user performing a tilt gesture to the right. As illustrated, the right panel 5002 may display information (metadata) associated with the photo. This information may include an indication of when the photo was captured, a name of the photo, a size of the photo, when the photo was added to the device or to a particular album, dimensions of the photo, people or things tagged in the photo, or the like.

Figure 51:
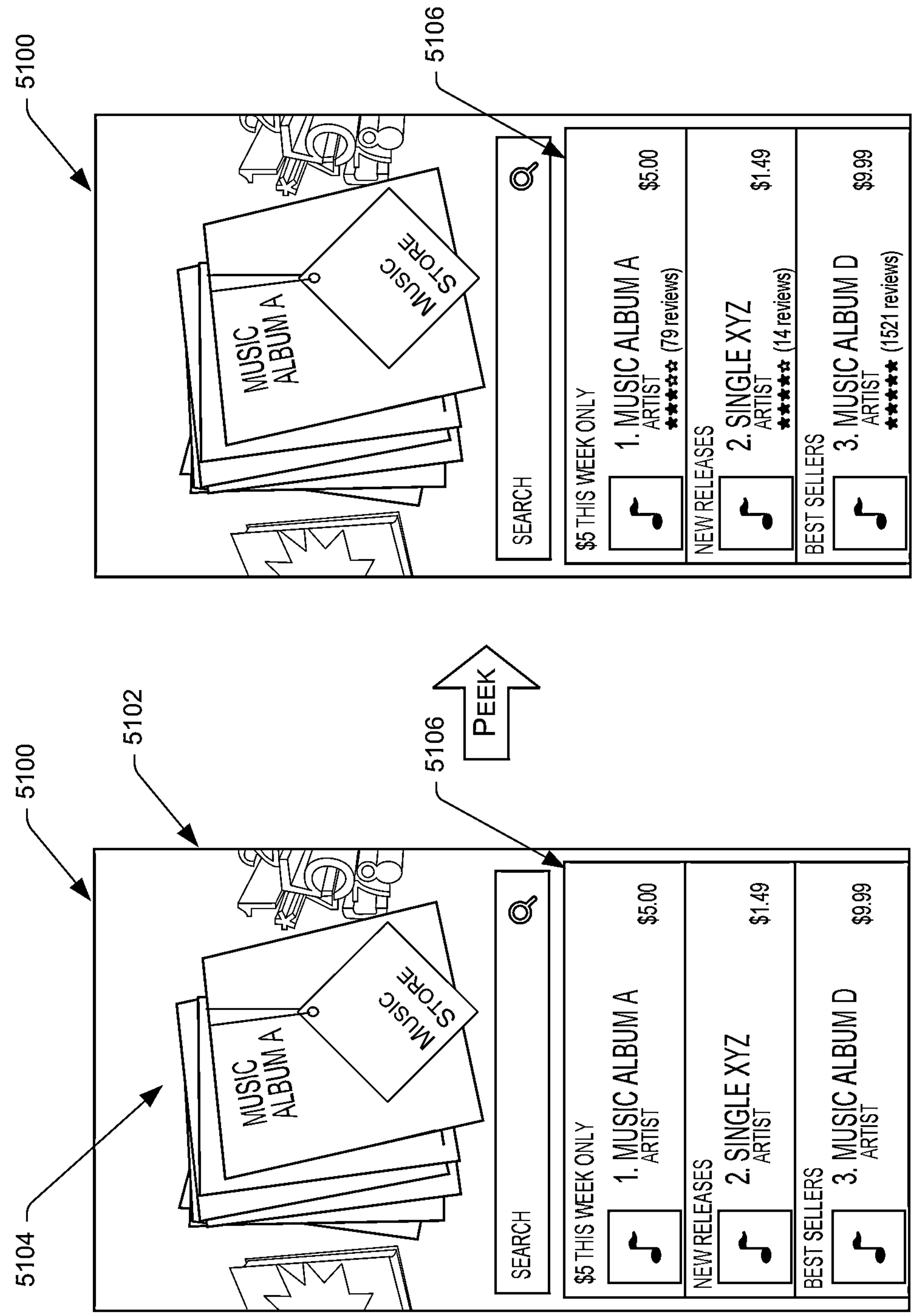
FIG. 51 illustrates an example UI of a carousel of icons that is navigable by a user of the device, with an icon corresponding to a music store currently having user-interface focus in the carousel. As illustrated, the information beneath the carousel may comprise additional music offered for acquisition. Also shown are example details associated with the items that may be displayed in response to a user of the device performing a peek gesture to the right.

FIG. 51 illustrates an example UI 5100 of a carousel of icons 5102 that is navigable by a user of the device 100, with an icon 5104 corresponding to a music album currently having user-interface focus in the carousel. As illustrated, the music album includes a badge indicating that this album is offered for acquisition in the music store. The UI 5100 may also include a search bar that allows the user to search the device and/or the music store for music from the UI 5100. In addition, the UI 5100 includes a lower portion 5106 that includes information comprising additional music offered for acquisition in the music store. The user may select the carousel icon 5102 or any of the items listed in the lower portion 5106 to navigate to corresponding portions of the music store.

In addition, this figure illustrates that the user may perform a peek gesture in order to cause the device to display additional information regarding the items listed in the lower portion 5106 of the UI 5100. For instance, this additional information may comprise a rating of each item, a number of reviews that constitute the rating, a number of songs on the album, a release year of the music, and/or any other type of similar or different information.

Figure 52:
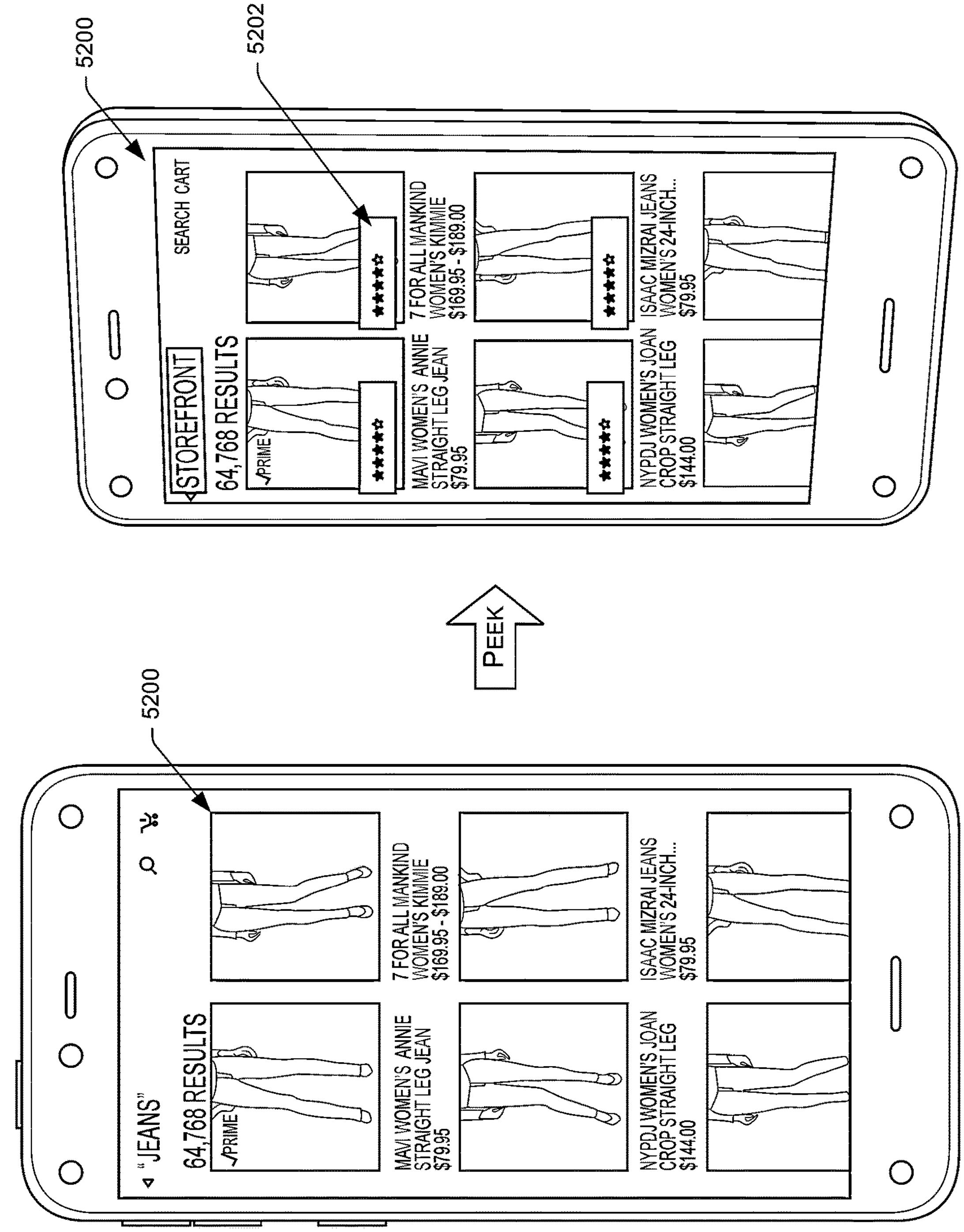
FIG. 52 illustrates an example UI showing search results associated with items offered for acquisition, as well as example details associated with the items that may be displayed in response to a user of the device performing a peek gesture to the right.

FIG. 52 illustrates an example UI 5200 showing search results associated with items offered for acquisition in a store. In addition, this figure illustrates example details 5202 associated with the items, with these details being displayed in response to a user performing a peek gesture. These example additional details 5202 may comprise a cumulative rating of each of the item as provided by other users and/or any other type of additional information.

Figure 53:
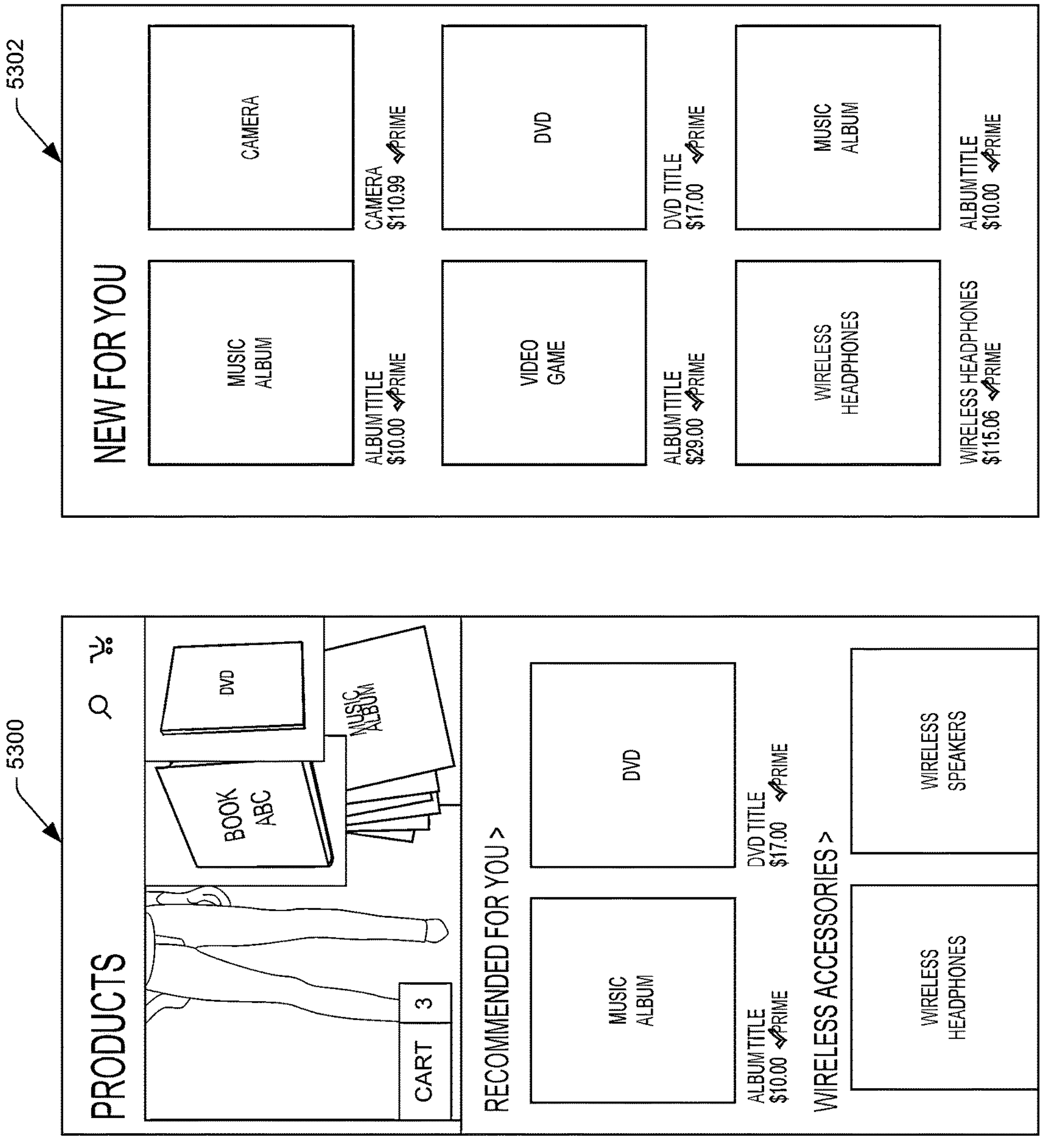
FIG. 53 illustrates an example UI showing a storefront associated with an offering service, as well as example right panel that the device may display in response to a user of the device performing a tilt gesture to the right.

FIG. 53 illustrates an example UI 5300 showing a storefront of an offering service, as presented by a shopping application. In this example, the user performs a tilt gesture to the right and, in response, the device 100 display an example right panel 5302. In this example, because the user is "logged in" and, therefore, the identity of the user is known, the right panel 5302 may display new content that has been recommended for the user. That is, the offering service may determine an array of content that the user may be interested in based on known information of the user (e.g., past purchase history) and may display this newly recommended content to the user in response to the user performing the tilt gesture. In instances where the user is not logged in or otherwise known to the device and the offering service, the right panel 5302 may comprise new content, best-selling content, and the like.

Figure 54:
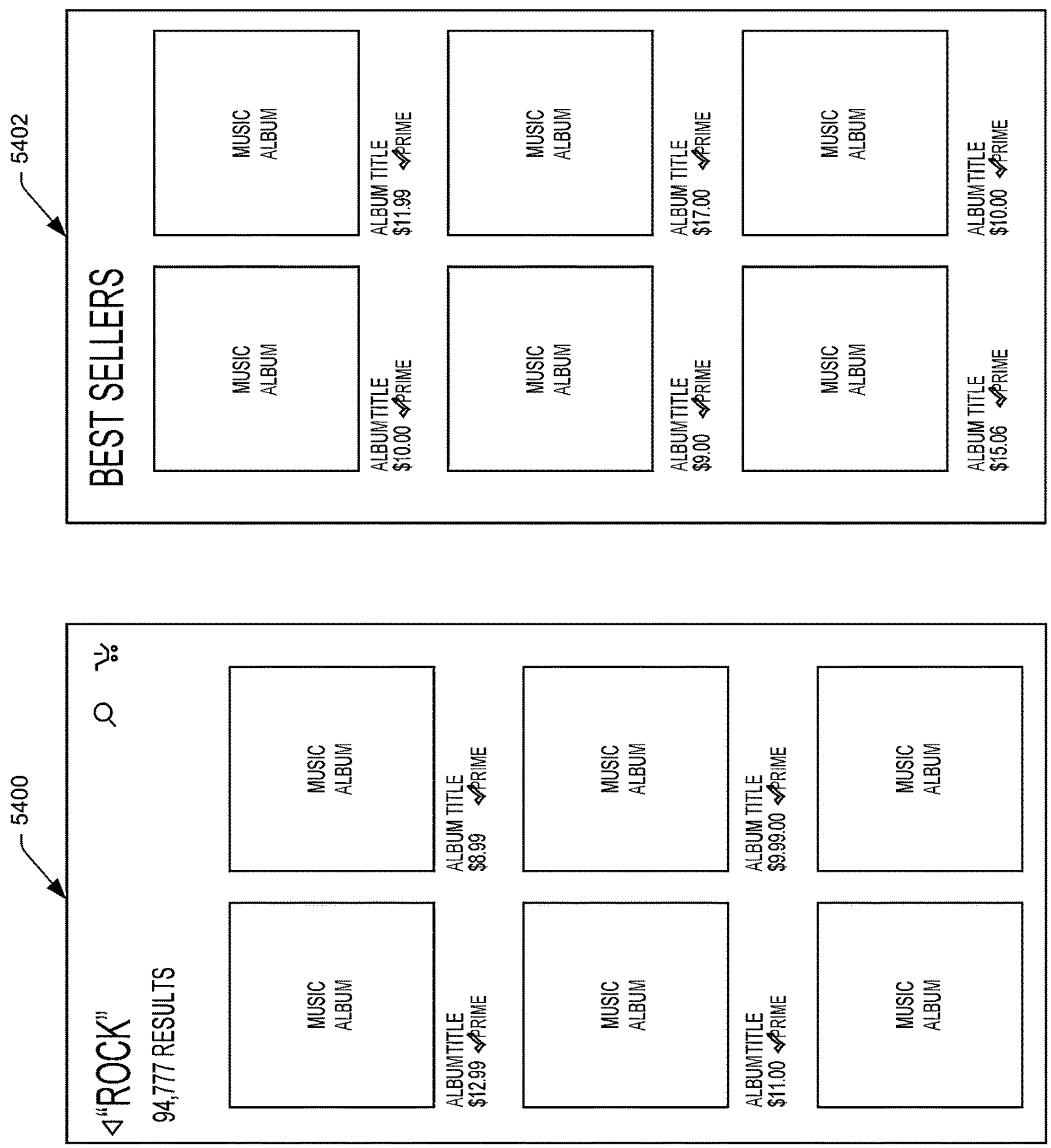
FIG. 54 illustrates an example UI showing search results associated with items offered for acquisition, as well as an example right panel that the device may display in response to a user of the device performing a tilt gesture to the right.

FIG. 54 illustrates an example UI 5400 showing search results associated with items offered for acquisition. The device 100 may display the UI 5400 in response to a user of the device 100 conducting an example search in the music store for content related to "rock". The UI 5400 includes the top music albums that match this search.

In addition, FIG. 54 illustrates an example right panel 5402 that the device 100 may display in response to a user of the device performing a tilt gesture to the right from the search-results UI 5400. As illustrated, the right panel 5402 may indicate best sellers in the music store. These best sellers may be across all music, best sellers from the content that matches the user's query ("rock"), or the like.

Figure 55:
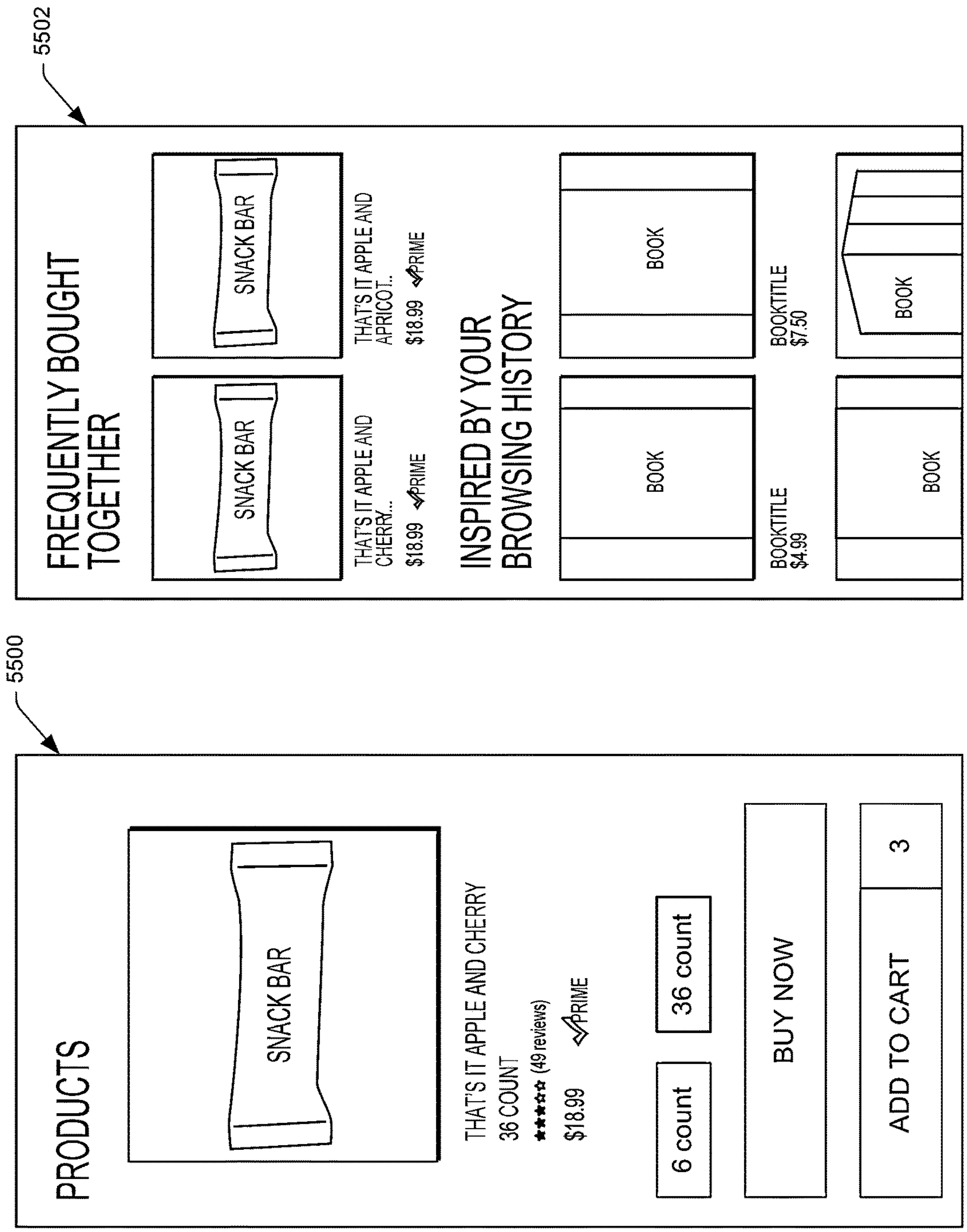
FIG. 55 illustrates an example UI showing a detail page that illustrates information associated with a particular item offered for acquisition, as well as an example right panel that the device may display in response to a user of the device performing a tilt gesture to the right.

FIG. 55 illustrates an example UI 5500 showing a detail page that illustrates information associated with a particular item offered for acquisition. This UI 5500 may include an image of the item, details regarding the item (e.g., price, rating, etc.), different options associated with the item (e.g., different box sizes), an icon that allows the user to purchase the item, an icon that allows the user to add the item to a cart of the user, and the like.

In addition, FIG. 55 illustrates an example right panel 5502 that the device 100 may display in response to a user of the device performing a tilt gesture to the right. This right panel 5502 may indicate other items that are often purchased with the item illustrated in the UI 5500, other recommended items for the user (e.g., as determined by the browsing history of the user), and the like.

Figure 56:
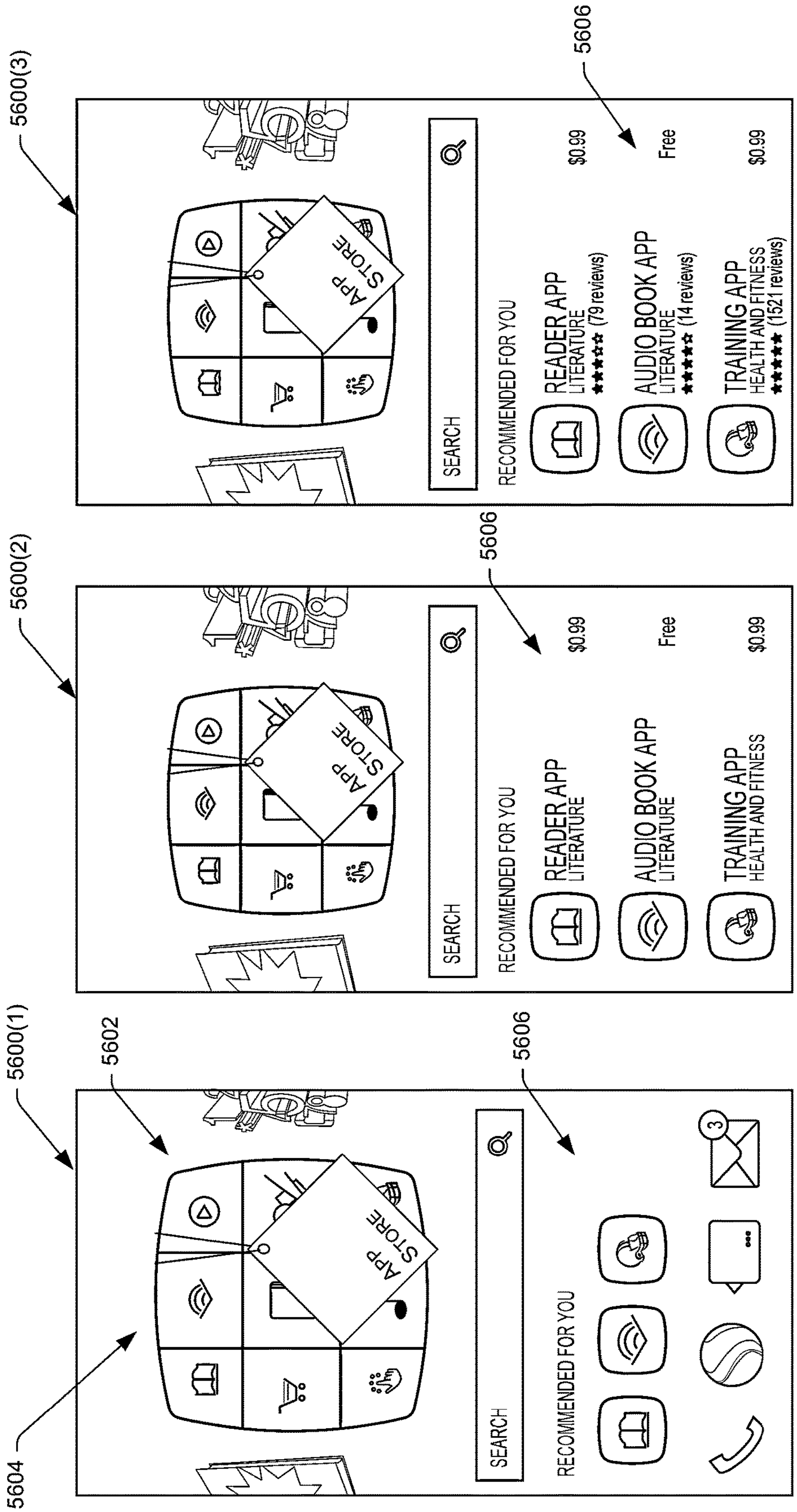
FIG. 56 illustrates an example UI of a carousel of icons that is navigable by a user of the device, with an icon corresponding to an application store currently having user-interface focus in the carousel. As illustrated, the information beneath the carousel may comprise items recommended for the user.

FIG. 56 illustrates an example UI 5600(1) of a carousel of icons 5602 that is navigable by a user of the device 100, with an icon 5604 corresponding to an application store currently having user-interface focus in the carousel 5602. The UI 5600(1) may also include a search bar that allows the user to search the application store directly from the UI 5600(1). As illustrated, the UI 5600(1) may include a lower portion 5606 that indicates, beneath the carousel 5602, applications that are recommended to the user (e.g., based on applications that the user has previously acquired). While no description is illustrated here, in some instances the application icons may include a name, price, and other details regarding the applications.

FIG. 56 further illustrates the UI 5600(2) after the user has swiped upwards in the lower portion 5606 of the UI 5600(1). As illustrated, in response to this gesture, the UI 5600(2) displays additional information regarding the applications recommended for the user. This additional information includes a textual description of each application, a cost of each application, a rating of each application, a category of each application, and the like. The user may perform a swipe gesture downwards within the lower portion 5606 in order to transition from the UI 5600(2) to the UI 5600(1).

Finally, FIG. 56 illustrates the UI 5600(3) after a user has performed a peek gesture from the UI 5600(2). Here, the UI 5600(3) has displayed even more information regarding the recommended items, such as ratings of the applications, a number of reviews that constitute each rating, and the like.

Figure 57:
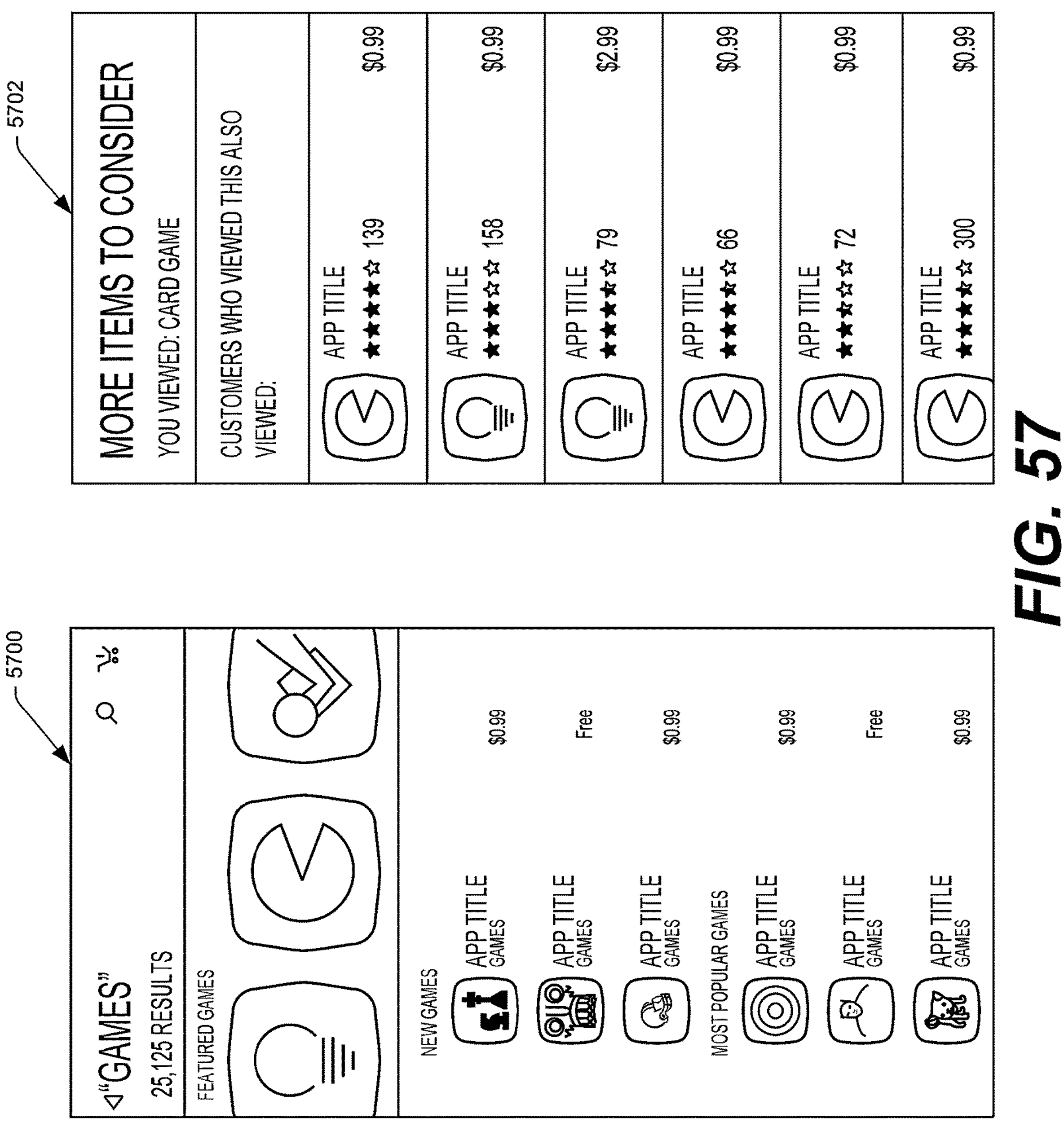
FIG. 57 illustrates an example UI showing search results within an application store, as well as an example right panel that the device may display in response to a user performing a tilt gesture to the right.

FIG. 57 illustrates an example UI 5700 showing search results within an application store that may be displayed in response to a user performing a search within the store. The UI 5700, for example, displays a ranked list of applications that are related to the user's query, "games". In addition, this figure illustrates an example right panel 5702 that the device may display in response to a user performing a tilt gesture to the right. This right panel 5702 may indicate more items (applications) that the user may consider, based on applications within the application store that the user has viewed. For instance, the right panel 5702 may indicate, to the user, applications viewed by other users who also viewed applications that the subject user of the device 100 has viewed.

Figure 58:
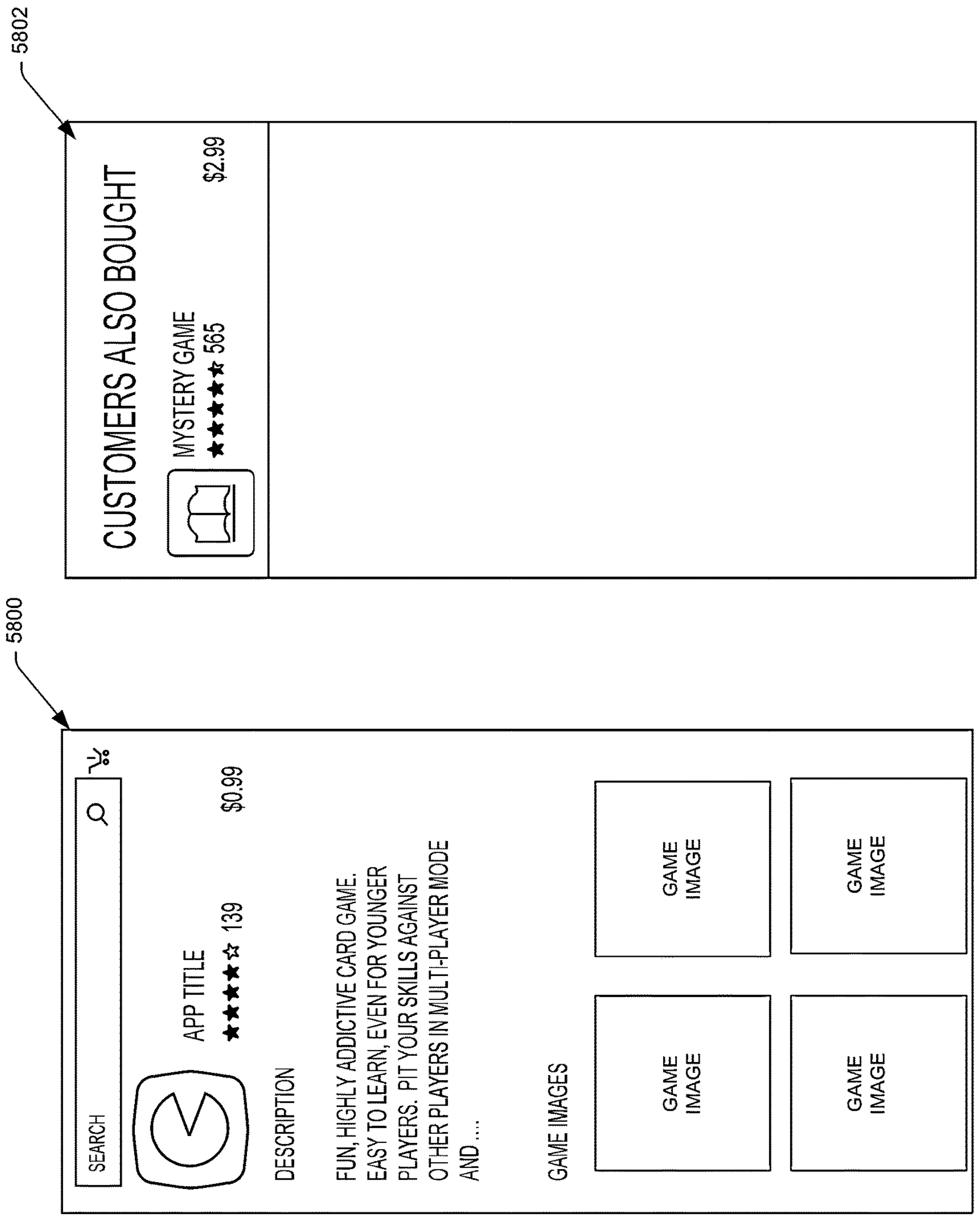
FIG. 58 illustrates an example UI showing details associated with a particular application available for acquisition from an application store, as well as an example right panel that the device may display in response to a user performing a tilt gesture to the right.

FIG. 58 illustrates an example UI 5800 showing details associated with a particular application available for acquisition from an application store. That is, the UI 5800 may comprise a "detail page" associated with a particular application in the application store. The details regarding the particular application may include a name of the application, a description of the application, a rating of the application, images within the application, and the like.

In addition, this figure illustrates an example right panel 5802 that the device 100 may display in response to a user performing a tilt gesture to the right. As illustrated, this right panel 5802 illustrates applications that other users who have viewed or acquired the subject application have also acquired.

Figure 59:
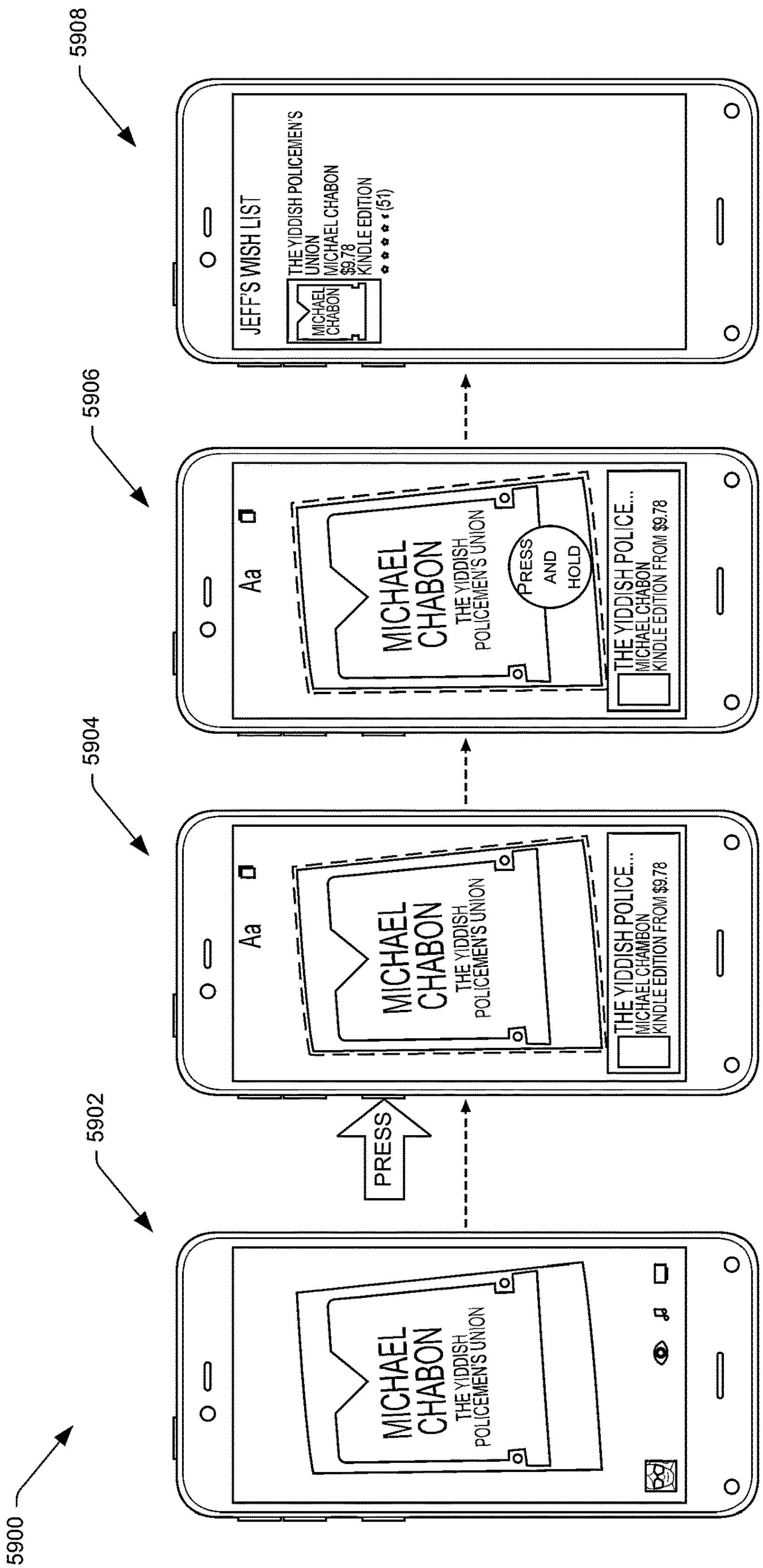
FIG. 59 illustrates an example sequence of UIs and operations for identifying an item from an image captured by a camera of the device, as well as adding the item to a list of the user (e.g., a wish list).

FIG. 59 illustrates an example sequence of UIs 5900 and operations for identifying an item from an image captured by a camera of the device, as well as adding the item to a list of the user (e.g., a wish list).

At 5902, the user of the device 100 launches a camera application such that the user is able to view, on the display 102, the visual information that the camera is currently capturing. The user may then point the camera a physical object in the environment a press a particular physical button, such as the button 116(2), to capture the image and cause the device 100 to identify the physical object (in this case a particular book). As such, at 5904, and in response to the user pressing the button 116(2), the device 100 may query a database of physical objects to identify the object. As illustrated, the device 100 may display information regarding this object, such as an image of the object and a price of the object as offered by an offering service.

At 5906, the user may press and hold on the on the display 102 (e.g., on the item itself) for a threshold amount of time. In response, the device 100 may perform a particular action associated with the item. For instance, at 5908 the device 100 may add the item (here, the book) to a wish list associated with the user. In other instances, the device 100 may acquire the book for the user or may perform some other action regarding the identified item.

Furthermore, in some instances the device may add this item to the wish list (or may perform some other action regarding the item) in response to the user performing a predefined gesture. For instance, a user may touch the item on the display and may perform a swivel gesture in order to add the item to the wish list of the user. In some instances, the user may depress and hold the physical button and may perform the swivel (or other) gesture in order to add the item to the wish list.

Figure 60:
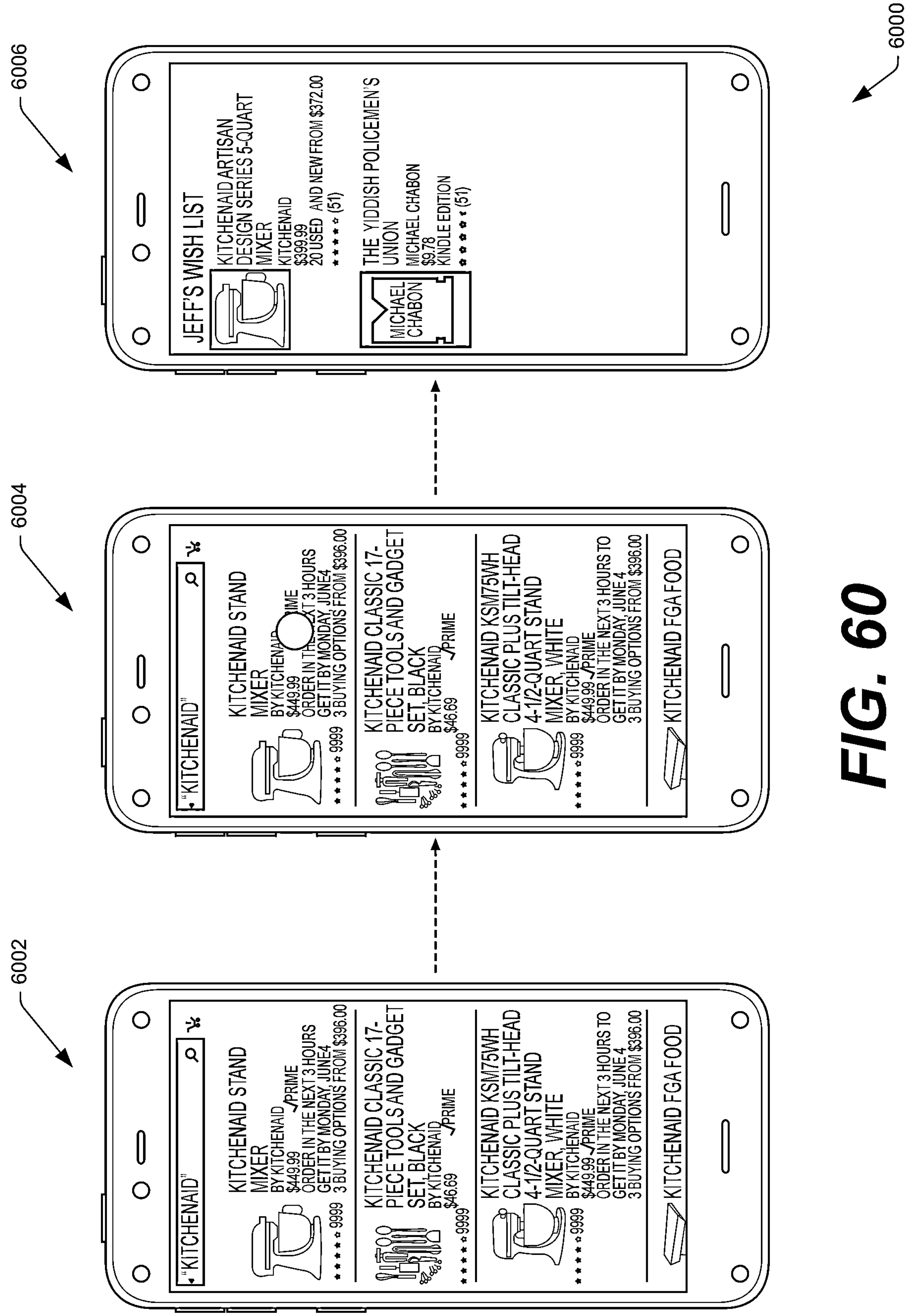
FIG. 60 illustrates another example sequence of UIs and operations for adding an item to a wish list of the user using a physical button of the device and/or another gesture indicating which of the items the user is selecting.

FIG. 60 illustrates another example sequence of UIs 6000 and operations for adding an item to a wish list of the user using a physical button of the device and/or another gesture indicating which of the items the user is selecting. At 6002, the device 100 display search results of items in response to a user conducting a search within a store on the device 100. At 6004, the user touches and holds a particular item listed in the search results and selects a physical button of the device, such as the button 116(2). In response, and as illustrated at 6006, the device 100 may add the item (here, the mixer) to a wish list associated with the user. In other instances, the device 100 may acquire the mixer for the user or may perform some other action regarding the identified item.

Furthermore, in some instances the device may add this item to the wish list (or may perform some other action regarding the item) in response to the user performing a predefined gesture. For instance, a user may touch the item on the display and may perform a swivel gesture in order to add the item to the wish list of the user. In some instances, the user may depress and hold the physical button and may perform the swivel (or other) gesture in order to add the item to the wish list.

Figure 61:
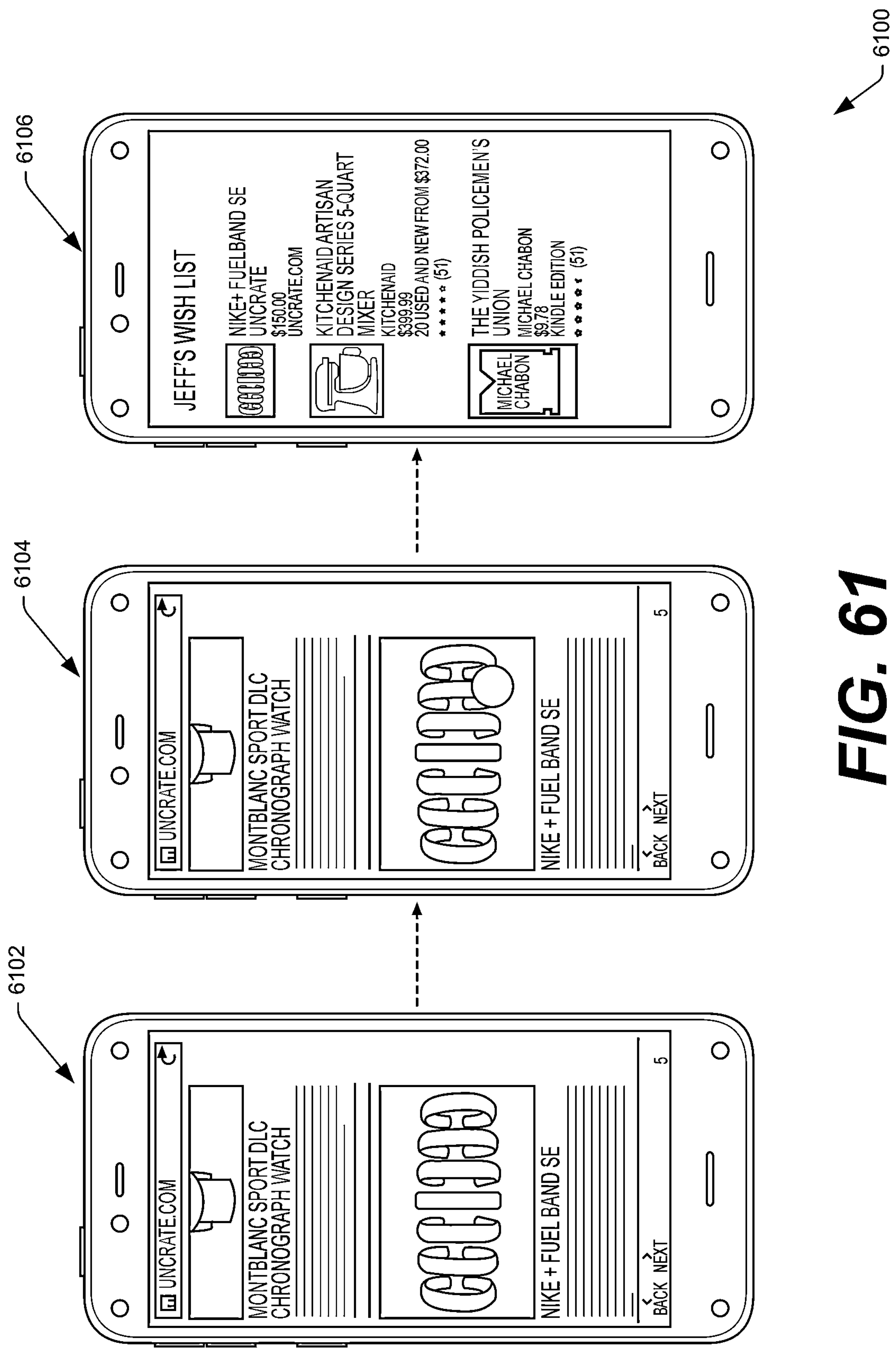
FIG. 61 illustrates another example sequence of UIs and operations for adding yet another item to a wish list of the user when the user is within a browser application.

FIG. 61 illustrates another example sequence of UIs 6100 and operations for adding yet another item to a wish list of the user when the user is within a browser application of the device 100. At 6102, the user is viewing a particular web page on the device 100 in a browser application. As illustrated, the web page illustrates or otherwise indicates a particular item. In some instances, at 6104 the user depresses the physical button 116(2) of the device and/or depresses the button and performs a particular gesture (e.g., a swivel gesture). In response, at 6106, the device 100 identifies the item within an electronic catalog of an offering service and adds the item to a wish list of the user.

In addition, in some instances the user may perform certain operations on the items listed in the wish list (or other list) from the UI shown at 6106. For instance, a user may remove an item from the wish list by performing a swipe gesture to the left on an area of the display 102 that displays the particular item. Additionally, a user may add the item to a cart of automatically purchase or otherwise acquire the item by performing a swipe gesture to the right on a portion of the display illustrating the item.

Figure 62:
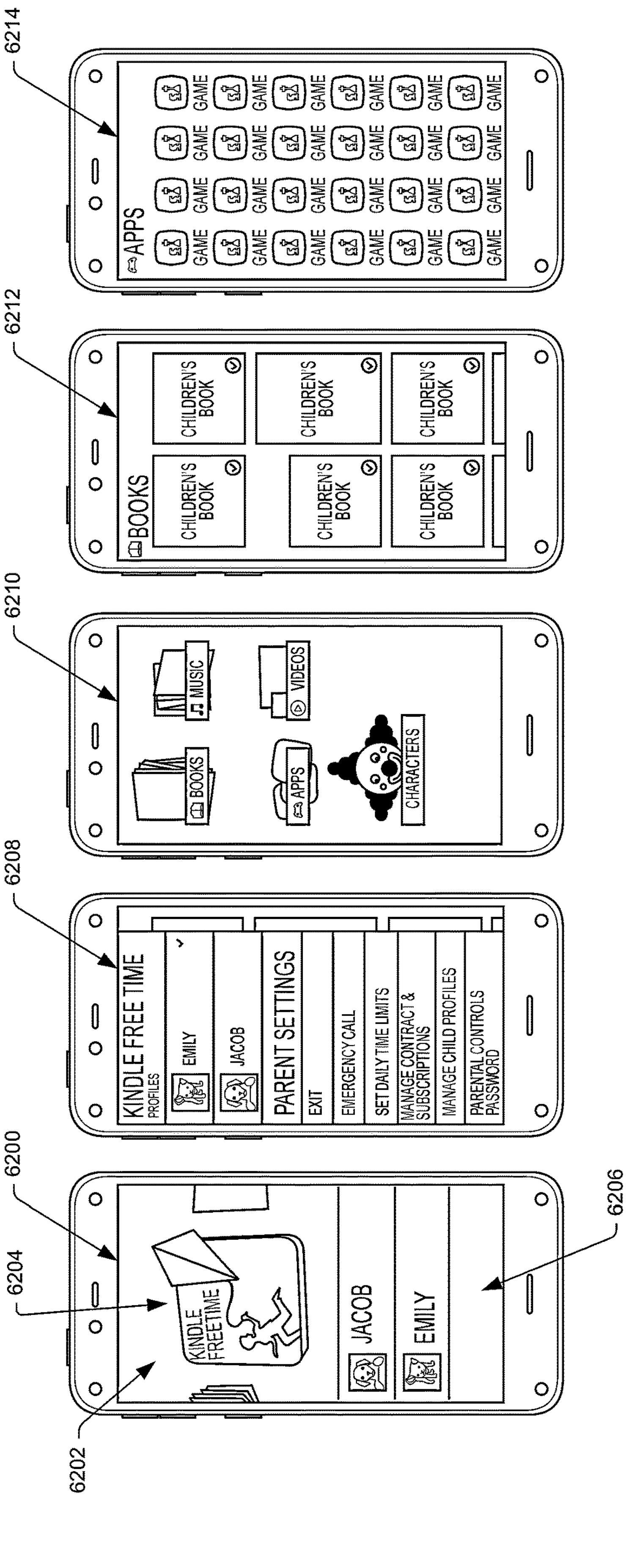
FIG. 62 illustrates an array of example UIs that the device may implement in the context of an application that puts limits on what content children may view from the device and limits on how the children may consume the content.

FIG. 62 illustrates an array of example UIs that the device may implement in the context of an application that puts limits on what content children may view from the device and limits on how the children may consume the content. In addition, certain gestures and other features (e.g., 3D-modeled icons) may be disabled for certain child profiles. A first UI 6200 includes a carousel of icons 6202 and an icon 6204 corresponding to an application ("Kindle Freetime") that may be used to limit the amount of nature of content consumed by children. That is, a parent or other user may configure accounts for children such that the parent is able to determine for how long the child is able to operate the device 100 as well as what content the child is able to view or use. As illustrated, because the icon 6204 has the user-interface focus, a lower portion 6206 of the UI 6200 illustrates particular accounts that have been created for the application corresponding to the icon 6204. As illustrated, a user of the device 100 has created two different accounts, one for a child named Jacob and another for a child named Emily.

A UI 6208 illustrates a menu associated with the "Freetime" application. This menu allows the user to toggle between different profiles or accounts as well as manage the accounts. In some instances, a parent may need to "log in" in order to manage the children's accounts. Further, in some instances the UI 6208 may be displayed by a predefined gesture, such as a tilt gesture to the left.

A UI 6210, meanwhile, illustrates different categories of content that a parent may manage and that a Freetime-application user may consume. The example categories include books, music, applications, videos, and characters. A UI 6212 displays a screen that the device 100 may present in response to a user selecting the category "books". As shown, the books that the user (e.g., child) is able view comprise children's books. Similarly, a UI 6214 displays a screen listing applications available to the child, with a parent potentially having indicated for this particular account that these applications are allowable.

Figure 63:
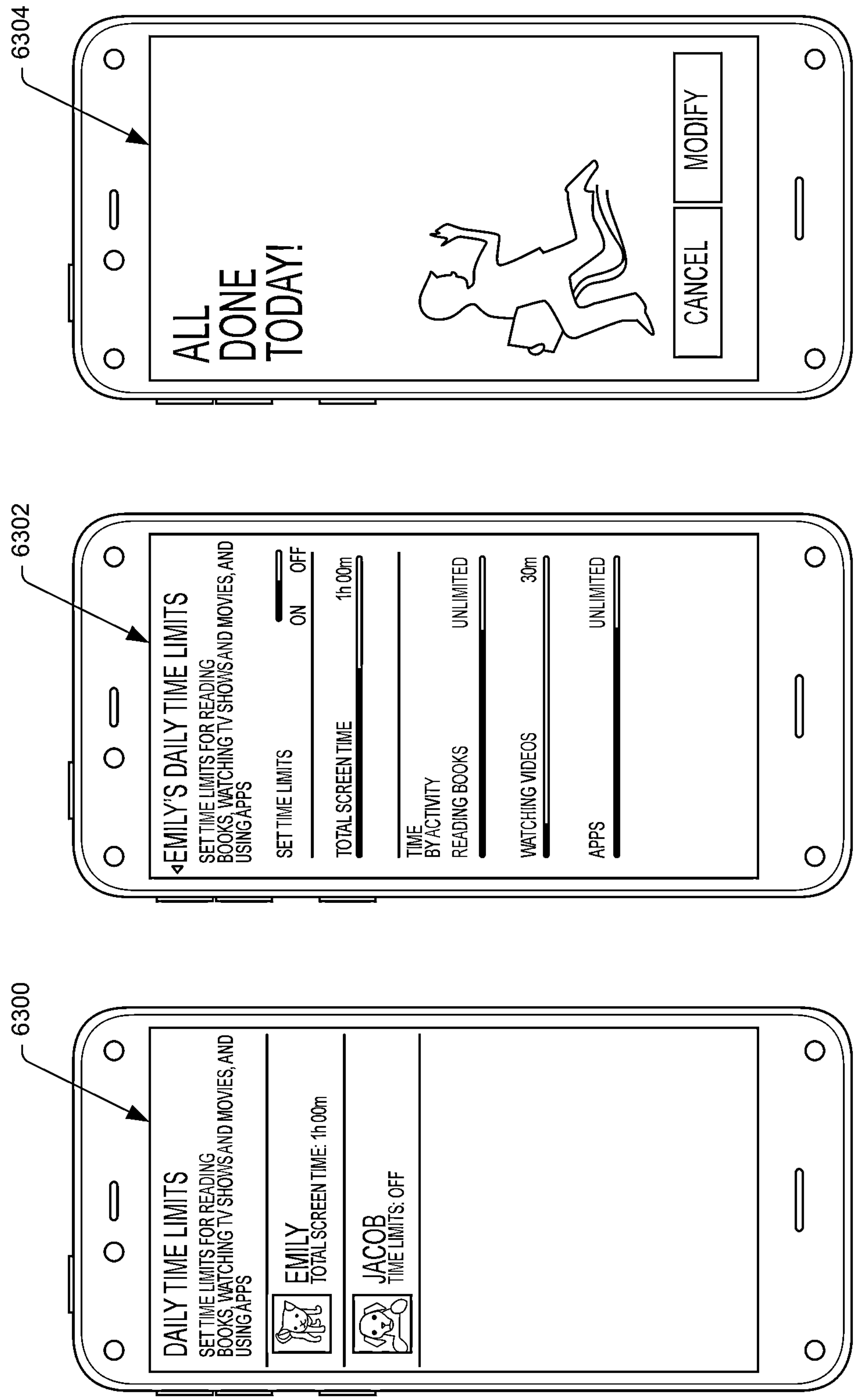
FIG. 63 illustrates additional UIs that the device may display as part of the application that limits the content and the consumption of the content for children using the device.

FIG. 63 illustrates additional UIs that the device may display as part of the application that limits the content and the consumption of the content for children using the device. A UI 6300 illustrates daily time limits associated with each profile. For instance, "Emily" is limited to a screen time of one hour, while "Jacob" does not currently have any time limitations. A UI 6302, meanwhile, comprises a screen from which a parent may manage time limits for an account. Here, the UI 6302 comprises time limits for "Emily". As shown, the UI 6302 allows the parent to turn on or off time limits. Here, the parent indicates that Emily is able to have one hour of screen time, comprising thirty minutes of video, but Emily is able to read or use applications as much as she would like. Finally, a UI 6304 indicates that Emily has used all of her allotted screen time. The UI 6304 also includes icons to "cancel" or "modify" these time limits.

Figure 64A:
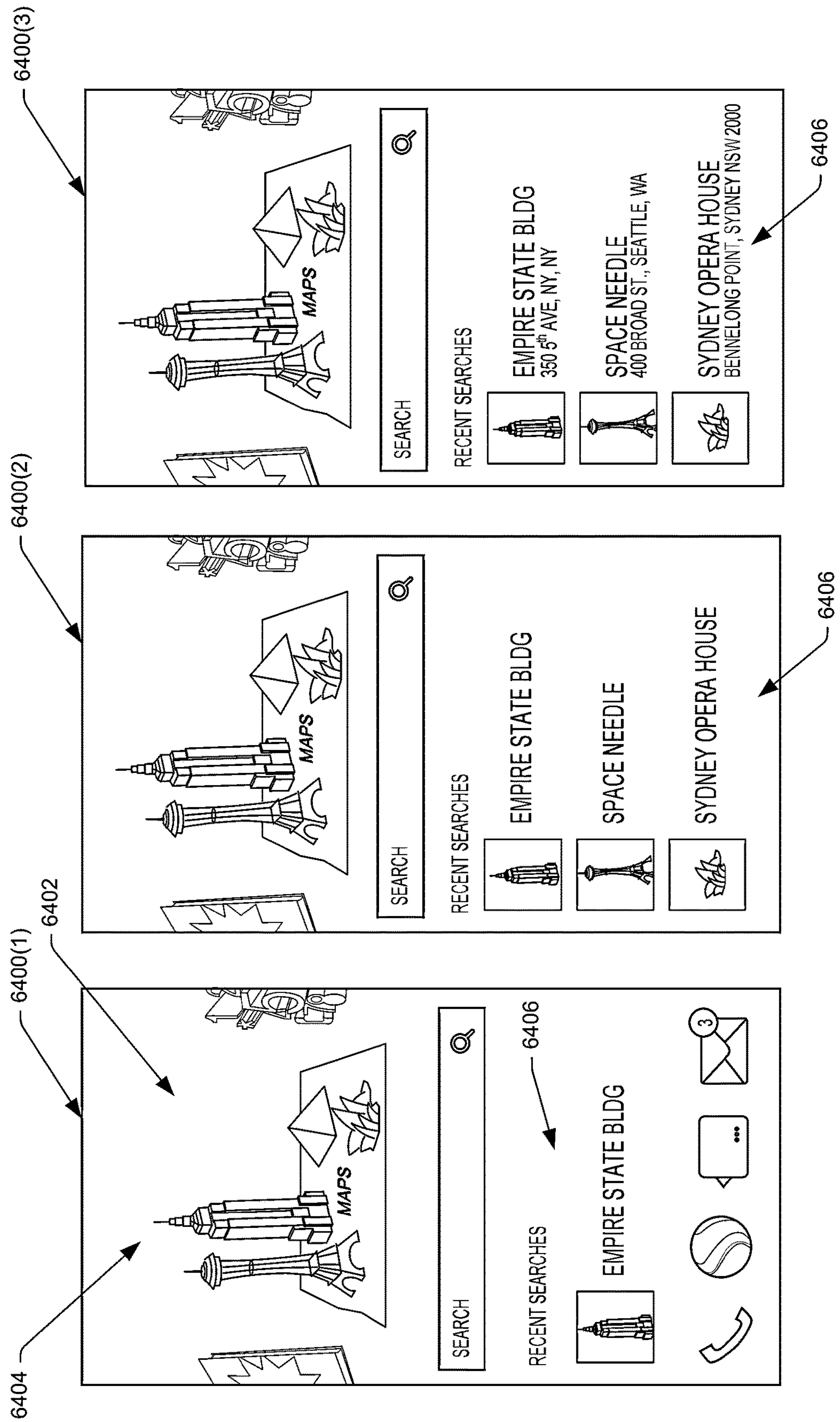
FIG. 64A illustrates a carousel of items, with a map application having user-interface focus.

FIG. 64A illustrates a UI 6400(1) comprising a carousel of icons 6402, as well as an icon corresponding to a map application 6404 currently having user-interface focus. In addition, a lower portion 6406 of the UI displays information corresponding to the map application. Here, the lower portion shows one recent search that the user has performed in the map application.

FIG. 64 further illustrates the UI 6400(2) after the user has swiped upwards in the lower portion 6406 of the UI 5600(1). As illustrated, in response to this gesture, the UI 6400(2) displays additional searches recently performed by the user in the map application. The user may perform a swipe gesture downwards within the lower portion 6406 in order to transition from the UI 6400(2) to the UI 6400(1).

Finally, FIG. 64 illustrates the UI 6400(3) after a user has performed a peek gesture from the UI 6400(2). Here, the UI 6400(3) has displayed even more information regarding the recent searches, such as a location or address of the recent searches, a date on which the user performed each respective search, and the like.

Figure 64B:
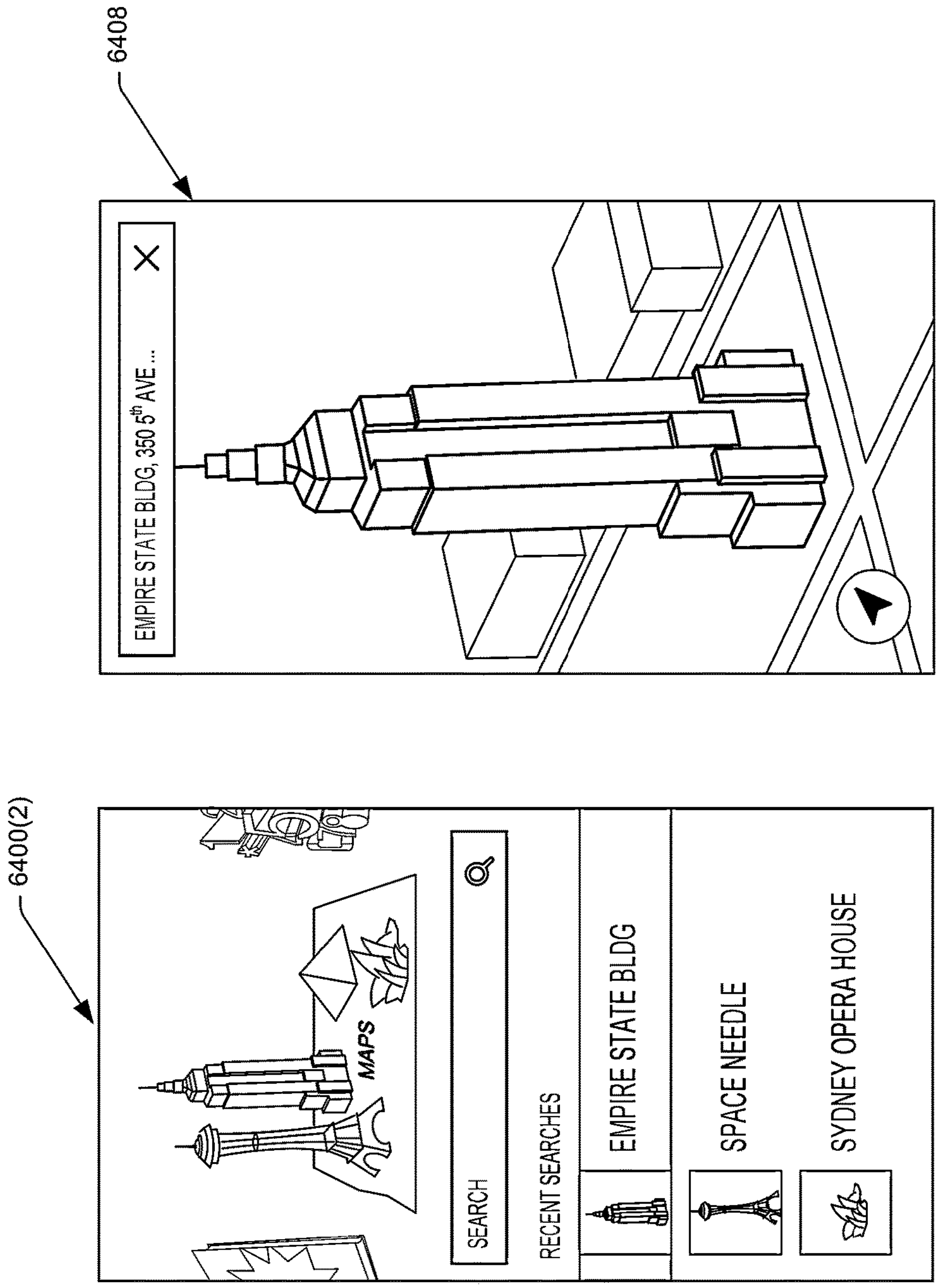
FIG. 64B illustrates the carousel of items as discussed above, with a particular item having user interface focus, as well as an example UI that may be displayed in response to a user selecting the item.

FIG. 64B illustrates UI shown above in FIG. 64A. Here, the user selects a recent search corresponding to the Empire State Building. In response, the device 100 displays a UI 6408 comprising a 3D-modeled object of the particular building. In some instances the user may navigate or otherwise manipulate this 3D-modeled object by swipe gestures on the display or by moving his or her head relative to the device (as determined by the corner cameras of the device 100).

Figure 65:
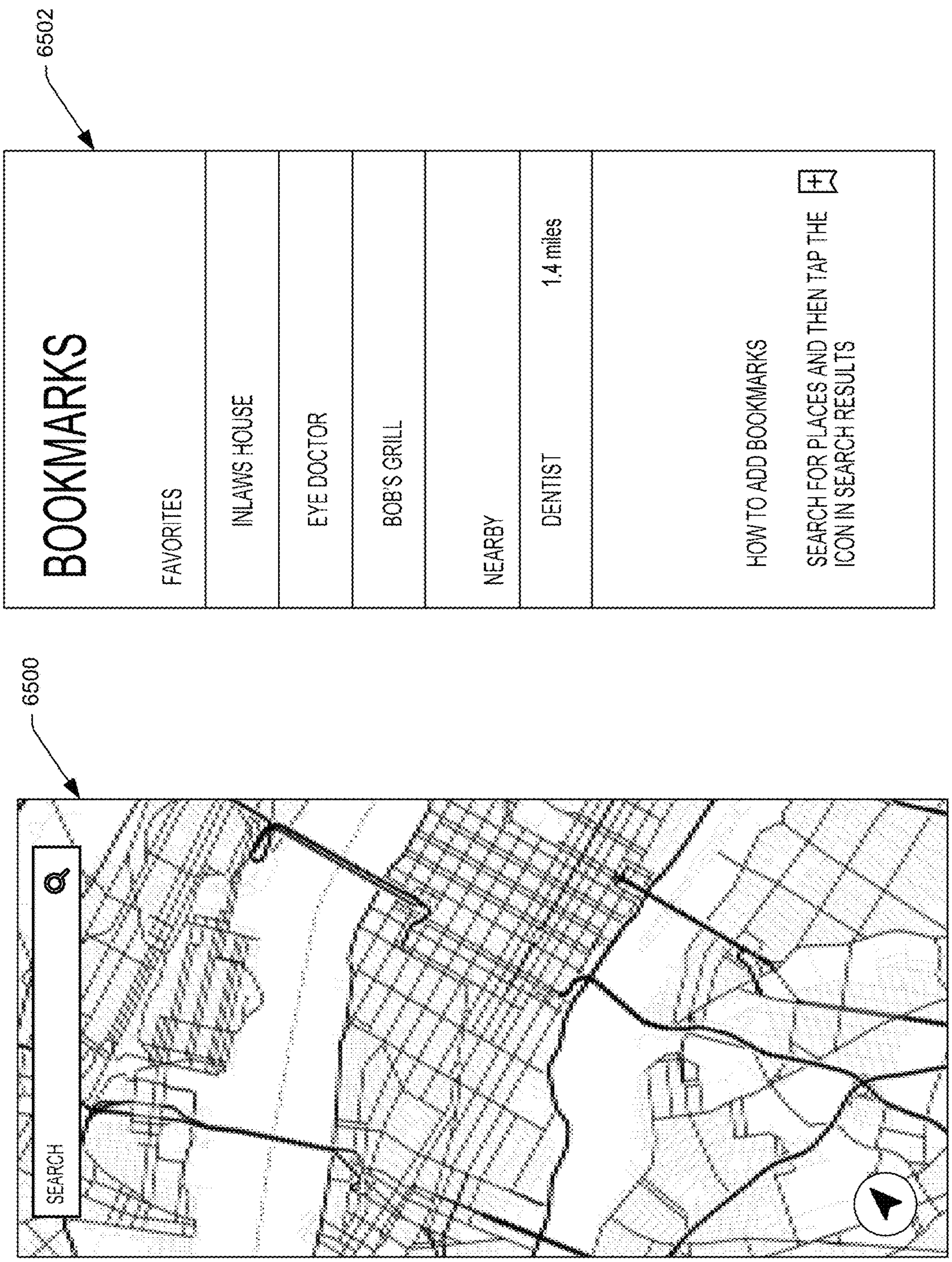
FIG. 65 illustrates an example map and an example right panel that the device may display in response to a user of the device performing a tilt gesture to the right.

FIG. 65 illustrates an example UI 6500 comprising a map that a map application may display. In addition to the map, the UI 6500 may include a search bar to allow the user to conduct a new search within the map application. In addition, FIG. 65 illustrates an example right panel 6502 that the device may display in response to a user of the device performing a tilt gesture to the right. As illustrated, the right panel 6502 may include one or more bookmarks that the user has made using the map application. The right panel 6502 may also include instructions or an icon for creating a bookmark. In response to selecting a bookmark from the right panel 6502, the map application may display a map corresponding to the selected bookmark on the device 100. Alternatively, the right panel may allow a user to "share" his or her location with others, such as with a social network of the user.

Figure 66:
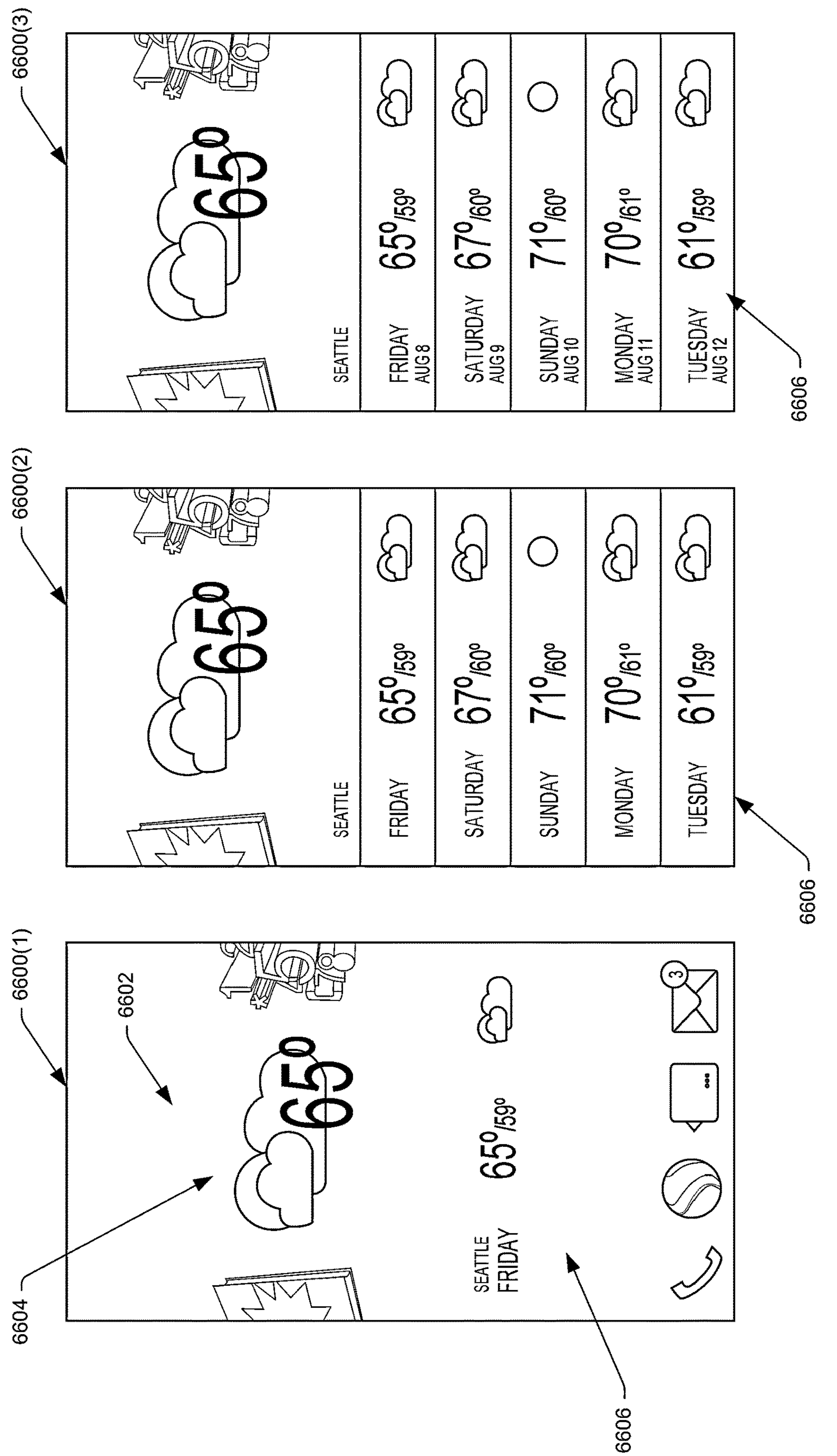
FIG. 66 illustrates a carousel of items, with a weather application having user-interface focus.

FIG. 66 illustrates a UI 6600(1) comprising a carousel of icons 6602, with an icon 6604 corresponding to a weather application having user-interface focus. As illustrated, because the icon 6604 has the user-interface focus, a lower portion 6606 of the UI 6600(1) may include information from the weather application. Here, for example, the lower portion 6606 includes a brief description of the weather for the current day at a location associated with the user of the device 100.

In addition, FIG. 66 illustrates a UI 6600(2) after the user has performed an upwards swipe gesture in the lower portion 6606 of the UI. In response, the UI 6600(2) displays additional information from the weather application in the lower portion 6606 of the UI 6600(2). Here, for instance, the additional information comprises an extended forecast at the location of the user. Of course, while FIG. 66 displays an extended forecast in response to the user swiping upwards, in other instances the UI may display a detailed forecast for the day (e.g., hourly), weather at other locations (e.g., as previously requested by the user), or the like. Finally, FIG. 66 illustrates, via UI 6600(3), that the user may perform a peek gesture to view additional information on the display 102. Here, for instance, the UI 6600(3) has added a date associated with each day in the extended forecast. In other instances, the peek gesture may add any other type of supplemental information, such as high and low temperatures in a different metric (e.g., Celsius), or the like.

Figure 67:
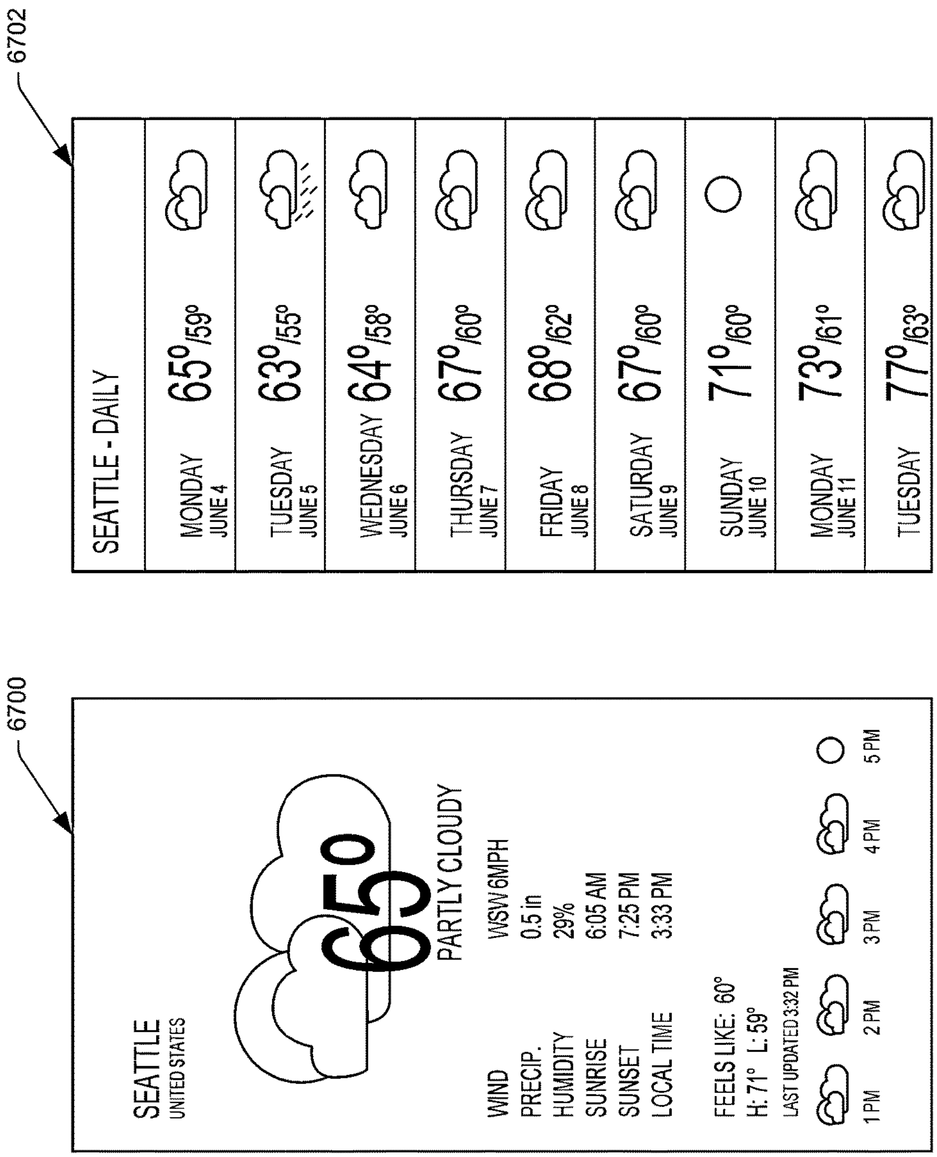
FIG. 67 illustrates an example UI showing a current weather report for a particular geographical location, as well as an example right panel that the device may display in response to a user performing a tilt gesture to the right.

FIG. 67 illustrates an example UI 6700 showing a current weather report for a particular geographical location, which may be displayed as part of a weather application executing on the device. As illustrated, a user of the device 100 may perform a tilt gesture to the right in order to cause the device to display an example right panel 6702. As illustrated, the UI 6700 may display a current weather, while the right panel 6702 may comprise an extended forecast in this example.

Figure 68:
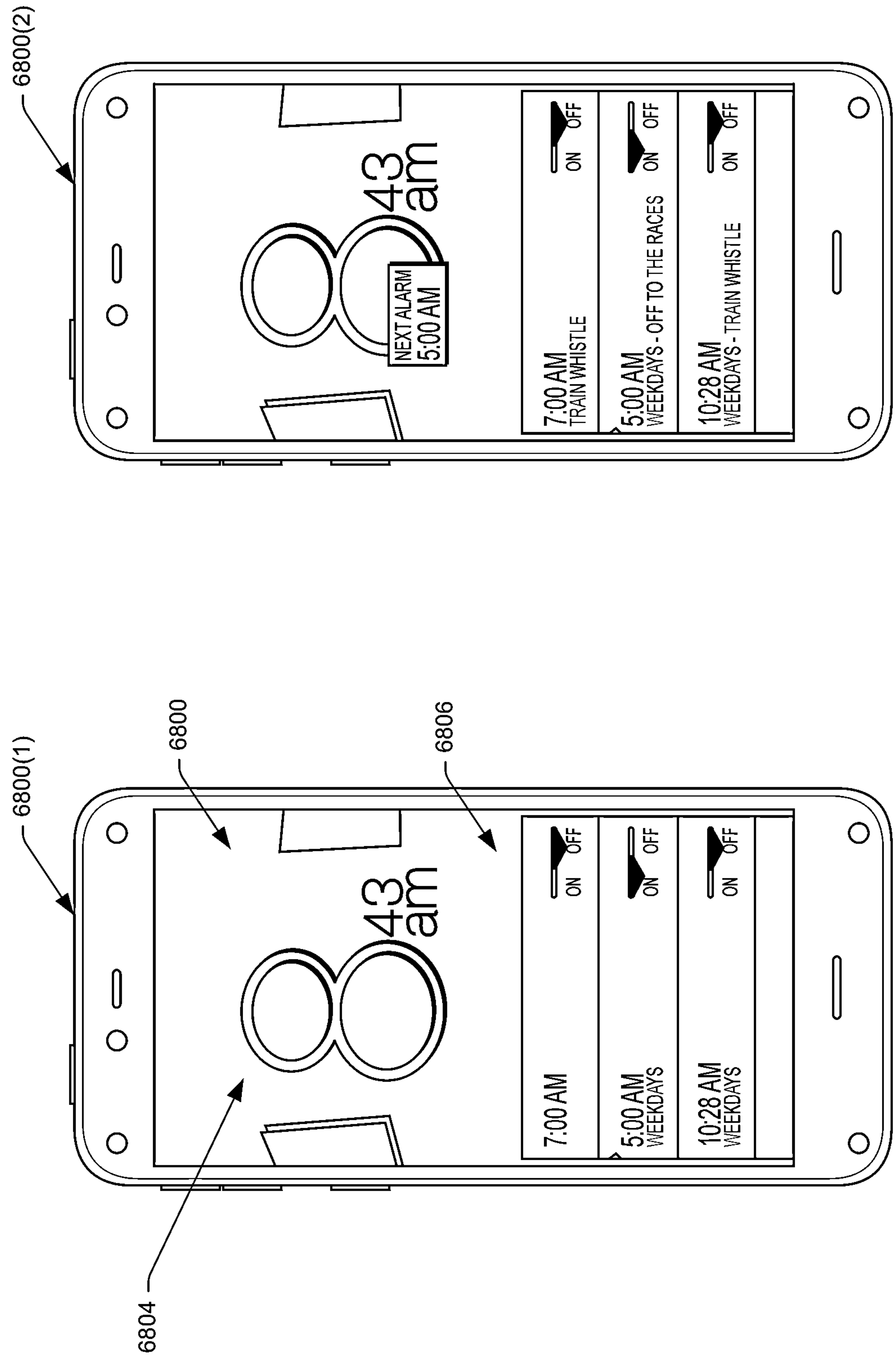
FIG. 68 illustrates two example UIs showing a carousel of icons, where an icon corresponding to a clock application currently has user-interface focus.

FIG. 68 illustrates an example UI 6800(1) having a carousel of icons 6802 that is navigable by the user with an icon 6804 corresponding to a clock widget currently having user-interface focus. In addition, the UI 6800(1) includes a lower portion 6806, which is populated with information from the clock widget given the current user-interface focus. As illustrated, this information in the lower portion 6806 comprises settings associated with one or more alarms previously configured by the user. The user may alter these settings (e.g., turn on or off, change the time, etc.) from the lower portion 6806 or in response to selecting a particular alarm from the list and thereafter altering the settings.

In addition, FIG. 68 illustrates a UI 6800(2) after performing a peek gesture. Here, the UI 6800(2) displays additional information in the lower portion 6806. Here, the additional information comprises a name of each alarm, although other implementations may comprise any other type of supplemental content.

Figure 69:
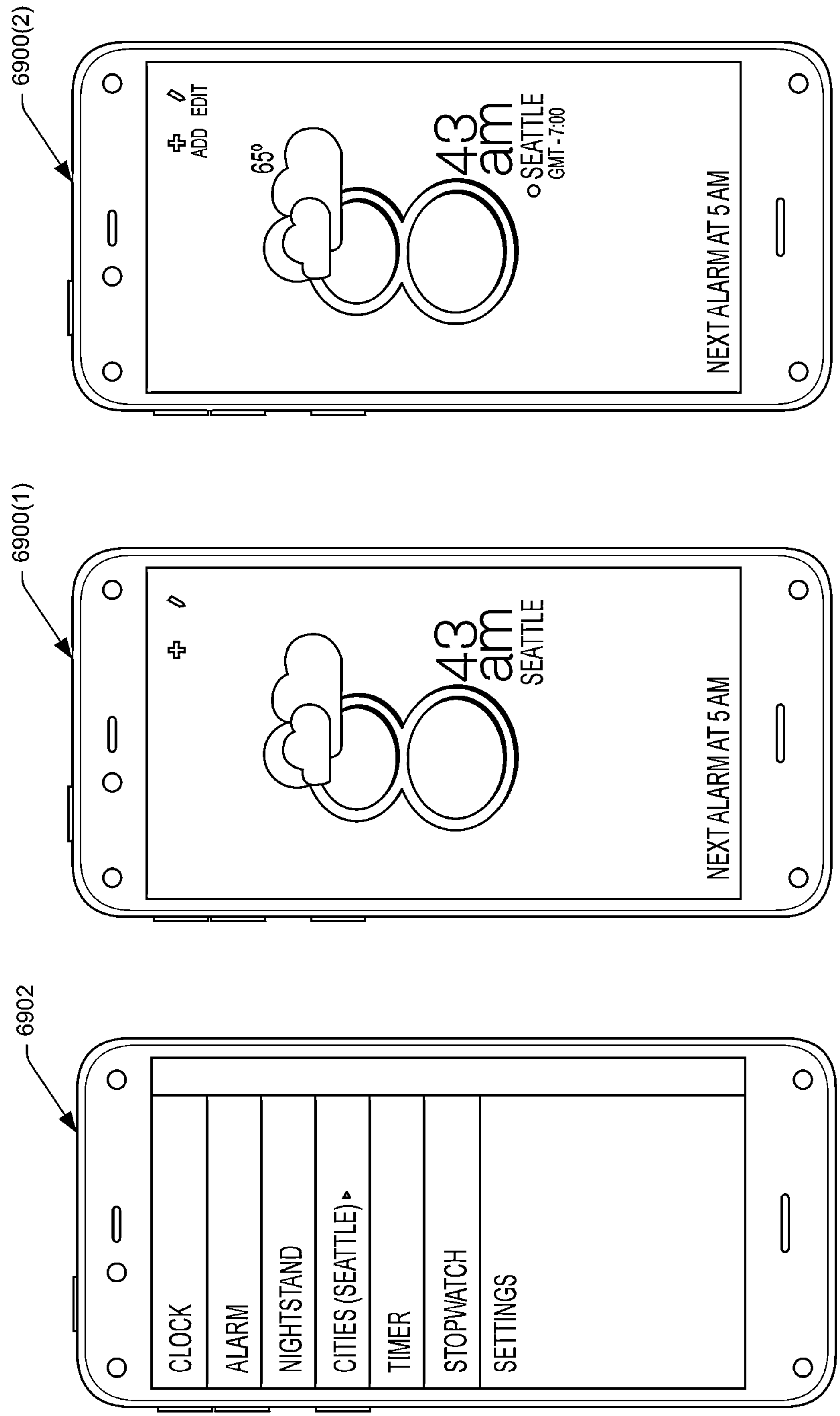
FIG. 69 illustrates an example UI showing a current time and current weather, as well as additional details displayed in response to a user performing a peek gesture to the right. This figure also illustrates an example settings menu that may be displayed in response to the user performing a tilt gesture to the left.

FIG. 69 illustrates an example UI 6900(1) showing a current time, current weather, and a time of next alarm set on the device 100. This UI 6900(1) may be displayed as part of a lock screen of the device 100, in response to a user launching the clock application, or the like. As illustrated, a UI 6900(2) may be displayed in response to a user performing a peek gesture. Here, the UI 6900(2) has added some supplementary information to the UI 6900(1). For instance, the UI 6900(2) includes text indicating the meaning of the icons on the display, as well as an indication of a time zone associated with the user's current location.

In addition, this figure illustrates a left panel 6902 that the device 100 may display in response to a user performing a tilt gesture to the left. This left panel 6902 may comprise a settings menu that allows a user to modify settings associated with the clock application, such as a time of alarms, a location for which to display weather, and the like.

Figure 70:
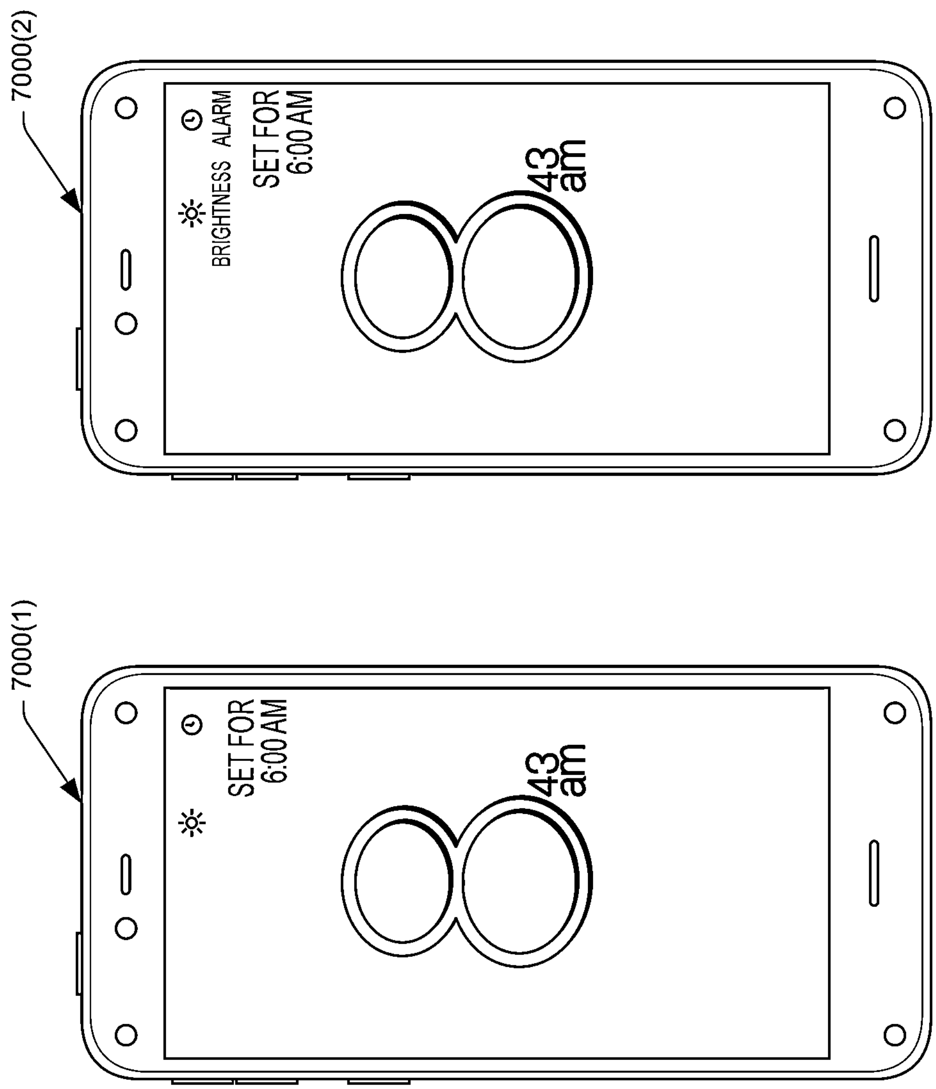
FIG. 70 illustrates an example UI showing a current time and a next scheduled alarm, as well as additional details that the device may display in response to the user performing a peek gesture to the right.

FIG. 70 illustrates an example UI 7000(1) showing a current time and a next scheduled alarm, as part of a "nightstand clock" application. In addition, FIG. 70 illustrates a UI 7000(2) that the device 100 may display in response to the user performing a peek gesture. As illustrated, the UI 7000(2) may display text indicating the meaning of the icons on the UI 7000(1), potentially along with one or more pieces of supplemental information.

Figure 71:
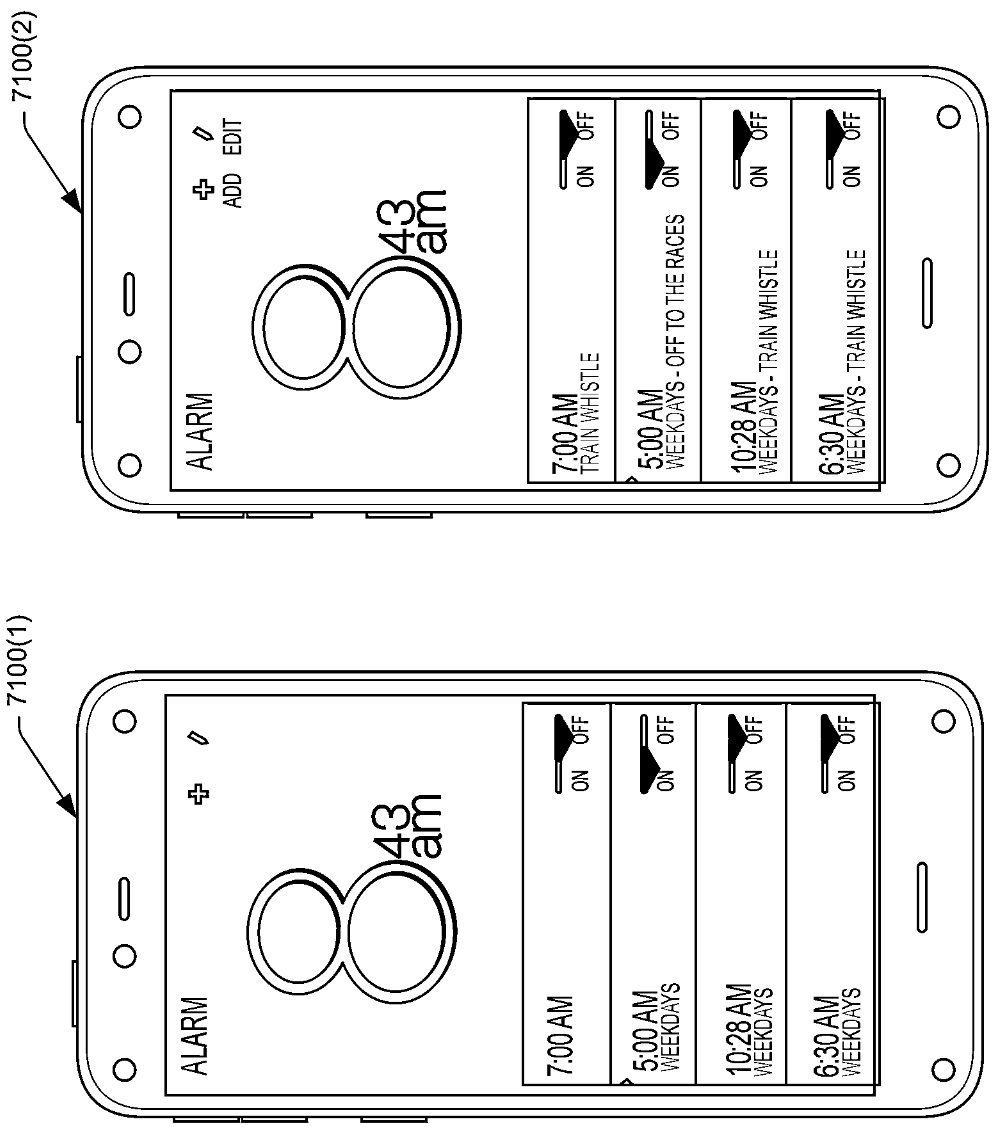
FIG. 71 illustrates another example UI showing a current time of any scheduled alarms, as well as additional details that the device may display in response to the user performing a peek gesture to the right.

FIG. 71 illustrates another example UI 7100(1) that an alarm clock application may display. As illustrated, the UI 7100(1) displays an indication of each alarm set on the device, as well as whether each alarm is currently on or off. The UI 7100(1) may also display a currently time of day.

In addition, FIG. 71 illustrates a UI 7100(2) that the device 100 may display in response to the user performing a peek gesture. As illustrated, the UI 7100(2) may have added a textual description to the icons of the UI 7100(1), as well as a textual description or title of each of the alarms.

Figure 72:
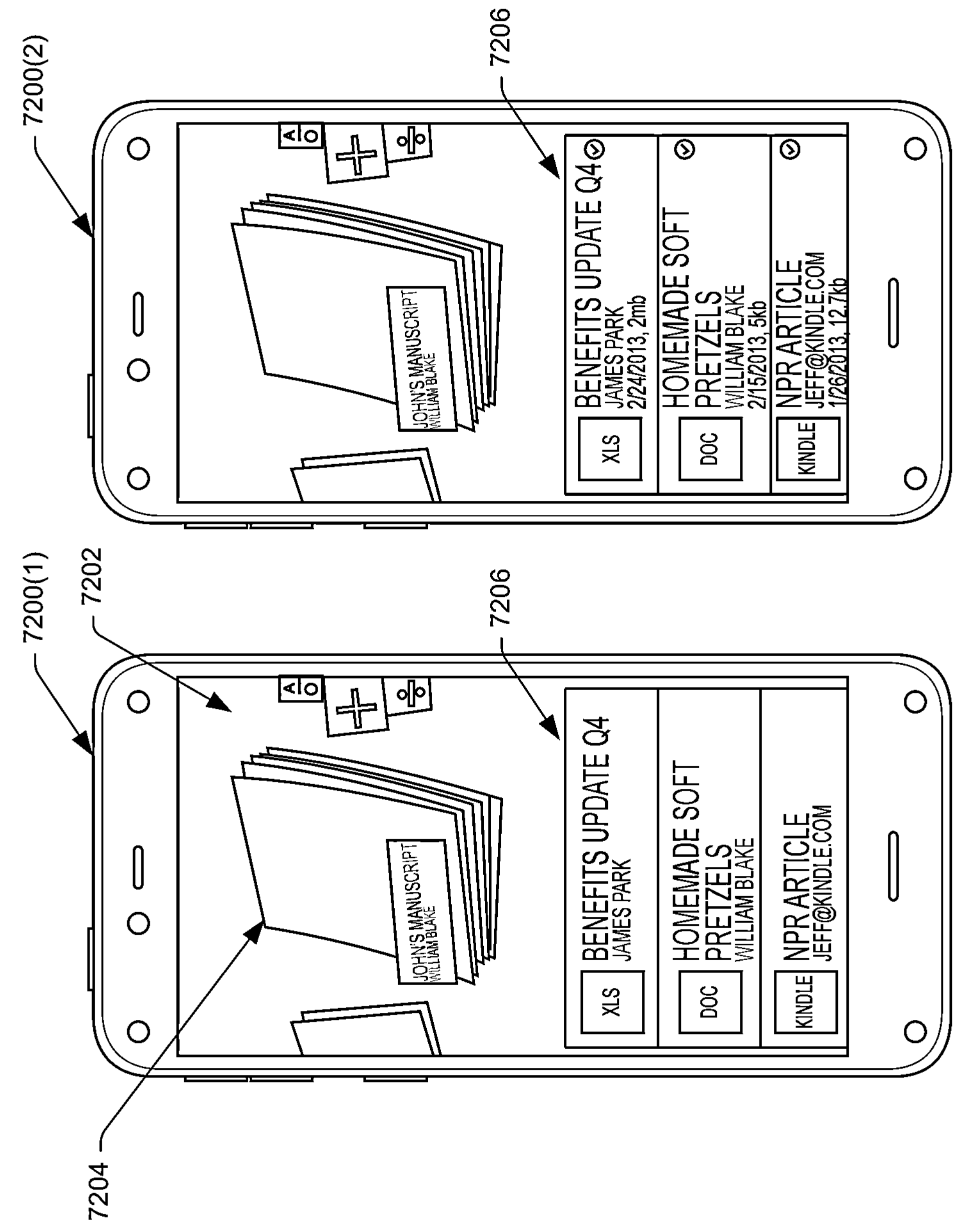
FIG. 72 illustrates an example UI showing a carousel of icons, with an icon corresponding to a document or word-processing application having user-interface focus. This figure also illustrates an example UI showing additional details regarding documents accessible to the device in response to a user of the device performing a peek gesture.

FIG. 72 illustrates an example UI 7200(1) showing a carousel of icons 7202, with an icon 7204 corresponding to a document or word-processing application having user-interface focus. In addition, this figure illustrates a lower portion 7206 of the UI, with this lower portion including information populated by the application currently having user-interface focus. As such, the lower portion 7206 includes documents recently created and/or opened by the device, potentially sorted according to any sort of order.

This figure also illustrates an example UI 7200(2) that the device 100 may display in response to the user of the device performing a peek gesture. As shown, the UI 7200(2) may include additional details regarding the items shown in the lower portion 7206 of the UI, such as a size of each corresponding document, whether the document is stored locally on the device, or the like.

Figure 73:
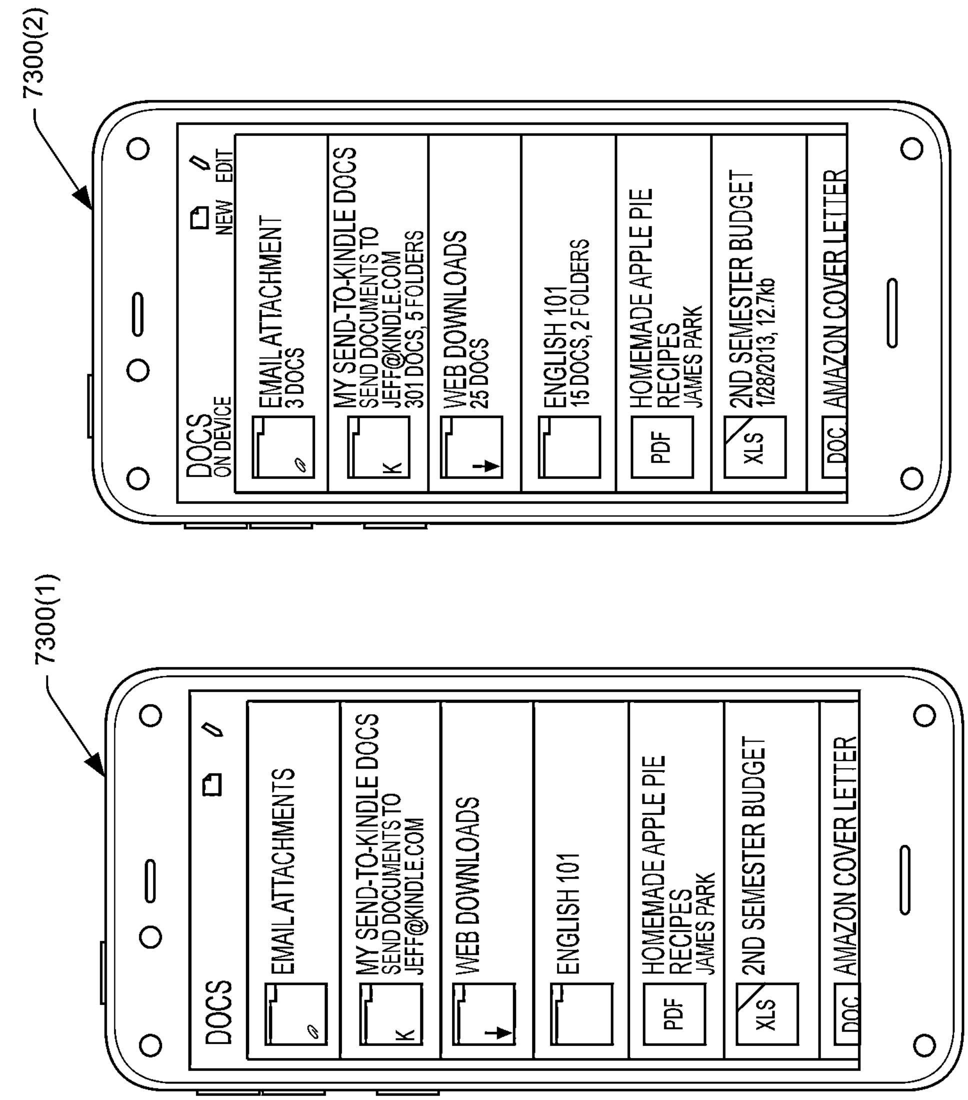
FIG. 73 illustrates an example UI showing a list of documents available to the device, as well as an example UI showing additional details regarding these documents in response to a user performing a peek gesture.

FIG. 73 illustrates an example UI 7300(1) showing a list of documents available to the device. The device 100 may display this UI 7300(1) in response to the user launching a document or word-processing application. As illustrated, in this example the UI 7300(1) displays groups of folders and/or individual documents, and each folder and/or document is associated with a particular title and an icon indicating a type of format of the file. In addition, this figure illustrates an example UI 7300(2) showing additional details regarding these documents in response to a user performing a peek gesture. These additional details may comprise a number of items in each folder, a number of folders in each folder, a size of particular document, or the like.

Figure 74:
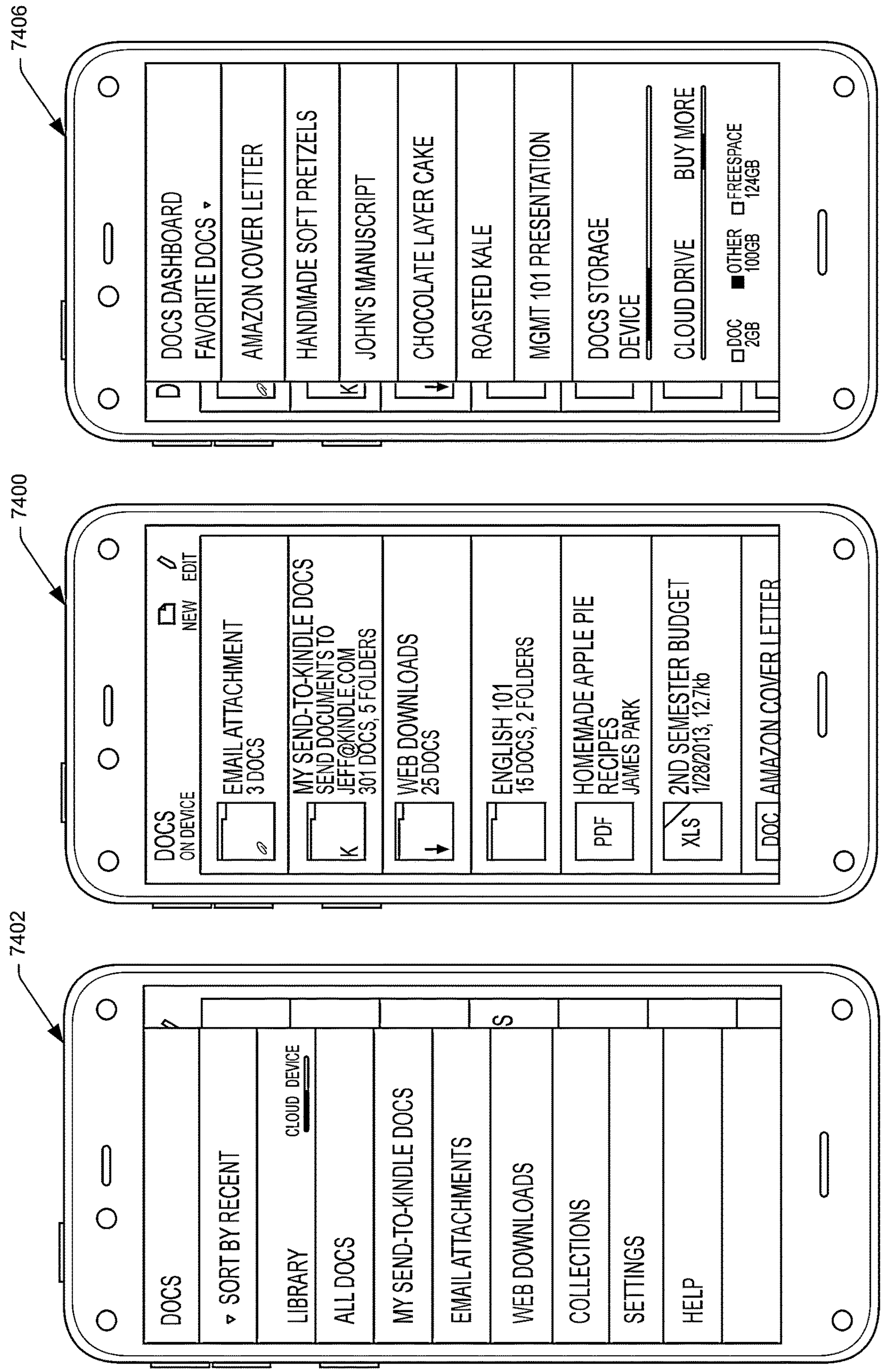
FIG. 74 illustrates an example UI that a document application may display, as well as example right and left panels that the device may display in response to the user performing a predefined gesture (e.g., a tilt gesture to the right and left, respectively).

FIG. 74 illustrates an example UI 7400 that a document application may display. As illustrated, the UI 7400 comprises a list of folders and/or documents available on the device, as well as icons that are selectable to create a new document and/or to edit an existing document. In addition, FIG. 74 illustrates an example left panel 7402 that the device may perform in response to the user performing a tilt gesture to the left. As illustrated, the UI 7402 may comprise a settings menu that allows a user to navigate his or her documents and/or manage settings of the document or word-processing application.

In addition, this figure illustrates an example right panel 7404 that the device 100 may display in response to a user performing a tilt gesture to the right. As illustrated, the UI 7404 may provide links that are selectable to launch "favorite" documents of the user, recently opened documents of the user, or the like. In addition, the UI 7404 may indicate an amount of local and cloud-based storage is remaining for the user, as well as an icon to purchase additional storage.

Figure 75:
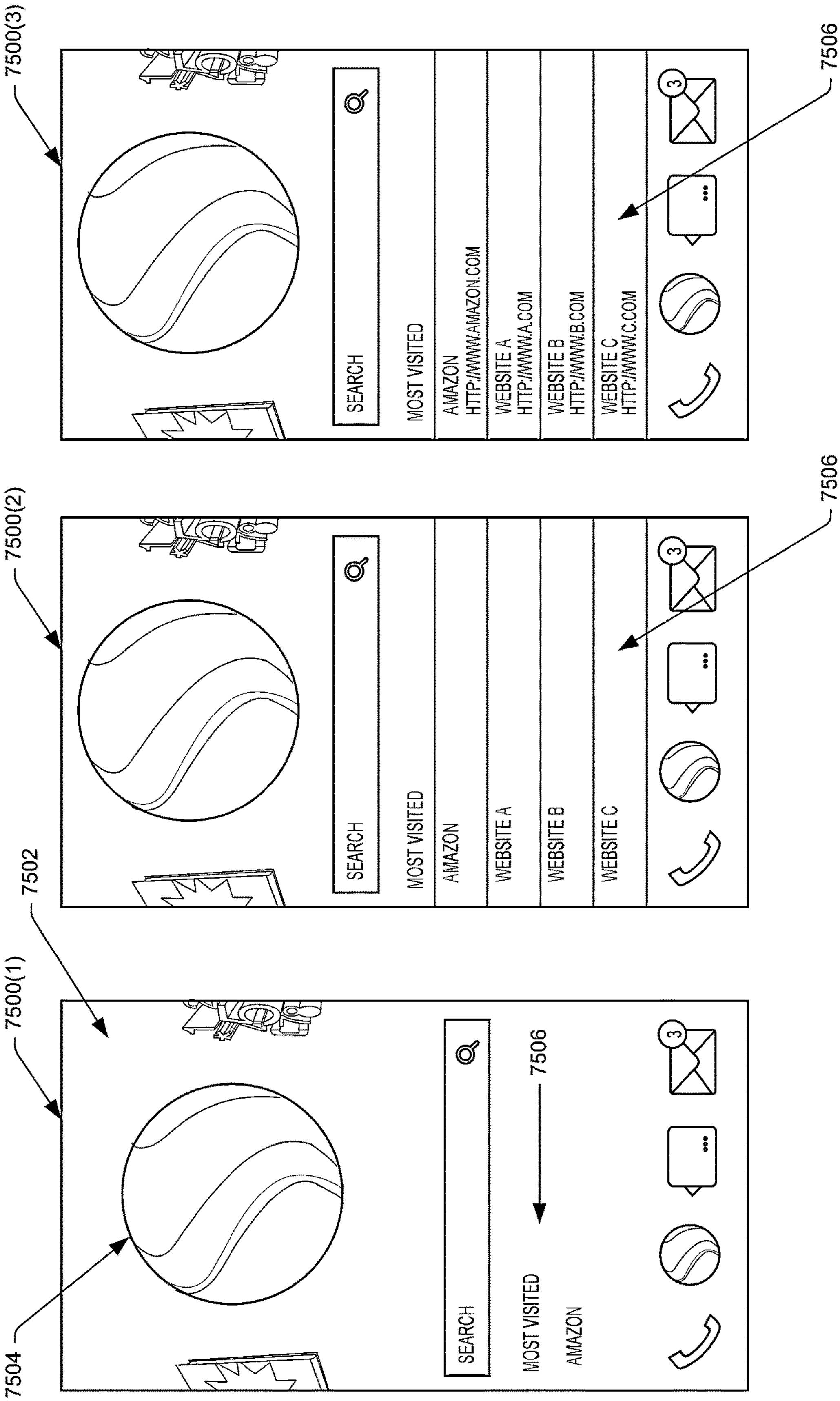
FIG. 75 illustrates an example UI showing a web-browsing application having user-interface focus.

FIG. 75 illustrates an example UI 7500(1) that includes a carousel of icons 7502 and an icon 7504 corresponding to a web-browsing application having user-interface focus in the carousel 7502. In addition, the UI 7500(1) includes a lower portion 7506 that includes information corresponding to the application associated with the icon 7504 having the user-interface focus. As illustrated, the lower portion includes a link to view the "most visited" websites on the device and a link to a specific offering service. In addition, the UI 7500(1) includes a search bar to allow the user of the device to conduct a web search from the UI 7500(1).

In addition, FIG. 75 illustrates an example UI 7500(2) after a user performs an upwards swiping gesture in the lower portion 7506 of the UI. As illustrated, the UI 7500(2) now displays additional information regarding the web-browsing application. For instance, in this example the lower portion 7506 now lists a title of the "most visited" websites, selection of which may cause the display to navigate to the site associated with the selected link. Finally, a UI 7500(3) illustrates additional details that may be displayed in response to a user of the device 100 performing a peek gesture. Here, the lower portion 7506 of the UI now lists the actual web address of the most-visited websites.

Figure 76A:
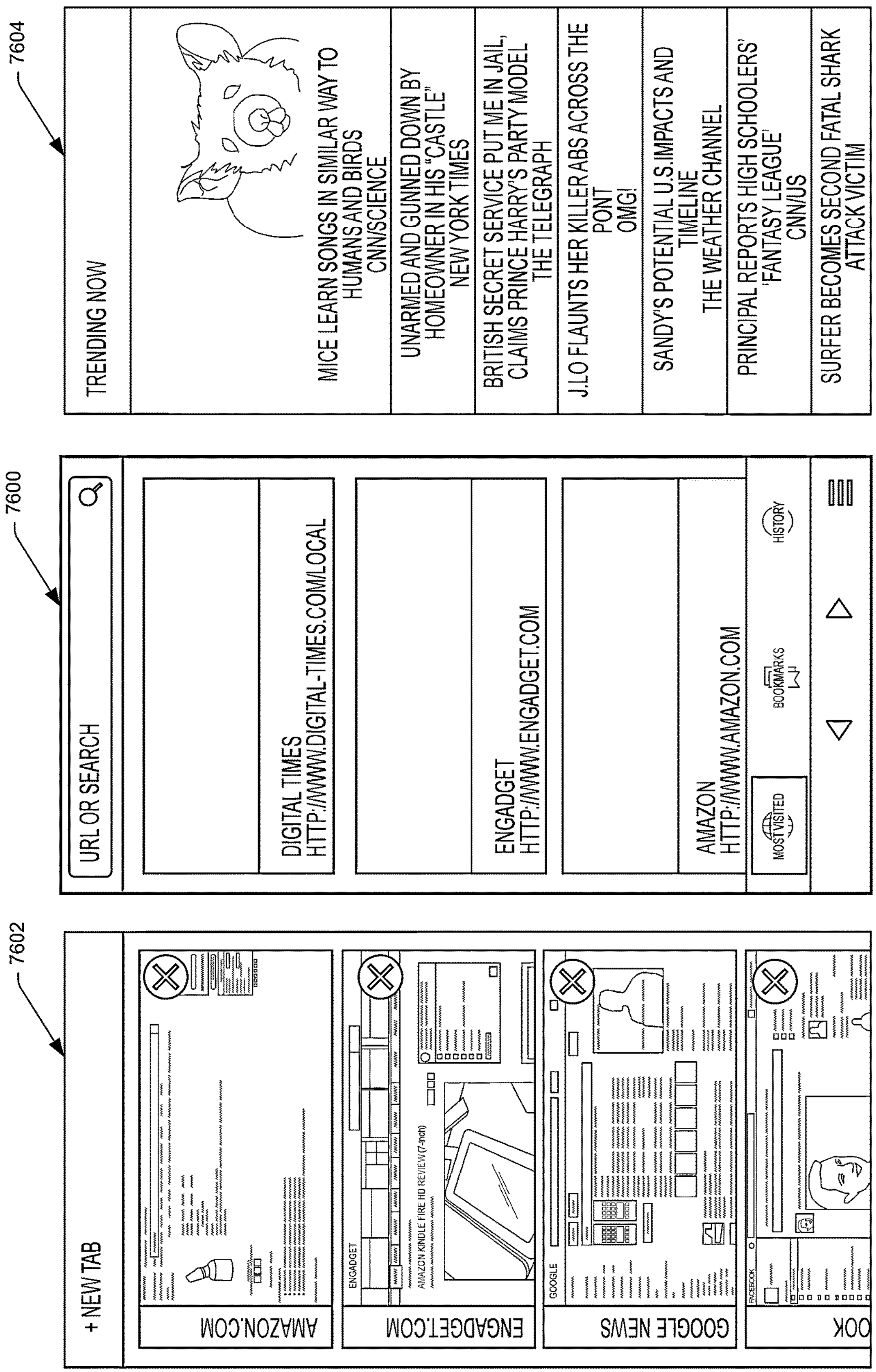
FIG. 76A illustrates an example UI showing example search results in response to a user performing a web-based search, as well as example right and left panels that the device may display in response to the user performing a predefined gesture (e.g., a tilt gesture to the right and left, respectively).

FIG. 76A illustrates an example UI 7600 showing example search results in response to a user performing a web-based search. In addition, FIG. 76 illustrates an example left panel 7602 that the device 100 may display in response to the user performing a tilt gesture to the left. As illustrated, the left panel 7602 may display each open tab in the web-browsing application, along with a control that allows a user to open a new tab. Finally, this figure illustrates a right panel 7604 that the device may display in response to the user performing a tilt gesture to the right from the center-panel UI 7600. Here, the right panel 7604 may include news and articles on the web that are currently trending based on trends of users on search engines, social-network posts, and the like.

Figure 76B:
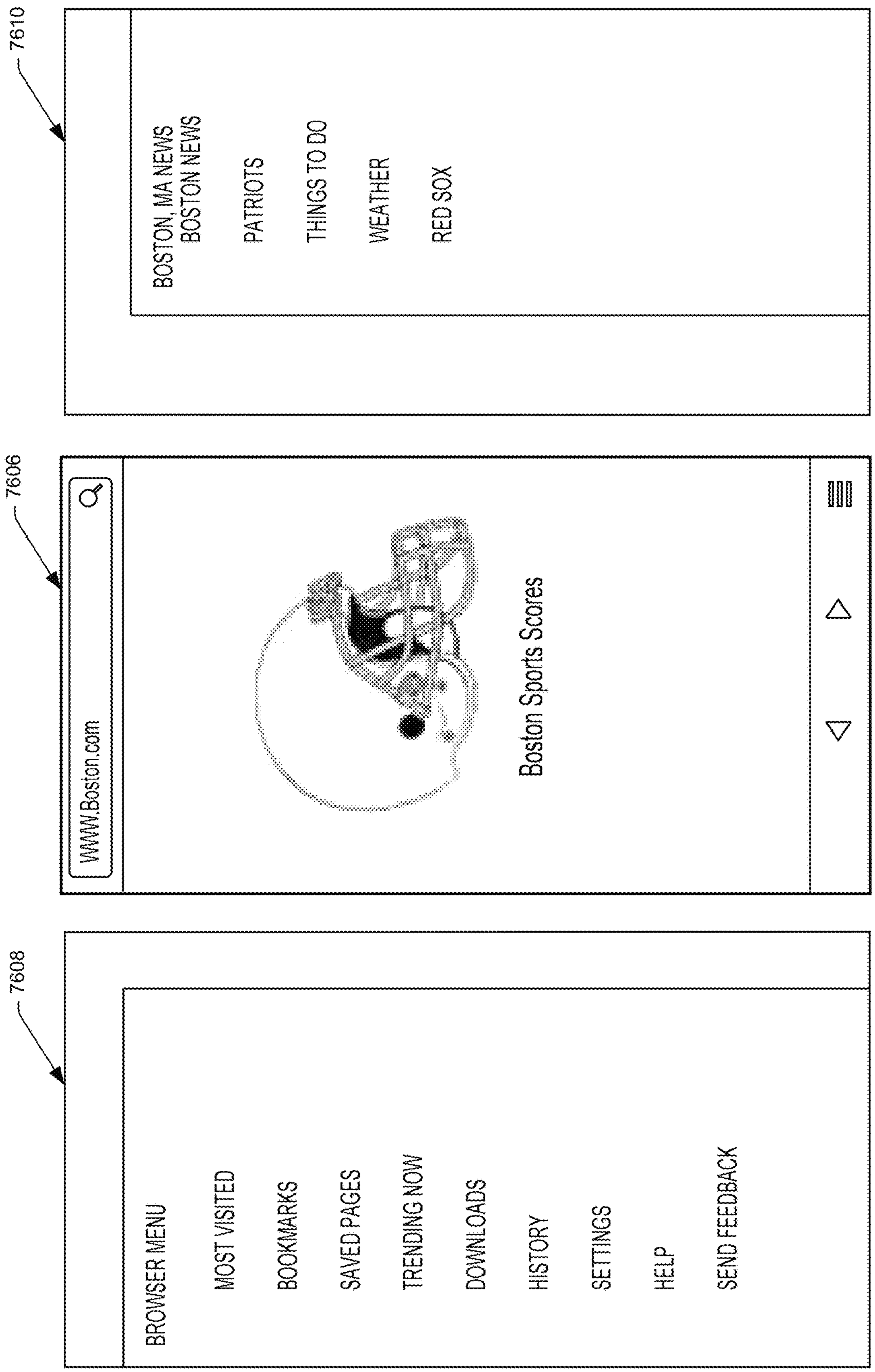
FIG. 76B illustrates another example UI showing an example webpage, as well as example right and left panels that the device may display in response to the user performing a predefined gesture (e.g., a tilt gesture to the right and left, respectively).

FIG. 76B illustrates an example UI 7606 of an example webpage displayed by the web-browsing application. In addition, FIG. 76B illustrates an example left panel 7608 that the browsing application may display in response to the user performing a tilt gesture to the left. As illustrated, the left panel 7608 may comprise a navigation menu that allows the user to navigate to the webpages that the user has "most visited", to webpages bookmarked by the user, to pages that the user has saved, to webpages that currently "trending", and the like.

In addition, FIG. 76B illustrates an example right panel 7610 that the browsing application may display in response to a user performing a tilt gesture to the right. As illustrated, the right panel may comprise a menu of prominent (e.g., often selected) links within the webpage associated with the UI 7606, or other links from other webpages that the device 100 has determined are related to the webpage associated with the UI 7606. Here, for instance, the webpage is associated with Boston and, similarly, the right panel 7610 includes links to Boston weather, Boston sports teams, and the like.

Figure 77:
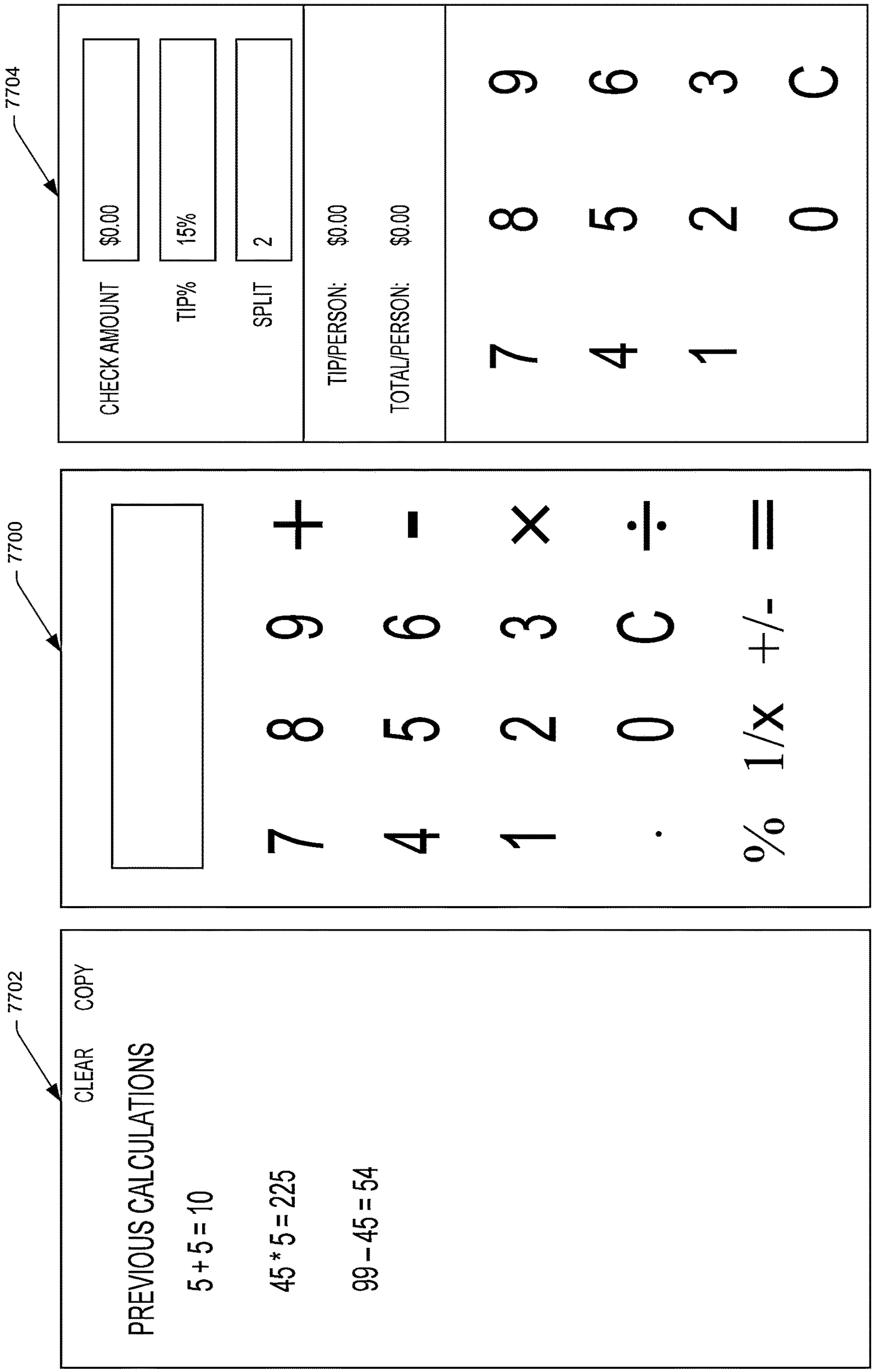
FIG. 77 illustrates an example UI showing a calculator application, as well as an example function that the calculator application may display in response to the user performing a tilt gesture.

FIG. 77 illustrates an example UI 7700 showing a calculator application that the device 102 may display in response to the user launching the calculator application. In addition, this figure illustrates a left panel 7702 that the application may display in response to a user performing a tilt gesture to the left and a right panel 7704 that the application may display in response to a user performing a tilt gesture to the right. In this example, the right panel 7704 comprises a "tip calculator" for calculating a tip based on an amount of a bill, such as a restaurant bill. As illustrated, the tip calculator includes a field to enter a check amount, a tip percentage, and a number of people that the user would like to split the bill across. After entering these figures, the tip calculator may display an amount of the tip per person and a total amount to be paid by each person. While the right panel in this figure illustrates a tip calculator, in other examples, the right panel may comprise another sort of calculator or calculator function. This figure also illustrates the left panel 7702, which comprises previous or recent calculations performed by the calculator. The left panel 7702 also includes an option to clear the history or copy one or more of the previous calculations for insertion into the calculator application or another application.

The processes discussed below are each illustrated as a collection of blocks in a logical flow graph, which represent a sequence of operations that can be implemented in hardware, software, or a combination thereof. In the context of software, the blocks represent computer-executable instructions stored on one or more computer-readable media that, when executed by one or more processing units, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. A client device, a remote content-item service, or both may implement the described processes.

Figure 78:
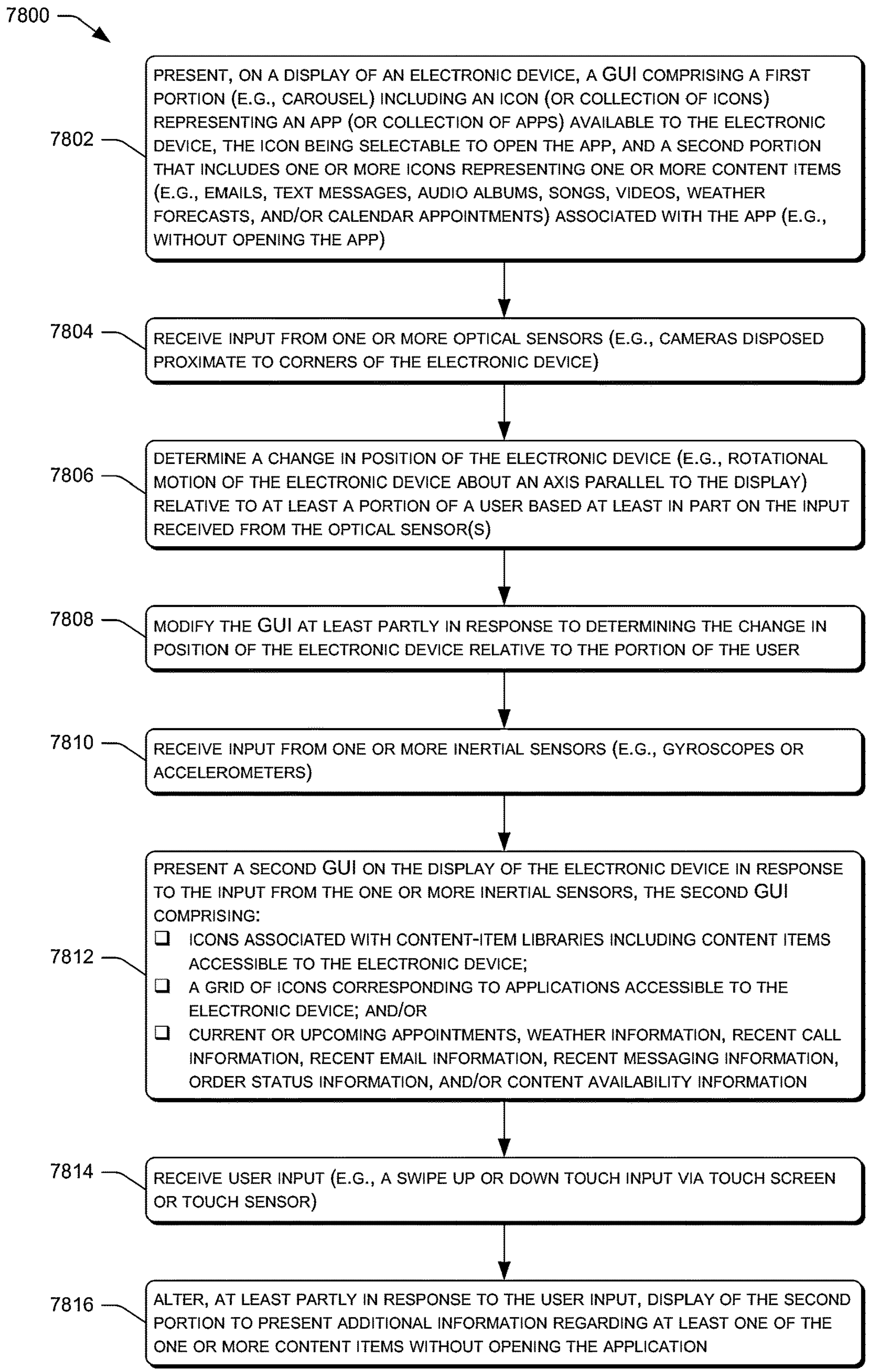
FIG. 78 illustrates a flowchart of an example process of presenting one or more graphical user interfaces (GUIs) comprising a first portion including an icon representing an application and a second portion that includes icons or information representing one or more content items associated with the application. The figure also shows techniques for allowing users to interact with the GUIs using one or more inputs or gestures (e.g., peek or tilt gestures).

FIG. 78 illustrates a flowchart of an example process 7800 of presenting one or more graphical user interfaces (GUIs) comprising a first portion including an icon representing an application and a second portion that includes icons or information representing one or more content items associated with the application. The figure also shows techniques for allowing users to interact with the GUIs using one or more inputs or gestures (e.g., peek or tilt gestures).

At 7802, the process 7800 presents, on a display of an electronic device, a GUI comprising a first portion (e.g., carousel) including an icon (or collection of icons) representing an application (or collection of application) available to the electronic device. The icon may be selectable to open the application. Further, the GUI may comprise a second portion that includes one or more icons representing one or more content items (e.g., emails, text messages, audio albums, songs, videos, weather forecasts, and/or calendar appointments) associated with the application. In some instances, all of this information may be displayed without opening the application.

At 7804, the process 7800 receives input from one or more optical sensors (e.g., cameras disposed proximate to corners of the electronic device). At 7806, the process determines a change in position of the electronic device (e.g., rotational motion of the electronic device about an axis parallel to the display) relative to at least a portion of a user based at least in part on the input received from the optical sensor(s).

At 7808, the process 7800 modifies the GUI at least partly in response to determining the change in position of the electronic device relative to the portion of the user. At 7810, the process 7800 receives input from one or more inertial sensors (e.g., gyroscopes or accelerometers) and, at 7812, presents a second GUI on the display of the electronic device in response to the input from the one or more inertial sensors. The second GUI may comprise at least one of icons associated with content-item libraries including content items accessible to the electronic device; a grid of icons corresponding to applications accessible to the electronic device; or current or upcoming appointments, weather information, recent call information, recent email information, recent messaging information, order status information, and/or content availability information.

At 7814, the process 7800 receives user input, such as a swipe up or down touch input via touch screen or touch sensor. In response, and at 7816, the process 7800 alters, at least partly in response to the user input, display of the second portion to present additional information regarding at least one of the one or more content items without opening the application.

FIG. 79 illustrates a flowchart of an example process 7900 of presenting a GUI including a collection of application icons in a carousel which are usable to open respective applications. The GUI also includes information of one or more content items associated with an application that is in interface focus (e.g., in the front of the carousel).

At 7902, the process 7900 presents a collection of application icons in a carousel, each application icon usable to open a respective application. At 7904, the process 7900 receives user input to move an application icon of the collection of application icons to a front of the carousel. At 7906, the process 7900 presents information of one or more content items associated with an application corresponding to the application icon moved to the front of the carousel.

At 7908, the process 7900 receives user input to move another application icon of the collection of application icons to the front of the carousel. At 7910, the process 7900 presents information of one or more content items associated with an application corresponding to the other application icon moved to the front of the carousel without opening the application. At 7912, the process 7900 receives user selection of the application icon at the front of the carousel and, at 7914, opens the application associated with the icon at the front of the carousel responsive to receiving the user selection.

At 7916, the process 7900 receives input from one or more optical sensors (e.g., cameras disposed proximate to one or more corners of the electronic device). At 7918, the process 7900 determines a change in position of the electronic device (e.g., rotational motion of the electronic device about an axis parallel to the display of the electronic device) relative to at least a portion of a user based at least in part on the input received from the one or more optical sensors. At 7920, the process 7900 presents additional/alternative info on display at least partly in response to determining the change in position of the electronic device relative to the portion of the user.

At 7922, the process 7900 receives input from one or more inertial sensors. Finally, at 7924, the process 7900 presents a user interface panel on the display of the electronic device in response to the input from the one or more inertial sensors. This user interface panel may comprise at least one of: icons associated with content-item libraries, each content-item library including content items accessible to the electronic device; a grid of icons corresponding to applications accessible to the electronic device; or current or upcoming appointments, weather information, recent call information, recent email information, recent messaging information, order status information, and/or content availability information.

FIG. 80 illustrates a flowchart of an example process 8000 of detecting and recognizing a gesture (e.g., a swivel gesture) and performing an operation such as, for example, those shown in FIG. 23A-FIG. 26 responsive to the gesture.

At 8002, the process 8000 detects a first rotation of an electronic device in a first rotational direction about an axis perpendicular to a display of the device (e.g., by measuring an angle of the first rotation using an inertial sensor and determines that the angle of the first rotation meets or exceeds a first threshold angle of rotation, such as 10 degrees). At 8004, the process 8000 detects a second rotation of the electronic device consecutive to the first rotation, the second rotation being in a second rotational direction about the axis perpendicular to the display of the device and being opposite the first rotational direction (e.g., by measuring an angle of the second rotation using an inertial sensor and determining that the angle of the second rotation meets or exceeds a second threshold angle of rotation, such 5 degrees, which is less than the first threshold angle of rotation).

At 8006, the process 8000 recognizes the first rotation and the second rotation as a predefined gesture (e.g., responsive to detecting the second rotation within a predetermined time of the detecting of the first rotation). At 8008, the process 8000 performs an operation responsive to recognizing the predefined gesture. This operation may comprise at least one of: causing one or more user interface controls to be presented on the display of the electronic device; causing a system chrome of the electronic device to be presented on the display of the electronic device; causing one or more application launch controls to be presented on the display of the electronic device (e.g., along a substantially arc-shaped path); accessing location information of the electronic device and causing presentation of a current location of the electronic device, a control usable to “like” the current location of the electronic device, a control usable to check-in at the current location of the electronic device, a control usable to bookmark the current location of the electronic device, a control usable to share the current location of the electronic device, and/or one or more points of interest within a predetermined distance of the current location of the electronic device; causing a map (e.g., of surroundings of a current location of the electronic device, a frequent route traveled by the electronic device, and/or a location of an appointment in a calendar of the electronic device) to be presented on the display of the electronic device; or presenting traffic information corresponding to one or more routes presented on the map.

Figure 81:
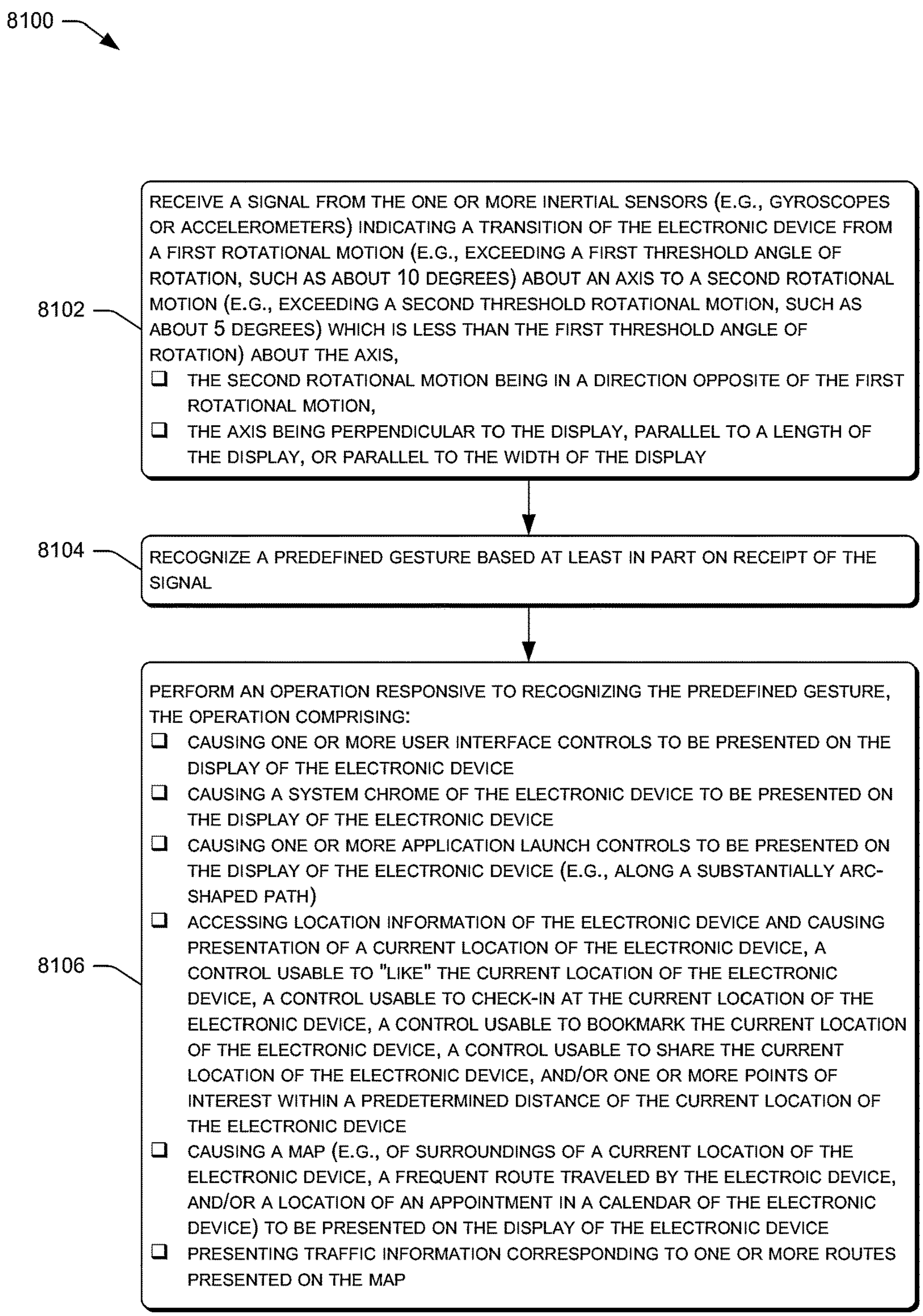
FIG. 81 illustrates a flowchart of another example process of recognizing a gesture (e.g., a swivel gesture) and performing an operation such as those shown in FIG. 23A-FIG. 26 responsive to the gesture.

FIG. 81 illustrates a flowchart of another example process 8100 of recognizing a gesture (e.g., a swivel gesture) and performing an operation such as, for example, those shown in FIG. 23A-FIG. 26 responsive to the gesture.

At 8102, the process 8100 receives a signal from the one or more inertial sensors (e.g., gyroscopes or accelerometers) indicating a transition of the electronic device from a first rotational motion (e.g., exceeding a first threshold angle of rotation, such as about 10 degrees) about an axis to a second rotational motion (e.g., exceeding a second threshold rotational motion, such as about 5 degrees, which is less than the first threshold angle of rotation) about the axis. In some instances, the second rotational motion is in a direction opposite of the first rotational motion, and the axis is perpendicular to the display, parallel to a length of the display, or parallel to the width of the display.

At 8104, the process 8100 recognizes a predefined gesture based at least in part on receipt of the signal. At 8106, the process 8100 performs an operation responsive to recognizing the predefined gesture. This operation may comprise at least one of: causing one or more user interface controls to be presented on the display of the electronic device; causing a system chrome of the electronic device to be presented on the display of the electronic device; causing one or more application launch controls to be presented on the display of the electronic device (e.g., along a substantially arc-shaped path); accessing location information of the electronic device and causing presentation of a current location of the electronic device, a control usable to “like” the current location of the electronic device, a control usable to check-in at the current location of the electronic device, a control usable to bookmark the current location of the electronic device, a control usable to share the current location of the electronic device, and/or one or more points of interest within a predetermined distance of the current location of the electronic device; causing a map (e.g., of surroundings of a current location of the electronic device, a frequent route traveled by the electronic device, and/or a location of an appointment in a calendar of the electronic device) to be presented on the display of the electronic device; or presenting traffic information corresponding to one or more routes presented on the map.

FIG. 82 illustrates a flowchart of an example process 8200 of presenting GUIs responsive to a relative orientation of a handheld electronic device relative to at least a portion of a body of a user.

At 8202, the process 8200 presents a first graphical user interface of an application (e.g., a shopping application, a content library application such as books or music, a reader application, a media player application, a web browser application, an email application, a messaging application, a weather application, a calendar application, a magic window application, a free time application, etc.) on a display of a handheld electronic device responsive to receiving a signal from the one or more sensors indicating that the handheld electronic device is oriented with a display axis substantially aligned with a portion of a user's body. At 8204, the process 8200 presents a second graphical user interface of the application on the display responsive to receiving a signal from the one or more sensors indicative of a first tilt gesture in which the handheld electronic device is oriented with the display axis offset from the portion of the user's body by a first angle in a first rotational direction.

At 8206, the process 8200 presents a third graphical user interface of the application on the display responsive to receiving a signal from the one or more sensors indicative of a second tilt gesture in which the handheld electronic device is oriented with the display axis offset from the portion of the user's body by a second angle in a second rotational direction opposite the first rotational direction. Finally, at 8208, the process 8200 presents supplemental information on the display concurrently with the first, second, and/or third graphical user interfaces responsive to receiving a signal from the one or more sensors indicative of a peek gesture in which the handheld electronic device is oriented with the display axis offset from the portion of the user's body: in the first rotational direction by an angle less than the first angle, or in the second rotational direction by an angle less than the second angle.

Figure 83:
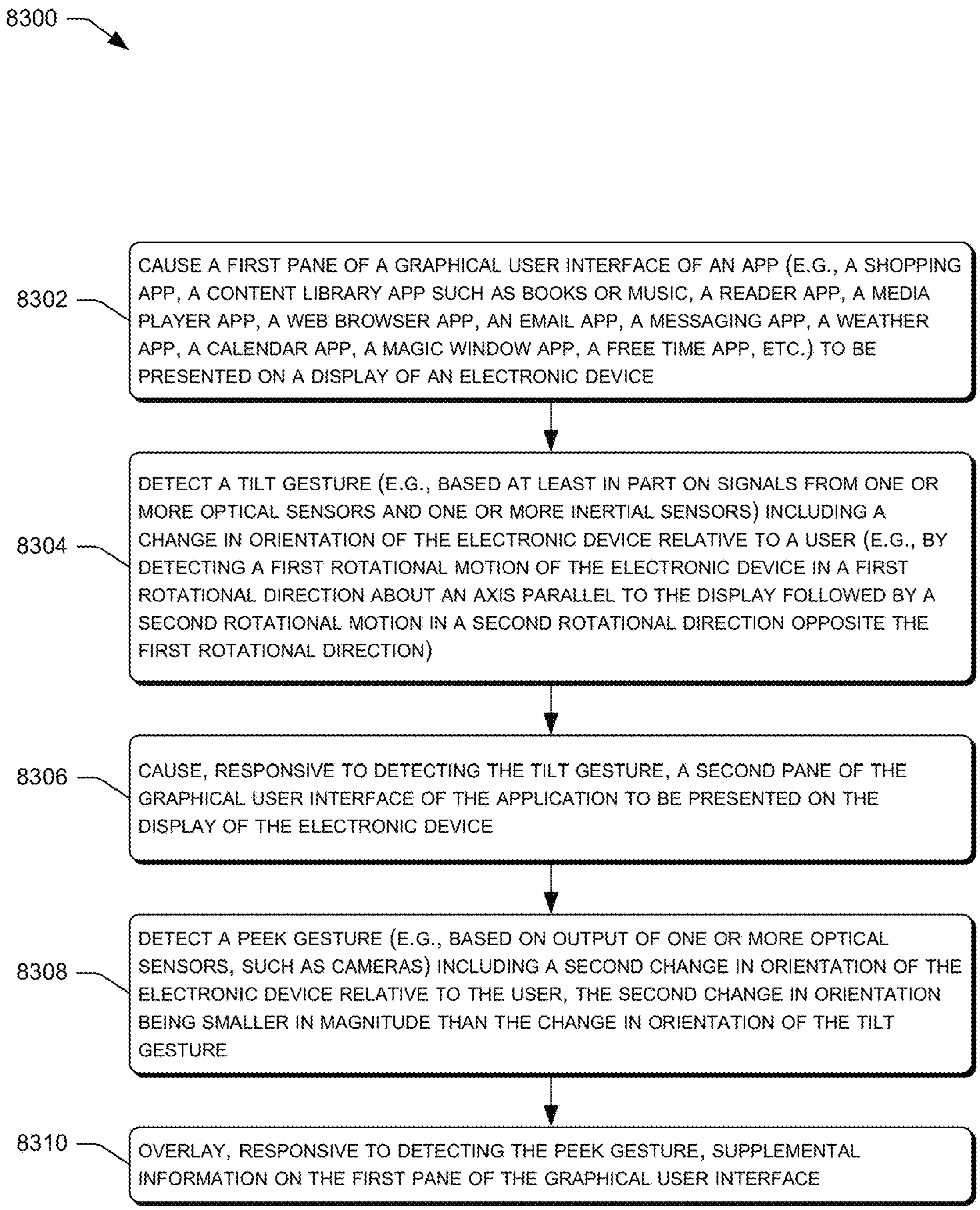
FIG. 83 illustrates a flowchart of an example process of presenting GUIs responsive to a change in orientation of a handheld electronic device relative to at least a portion of a body of a user.

FIG. 83 illustrates a flowchart of an example process 8300 of presenting GUIs responsive to a change in orientation of a handheld electronic device relative to at least a portion of a body of a user.

At 8302, the process 8300 causes a first pane of a graphical user interface of an application (e.g., a shopping application, a content library application such as books or music, a reader application, a media player application, a web browser application, an email application, a messaging application, a weather application, a calendar application, a magic window application, a free time application, etc.) to be presented on a display of an electronic device. At 8304, the process 8300 detects a tilt gesture (e.g., based at least in part on signals from one or more optical sensors and one or more inertial sensors) including a change in orientation of the electronic device relative to a user (e.g., by detecting a first rotational motion of the electronic device in a first rotational direction about an axis parallel to the display followed by a second rotational motion in a second rotational direction opposite the first rotational direction).

At 8306, the process 8300 causes, responsive to detecting the tilt gesture, a second pane of the graphical user interface of the application to be presented on the display of the electronic device. At 8308, the process 8300 detects a peek gesture (e.g., based on output of one or more optical sensors, such as cameras) including a second change in orientation of the electronic device relative to the user, the second change in orientation being smaller in magnitude than the change in orientation of the tilt gesture. Finally, at 8310, the 8300 overlays, responsive to detecting the peek gesture, supplemental information on the first pane of the graphical user interface.

The device 100, as well as any other device capable of implementing the techniques described above, may comprise any type of electronic device, such as a mobile electronic device (e.g., an electronic book reader, a tablet device, a laptop computer, a smart phone or other multifunction communication device, a portable digital assistant, a wearable device, an automotive display, etc.). Alternatively, the device may be a non-mobile electronic device (e.g., a computer display, a television, an appliance, a cash register, etc.).

The devices may include one or more processors and memory, one or more displays for displaying content items, one or more I/O components for interacting with a respective device, one or more network interfaces, and one or more power sources. The network interfaces may support both wired and wireless connection to various networks, such as cellular networks, radio, WiFi networks, short range networks (e.g., Bluetooth®), infrared (IR), and so forth.

Depending on the configuration of the electronic device, the memory 8104 (and other memory described throughout) is an example of computer storage media and may include volatile and nonvolatile memory. Thus, the memory may include, but is not limited to, RAM, ROM, EEPROM, flash memory, or other memory technology, or any other medium that can be used to store computer-readable instructions, programs, applications, media items, and/or data which can be accessed by the respective electronic device. In some examples, the computer-readable media is a tangible non-transitory computer-readable media.

The memory may be used to store any number of functional components that are executable on the processor, as well as content items that are rendered by the electronic device. Thus, the memory may include an operating system and data storage to store one or more content items, such as eBooks, audio books, songs, videos, still images, and the like. The memory of each respective electronic device may also store one or more content rendering applications to render content items on the device. These content presentation applications may be implemented as various applications depending upon the content items. For instance, the content presentation application may be an electronic book reader application for rending textual electronic books, an audio player for playing audio books or songs, a video player for playing video, and so forth.

The electronic device 100 may have additional features or functionality. For example, the device may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 800 may reside remotely from the device in some implementations.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A handheld electronic device comprising:

a display on which to present one or more graphical user interfaces, a display axis defined perpendicular to the display;

one or more sensors;

one or more processors; and memory storing instructions operable to cause the one or more processors to perform operations comprising:

presenting a first graphical user interface of an application on the display responsive to receiving a first signal from the one or more sensors indicating that the handheld electronic device is oriented with the display axis in an initial orientation;

presenting a second graphical user interface of the application on the display and removing the first graphical user interface from the display responsive to receiving a second signal from the one or more sensors indicative of a first tilt gesture in which the handheld electronic device is oriented with the display axis offset from the initial orientation by a first angle in a first rotational direction; and presenting a third graphical user interface of the application on the display and removing the second graphical user interface from the display responsive to receiving a third signal from the one or more sensors indicative of a second tilt gesture in which the handheld electronic device is oriented with the display axis offset from the initial orientation by a second angle in a second rotational direction opposite the first rotational direction.

2. The handheld electronic device of claim 1, wherein:

the application comprises a shopping application;

the first graphical user interface comprises one or more items available for purchase via the shopping application;

the second graphical user interface comprises recommendations for additional items available for purchase; and the third graphical user interface comprises a control interface including one or more controls or settings of the shopping application.

3. The handheld electronic device of claim 1, wherein:

the application comprises a content library application;

the first graphical user interface comprises one or more content items in a collection of content items available for consumption via the content library application;

the second graphical user interface comprises recommendations for additional content items available for purchase from a content store; and the third graphical user interface comprises a control interface including one or more controls or settings of the content consumption application.

4. The handheld electronic device of claim 1, wherein:

the application comprises a reader application;

the first graphical user interface comprises content of an electronic book;

the second graphical user interface comprises supplemental information associated with the content of the electronic book presented in the first graphical user interface; and the third graphical user interface comprises a table of contents of the electronic book.

5. The handheld electronic device of claim 1, wherein:

the application comprises a media player application;

the first graphical user interface comprises information of a playing audio content item;

the second graphical user interface comprises lyrics or a transcript of the playing audio content item and identifies a portion of the lyrics or transcript that is presently being played back; and the third graphical user interface comprises a control interface including one or more controls or settings of the media player application.

6. The handheld electronic device of claim 1, wherein:

the application comprises a browser application;

the first graphical user interface comprises content of a website or web search results;

the second graphical user interface comprises one or more topics currently trending on one or more search engines; and the third graphical user interface comprises a list of currently open tabs or pages of the browser application.

7. The handheld electronic device of claim 1, wherein:

the application comprises an email application;

the first graphical user interface comprises an inbox of the email application;

the second graphical user interface comprises one or more attachments attached to one or more emails in the inbox; and the third graphical user interface comprises a control interface including a settings menu of the email application.

8. The handheld electronic device of claim 1, wherein:

the application comprises an email application;

the first graphical user interface comprises an open email;

the second graphical user interface comprises a list of emails from the sender of the open email; and the third graphical user interface comprises a control interface including a settings menu of the email application.

9. The handheld electronic device of claim 1, wherein:

the application comprises an email application;

the first graphical user interface comprises an email reply, reply all, or forward;

the second graphical user interface comprises a list of selectable quick reply messages; and the third graphical user interface comprises a control interface including a settings menu of the email application.

10. The handheld electronic device of claim 1, wherein:

the application comprises an email application;

the first graphical user interface comprises a new email composition interface;

the second graphical user interface comprises a list of contacts from which to select a recipient of the new email; and the third graphical user interface comprises a control interface including a settings menu of the email application.

11. The handheld electronic device of claim 1, the operations further comprising presenting supplemental information on the display concurrently with the first graphical user interface responsive to receiving a fourth signal from the one or more sensors indicative of a peek gesture in which the handheld electronic device is oriented with the display axis offset from the initial orientation:

in the first rotational direction by a third angle less than the first angle, or in the second rotational direction by a fourth angle less than the second angle.

12. A computer implemented method comprising:

under control of an electronic device configured with specific instructions executable by one or more processors of the electronic device, causing a first pane of a graphical user interface of an application to be presented on a display of the electronic device;

detecting a tilt gesture including a change in orientation of the electronic device from a first orientation to a second orientation, the tilt gesture comprising detecting a first rotational motion of the electronic device in a first rotational direction about an axis parallel to the display followed by a second rotational motion in a second rotational direction opposite the first rotational direction; and responsive to detecting the tilt gesture, causing a second pane of the graphical user interface of the application to be presented on the display of the electronic device and causing the first pane of the graphical user interface to be removed from the display of the electronic device.

13. The method of claim 12, wherein the detecting the tilt gesture is based at least in part on signals from one or more optical sensors and one or more inertial sensors.

14. The method of claim 12, further comprising:

detecting a peek gesture including a second change in orientation of the electronic device relative to the user, the second change in orientation being smaller in magnitude in at least one direction than the change in orientation of the tilt gesture; and overlaying, responsive to detecting the peek gesture, supplemental information on the first pane of the graphical user interface.

15. The method of claim 12, wherein the detecting the peek gesture is based on one or more optical sensors.

16. The method of claim 12, wherein:

the application comprises a shopping application;

the first pane of the graphical user interface comprises one or more items available for purchase; and the second pane of the graphical user interface comprises recommendations for additional items available for purchase.

17. The method of claim 12, wherein:

the application comprises a content library application;

the first pane of the graphical user interface comprises one or more content items in a collection of content items available for consumption; and the second pane of the graphical user interface comprises recommendations for additional content items available for purchase from a content store.

18. The method of claim 12, wherein:

the application comprises a reader application;

the first pane of the graphical user interface comprises content of an electronic book; and the second pane of the graphical user interface comprises:

supplemental information associated with the content of the electronic book presented in the first pane of the graphical user interface; or a table of contents of the electronic book.

19. The method of claim 12, wherein:

the application comprises a media player application;

the first pane of the graphical user interface comprises information of a playing audio content item; and the second pane of the graphical user interface comprises lyrics or a transcript of the playing audio content item and identifies a portion of the lyrics or transcript that is presently being played back.

20. The method of claim 12, wherein:

the application comprises a browser application;

the first pane of the graphical user interface comprises content of a website or web search results; and the second pane of the graphical user interface comprises at least one of:

one or more currently trending topics; or a list of currently open tabs or pages of the browser application.

21. The method of claim 12, wherein:

the application comprises an email application;

the first pane of the graphical user interface comprises an inbox of the email application; and the second pane of the graphical user interface comprises one or more attachments attached to one or more emails in the inbox.

22. The method of claim 12, wherein:

the application comprises an email application;

the first pane of the graphical user interface comprises an open email; and the second pane of the graphical user interface comprises a list of emails from the sender of the open email.

23. The method of claim 12, wherein:

the application comprises an email application;

the first pane of the graphical user interface comprises an email reply, reply all, or forward; and the second pane of the graphical user interface comprises a list of selectable quick reply messages.

24. The method of claim 12, wherein:

the application comprises an email application;

the first pane of the graphical user interface comprises a new email composition interface; and the second pane of the graphical user interface comprises a list of contacts from which to select a recipient of the new email.

25. One or more computer-readable storing instructions executable by one or more processors of the electronic device to implement the method of claim 12.

26. The method of claim 12, wherein detecting the tilt gesture further comprises determining that a first time at which the second rotational motion was performed was within a predetermined amount of time of a second time at which the first rotational motion was performed.

27. An electronic device comprising:

one or more processors; and memory communicatively coupled to the one or more processors and storing instructions that, when executed, configure the one or more processors to:

cause a first pane of a graphical user interface of an application to be presented on a display of the electronic device;

detect a tilt gesture including a change in orientation of the electronic device from a first orientation to a second orientation, the tilt gesture comprising detecting a first rotational motion of the electronic device in a first rotational direction about an axis parallel to the display followed by a second rotational motion in a second rotational direction opposite the first rotational direction; and responsive to detecting the tilt gesture, cause a second pane of the graphical user interface of the application to be presented on the display of the electronic device and cause the first pane of the graphical user interface to be removed from the display of the electronic device.

* * * * *